(12) United States Patent
Miyakawa et al.

(10) Patent No.: US 8,993,074 B2
(45) Date of Patent: Mar. 31, 2015

(54) LIQUID CRYSTAL DISPLAY DEVICE AND METHOD OF MANUFACTURING THE SAME

(71) Applicant: Sony Corporation, Tokyo (JP)

(72) Inventors: Masashi Miyakawa, Kanagawa (JP); Shunichi Suwa, Kanagawa (JP); Tadaaki Isozaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/850,888

(22) Filed: Mar. 26, 2013

(65) Prior Publication Data

US 2014/0111752 A1    Apr. 24, 2014

(30) Foreign Application Priority Data

Mar. 30, 2012 (JP) ................................. 2012-081972

(51) Int. Cl.

| | |
|---|---|
| *C09K 19/00* | (2006.01) |
| *C09K 19/30* | (2006.01) |
| *C09K 19/20* | (2006.01) |
| *C09K 19/02* | (2006.01) |
| *G02F 1/1333* | (2006.01) |
| *G02F 1/1337* | (2006.01) |
| *C08G 73/10* | (2006.01) |
| *C08L 79/08* | (2006.01) |

(52) U.S. Cl.
CPC .......... *G02F 1/133711* (2013.01); *C08G 73/10* (2013.01); *C08L 79/08* (2013.01); *G02F 2001/133742* (2013.01)
USPC .............. 428/1.2; 349/86; 349/123; 349/183; 252/299.63; 252/299.64

(58) Field of Classification Search
USPC ...................... 349/86, 123, 183; 428/1.1, 1.2; 252/299.01, 299.6, 299.63, 299.64
See application file for complete search history.

(56) References Cited

U.S. PATENT DOCUMENTS

| | | | |
|---|---|---|---|
| 2012/0212691 A1* | 8/2012 | Miyakawa et al. | 349/86 |
| 2013/0010244 A1* | 1/2013 | Suwa et al. | 349/123 |
| 2013/0155360 A1* | 6/2013 | Shibahara et al. | 349/123 |

FOREIGN PATENT DOCUMENTS

| | | |
|---|---|---|
| JP | 10-073821 | 3/1998 |
| JP | 10-087859 | 4/1998 |
| JP | 10-232400 | 9/1998 |
| JP | 10-252646 | 9/1998 |
| JP | 11-326638 | 11/1999 |
| JP | 2002-082336 | 3/2002 |
| JP | 2011-095696 | 5/2011 |

* cited by examiner

*Primary Examiner* — Geraldina Visconti
(74) *Attorney, Agent, or Firm* — K&L Gates LLP

(57) ABSTRACT

There is provided a liquid crystal display device including a liquid crystal display element including a first alignment film and a second alignment film provided on opposing surfaces of a pair of substrates, and a liquid crystal layer arranged between the first alignment film and the second alignment film and including crystal molecules having negative dielectric constant anisotropy. At least the first alignment film includes a compound in which a polymer compound having a first side chain and a second side chain is crosslinked or polymerized. The first side chain has a crosslinkable functional group or a polymerizable functional group. The second side chain has a structure inducing dielectric anisotropy. The liquid crystal molecules are pretilted by the first alignment film.

7 Claims, 13 Drawing Sheets

LIQUID CRYSTAL DISPLAY DEVICE AND METHOD OF MANUFACTURING THE SAME

CROSS REFERENCES TO RELATED APPLICATIONS

The present application claims priority to Japanese Priority Patent Application JP 2012-081972 filed in the Japan Patent Office on Mar. 30, 2012, the entire content of which is hereby incorporated by reference.

BACKGROUND

The present disclosure relates to a liquid crystal display device including a liquid crystal display element in which a liquid crystal layer is sealed between a pair of substrates having an alignment film on their opposing surfaces, and a method of manufacturing the liquid crystal display device.

In recent years, a liquid crystal display (LCD) has been widely used as a display monitor for a liquid crystal television receiver, a notebook type personal computer, a car navigation device or the like. This liquid crystal display is classified into a variety of display modes (schemes) according to a molecule arrangement (alignment) of liquid crystal molecules included in a liquid crystal layer sandwiched between substrates. For example, a TN (Twisted Nematic) mode in which liquid crystal molecules are aligned to be twisted in a state in which a voltage is not applied is well known as a display mode. In the TN mode, the liquid crystal molecules have positive dielectric anisotropy, i.e., a property of a dielectric constant of the liquid crystal molecules in a long axis direction is greater than that in a short axis direction. For this, the liquid crystal molecules have a structure in which the liquid crystal molecules are aligned in a direction perpendicular to a substrate surface while an alignment orientation of the liquid crystal molecules is sequentially rotated within a plane parallel to the substrate surface.

Meanwhile, a VA (Vertical Alignment) mode in which liquid crystal molecules are aligned perpendicular to a substrate surface in a state in which a voltage is not applied has attracted attention. In the VA mode, the liquid crystal molecules have negative dielectric constant anisotropy, i.e., a property of a dielectric constant of the liquid crystal molecules in a long axis direction is smaller than that in a short axis direction. The VA mode can realize a wider viewing angle than the TN mode.

In a liquid crystal display in such a VA mode, when a voltage is applied, the liquid crystal molecules aligned in a direction perpendicular to a substrate respond to topple in a direction parallel to the substrate due to negative dielectric constant anisotropy, thereby transmitting light. However, since a direction in which the liquid crystal molecules aligned in the direction perpendicular to the substrate topple is arbitrary, alignment of the liquid crystal molecules is disturbed due to the applied voltage, which becomes a factor that worsens a response characteristic to the voltage.

Thus, technology for regulating the direction in which the liquid crystal molecules topple in response to the voltage in order to improve the response characteristic has been studied. Specifically, there is technology for pretilting liquid crystal molecules using an alignment film formed by applying a linearly polarized light of an ultraviolet ray or applying an ultraviolet ray from a direction oblique to a substrate surface (optical alignment film technology). For example, technology for forming an alignment film by applying a linearly polarized light of an ultraviolet ray or applying an ultraviolet ray from a direction oblique to a substrate surface to a film formed of a polymer including a chalcone structure to crosslink a double bond portion in the chalcone structure is known as the optical alignment film technology (see Japanese Patent Application Laid-Open Publication Nos. Hei10-087859, Hei10-252646 and 2002-082336). There is additional technology for forming an alignment film using a mixture of a vinyl cinnamate derivative polymer and a polyimide (see Japanese Patent Application Laid-Open Publication No. Hei 10-232400). Further, technology for forming an alignment film by applying linearly polarized light having a wavelength of 254 nm to a film including polyimide to decompose a portion of the polyimide (see Japanese Patent Application Laid-Open Publication No. Hei10-073821) is also known. Further, as peripheral technology for the optical alignment film technology, there is technology for forming a film including a liquid crystal polymer compound on a film formed of a polymer including a dichroic photoreactive constituent unit such as an azobenzene derivative, which has been irradiated with linearly polarized light or oblique light, as a liquid crystal alignment film (see Japanese Patent Application Laid-Open Publication No. Hei 11-326638).

Further, a liquid crystal display device including a liquid crystal display element having a pair of alignment films provided on opposing surfaces of a pair of substrates, and a liquid crystal layer provided between the pair of alignment films and including liquid crystal molecules having negative dielectric constant anisotropy, wherein at least one of the pair of alignment films includes a compound in which a polymer compound having a crosslinkable functional group as a side chain is crosslinked or deformed, and the liquid crystal molecules are pretilted by the crosslinked or deformed compound, is known from Japanese Patent Application Laid-Open Publication No. 2011-095696.

SUMMARY

However, in the optical alignment film technology described above, a response characteristic is improved, but there is a problem in that a large-scale light irradiation apparatus such as an apparatus that applies the linearly polarized light or an apparatus that applies the light from a direction oblique to a substrate surface is necessary when the alignment film is formed. Further, there is another problem in that a larger-scale apparatus is necessary and a manufacturing process becomes complicated in order to manufacture a liquid crystal display having a multi-domain obtained by providing a plurality of sub-pixels in a pixel and dividing alignment of liquid crystal molecules to realize a wider viewing angle. Specifically, in the liquid crystal display having the multi-domain, an alignment film is formed so that pretilt is different for each sub-pixel. Accordingly, when the above optical alignment film technology is used in manufacture of the liquid crystal display having the multi-domain, light is applied to each sub-pixel, and accordingly, a mask pattern for each sub-pixel is necessary and a scale of the light irradiation apparatus becomes large. Further, in the technology disclosed in Japanese Patent Application Laid-Open Publication No. 2011-095696, it is possible to improve a response characteristic. However, the liquid crystal molecules are pretilted by applying a voltage to a pixel electrode and an opposing electrode provided in the liquid crystal display device at the time of manufacture of the liquid crystal display device, but there is a demand for a lower applied voltage.

Accordingly, it is desirable to provide a liquid crystal display device that includes a liquid crystal display element whose response characteristic can be easily improved without using a large-scale manufacturing apparatus and which is capable of allowing a voltage applied to pretilt liquid crystal molecules to be lower, and a method of manufacturing the liquid crystal display device.

A liquid crystal display device according to a (1-A)$^{th}$, (1-B)$^{th}$, (1-C)$^{th}$ or (1-D)$^{th}$ aspect of the present disclosure includes a liquid crystal display element including:

a first alignment film and a second alignment film provided on opposing surfaces of a pair of substrates; and a liquid crystal layer arranged between the first alignment film and the second alignment film and including crystal molecules having negative dielectric constant anisotropy, wherein at least the first alignment film includes a compound in which a polymer compound (for convenience, referred to as a "compound before an alignment process") having a first side chain and a second side chain is crosslinked or polymerized (for convenience, referred to as a "compound after an alignment process"), the first side chain has a crosslinkable functional group or a polymerizable functional group, the second side chain has a structure inducing dielectric anisotropy (the (1-A)$^{th}$ aspect of the present disclosure), the second side chain has a dipole moment in a direction perpendicular to its long axis, and has a structure inducing spontaneous polarization (the (1-B)$^{th}$ aspect of the present disclosure), the second side chain has a dielectrically negative component (the (1-C)$^{th}$ aspect of the present disclosure), or the second side chain has the following Structural Formula (11) or (12) (the (1-D)$^{th}$ aspect of the present disclosure), and the liquid crystal molecules are pretilted by the first alignment film. Here, the "crosslinkable functional group" refers to a group in which a crosslinked structure (a bridged structure) can be formed, and more specifically, refers to dimerization. Further, the "polymerizable functional group" refers to a functional group in which two or more functional groups perform sequential polymerization.

a ring X is represented by one of the following formulae:

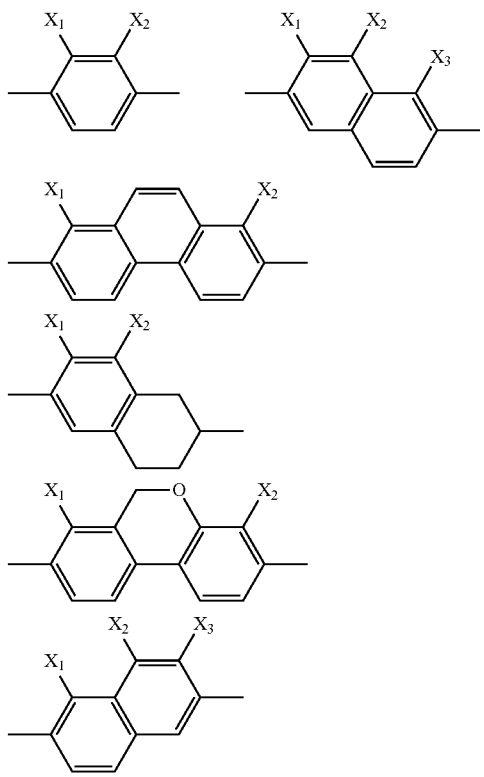

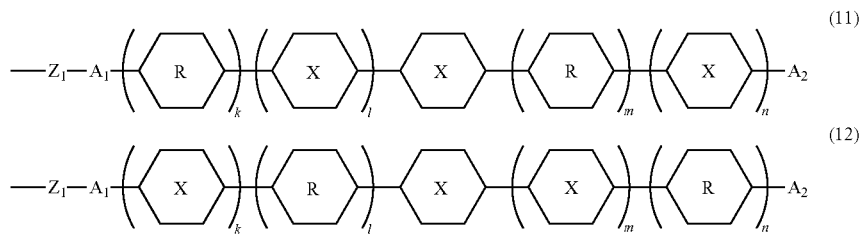

where a ring R is represented by one of the following formulae:

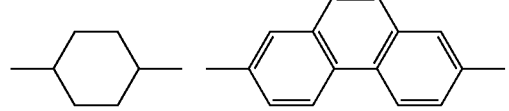

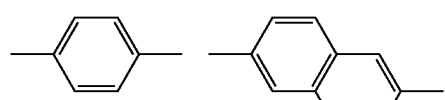

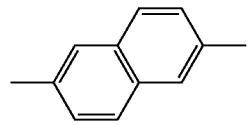

-continued

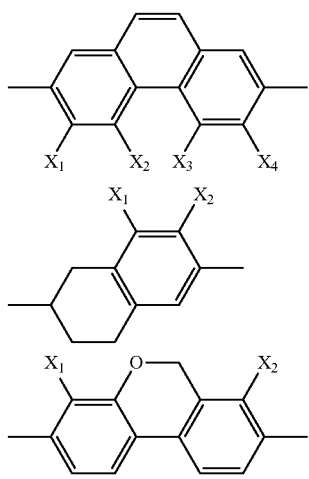

-continued

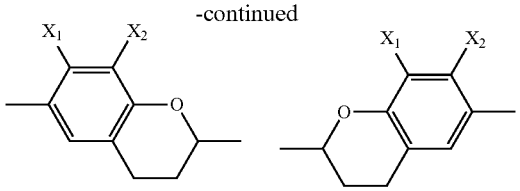

$Z_1$ represents one of a single bond, —O—, —CH$_2$O—, —OCH$_2$—, —COO— and —COO—, each of $A_1$ and $A_2$ independently represents a hydrogen atom or an unsubstituted alkyl group having 0 to 15 carbon atoms, and in the alkyl group, any non-adjacent —(CH$_2$)— may be substituted by —O—, —S— or —CO—, and any —(CH$_2$)— may be substituted by —CH=CH— or —C≡C—, $X_1$ represents one of a halogen atom, —CN, —OCF$_3$, —CF$_3$, —CHF$_2$, —CH$_2$F, —OCF$_2$CHF$_2$ or —OCF$_2$CHFCF$_3$, each of $X_2$, $X_3$ and $X_4$ independently represents a hydrogen atom, a halogen atom, —CN, —OCF$_3$, —CF$_3$, —CHF$_2$, —CH$_2$F, —OCF$_2$CHF$_2$ or —OCF$_2$CHFCF$_3$, and each of k, l, m, and n independently represents 0 or 1.

A liquid crystal display device according to a (2-A)$^{th}$, (2-B)$^{th}$, (2-C)$^{th}$ or (2-D)$^{th}$ aspect of the present disclosure includes a liquid crystal display element including:

a first alignment film and a second alignment film provided on opposing surfaces of a pair of substrates; and a liquid crystal layer arranged between the first alignment film and the second alignment film and including crystal molecules having negative dielectric constant anisotropy, wherein at least the first alignment film includes a compound in which a polymer compound (for convenience, referred to as a "compound before an alignment process") having a first side chain and a second side chain is deformed (for convenience, referred to as a "compound after an alignment process"), the first side chain has a photosensitive functional group, the second side chain has a structure inducing dielectric anisotropy (the (2-A)$^{th}$ aspect of the present disclosure), the second side chain has a dipole moment in a direction perpendicular to its long axis, and has a structure inducing spontaneous polarization (the (2-B)$^{th}$ aspect of the present disclosure), the second side chain has a dielectrically negative component (the (2-C)$^{th}$ aspect of the present disclosure), or the second side chain has the following Structural Formula (11) or (12) (the (2-D)$^{th}$ aspect of the present disclosure), and the liquid crystal molecules are pretilted by the first alignment film. Here, the "photosensitive functional group" refers to a group capable of absorbing an energy ray. Further, the energy ray may include an ultraviolet ray, an X ray, or an electron beam. The same applies hereinafter.

A liquid crystal display device according to a (3-A)$^{th}$, (3-B)$^{th}$, (3-C)$^{th}$ or (3-D)$^{th}$ aspect of the present disclosure includes a liquid crystal display element including:

a first alignment film and a second alignment film provided on opposing surfaces of a pair of substrates; and a liquid crystal layer arranged between the first alignment film and the second alignment film and including crystal molecules having negative dielectric constant anisotropy, wherein at least the first alignment film includes a compound in which a polymer compound having a side chain is crosslinked or polymerized, the side chain has a crosslinkable functional group or a polymerizable functional group, and has a structure inducing dielectric anisotropy (the (3-A)$^{th}$ aspect of the present disclosure), the side chain has a crosslinkable functional group or a polymerizable functional group, has a dipole moment in a direction perpendicular to its long axis, and has a structure inducing spontaneous polarization (the (3-B)$^{th}$ aspect of the present disclosure), the side chain has a crosslinkable functional group or a polymerizable functional group, and has a dielectrically negative component (the (3-C)$^{th}$ aspect of the present disclosure), or the side chain has a crosslinkable functional group or a polymerizable functional group, and has the following Structural Formula (13), (14), (15) or (16) (the (3-C)$^{th}$ aspect of the present disclosure), and the liquid crystal molecules are pretilted by the first alignment film.

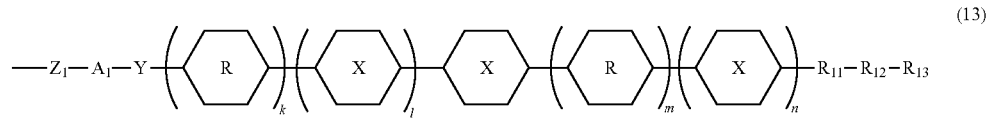

(13)

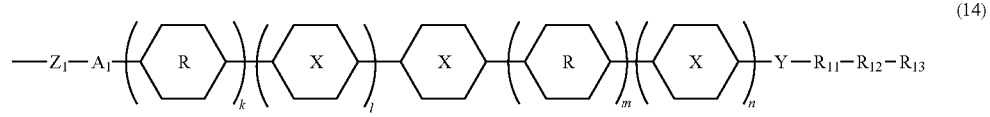

(14)

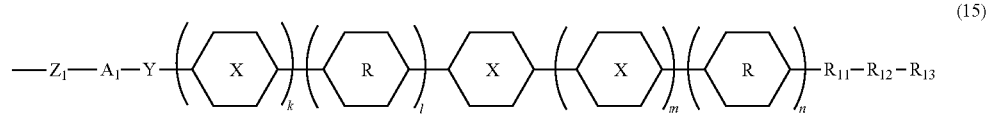

(15)

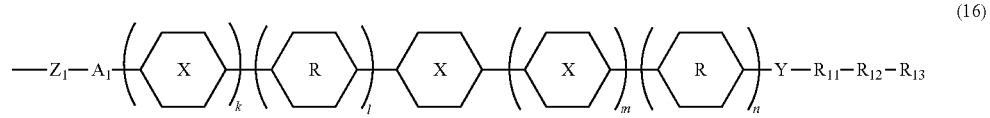

(16)

where a ring R is represented by one of the following formulae,

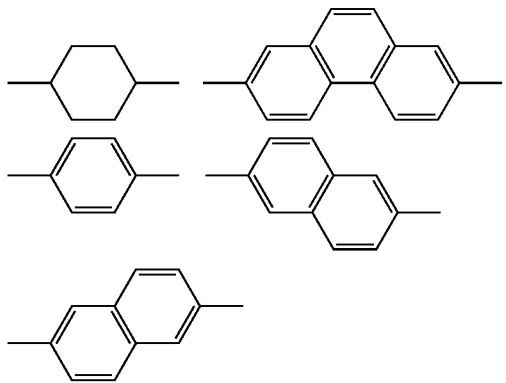

a ring X is represented by one of the following formulae,

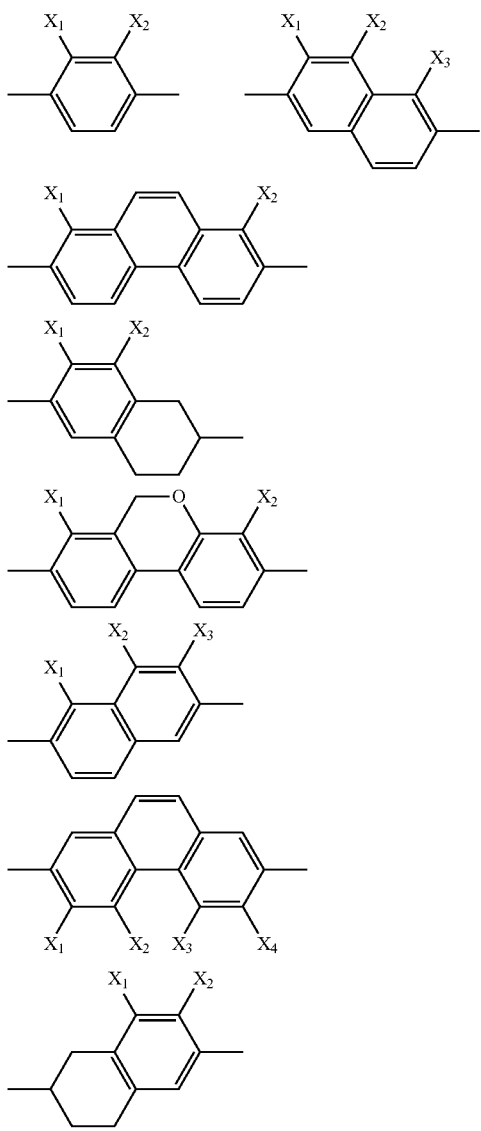

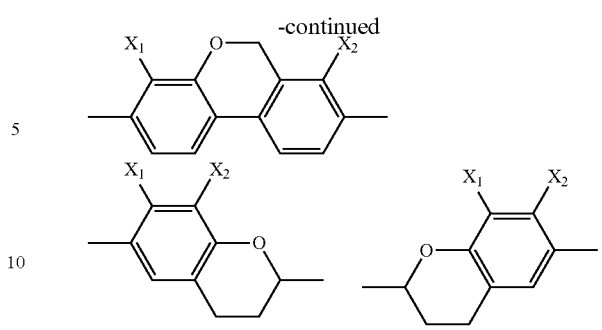

$Z_1$ represents one of a single bond, —O—, —CH$_2$O—, —OCH$_2$—, —COO— and —COO—, each of $A_1$ and $A_2$ independently represents a hydrogen atom or an unsubstituted alkyl group having 0 to 15 carbon atoms, and in the alkyl group, any non-adjacent —(CH$_2$)— may be substituted by —O—, —S— or —CO—, and any —(CH$_2$)— may be substituted by —CH═CH— or —C≡C—, $X_1$ represents one of a halogen atom, —CN, —OCF$_3$, —CF$_3$, —CHF$_2$, —CH$_2$F, —OCF$_2$CHF$_2$ or —OCF$_2$CHFCF$_3$, each of $X_2$, $X_3$ and $X_4$ independently represents a hydrogen atom, a halogen atom, —CN, —OCF$_3$, —CF$_3$, —CHF$_2$, —CH$_2$F, —OCF$_2$CHF$_2$ or —OCF$_2$CHFCF$_3$, each of k, l, m, and n independently represents 0 or 1, Y represents a crosslinkable functional group or a polymerizable functional group, $R_{11}$ represents a linear or branched divalent organic group including an ether group or an ester group having one or more carbon atoms, or at least one kind of bond group selected from the group consisting of ether, ester, ether ester, acetal, ketal, hemiacetal and hemiketal, $R_{12}$ represents a divalent organic group including a plurality of ring structures, and $R_{13}$ represents a hydrogen atom, a halogen atom, an alkyl group, an alkoxy group, a monovalent group having a carbonate group, or a derivative thereof.

According to an embodiment of the present disclosure, there is provided a method of manufacturing a liquid crystal display device (or a method of manufacturing a liquid crystal display element) including, forming, on one of a pair of substrates, a first alignment film including a polymer compound (for convenience, referred to as a "compound before an alignment process") having a first side chain having a crosslinkable functional group or a polymerizable functional group and a second side chain, and forming a second alignment film on the other of the pair of substrates, arranging the pair of substrates so that the first alignment film and the second alignment film oppose each other, and sealing a liquid crystal layer including liquid crystal molecules having negative dielectric constant anisotropy between the first alignment film and the second alignment film, and then, crosslinking or polymerizing the first side chain in the polymer compound (compound before an alignment process) to pretilt the liquid crystal molecules. The second side chain may have a structure inducing dielectric anisotropy, the second side chain may have a dipole moment in a direction perpendicular to its long axis and has a structure inducing spontaneous polarization, the second side chain may have a dielectrically negative component, or the second side chain may have the following Structural Formula (11) or (12).

In the method of manufacturing a liquid crystal display device (or the method of manufacturing a liquid crystal display element) according to the first aspect of the present disclosure or a third aspect that will be described below, the first side chain of the polymer compound (the compound before an alignment process) may be crosslinked or polymerized by applying an energy ray or heating while aligning the liquid crystal molecules by applying a predetermined electric field to the liquid crystal layer.

Also, in this case, it is desirable to irradiate the liquid crystal layer with an energy ray while applying an electric field to the liquid crystal layer so that the liquid crystal molecules are arranged in a direction oblique with respect to the surface of at least one of the pair of substrates. Further, it is more desirable for the pair of substrates to include a substrate having a pixel electrode and a substrate having an opposing electrode and to apply the energy ray from the substrate having the pixel electrode. In general, a color filter is formed in the substrate having an opposing electrode, and the energy ray is absorbed by the color filter, possibly making reaction of the crosslinkable functional group or the polymerizable functional group of the alignment film material difficult. Accordingly, it is more desirable to apply the energy ray from the substrate having a pixel electrode in which the color filter is not formed, as described above. If the color filter is formed on the substrate having a pixel electrode, it is desirable to apply the energy ray from the substrate having an opposing electrode. Further, basically, an azimuth angle (a deviation angle) of the liquid crystal molecules when the liquid crystal molecules are pretilted is defined by the intensity and direction of the electric field and a molecule structure of an alignment film material, and a pole angle (a zenith angle) is defined by the intensity of the electric field and the molecule structure of the alignment film material. The same applies in the method of manufacturing a liquid crystal display device according to the second to fourth aspects of the present disclosure that will be described below.

According to an embodiment of the present disclosure, there is provided a method of manufacturing a liquid crystal display device (or a method of manufacturing a liquid crystal display element) including forming, on one of a pair of substrates, a first alignment film including a polymer compound (for convenience, referred to as a "compound before an alignment process") having a first side chain having a photosensitive functional group and a second side chain, and forming a second alignment film on the other of the pair of substrates, arranging the pair of substrates so that the first alignment film and the second alignment film oppose each other, and sealing a liquid crystal layer including liquid crystal molecules having negative dielectric constant anisotropy between the first alignment film and the second alignment film, and then deforming the first side chain in the polymer compound (compound before an alignment process) to pretilt the liquid crystal molecules, wherein the second side chain has a structure inducing dielectric anisotropy, the second side chain has a dipole moment in a direction perpendicular to its long axis and has a structure inducing spontaneous polarization, the second side chain has a dielectrically negative component, or the second side chain has the following Structural Formula (11) or (12).

In the method of manufacturing a liquid crystal display device (or the method of manufacturing a liquid crystal display element) according to the second aspect of the present disclosure, the first side chain of the polymer compound (the compound before an alignment process) may be deformed by applying an energy ray while aligning the liquid crystal molecules by applying a predetermined electric field to the liquid crystal layer.

A method of manufacturing a liquid crystal display device (or a method of manufacturing a liquid crystal display element) according to the third aspect of the present disclosure includes a process of:

forming, on one of a pair of substrates, a first alignment film (for convenience, referred to as a "compound before an alignment process") including a polymer compound having a side chain and forming a second alignment film on the other of the pair of substrates, arranging the pair of substrates so that the first alignment film and the second alignment film oppose each other, and sealing a liquid crystal layer including liquid crystal molecules having negative dielectric constant anisotropy between the first alignment film and the second alignment film, and then crosslinking or polymerizing the side chain in the polymer compound (the compound before an alignment process) to pretilt the liquid crystal molecules, wherein the side chain has a crosslinkable functional group or a polymerizable functional group, a structure inducing dielectric anisotropy, a dipole moment in a direction perpendicular to its long axis and a structure inducing spontaneous polarization, a dielectrically negative component, or Structural Formula (13), (14), (15) or (16) described above.

According to an embodiment of the present disclosure, there is provided a method of manufacturing a liquid crystal display device (or a method of manufacturing a liquid crystal display element) including, forming, on one of a pair of substrates, a first alignment film including a polymer compound (for convenience, referred to as a "compound before an alignment process") having a first side chain having a crosslinkable functional group or a photosensitive functional group and a second side chain, and forming a second alignment film on the other of the pair of substrates, arranging the pair of substrates so that the first alignment film and the second alignment film oppose each other, and sealing a liquid crystal layer including liquid crystal molecules having negative dielectric constant anisotropy between the first alignment film and the second alignment film, and then radiating the polymer compound (compound before an alignment process) with an energy ray to pretilt the liquid crystal molecules. The second side chain may have a structure inducing dielectric anisotropy, the second side chain may have a dipole moment in a direction perpendicular to its long axis and has a structure inducing spontaneous polarization, the second side chain may have a dielectrically negative component, or the second side chain may have the following Structural Formula (11) or (12).

In the method of manufacturing a liquid crystal display device according to the fourth aspect of the present disclosure, an ultraviolet ray may be applied as an energy ray to the polymer compound while aligning the liquid crystal molecules by applying a predetermined electric field to the liquid crystal layer.

In the liquid crystal display device according to the $(1\text{-}C)^{th}$ aspect of the present disclosure, the $(2\text{-}C)^{th}$ aspect of the present disclosure or the $(3\text{-}C)^{th}$ aspect of the present disclosure, or the method of manufacturing a liquid crystal display device according to the first to fourth aspects of the present disclosure, the dielectrically negative component may be any one of a halogen atom, —CN, —OCF$_3$, —CF$_3$, —CHF$_2$, —$CH_2F$, —$OCF_2CHF_2$ and —$OCF_2CHFCF_3$. That is, $X_1$, $X_2$, $X_3$, and $X_4$ in a ring X correspond to the dielectrically negative component.

The liquid crystal molecules are pretilted by the first alignment film (by the compound after an alignment process) (a first pretilt angle $\theta_1$) and the liquid crystal molecules are pretilted by the second alignment film (the compound after an alignment process) (a second pretilt angle $\theta_2$). The first pretilt angle $\theta_1$ and the second pretilt angle $\theta_2$ have a value greater than 0°. Here, the pretilt angles $\theta_1$ and $\theta_2$ may be the same angle ($\theta_1=\theta_2$) or may be different angles ($\theta_1 \neq \theta_2$), but it is desirable for the pretilt angle $\theta_1$ and $\theta_2$ to be different angles. Accordingly, it is possible to improve a response rate to application of the driving voltage in comparison with a case in which both of the pretilt angles $\theta_1$ and $\theta_2$ are 0° and to obtain substantially the same contrast as the case in which both of the pretilt angles $\theta_1$ and $\theta_2$ are 0°. Thus, it is possible to reduce a transmission amount of light at the time of black display and improve the contrast while improving the response characteristic. When the pretilt angles $\theta_1$ and $\theta_2$ are different angles, it is desirable for a greater the pretilt angle $\theta$ among the pretilt angles $\theta_1$ and $\theta_2$ to range from 1° to 4°. When the greater pretilt angle $\theta$ is within such an angle range, particularly high effects can be obtained.

In the liquid crystal display device according to the $(1-A)^{th}$ to $(1-D)^{th}$ aspects of the present disclosure and the $(2-A)^{th}$ to $(2-D)^{th}$ aspects of the present disclosure, and the method of manufacturing a liquid crystal display device according to the first, second and fourth aspects of the present disclosure, which include the preferred form described above, the liquid crystal molecules are pretilted by the first alignment film. Specifically, mainly, the pretilt of the liquid crystal molecules is held or fixed by the first side chain, and the pretilt of the liquid crystal molecules is promoted by the second side chain, thus reducing the applied voltage at the time of pretilt of the liquid crystal molecules. Further, in the liquid crystal display device according to the $(3-A)^{th}$ to $(3-D)^{th}$ aspects of the present disclosure and the method of manufacturing a liquid crystal display device according to the third aspect of the present disclosure, which include the preferred form described above, the liquid crystal molecules are pretilted by the first alignment film. Specifically, the pretilt of the liquid crystal molecules is held or fixed and the pretilt of the liquid crystal molecules is promoted by all polymer compounds having the side chains, thus reducing the applied voltage at the time of pretilt of the liquid crystal molecules.

The liquid crystal display device according to the $(1-A)^{th}$ to $(1-D)^{th}$ aspects of the present disclosure and the method of manufacturing a liquid crystal display device according to the first aspect of the present disclosure, which include the preferred form and configuration described above, may be hereinafter collectively simply referred to as "the first aspect of the present disclosure." The liquid crystal display device according to the $(2-A)^{th}$ to $(2-D)^{th}$ aspects of the present disclosure and the method of manufacturing a liquid crystal display device according to the second aspect of the present disclosure, which include the preferred form and configuration described above, may be hereinafter collectively simply referred to as "the second aspect of the present disclosure." The liquid crystal display device according to the $(3-A)^{th}$ to $(3-D)^{th}$ aspects of the present disclosure and the method of manufacturing a liquid crystal display device according to the third aspect of the present disclosure, which include the preferred form and configuration described above, may be hereinafter collectively simply referred to as "the third aspect of the present disclosure." The method of manufacturing a liquid crystal display device according to the fourth aspect of the present disclosure, which includes the preferred form and configuration described above, may be hereinafter simply referred to as "the fourth aspect of the present disclosure." Further, the liquid crystal display device according to the $(1-A)^{th}$ to $(1-D)^{th}$ aspects, the $(2-A)^{th}$ to $(2-D)^{th}$ aspects, and the $(3-A)^{th}$ to $(3-D)^{th}$ aspects of the present disclosure may be hereinafter collectively simply referred to as a "liquid crystal display device of the present disclosure." The method of manufacturing a liquid crystal display device according to the first to fourth aspects of the present disclosure, which includes the preferred form described above, may be hereinafter simply referred to as a "method of manufacturing a liquid crystal display device in the present disclosure." The liquid crystal display device of the present disclosure and the method of manufacturing a liquid crystal display device in the present disclosure may be hereinafter collectively simply referred to as "the present disclosure."

In the first aspect, the second aspect or the fourth aspect of the present disclosure, a polymer compound (a compound before an alignment process) or a compound constituting a first alignment film (a compound after an alignment process) may have a configuration including a group represented by the following formula (1) as the first side chain. Further, for convenience, this configuration is referred to as a "$(1-1)^{th}$ configuration of the present disclosure, $(2-1)^{th}$ configuration of the present disclosure or $(4-1)^{th}$ configuration of the present disclosure."

$$-R_1'-R_2'-R_3' \quad (1)$$

where $R_1'$ is a divalent organic group including an ether group or an ester group in a straight chain shape or a branch shape having one or more carbon atoms and is bonded to the main chain of the polymer compound or the crosslinked compound (a compound before an alignment process or a compound after an alignment process) or $R_1'$ is at least one of bond group selected from the group consisting of ether, ester, ether ester, acetal, ketal, hemiacetal and hemiketal and is bonded to the main chain of the polymer compound or the crosslinked compound (the compound before an alignment process or the compound after an alignment process). $R_2'$ is a divalent organic group including a plurality of ring structures, and one of the atoms constituting the ring structure is bonded to $R_1'$. $R_3'$ is a hydrogen atom, a halogen atom, an alkyl group, an alkoxy group, a monovalent group having a carbonate group, or a derivative thereof.

Or, in the first aspect, the second aspect or the fourth aspect of the present disclosure, the polymer compound (the compound before an alignment process) or the compound constituting the first alignment film (the compound after an alignment process) can include a compound having a group represented by Formula (2) as the first side chain. Further, for convenience, this configuration is referred to as a "$(1-2)^{th}$ configuration of the present disclosure, $(2-2)^{th}$ configuration of the present disclosure or $(4-2)^{th}$ configuration of the present disclosure." The polymer compound (the compound before an alignment process) or the compound constituting the first alignment film (the compound after an alignment process) can include a compound having the group represented by Formula (1) and a group represented by Formula (2) described above as the first side chain, as well as the group represented by Formula (2).

$$-R_1'-R_{12}'-R_{13}'-R_{14}' \quad (2)$$

where $R_{11}'$ is a linear or branched divalent organic group including an ether group or an ester group having 1 to 20 carbon atoms, preferably, 3 to 12 carbon atoms, and is bonded to the main chain of the polymer compound or the crosslinked compound (the compound before an alignment process or the compound after an alignment process). Or, $R_{11}'$ is at least one bond group selected from the group consisting of ether, ester, acetal, ether ester, ketal, hemiacetal and hemiketal and is bonded to the main chain of the polymer compound or the crosslinked compound (the compound before an alignment process or the compound after an alignment process). For example, $R_{12}'$ is a divalent group including a structure of any one of chalcone, cinnamate, cinnamoyl, coumarin, maleimide, benzophenone, norbornene, oryzanol, chitosan, acryloyl, methacryloyl, vinyl, epoxy and oxetane, or an ethynylene group. $R_{13}'$ is a divalent organic group including a plurality of ring structures. $R_{14}'$ is a hydrogen atom, a halogen atom, an alkyl group, an alkoxy group, a monovalent group having a carbonate group, or a derivative thereof. In some cases, Formula (2) may be changed as the following formula (2'). In other words, Formula (2) includes Formula (2').

$$—R_{11}'—R_{12}'—R_{14}' \qquad (2')$$

Or, in the first aspect of the present disclosure, the first alignment film may include the first side chain and the second side chain, and the main chain that supports the first side chain and the second side chain with respect to the first substrate (here, the first side chain and the second side chain are bonded to the main chain), and may include a crosslinkage portion in which a part of the first side chain has been crosslinked, and end structure portions bonded to the crosslinkage portion, and the liquid crystal molecules may be pretilted as the liquid crystal molecules fall along the end structure portion or are sandwiched between the end structure portions. Or, in the second aspect of the present disclosure, the first alignment film may include the first side chain and the second side chain, and the main chain that supports the first side chain and the second side chain with respect to the first substrate (here, the first side chain and the second side chain are bonded to the main chain) and may include a deformation portion in which the first side chain has been deformed, and end structure portions bonded to the deformation portion, and the liquid crystal molecules can be pretilted as the liquid crystal molecules fall along the end structure portion or are sandwiched between the end structure portions. Or, in the fourth aspect of the present disclosure, the first alignment film may include the first side chain and the second side chain, and the main chain that supports the first side chain and the second side chain with respect to the first substrate (here, the first side chain and the second side chain are bonded to the main chain), and may include a crosslinked or a deformation portion in which a portion of the first side chain has been crosslinked or deformed, and end structure portions bonded to the crosslinked or deformation portion, and the liquid crystal molecules may be pretilted as the liquid crystal molecules fall along the end structure portion or are sandwiched between the end structure portions. Further, for convenience, this configuration may be referred to as a "(1-3)$^{th}$ configuration of the present disclosure, (2-3)$^{th}$ configuration of the present disclosure or (4-3)$^{th}$ configuration of the present disclosure." The first side chain and the second side chain may be bonded to one same main chain or may be bonded to two or more different main chains. Further, the first side chain and the second side chain may be bonded.

Or, in the first aspect of the present disclosure, the first alignment film may include the first side chain and the second side chain, and the main chain that supports the first side chain and the second side chain with respect to the first substrate (here, the first side chain and the second side chain are bonded to the main chain), and may include a crosslinkage portion in which a portion of the first side chain has been crosslinked, and end structure portions bonded to the crosslinkage portion and having a mesogenic group. Further, for convenience, this configuration is referred to as a "(1-4)$^{th}$ configuration of the present disclosure." Further, in the (1-4)$^{th}$ configuration of the present disclosure, the main chain and the crosslinkage portion may be bonded by a covalent bond, and the crosslinkage portion and the end structure portion may be bonded by a covalent bond. Or, in the second aspect of the present disclosure, the first alignment film may include the first side chain and the second side chain, and the main chain that supports the first side chain and the second side chain with respect to the first substrate (here, the first side chain and the second side chain are bonded to the main chain), and may include a deformation portion in which a portion of the first side chain has been deformed, and end structure portions bonded to the deformation portion and having a mesogenic group. Further, for convenience, this configuration is referred to as a "(2-4)$^{th}$ configuration of the present disclosure." Further, in the fourth aspect of the present disclosure, the first alignment film may include the first side chain and the second side chain, and the main chain that supports the first side chain and the second side chain with respect to the first substrate (here, the first side chain and the second side chain are bonded to the main chain), and a crosslinked or deformation portion in which a portion of the first side chain has been crosslinked or deformed, and an end structure portion bonded to the crosslinked or deformation portion and having a mesogenic group. Further, for convenience, this configuration is referred to as a "(4-4) configuration of the present disclosure." Here, the first side chain and the second side chain may be bonded to one same main chain or may be bonded to different main chains. Further, the first side chain and the second side chain may be bonded.

In the first aspect of the present disclosure including the (1-1)$^{th}$ configuration of the present disclosure to the (1-4)$^{th}$ configuration of the present disclosure, the first side chain (more specifically, the crosslinkage portion) may have a photodimerized photosensitive group.

Further, in the third aspect of the present disclosure, the polymer compound has "Y" (having a photoreactive crosslinkable functional group or polymerizable functional group) and —$R_{11}$—$R_{12}$—$R_{13}$ (e.g., a vertical induction structure portion) within one side chain unit, as described above. Here, "Y" may include, specifically, a photosensitive group having a crosslinkable functional group or a polymerizable functional group, and the photoreactive crosslinkable functional group may include, specifically, a divalent group including a structure of any one of chalcone, cinnamate, cinnamoyl, coumarin, maleimide, benzophenone, norbornene, oryzanol, chitosan, acryloyl, methacryloyl, vinyl, epoxy and oxetane, or an ethynylene group. Further, $R_{12}$ may include a 1,4-phenylene group, a 1,4-cyclohexylene group, a pyrimidine-2,5-diyl group, a 1,6-naphthalene group, a divalent group having a steroid skeleton, or a derivative thereof.

Further, in the (1-D)$^{th}$ aspect of the present disclosure, the (2-D)$^{th}$ aspect of the present disclosure, and the (3-D)$^{th}$ aspect of the present disclosure, "A2" may include, specifically, an alkyl group having 1 to 10 carbon atoms, an alkoxy group having 1 to 9 carbon atoms, an alkoxyalkyl group having 2 to 9 carbon atoms, an alkoxyalkoxy group having 2 to 8 carbon atoms, an alkenyl group having 2 to 10 carbon atoms, an alkenyloxy group having 2 to 9 carbon atoms, an alkenyloxyalkyl group having 3 to 9 carbon atoms, or an alkoxyalkenyl group having 3 to 9 carbon atoms. The alkyl group may include —$CH_3$, —$C_2H_5$, —$C_3H_7$, —$C_4H_9$, —$C_5H_{11}$, —$C_6H_{13}$, —$C_7H_{15}$, —$C_8H_{17}$, —$C_9H_{19}$ and —$C_{10}H_{21}$, and the alkoxy group may include —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, —OC$_8$H$_7$ and —OC$_9$H$_{19}$.

Further, in the present disclosure including the preferred configuration and form described above, surface roughness Ra of the first alignment film may be 1 nm or less. Here, the surface roughness Ra is defined in JIS B 0601:2001.

Furthermore, in the present disclosure including the preferred configuration and form described above, the alignment regulation portion including the slits formed in the electrodes or the alignment regulation portion including protrusions provided in the substrate may be provided.

Further, in the present disclosure including the preferred configuration and form described above, the second alignment film may include the polymer compound (the compound before an alignment process) constituting the first alignment film or have the same composition as the first alignment film, as described above. However, the second alignment film may include a polymer compound (a compound before an alignment process) different from the polymer compound (the compound before an alignment process) constituting the first alignment film, as long as the second alignment film includes the polymer compound (the compound before an alignment process) defined in the first to fourth aspects of the present disclosure.

In the present disclosure including the preferred configuration and form described above, the main chain may have a configuration in which an imide bond is included in a repetition unit. Further, the polymer compound (the compound after an alignment process) may include the structure that arranges the liquid crystal molecules in a predetermined direction with respect to the pair of substrates, i.e., with respect to not only the first substrate but also the second substrate. Further, the pair of substrates may include the substrate having the pixel electrodes and the substrate having the opposing electrode. That is, the first substrate may be the substrate having the pixel electrodes and the second substrate may be the substrate having the opposing electrode, or the second substrate may be the substrate having the pixel electrodes or the first substrate may be the substrate having the opposing electrode.

In the liquid crystal display device according to the first aspect of the present disclosure, the first alignment film, i.e., at least one of a pair of alignment films, includes the compound (the compound after an alignment process) in which the polymer compound (the compound before an alignment process) having a crosslinkable functional group or a polymerizable functional group as the first side chain is crosslinked or polymerized, and the pretilt of the liquid crystal molecules is held and fixed by the compound after an alignment process. Accordingly, if an electric field is applied between the pixel electrode and the opposing electrode, a long axis direction of the liquid crystal molecules responds in a predetermined direction with respect to the substrate surface and an excellent display characteristic is secured. Further, since the pretilt of the liquid crystal molecules is held and fixed by the compound after an alignment process, a response rate according to the electrical field between the electrodes (a rising rate of image display) becomes high as compared with the case in which the liquid crystal molecules are not pretilted, and an excellent display characteristic is easily maintained as compared with a case in which liquid crystal molecules are pretilted without using the crosslinked or polymerized compound.

In the method of manufacturing a liquid crystal display device according to the first aspect of the present disclosure, the first alignment film including the polymer compound having a crosslinkable functional group or a polymerizable functional group as the first side chain (the compound before an alignment process) is formed and then the liquid crystal layer is sealed between the first alignment film and the second alignment film. Here, the liquid crystal molecules in the liquid crystal layer are arranged as a whole in a predetermined direction (e.g., a horizontal direction, a vertical direction or an oblique direction) with respect to the surfaces of the first alignment film and the second alignment film by the first alignment film and the second alignment film. Subsequently, the crosslinkable functional group or the polymerizable functional group is caused to react to crosslink or polymerize the polymer compound while applying the electric field. Thus, the pretilt of the liquid crystal molecules near the crosslinked or polymerized compound (the compound after an alignment process) is held and fixed. Accordingly, the response rate (the rising rate of the image display) is improved as compared with the case in which the liquid crystal molecules are not pretilted. Moreover, the liquid crystal molecules can be pretilted without the linearly polarized light or the light in an oblique direction being applied to the alignment film prior to sealing of the liquid crystal layer and without using a large-scale apparatus, by crosslinking or polymerizing the polymer compound (the compound before an alignment process) in a state in which the liquid crystal molecules are arranged.

In the liquid crystal display device according to the second aspect of the present disclosure, the first alignment film, i.e., at least one of a pair of alignment films, includes the compound in which the polymer compound having a photosensitive functional group as the first side chain (the compound before an alignment process) has been deformed (the compound after an alignment process), and the pretilt of the liquid crystal molecules is held and fixed by the compound after an alignment process. Accordingly, if an electric field is applied between the pixel electrode and the opposing electrode, a long axis direction of the liquid crystal molecules responds in a predetermined direction with respect to the substrate surface and an excellent display characteristic is secured. A response rate according to the electrical field between the electrodes (a rising rate of image display) becomes high as compared with the case in which the liquid crystal molecules are not pretilted, and an excellent display characteristic is easily maintained as compared with a case in which liquid crystal molecules are pretilted without using the deformed compound.

In the method of manufacturing a liquid crystal display device according to the second aspect of the present disclosure, the first alignment film including the polymer compound having a photosensitive functional group as the first side chain (the compound before an alignment process) is formed and then the liquid crystal layer is sealed between the first alignment film and the second alignment film. Here, the liquid crystal molecules in the liquid crystal layer are arranged as a whole in a predetermined direction (e.g., a horizontal direction, a vertical direction or an oblique direction) with respect to the surfaces of the first alignment film and the second alignment film by the first alignment film and the second alignment film. Subsequently, the polymer compound (the compound before an alignment process) is caused to be deformed while applying the electric field. Thus, the pretilt of the liquid crystal molecules near the deformed compound (the compound after an alignment process) can be held and fixed. Accordingly, the response rate (the rising rate of the image display) is improved as compared with the case in which the liquid crystal molecules are not pretilted. Moreover, the liquid crystal molecules can be pretilted without the linearly polarized light or the light in an oblique direction being applied to the alignment film prior to sealing of the liquid crystal layer and without using a large-scale apparatus, by deforming the polymer compound (the compound before an alignment process) in a state in which the liquid crystal molecules are arranged.

In the liquid crystal display device according to the third aspect of the present disclosure, the first alignment film, i.e., at least one of a pair of alignment films, includes the compound in which the polymer compound (the compound before an alignment process) having a crosslinkable functional group or a polymerizable functional group as the first side chain is crosslinked or polymerized (the compound after an alignment process), and the pretilt of the liquid crystal molecules is held and fixed by the compound after an alignment process. Accordingly, if an electric field is applied between the pixel electrode and the opposing electrode, a long axis direction of the liquid crystal molecules responds in a predetermined direction with respect to the substrate surface and an excellent display characteristic is secured. Further, since the pretilt of the liquid crystal molecules is held and fixed by the compound after an alignment process, a response rate (a rising rate of image display) according to the electrical field between the electrodes becomes high as compared with the case in which the liquid crystal molecules are not pretilted, and an excellent display characteristic is easily maintained as compared with the case in which liquid crystal molecules are pretilted without using the crosslinked or polymerized compound.

In the method of manufacturing a liquid crystal display device according to the third aspect of the present disclosure, the first alignment film including the polymer compound having a crosslinkable functional group or a polymerizable functional group as the first side chain (the compound before an alignment process) is formed and then the liquid crystal layer is sealed between the first alignment film and the second alignment film. Here, the liquid crystal molecules in the liquid crystal layer are arranged as a whole in a predetermined direction (e.g., a horizontal direction, a vertical direction or an oblique direction) with respect to the surfaces of the first alignment film and the second alignment film by the first alignment film and the second alignment film. Subsequently, the crosslinkable functional group or the polymerizable functional group is caused to react to crosslink or polymerize the polymer compound while applying the electric field. Thus, the pretilt of the liquid crystal molecules near the crosslinked or polymerized compound (the compound after an alignment process) is held and fixed. Accordingly, the response rate (the rising rate of the image display) is improved as compared with the case in which the liquid crystal molecules are not pretilted. Moreover, the liquid crystal molecules can be pretilted without the linearly polarized light or the light in an oblique direction being applied to the alignment film prior to sealing of the liquid crystal layer and without using a large-scale apparatus, by crosslinking or polymerizing the polymer compound (the compound before an alignment process) in a state in which the liquid crystal molecules are arranged.

In the method of manufacturing a liquid crystal display device according to the fourth aspect of the present disclosure, the pretilt of the liquid crystal molecules can be held and fixed by applying an energy ray to the polymer compound (the compound before an alignment process). That is, a response rate (a rising rate of the image display) is improved by crosslinking, polymerizing or deforming the first side chain of the polymer compound (the compound before an alignment process) in a state in which the liquid crystal molecules are arranged, as compared with the case in which the liquid crystal molecules are not pretilted. Moreover, the liquid crystal molecules can be pretilted without the linearly polarized light or the light in an oblique direction being applied to the alignment film prior to sealing of the liquid crystal layer and without using a large-scale apparatus.

Moreover, in the present disclosure, the second side chain or the side chain has a structure inducing dielectric anisotropy (the $(1-A)^{th}$ aspect of the present disclosure, the $(2-A)^{th}$ aspect of the present disclosure, the $(3-A)^{th}$ aspect of the present disclosure, or the like), has the dipole moment in a direction perpendicular to its long axis and has the structure inducing spontaneous polarization (the $(1-B)^{th}$ aspect of the present disclosure, the $(2-B)^{th}$ aspect of the present disclosure, the $(3-B)^{th}$ aspect of the present disclosure, or the like), has a dielectrically negative component (the $(1-C)^{th}$ aspect of the present disclosure, the $(2-C)^{th}$ aspect of the present disclosure, the $(3-C)^{th}$ aspect of the present disclosure, or the like), or has Structural Formula (11), Structural Formula (12) or any one of Structural Formulae (13) to (16) (the $(1-D)^{th}$ aspect of the present disclosure, the $(2-D)^{th}$ aspect of the present disclosure, the $(3-D)^{th}$ aspect of the present disclosure, or the like). Therefore, when an electric field is applied, it is possible to promote the pretilt of the liquid crystal molecules by the second side chain or the side chain as a result of the second side chain or the side chain being aligned in a direction dependent on a direction of the electric field (e.g., a direction generally perpendicular to the direction of the electric field). As a result, it is possible to reduce a value of the voltage that is applied to the liquid crystal layer in order to pretilt the liquid crystal molecules constituting the liquid crystal layer in the process of manufacturing the liquid crystal display device. Further, it is possible to achieve a lower voltage applied when the liquid crystal molecules are pretilted at the time of manufacture of the liquid crystal display device. Moreover, it is possible to mitigate pretilt distortion of the liquid crystal molecules at an alignment interface, thereby stabilizing a value of the pretilt and further improving the response rate.

Additional features and advantages are described herein, and will be apparent from the following Detailed Description and the figures.

DETAILED DESCRIPTION

Hereinafter, the present disclosure based on embodiments and examples of the disclosure will be described with reference to the drawings, but the present disclosure is not limited to the embodiments and examples of the disclosure, and various numerical values or materials in the embodiments and examples of the disclosure are illustrative. Further, a description will be given in the following order.

1. Description of common configuration and structure in liquid crystal display device according to an aspect of the present disclosure 2. Description of liquid crystal display device and method of manufacturing the same in the present disclosure, based on embodiments of the disclosure 3. Description of liquid crystal display device and method of manufacturing the same in the present disclosure, based on examples, and others

[Description of Common Configuration and Structure in Liquid Crystal Display Device (Liquid Crystal Display Element) of the Disclosure]

Figure 1:
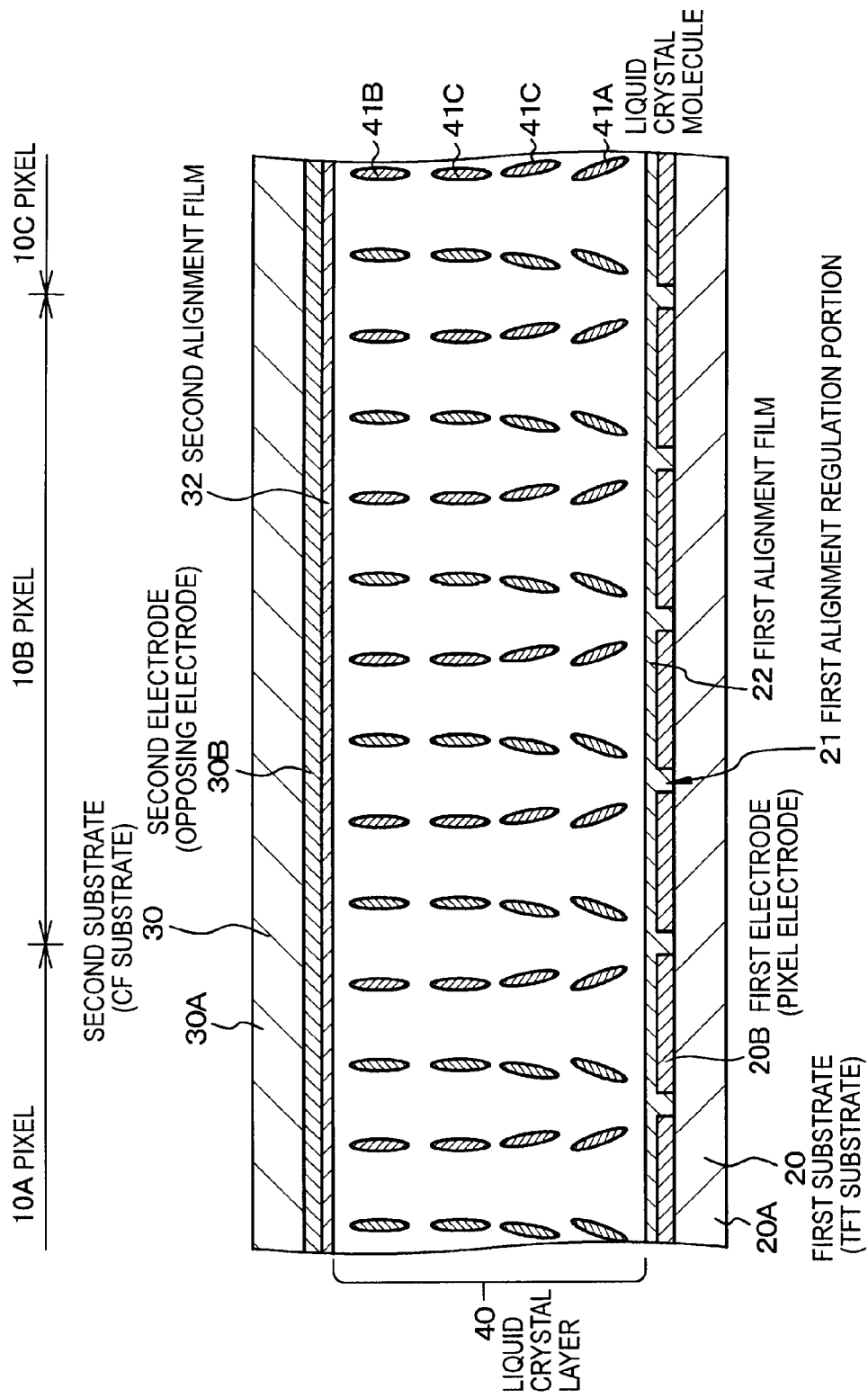
FIG. 1 is a schematic partial cross-sectional view of a liquid crystal display device according to an aspect of the present disclosure.

A schematic partial cross-sectional view of a liquid crystal display device (or a liquid crystal display element) according to first to third aspects of the present disclosure is illustrated in FIG. 1. This liquid crystal display device includes a plurality of pixels 10 (10A, 10B, 10C, . . . ). Also, in the liquid crystal display device (the liquid crystal display element), a liquid crystal layer 40 including liquid crystal molecules 41 is provided between a TFT (Thin Film Transistor) substrate 20 and a CF (Color Filter) substrate 30 via alignment films 22 and 32. This liquid crystal display device (liquid crystal display element) is of a so-called transmission type, and a display mode is a vertical alignment (VA) mode. FIG. 1 illustrates a non-driven state in which a driving voltage is not applied. Further, for example, the pixel 10, in fact, includes sub-pixels, such as a sub-pixel displaying a red image, a sub-pixel displaying a green image, and a sub-pixel displaying a blue image.

Here, the TFT substrate 20 corresponds to a first substrate, and the CF substrate 30 corresponds to a second substrate. Further, a pixel electrode 20B and the alignment film 22 provided in the first substrate (the TFT substrate) 20 correspond to a first electrode and a first alignment film, and an opposing electrode 30B and the alignment film 32 provided in the second substrate (the CF substrate) 30 correspond to a second electrode and a second alignment film.

That is, the liquid crystal display device according to the first to third aspects of the present disclosure includes a liquid crystal display element including the first alignment film 22 and the second alignment film 32 provided on the opposing surfaces of the pair of substrates 20 and 30, and the liquid crystal layer 40 arranged between the first alignment film 22 and the second alignment film 32 and having the liquid crystal molecules 41 having negative dielectric constant anisotropy.

Also, in the liquid crystal display device according to the $(1\text{-}A)^{th}$ to $(1\text{-}D)^{th}$ aspects of the present disclosure, at least the first alignment film (specifically, the first alignment film 22 and the second alignment film 32) includes a compound in which a polymer compound having a first side chain and a second side chain is crosslinked or polymerized, the first side chain has a crosslinkable functional group or a polymerizable functional group, and the liquid crystal molecules 41 are pretilted by the first alignment film 22 and also pretilted by the second alignment film 32.

Specifically, the first alignment film 22 includes a compound in which a polymer compound including a first side chain having a crosslinkable functional group or a polymerizable functional group is crosslinked or polymerized (a compound after an alignment process). Further, the second alignment film 32 also includes a compound in which a polymer compound including a first side chain having a crosslinkable functional group or a polymerizable functional group is crosslinked or polymerized (a compound after an alignment process). Here, the polymer compound of the first alignment film 22 and the polymer compound of the second alignment film 32 are, preferably, the same polymer compounds. The compound after an alignment process of the first alignment film 22 and the compound after an alignment process of the second alignment film 32 are the same compounds after an alignment process. Also, as described above, the liquid crystal molecules are pretilted (a first pretilt angle $\theta_1$) by the first alignment film 22 (by the compound after an alignment process), and the liquid crystal molecules are also pretilted (a second pretilt angle $\theta_2$) by the second alignment film 32 (by the compound after an alignment process).

Further, in the liquid crystal display device according to the $(2\text{-}A)^{th}$ to $(2\text{-}D)^{th}$ aspects of the present disclosure, at least the first alignment film (specifically, the first alignment film 22 and the second alignment film 32) includes a compound in which a polymer compound having a first side chain and a second side chain is deformed, the first side chain has a photosensitive functional group, and the liquid crystal molecules 41 are pretilted by the first alignment film 22 and also pretilted by the second alignment film 32.

Furthermore, in the liquid crystal display device according to the $(3\text{-}A)^{th}$ to $(3\text{-}D)^{th}$ aspects of the present disclosure, at least the first alignment film (specifically, the first alignment film 22 and the second alignment film 32) includes a compound in which a polymer compound having a side chain is crosslinked or polymerized, and the liquid crystal molecules 41 are pretilted by the first alignment film 22) and also pretilted by the second alignment film 32.

More specifically, this liquid crystal display device is completed by arranging a plurality of pixels 10 each including the first substrate (the TFT substrate) 20 and the second substrate (the CF substrate) 30, the first electrode (the pixel electrode) 20B formed on an opposing surface of the first substrate 20 which opposes the second substrate 30, a first alignment regulation portion 21 provided in the first electrode (the pixel electrode) 20B, the first alignment film 22 that covers the first electrode (the pixel electrode) 20B, the first alignment regulation portion 21, and the opposing surface of the first substrate (the TFT substrate) 20, the second electrode (the opposing electrode) 30B formed on the opposing surface of the second substrate (the CF substrate) 30 that opposes to the first substrate (the TFT substrate) 20, the second alignment film 32 that covers the second electrode (the opposing electrode) and the opposing surface of the second substrate (the CF substrate) 30, and the liquid crystal layer 40 provided between the first alignment film 22 and the second alignment film 32 and including the liquid crystal molecules 41.

Figure 3:
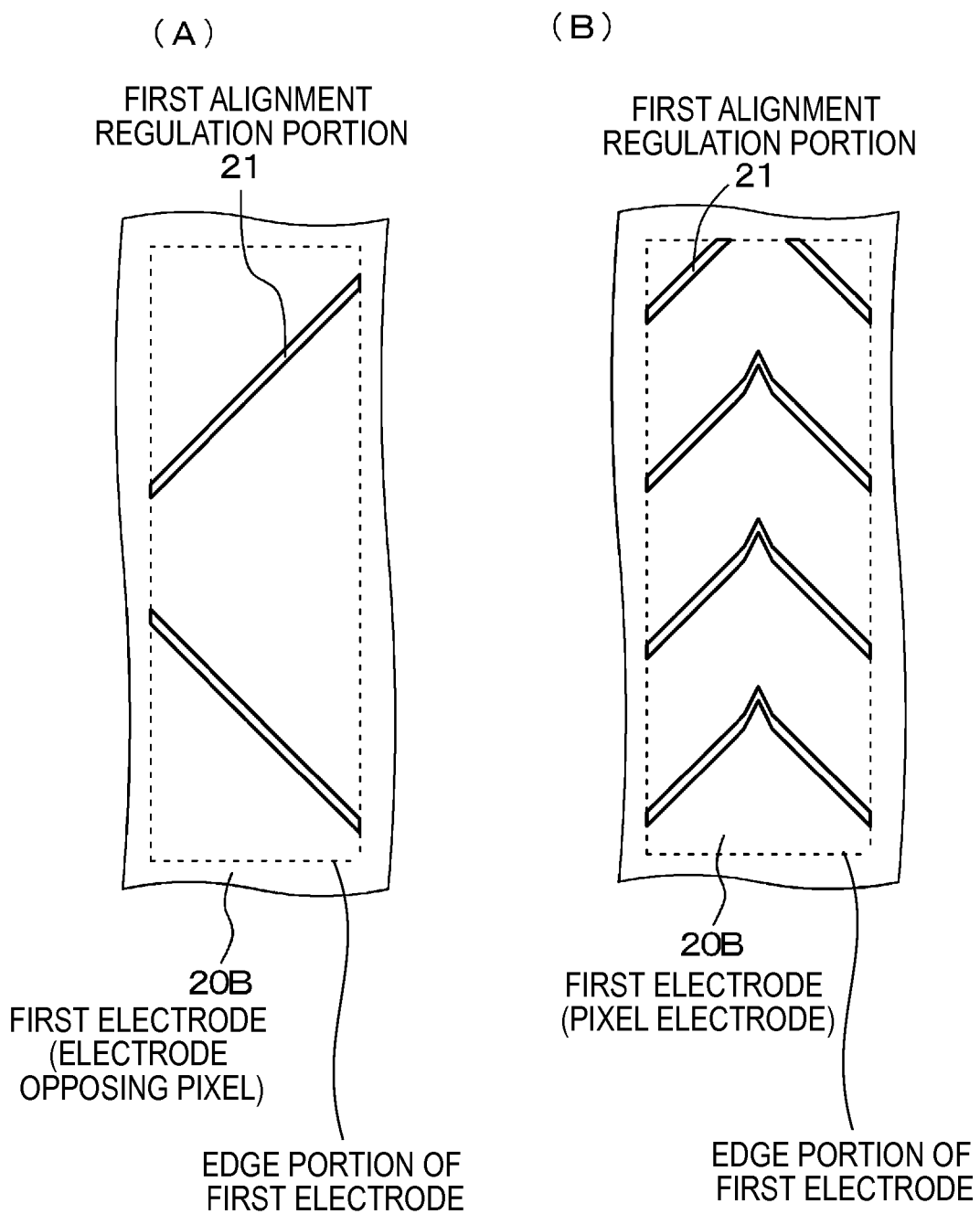
FIGS. 3(A) and (B) are schematic diagrams of a first electrode and a first slit portion when one pixel is viewed from above.

In the TFT substrate 20 formed of a glass substrate, for example, a plurality of pixel electrodes 20B are arranged in a matrix shape on the surface that opposes the CF substrate 30 formed of a glass substrate. Further, a TFT switching element including a gate, a source and a drain, which drives each of the plurality of pixel electrodes 20B, a gate line and a source line connected to the TFT switching element, and the like (not shown) are provided. The pixel electrode 20B is provided for each pixel electrically separated by a pixel separation portion, and is formed of, for example, a material having transparency such as ITO (indium tin oxide). In each pixel, for example, a first slit portion 21 having a stripe- or V-shaped pattern (a portion in which an electrode is not formed) is provided in the pixel electrode 20B. Further, a layout diagram of the first electrode (the pixel electrode) 20B and the first slit portion 21 when one pixel (sub-pixel) is viewed from above is illustrated in FIG. 3(A) or 3(B). Accordingly, if a driving voltage is applied, an electric field oblique to the long axis direction of the liquid crystal molecules 41 is applied and regions in which the alignment directions are different within the pixel are formed (alignment division), thereby improving a viewing angle characteristic. That is, the first slit portion 21 is a first alignment regulation portion for regulating the alignment of all the liquid crystal molecules 41 in the liquid crystal layer 40 in order to secure an excellent display characteristic. Here, the alignment direction of the liquid crystal molecules 41 at the time of application of the driving voltage is regulated by the first slit portion 21. As described above, basically, an azimuthal angle of the liquid crystal molecules when the liquid crystal molecules have been pretilted is defined according to an intensity and direction of the electric field and a molecule structure of the alignment film material, and the direction of the electric field is determined by the alignment regulation portion.

In the CF substrate 30, for example, a color filter (not shown) including red (R), green (G), and blue (B) stripe-shaped filters, and the opposing electrode 30B are arranged over a substantially entire surface of an effective display region in the surface opposing the TFT substrate 20. The opposing electrode 30B is formed, for example, of a material having transparency such as ITO, similar to the pixel electrode 20B. The opposing electrode 30B is a so-called solid electrode that is not patterned.

The first alignment film 22 is provided on the surface of the TFT substrate 20 on the side of the liquid crystal layer 40 to cover the pixel electrodes 20B and the first slit portions 21. The second alignment film 32 is provided on the surface of the CF substrate 30 on the side of the liquid crystal layer 40 to cover the opposing electrode 30B. The first alignment film 22 and the second alignment film 32 are intended to regulate alignment of the liquid crystal molecules 41. Here, the first alignment film 22 and the second alignment film 32 have a function of aligning the liquid crystal molecules 41 located away from the substrate, in a direction perpendicular to the substrate surface, and pretilting the liquid crystal molecules 41 (41A and 41B) near the substrate. Further, in the liquid crystal display device (the liquid crystal display element) illustrated in FIG. 1, a slit portion is not provided in the CF substrate 30.

Figure 11:
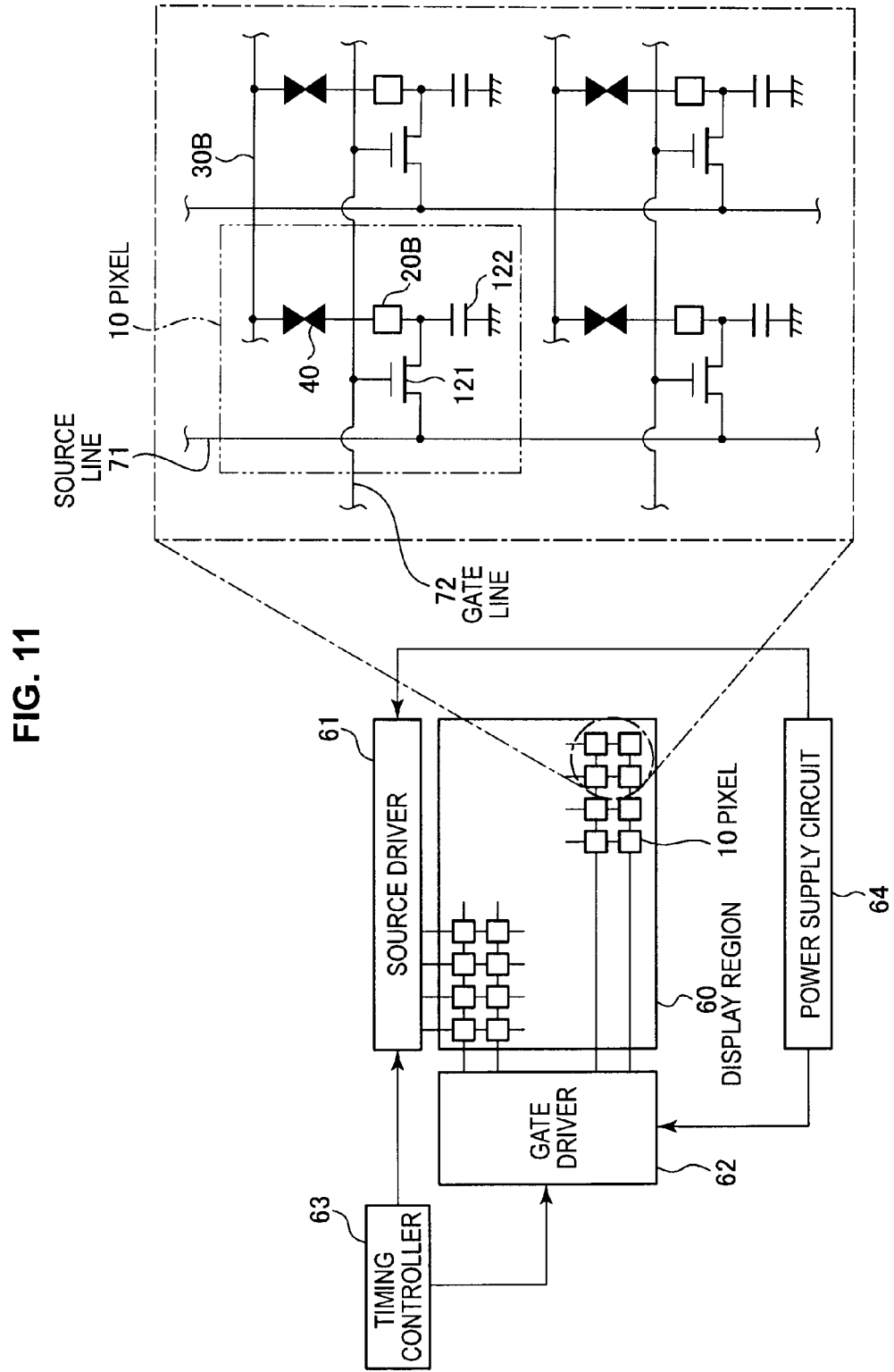
FIG. 11 is a circuit configuration diagram of the liquid crystal display device illustrated in FIG. 1.

FIG. 11 illustrates a circuit configuration of the liquid crystal display device illustrated in FIG. 1.

As illustrated in FIG. 11, the liquid crystal display device includes a liquid crystal display element including a plurality of pixels 10 provided within a display region 60. In this liquid crystal display device, a source driver 61 and a gate driver 62, a timing controller 63 that controls the source driver 61 and the gate driver 62, a power supply circuit 64 that supplies power to the source driver 61 and the gate driver 62 are provided around the display region 60.

The display region 60 is a region in which an image is displayed, and is a region configured to be able to display an image by the plurality of pixels 10 being arranged in a matrix. In FIG. 11, a region corresponding to four pixels 10 is enlarged and separately illustrated, in addition to the display region 60 including the plurality of pixels 10.

In the display region 60, a plurality of source lines 71 are arranged in a row direction and a plurality of gate lines 72 are arranged in a column direction, and each pixel 10 is arranged in a position in which the source line 71 and the gate line 72 intersect each other. Each pixel 10 includes a transistor 121 and a capacitor 122, as well as the pixel electrode 20B and the liquid crystal layer 40. In each transistor 121, a source electrode is connected to the source line 71, a gate electrode is connected to the gate line 72, and a drain electrode is connected to the capacitor 122 and the pixel electrode 20B. Each source line 71 is connected to the source driver 61, and an image signal is supplied from the source driver 61. Each gate line 72 is connected to the gate driver 62, and a scanning signal is sequentially supplied from the gate driver 62.

The source driver 61 and the gate driver 62 select a specific pixel 10 from among the plurality of pixels 10.

For example, the timing controller 63 outputs an image signal (e.g., RGB video signals corresponding to red, green, and blue) and a source driver control signal for controlling an operation of the source driver 61 to the source driver 61. Further, the timing controller 63, for example, outputs a gate driver control signal for controlling the operation of the gate driver 62 to the gate driver 62. Examples of the source driver control signal may include a horizontal synchronization signal, a start pulse signal, and a clock signal for the source driver. Examples of the gate driver control signal may include a vertical synchronization signal, and a clock signal for a gate driver.

In this liquid crystal display device, a driving voltage is applied between the first electrode (the pixel electrode) 20B and the second electrode (the opposing electrode) 30B in the following manner, thereby displaying an image. Specifically, the source driver 61 supplies an individual image signal to the predetermined source line 71 based on the image signal input from the timing controller 63 in response to an input of the source driver control signal from the timing controller 63. In addition, the gate driver 62 sequentially supplies the scanning signal to the gate line 72 at a predetermined timing in response to the input of the gate driver control signal from the timing controller 63. Accordingly, the pixel 10 located at an intersection between the source line 71 to which the image signal is supplied and the gate line 72 to which the scanning signal is supplied is selected, and the driving voltage is applied to the pixel 10.

Hereinafter, the present disclosure will be described based on embodiments of the disclosure (abbreviated as "embodiments") and examples.

Embodiment 1

Embodiment 1 relates to the liquid crystal display device (or the liquid crystal display element) in a VA mode according to the (1-A)$^{th}$ to (1-D)$^{th}$ aspects of the present disclosure, and the method of manufacturing a liquid crystal display device (or a liquid crystal display element) according to first and fourth aspects of the present disclosure. In Embodiment 1, a first alignment film and a second alignment film (the alignment films 22 and 32) include one kind or two or more kinds of polymer compounds including a first side chain having a crosslinked structure (the compound after an alignment process). Also, the liquid crystal molecules are pretilted. Here, the compound after an alignment process is produced by forming the alignment films 22 and 32 in a state in which one kind or two or more kinds of polymer compounds (the compounds before an alignment process) having a main chain, a first side chain and a second side chain is included, providing the liquid crystal layer 40, and then crosslinking or polymerizing the polymer compound or applying an energy ray to the polymer compound, more specifically, by causing the crosslinkable functional group or the polymerizable functional group included in the first side chain to react while applying an electric field or a magnetic field. Also, the compound after an alignment process includes a structure (specifically, a second side chain) that arranges the liquid crystal molecules in a predetermined direction (specifically, an oblique direction) with respect to the pair of substrates (specifically, the TFT substrate 20 and the CF substrate 30). Thus, the compound after an alignment process is included in the alignment films 22 and 32 by crosslinking or polymerizing the polymer compound (the compound before an alignment process) or by applying the energy ray to the polymer compound (the compound before an alignment process), such that the liquid crystal molecules 41 near the alignment films 22 and 32 can be pretilted and subjected to, for example, vertical alignment. Thus, a response rate (a rising rate of image display and a falling speed of the image display) becomes high and a display characteristic is improved.

Here, the second side chain includes a structure inducing dielectric anisotropy. Or, the second side chain has a dipole moment in a direction perpendicular to the long axis of the second side chain and includes a structure inducing spontaneous polarization. Or, the second side chain includes a dielectrically negative component. Further, the dielectrically negative component is any of a halogen atom (e.g., a fluorine atom or a chlorine atom), —CN, —OCF$_3$, —CF$_3$, —CHF$_2$, —CH$_2$F, —OCF$_2$CHF$_2$ or —OCF$_2$CHFCF$_3$. That is, X$_1$, X$_2$, X$_3$, and X$_4$ in a ring X correspond to the dielectrically negative components. Or, the second side chain has Structural Formula (11) or (12) described above. The same applies in Embodiment 2 that will be described below.

More specifically, the second side chain, for example, has a structure shown in the following formulae (G-1) to (G-98). Further, in the structure shown in Formulae (G-89) to (G-98), "Z1" of the second side chain is bonded to the main chain via m-phenylene diamine Even in the structure shown in Formulae (G-1) to (G-89), "Z1" of the second side chain can be bonded to the main chain via the m-phenylene diamine.

(G-01)

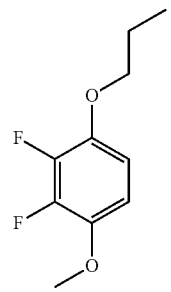
(G-02)

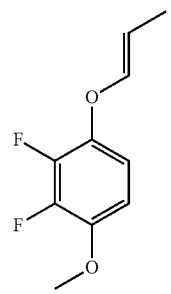
(G-03)

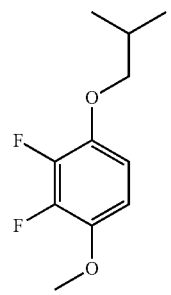
(G-04)

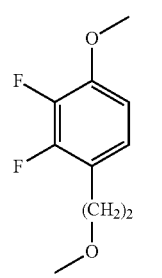
(G-05)

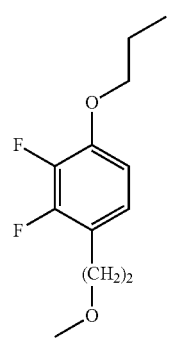
(G-06)

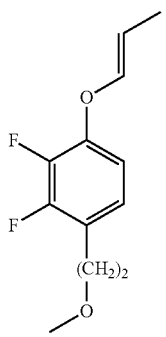
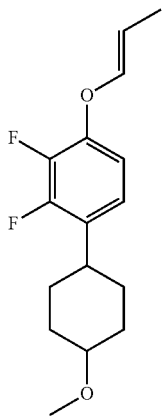

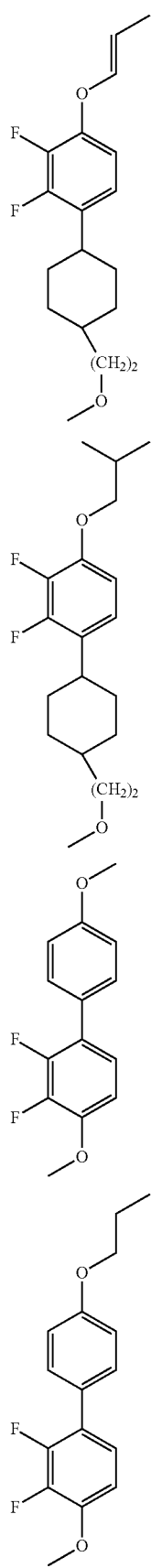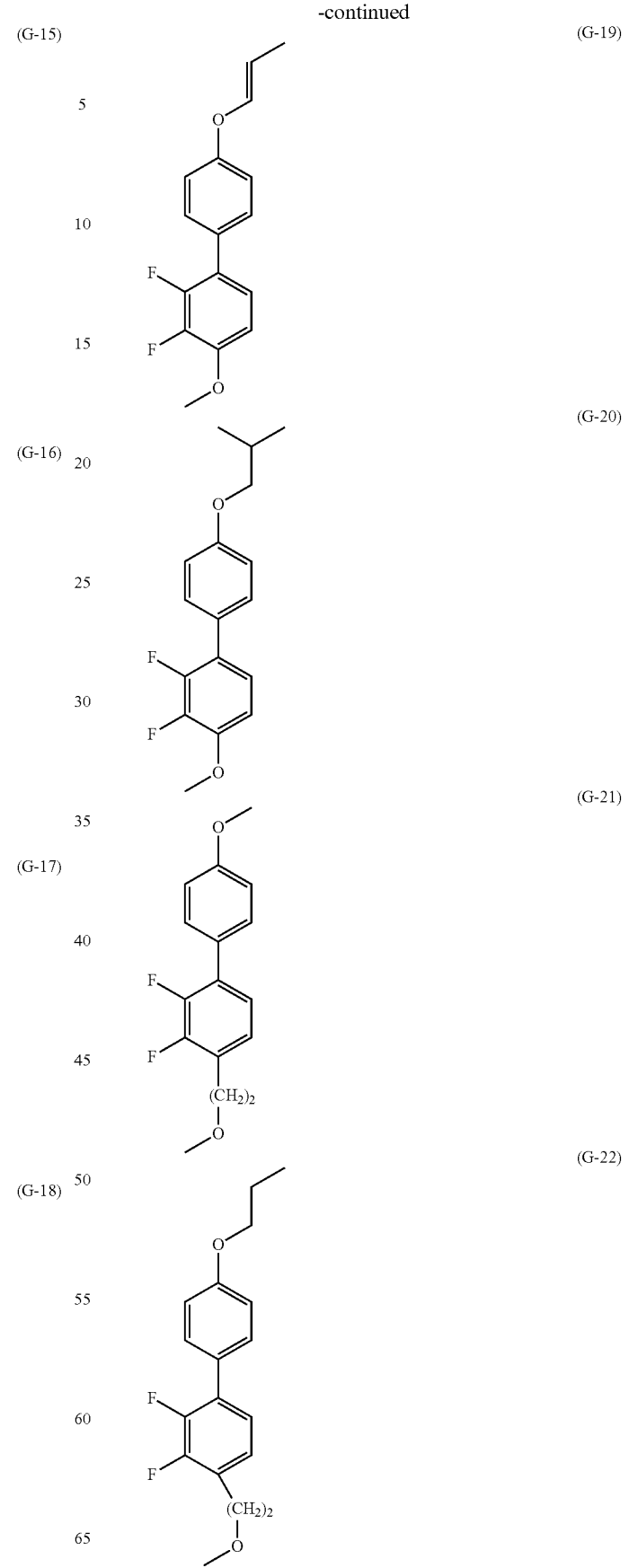

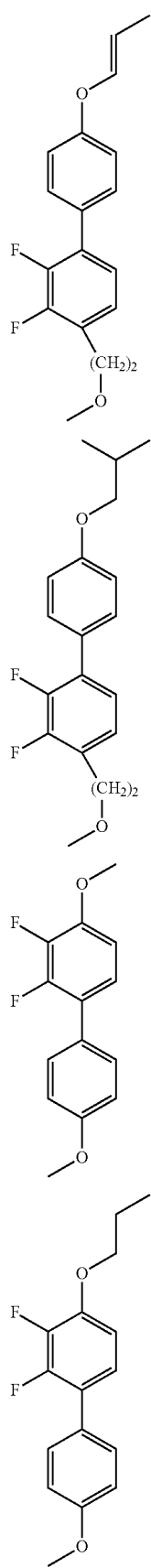
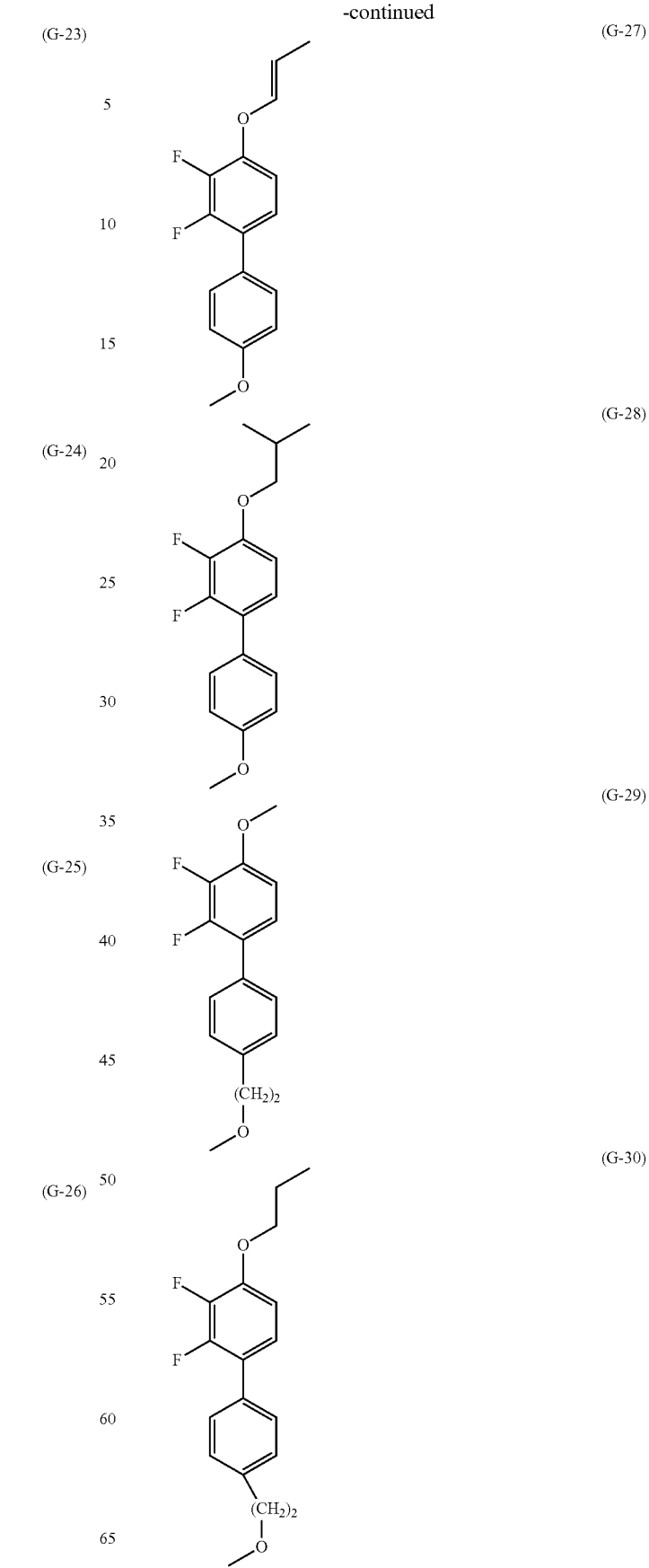

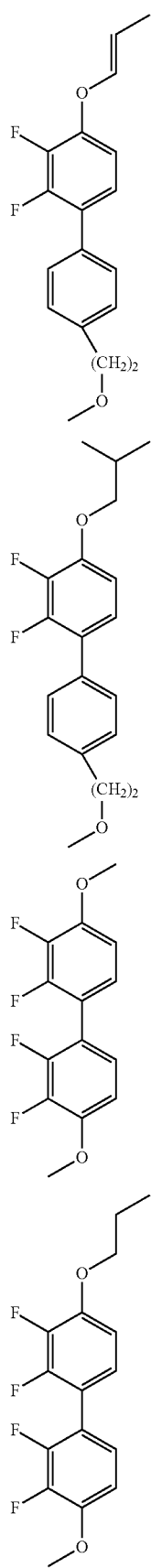
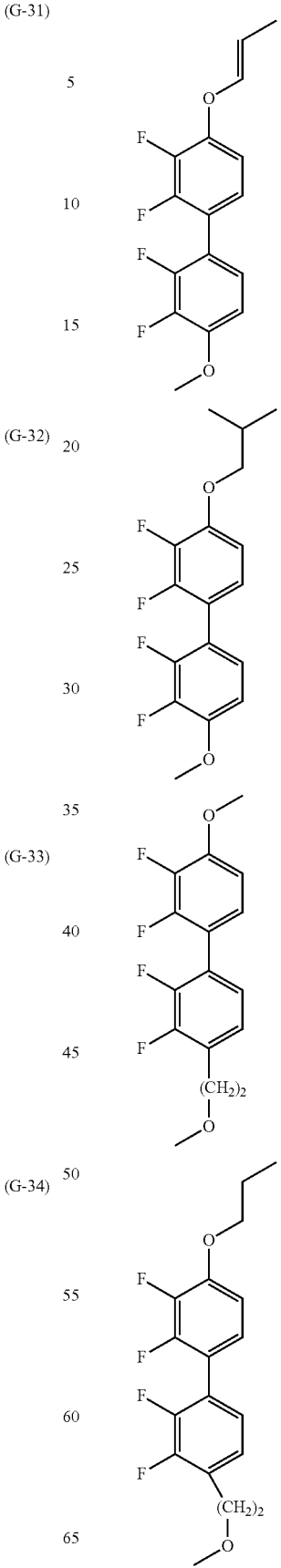

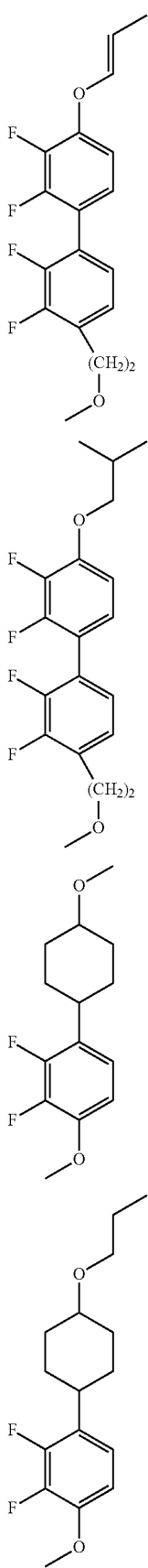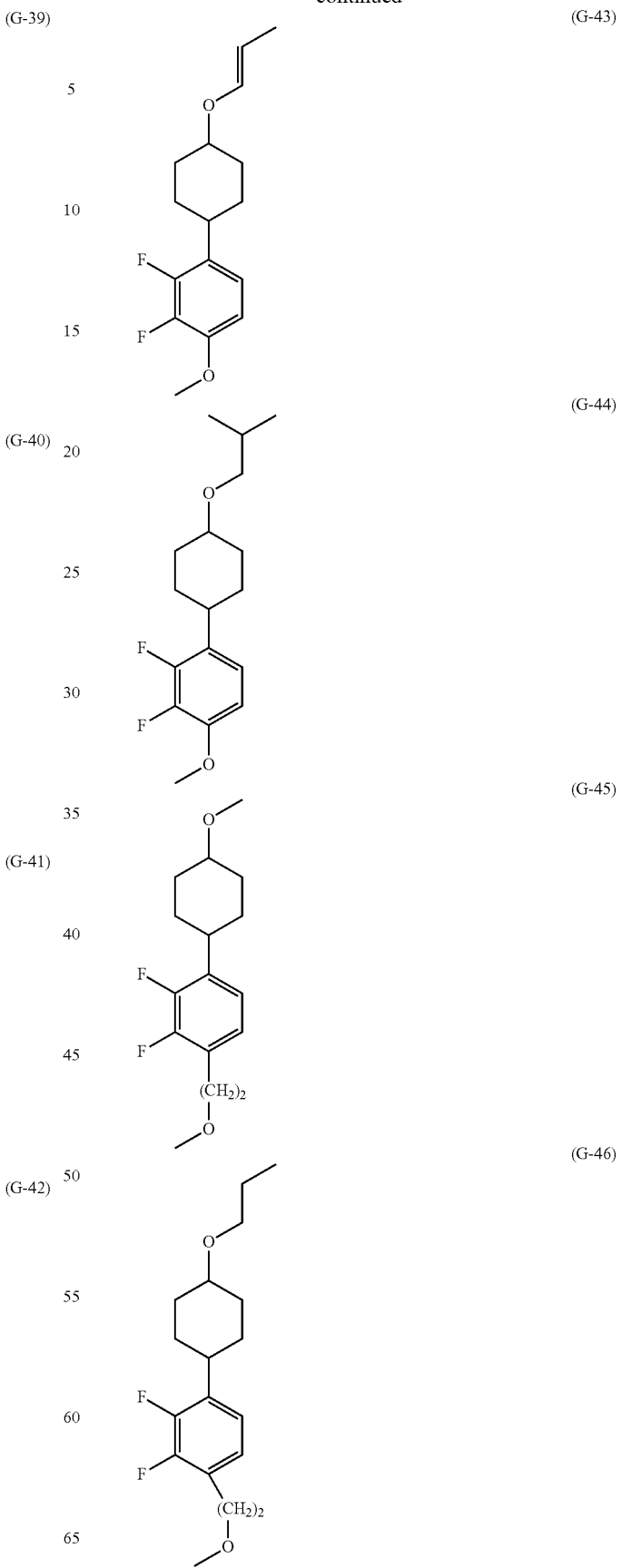

(G-47)
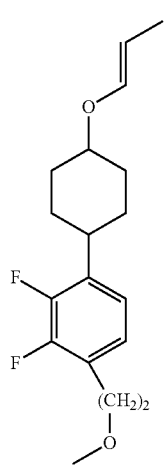
(G-48)
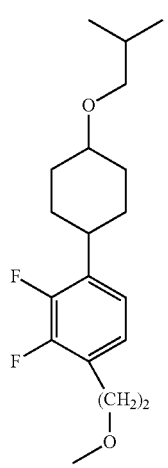
(G-49)
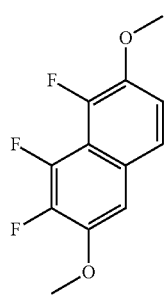
(G-50)
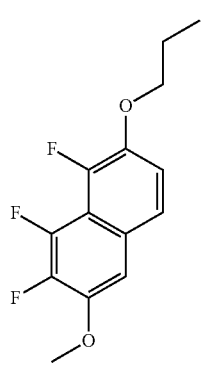
(G-51)
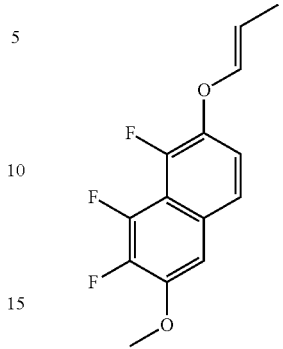
(G-52)
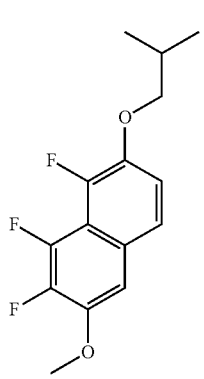
(G-53)
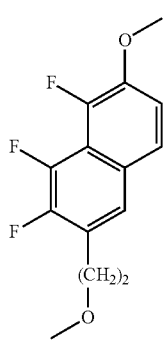
(G-54)
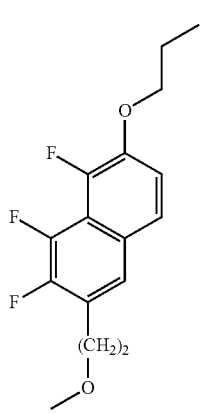

(G-55)
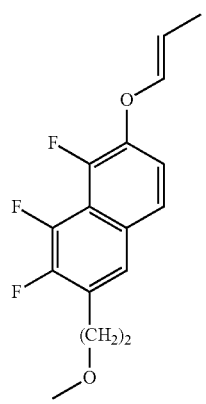
(G-56)
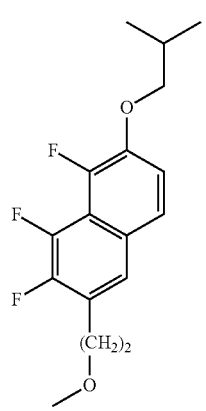
(G-57)
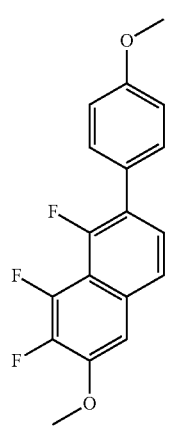
(G-58)
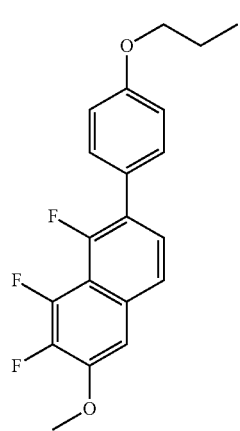
(G-59)
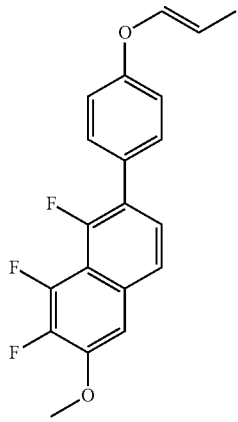
(G-60)
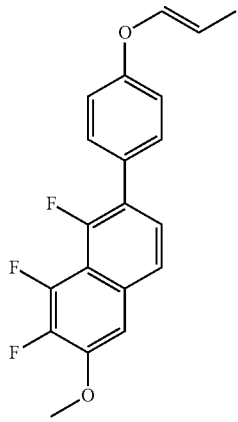
(G-61)
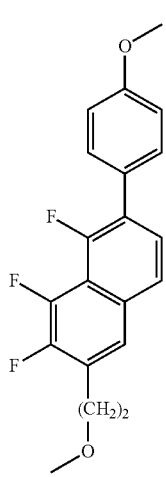

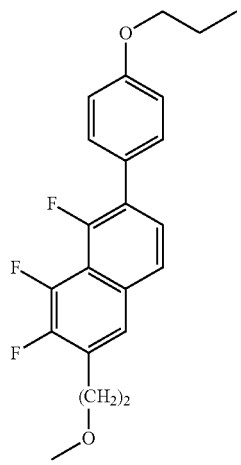
(G-62)
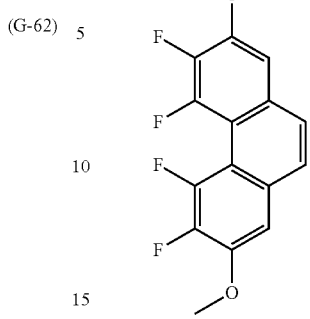
(G-65)
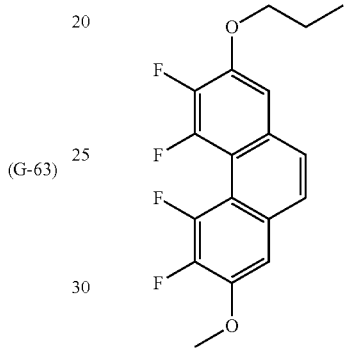
(G-66)
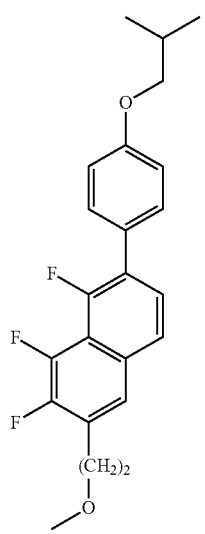
(G-63)
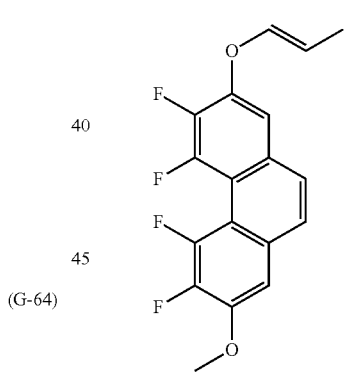
(G-67)
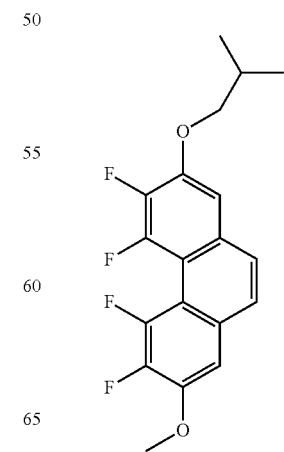
(G-68)
(G-64)

(G-69) 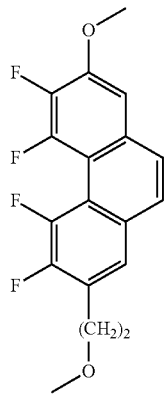
(G-70) 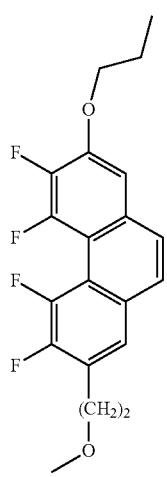
(G-71) 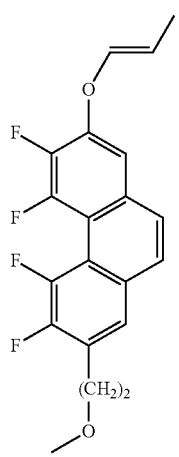
(G-72) 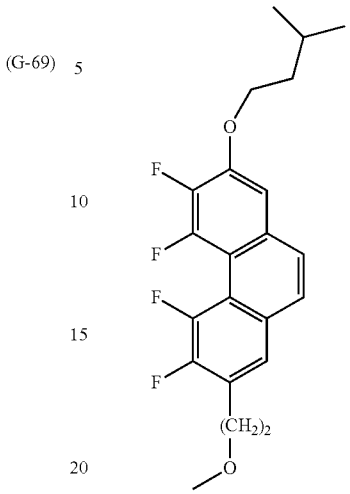
(G-73) 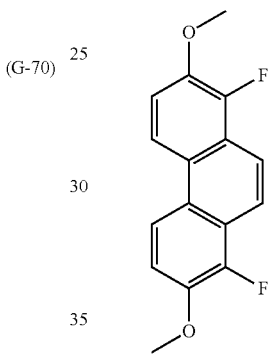
(G-74) 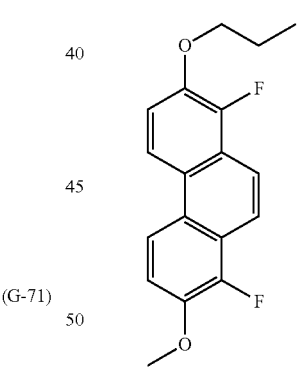
(G-75) 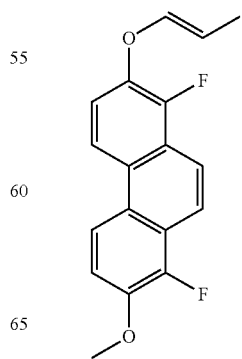

-continued
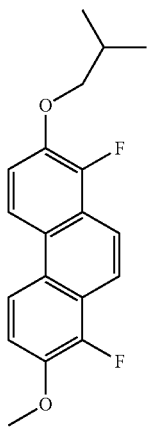
(G-76)
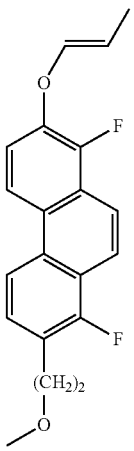
(G-77)
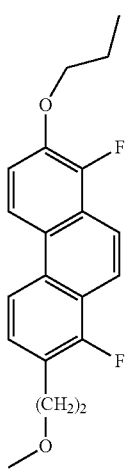
(G-78)
-continued
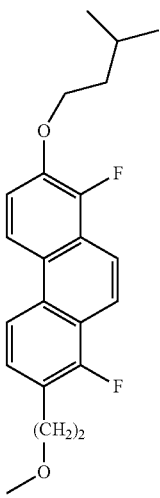
(G-79)
(G-80)
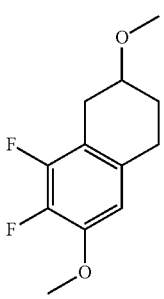
(G-81)
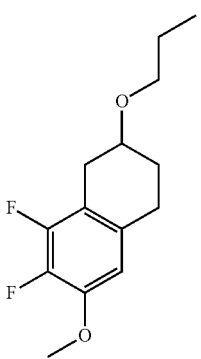
(G-82)

(G-83)
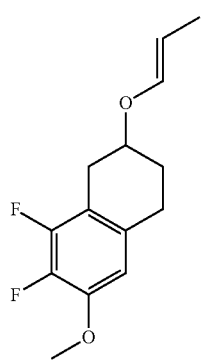
(G-84)
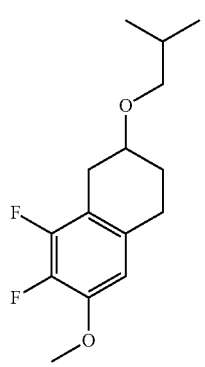
(G-85)
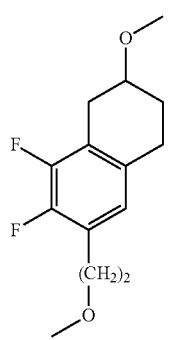
(G-86)
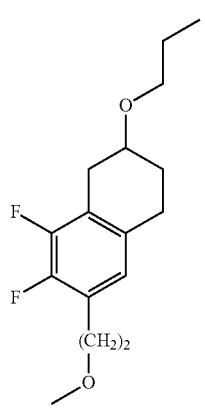
(G-87)
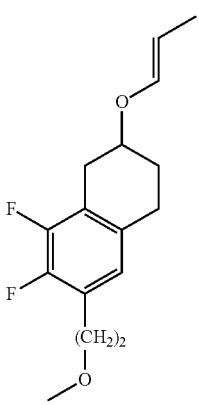
(G-88)
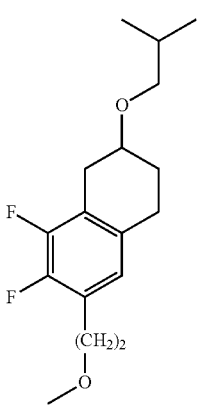
(G-89)
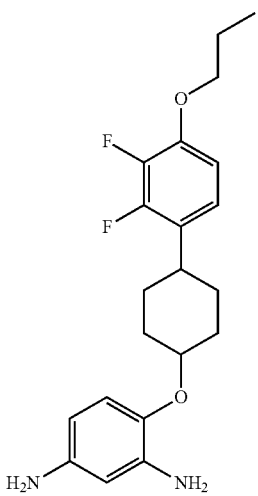
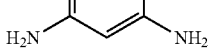

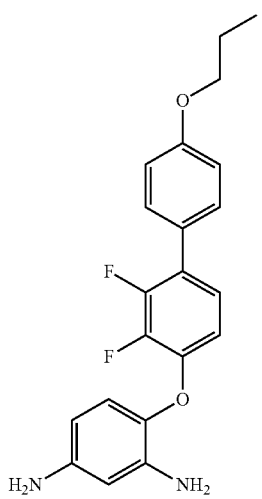
(G-90)
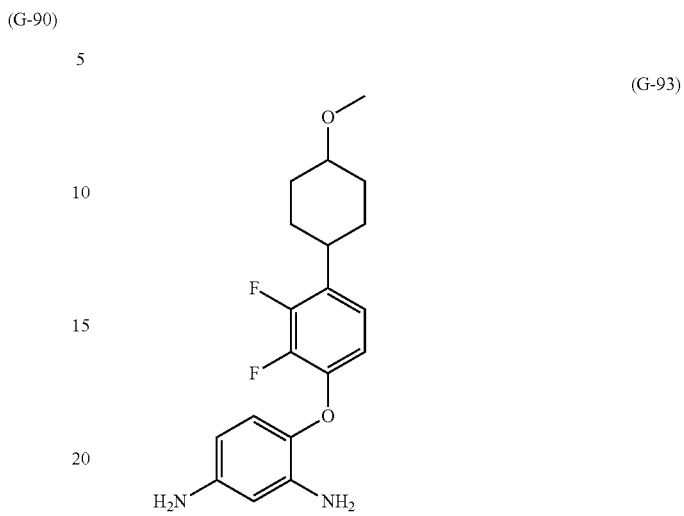
(G-93)
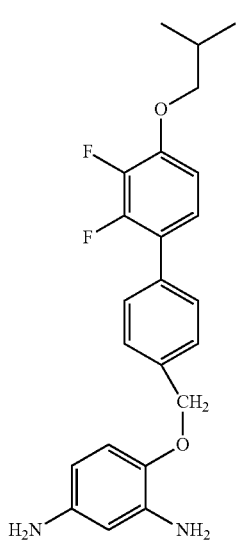
(G-91)
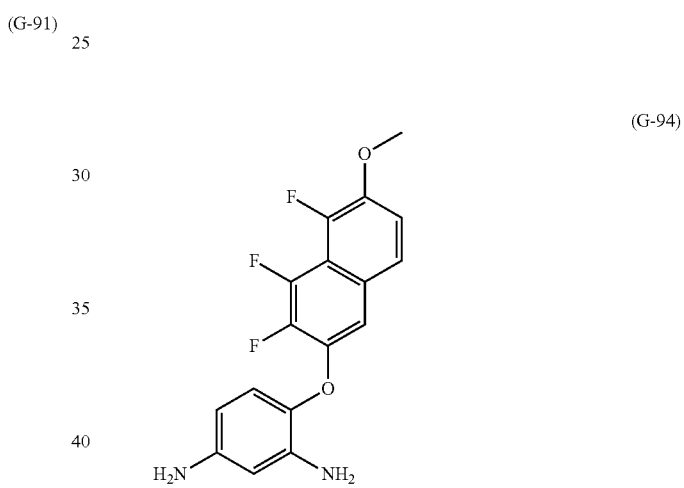
(G-94)
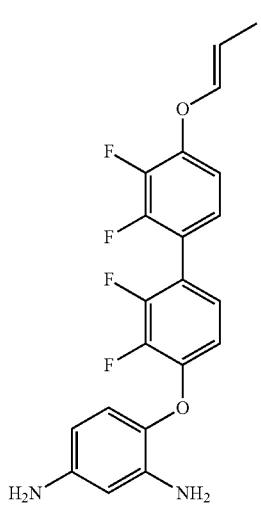
(G-92)
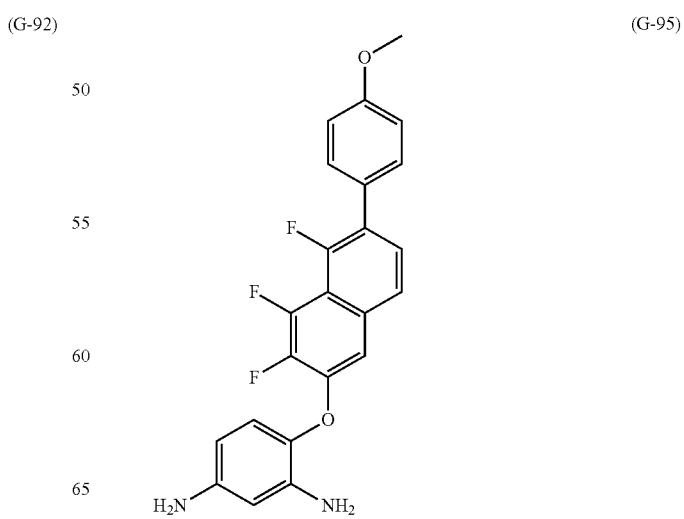
(G-95)

(G-96)

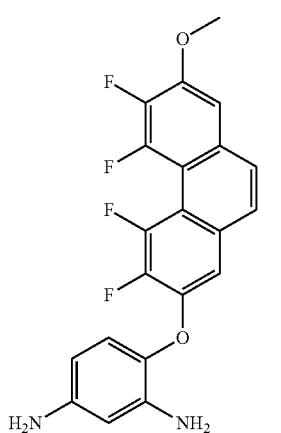

(G-97)

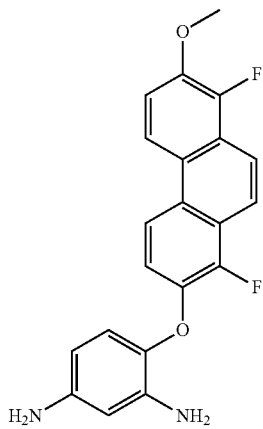

(G-98)

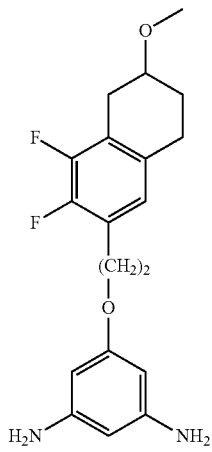

It is desirable for the compound before an alignment process to include a high heat resistance structure as the main chain. Accordingly, in the liquid crystal display device (the liquid crystal display element), even when the liquid crystal display device is exposed to a high temperature environment, the compound after an alignment process in the alignment films 22 and 32 maintains alignment regulation capability for the liquid crystal molecules 41, and accordingly, a display characteristic such as contrast together with a response characteristic is maintained to be excellent and reliability is secured. Here, it is desirable for the main chain to include an imide bond in a repetition unit. An example of the compound before an alignment process including an imide bond in the main chain may include a polymer compound including a polyimide structure represented by Formula (3). The polymer compound including the polyimide structure shown in Formula (3) may include one kind of the polyimide structure shown in Formula (3), may include a plurality of kinds connected at random, or may include a structure other than the structure shown in Formula (3).

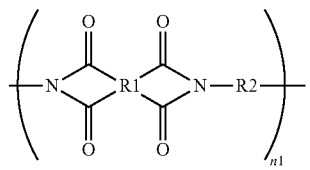

(3)

Here, R1 is a tetravalent organic group, R2 is a divalent organic group, and n1 is an integer equal to or greater than 1.

R1 and R2 in Formula (3) are any tetravalent or divalent groups including carbon, but it is desirable for any one of R1 and R2 to include a crosslinkable functional group or a polymerizable functional group as the first side chain. This is because it is easy to obtain sufficient alignment regulation capability in the compound after an alignment process.

Further, in the compound before an alignment process, a plurality of side chains are bonded to the main chain, and at least one of the plurality of side chains may be the first side chain including a crosslinkable functional group or a polymerizable functional group. That is, the compound before an alignment process may include a side chain not exhibiting crosslinkage, in addition to the first side chain with crosslinkage. The first side chain including a crosslinkable functional group or a polymerizable functional group may be one kind or a plurality of kinds. The crosslinkable functional group or the polymerizable functional group is any functional group capable of crosslinkage reaction after the liquid crystal layer 40 is formed, and may be a group that forms a crosslinked structure by photoreaction, or may be a group that forms a crosslinked structure by thermal reaction. Among them, a crosslinkable functional group or a polymerizable functional group with photoreactivity that forms a crosslinked structure by photoreaction (a photosensitive group with photosensitivity) is desirable. This is because it is easy to regulate the alignment of the liquid crystal molecules 41 in a predetermined direction, a response characteristic is improved, and manufacture of a liquid crystal display device (a liquid crystal display element) with an excellent display characteristic is facilitated.

An example of the crosslinkable functional group with photosensitivity (which is a photosensitive group with photosensitivity, such as a photodimerized photosensitive group) may include a group including a structure of any one of chalcone, cinnamate, cinnamoyl, coumarin, maleimide, benzophenone, norbornene, oryzanol, and chitosan. Among them, an example of a group including a structure of the chalcone, the cinnamate or the cinnamoyl may include a group represented by Formula (41). If the compound before an alignment process having the first side chain including the group shown in Formula (41) is crosslinked, for example, a structure shown in Formula (42) is formed. In other words, the compound after an alignment process produced from a polymer compound including the group shown in Formula (41) includes the structure shown in Formula (42) with a cyclobutane skeleton. Further, for example, the crosslinkable functional group with the photoreactivity such as maleimide exhibits not only a light dimerization reaction but also a polymerization reaction in some cases. Accordingly, it is represented as the compound in which the polymer compound having a crosslinkable functional group or a polymerizable functional group is crosslinked or polymerized.

(41)

(42)

where R3 is a divalent group including an aromatic ring, R4 is a monovalent group including one or two or more ring structures, and R5 is a hydrogen atom, an alkyl group or a derivative thereof.

R3 in Formula (41) is any divalent group including an aromatic ring such as a benzene ring, and may include a carbonyl group, an ether bond, an ester bond or a hydrocarbon group, in addition to the aromatic ring. Further, R4 in Formula (41) is any monovalent group including one or two or more ring structures, and may include a carbonyl group, an ether bond, an ester bond, a hydrocarbon group or a halogen atom, in addition to the ring structure. The ring structure of R4 is any ring including carbon as an element constituting a skeleton, and an example of the ring structure may include an aromatic ring, a heterocyclic ring or an aliphatic ring, or a ring structure in which the rings are connected or condensed. R5 in Formula (41) is any of a hydrogen atom, an alkyl group and a derivative thereof. Here, the "derivative" refers to a group in which some or all of hydrogen atoms of the alkyl group are substituted by a substituent such as halogen atoms. Further, the number of carbon atoms of the alkyl group to be introduced as R5 is arbitrary. A hydrogen atom or a methyl group is desirable as R5. This is because excellent crosslinking reactivity can be obtained.

R3 in Formula (42) may be the same or may be different. The same applies to R4 and R5 in Formula (41). Examples of R3, R4 and R5 in Formula (42) may include R3, R4 and R5 in Formula (41) described above.

An example of the group shown in Formula (41) may include a group represented by Formulae (41-1) to (41-33). However, the group is not limited to the groups shown in Formulae (41-1) to (41-33) if the group is a group having the structure shown in Formula (41).

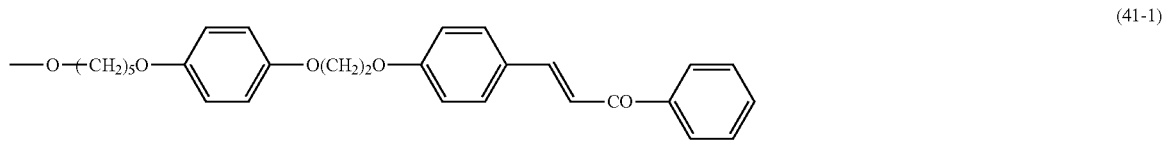
(41-1)

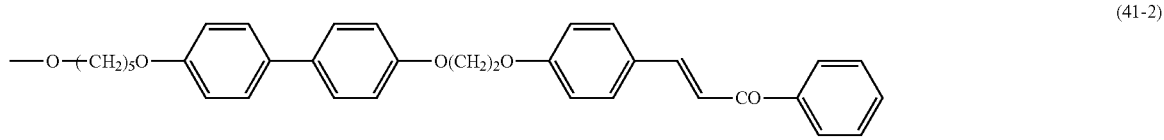
(41-2)

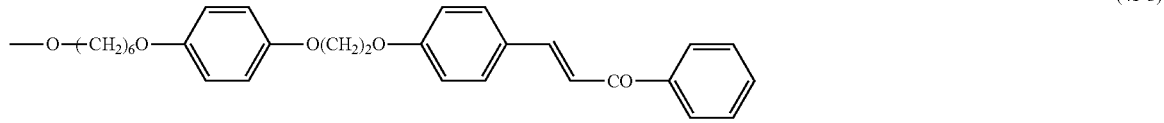
(41-3)

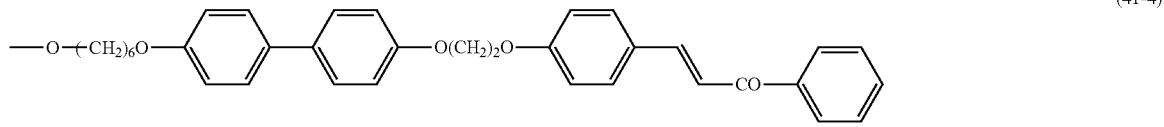
(41-4)

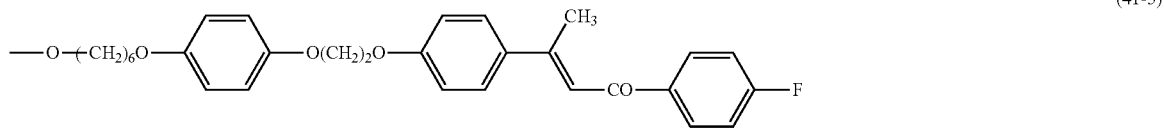
(41-5)

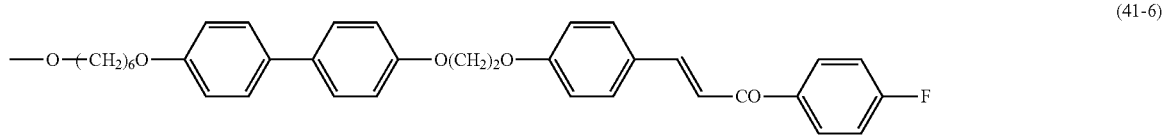
(41-6)

-continued
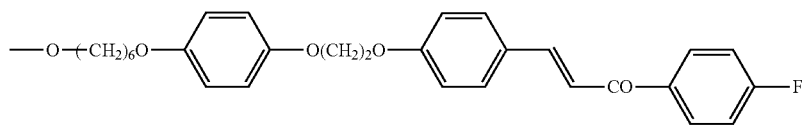
(41-7)
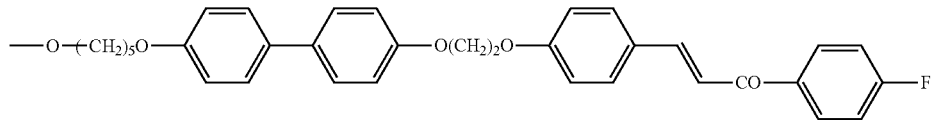
(41-8)
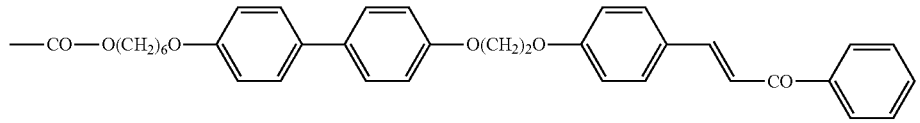
(41-9)
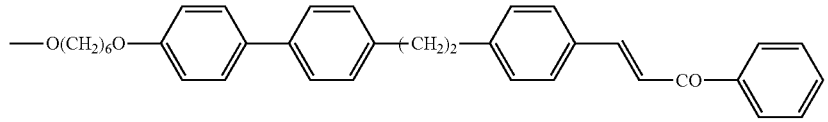
(41-10)
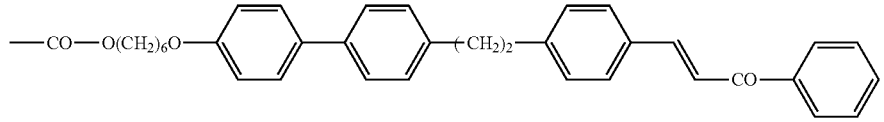
(41-11)
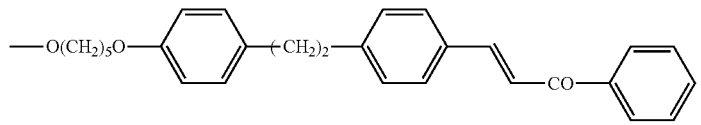
(41-12)
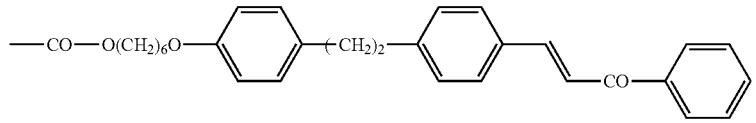
(41-13)
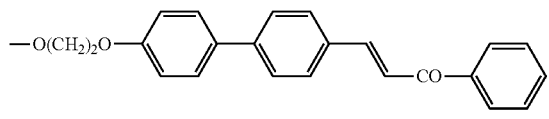
(41-14)
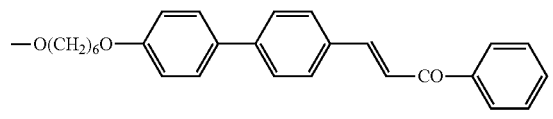
(41-15)
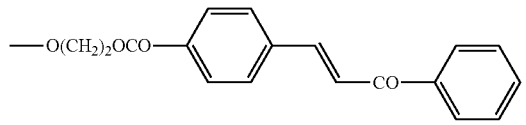
(41-16)
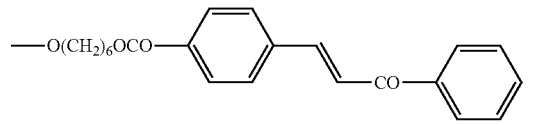
(41-17)
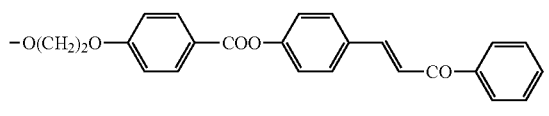
(41-18)
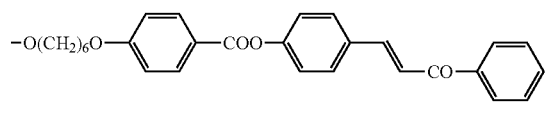
(41-19)
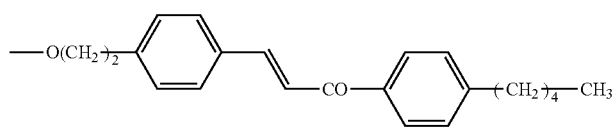
(41-20)

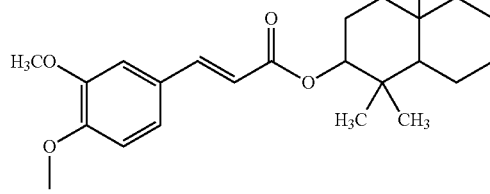 (41-21)
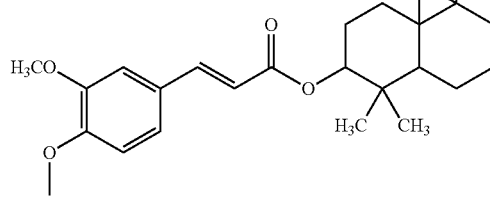 (41-22)
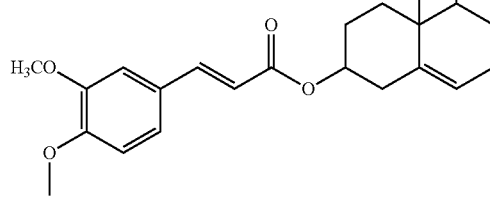 (41-23)
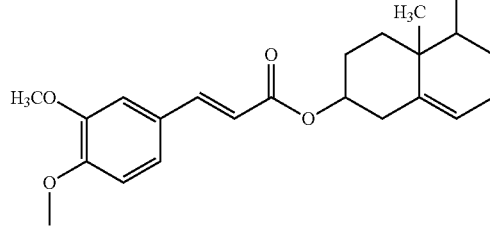 (41-24)

-continued
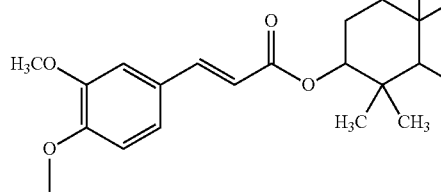
(41-25)
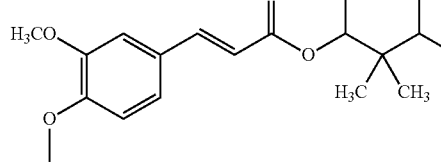
(41-26)
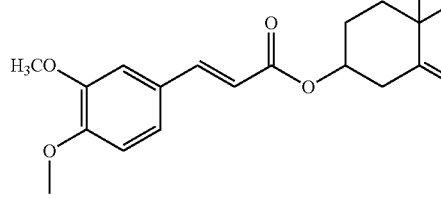
(41-27)
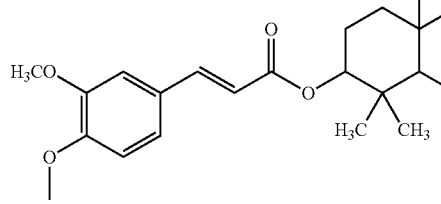
(41-28)
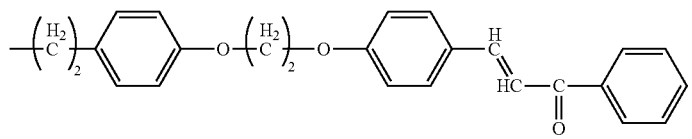
(41-29) (41-30)
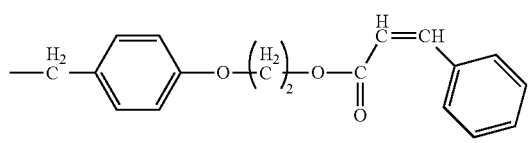
(41-31) (41-32)
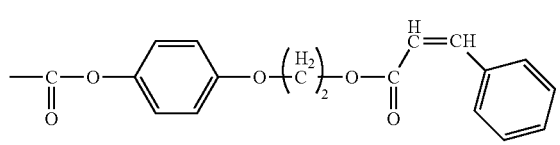 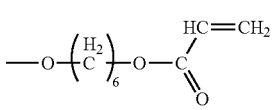

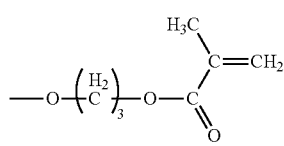

(41-33)

It is desirable for the compound before an alignment process to include a structure for aligning the liquid crystal molecules 41 in the direction perpendicular to the substrate surface (hereinafter referred to as a "vertical alignment induction structure portion"). This is because alignment regulation of all the liquid crystal molecules 41 becomes possible even when the alignment films 22 and 32 do not include a compound having a vertical alignment induction structure portion (so-called normal vertical alignment agent) separately from the compound after an alignment process. Moreover, this is because it is easy to form the alignment films 22 and 32 capable of more uniformly exhibiting an alignment regulation function for the liquid crystal layer 40, as compared with a case in which a compound having a vertical alignment induction structure portion is separately included. In the compound before an alignment process, the vertical alignment induction structure portion may be included in the main chain, may be included in the first side chain, or may be included in both. Further, if the compound before an alignment process includes the polyimide structure shown in Formula (3), it is desirable to include two kinds of structures: a structure including the vertical alignment induction structure portion (repetition unit) as R2 and a structure including a crosslinkable functional group or a polymerizable functional group (repetition unit) as R2. This is because the structures are easily available. Further, if the vertical alignment induction structure portion is included in the compound before an alignment process, the vertical alignment induction structure portion is also included in the compound after an alignment process.

An example of the vertical alignment induction structure portion may include an alkyl group having 10 or more carbon atoms, a halogenated alkyl group having 10 or more carbon atoms, an alkoxy group having 10 or more carbon atoms, a halogenated alkoxy group having 10 or more carbon atoms, or an organic group having a ring structure. Specifically, an example of the structure including the vertical alignment induction structure portion may include the structure represented by Formulae (5-1) to (5-6).

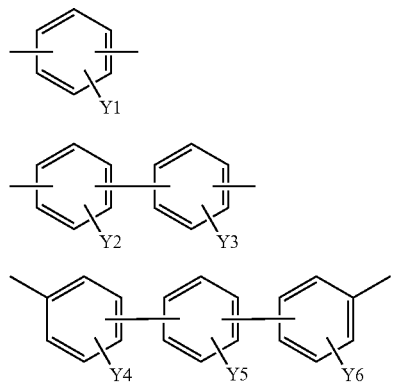

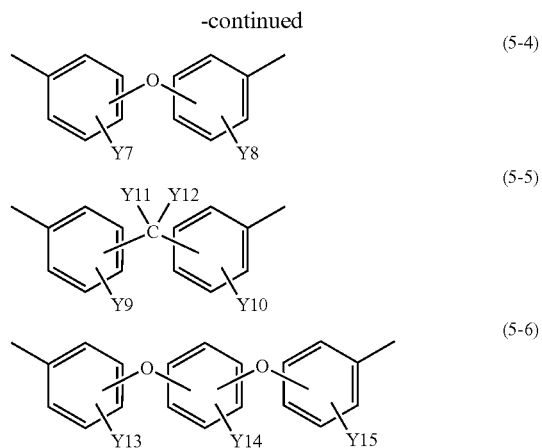

Here, Y1 is an alkyl group having 10 or more carbon atoms, an alkoxy group having 10 or more carbon atoms, or a monovalent organic group including a ring structure. Further, Y2 to Y15 are hydrogen atoms, alkyl groups having 10 or more carbon atoms, alkoxy groups having 10 or more carbon atoms, or monovalent organic groups including a ring structure. At least one of Y2 and Y3, at least one of Y4 to Y6, at least one of Y7 and Y8, at least one of Y9 to Y12, and at least one of Y13 to Y15 are alkyl groups having 10 or more carbon atoms, alkoxy groups having 10 or more carbon atoms, or monovalent organic groups including a ring structure. However, Y11 and Y12 may be bonded to form a ring structure.

Further, an example of the monovalent organic group including the ring structure as the vertical alignment induction structure portion may include a group represented by Formulae (6-1) to (6-23). An example of the divalent organic group including the ring structure as the vertical alignment induction structure portion may include a group represented by Formulae (7-1) to (7-7).

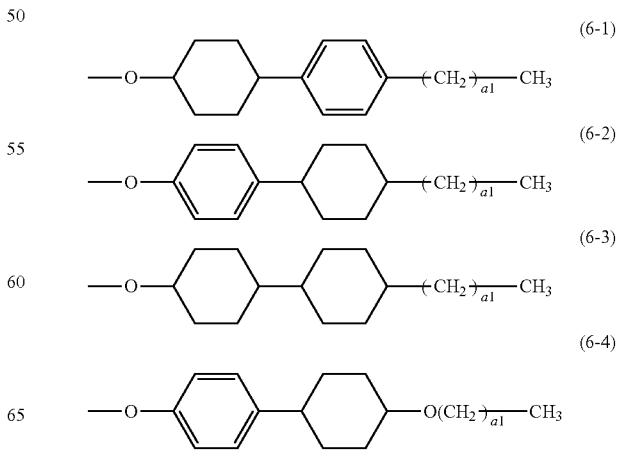

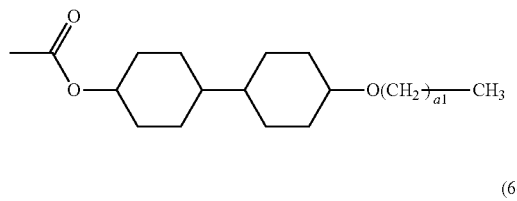
(6-5)
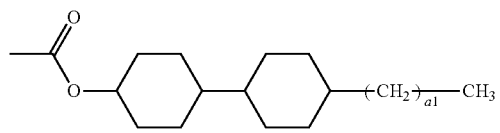
(6-6)
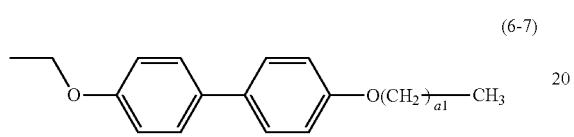
(6-7)
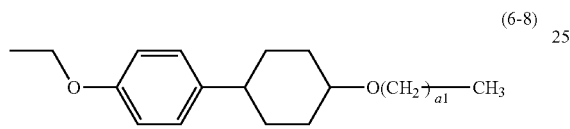
(6-8)
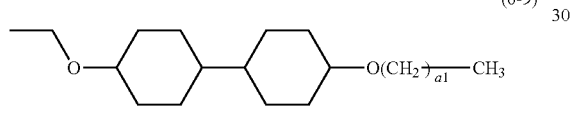
(6-9)
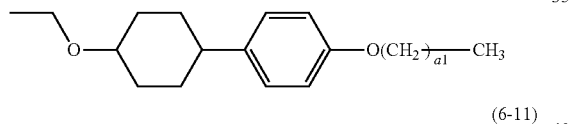
(6-10)
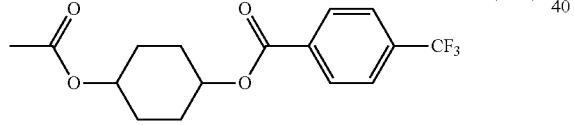
(6-11)
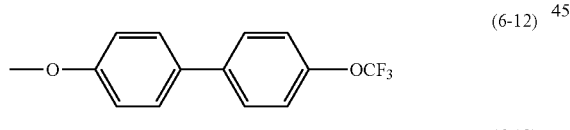
(6-12)
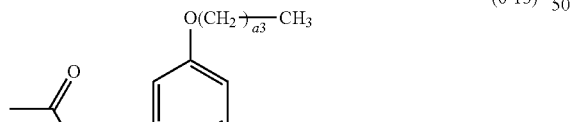
(6-13)
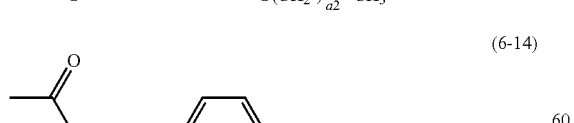
(6-14)
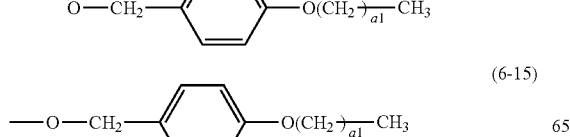
(6-15)
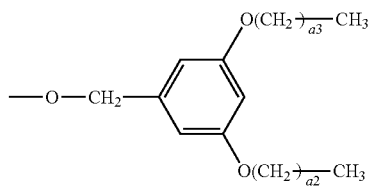
(6-16)
where a1 to a3 are integers ranging from 0 to 21.
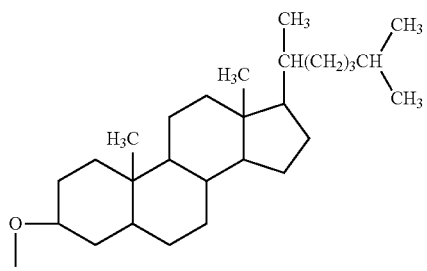
(6-17)
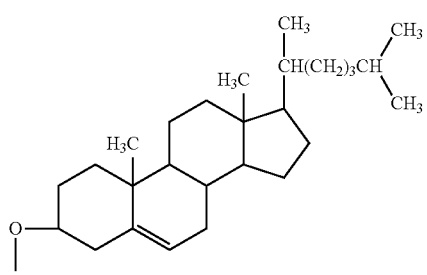
(6-18)
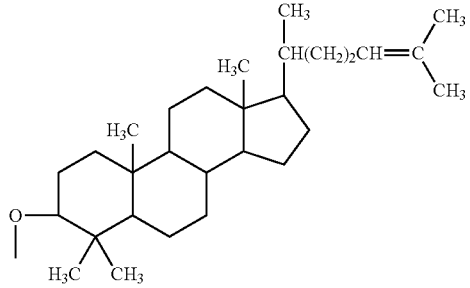
(6-19)
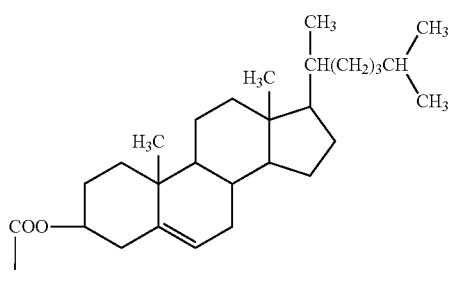
(6-20)

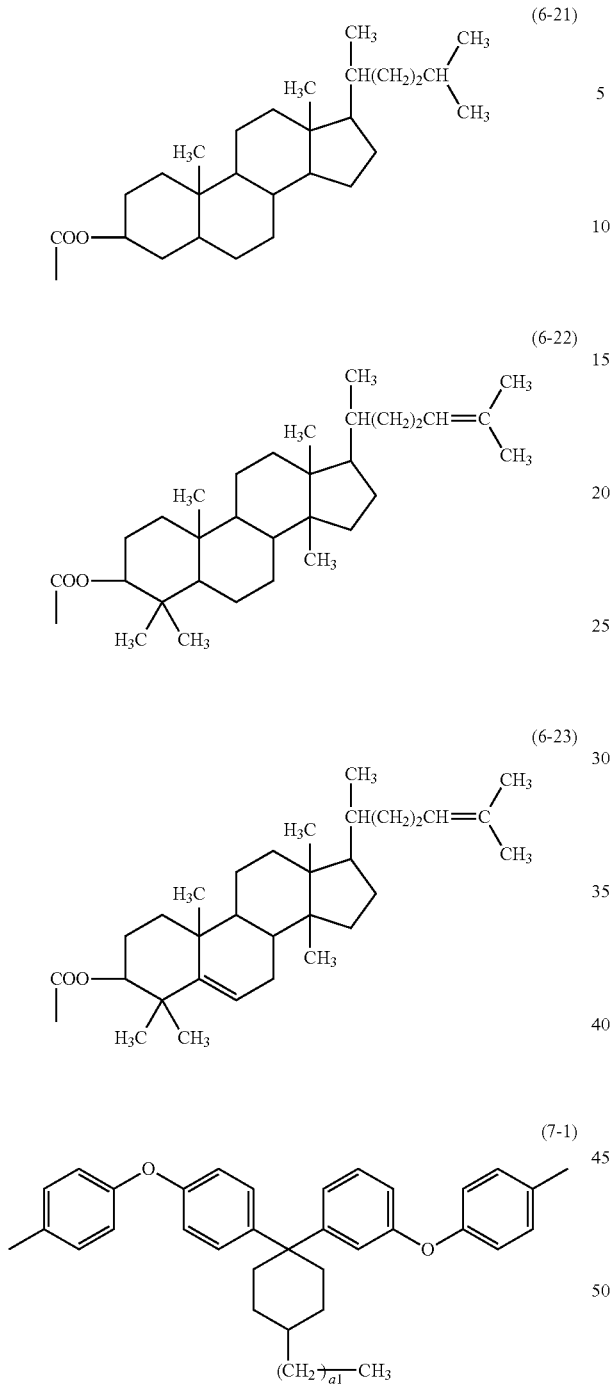
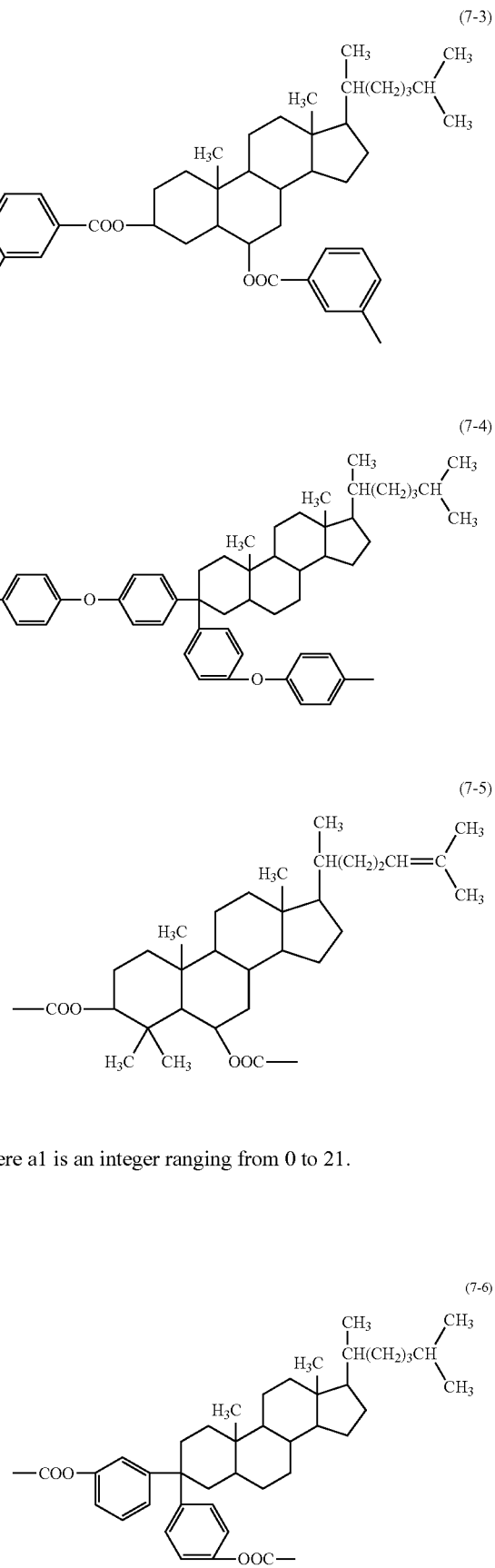
where a1 is an integer ranging from 0 to 21.

(7-7)

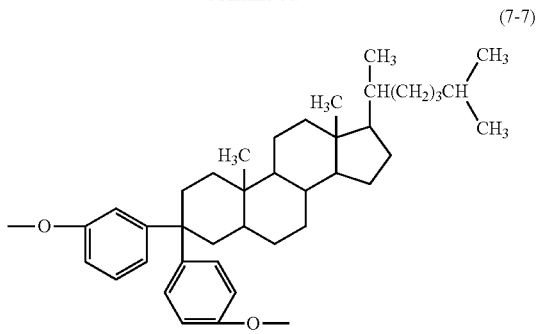

Further, if the vertical alignment induction structure portion includes a structure functioning to arrange the liquid crystal molecules 41 in the direction perpendicular to the substrate surface, the vertical alignment induction structure portion is not limited to the above-described group.

Further, when expressed according to the (1-1)$^{th}$ configuration and the (2-1)$^{th}$ configuration of the present disclosure (see Embodiment 2 that will be described below) or the (4-1)$^{th}$ configuration, a polymer compound before crosslinkage (the compound before an alignment process), for example, includes a compound having a group represented by Formula (1) as the first side chain. Since the group shown in Formula (1) can move along the liquid crystal molecules 41, the group shown in Formula (1) is fixed along with the crosslinkable functional group or the polymerizable functional group in the state in which the group is along the alignment direction of the liquid crystal molecules 41 when the compound before an alignment process is crosslinked. Also, since it becomes easy to regulate the alignment of the liquid crystal molecules 41 by the predetermined direction by the fixed group shown in Formula (1), manufacture of a liquid crystal display element having an excellent display characteristic can be more facilitated.

where $R_1'$ is a divalent organic group including an ether group or an ester group in a straight chain shape or a branch shape having one or more carbon atoms, and is bonded to the main chain of the polymer compound or the crosslinked compound (the compound before an alignment process or the compound after an alignment process) or $R_1'$ is at least one kind of bond group selected from the group consisting of ether, ester, ether ester, acetal, ketal, hemiacetal and hemiketal and is bonded to the main chain of the polymer compound or the crosslinked compound (the compound before an alignment process or the compound after an alignment process). $R_2'$ is a divalent organic group including a plurality of ring structures, and one of the atoms constituting the ring structure is bonded to $R_1'$. $R_3'$ is a hydrogen atom, a halogen atom, an alkyl group, an alkoxy group, a monovalent group having a carbonate group, or a derivative thereof.

$R_1'$ in Formula (1) is a portion for functioning as a spacer portion for fixing $R_2'$ and $R_3'$ to the main chain and greatly pretilting the liquid crystal molecules if long $R_1'$ is selected and easily making a pretilt angle constant if short $R_1'$ is selected. An example of $R_1'$ may include an alkylene group. This alkylene group may have an ether bond between carbon atoms on the way and the number of portions having the ether bond may be 1 or may be 2. Further, $R_1'$ may have a carbonyl group or a carbonate group. It is desirable that the number of carbon atoms of $R_1'$ is 6 or more. This is because the group shown in Formula (1) interacts with the liquid crystal molecules 41 and thus it becomes easy to be along the group. It is desirable that this number of carbon atoms is determined so that a length of $R_1'$ is substantially equal to a length of an end chain of the liquid crystal molecules 41.

$R_2'$ in Formula (1) is a portion along a ring structure (a core portion) included in a general nematic liquid crystal molecule. An example of $R_2'$ may include the same group or skeleton as the ring structure included in the liquid crystal molecule, like a 1,4-phenylene group, a 1,4-cyclohexylene group, a pyrimidine-2,5-diyl group, a 1,6-naphthalene group, a divalent group having a steroid skeleton, or a derivative thereof. Here, the "derivative" is a group in which one or two or more substituents are introduced into a series of groups described above.

$R_3'$ in Formula (1) is a portion along the end chain of the liquid crystal molecule, and an example of $R_3'$ may include an alkyl group or a halogenated alkyl group. However, in the halogenated alkyl group, at least one hydrogen atom in the alkyl group may be substituted by a halogen atom and a type of the halogen atom is arbitrary. The alkyl group or the halogenated alkyl group may have an ether bond between carbon atoms on the way and the number of portions having the ether bond may be 1 or may be 2 or more. Further, $R_3'$ may have a carbonyl group or a carbonate group. It is more desirable that the number of carbon atoms of $R_3'$ is 6 or more for the same reason as in $R_1'$.

Specifically, an example of the group shown in Formula (1) may include a monovalent group represented by Formulae (1-1) to (1-12).

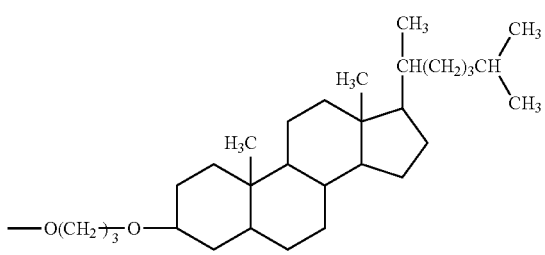

(1-1)

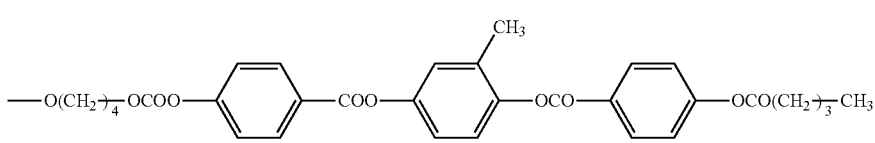

(1-2)

-continued

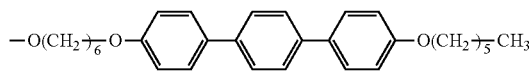
(1-3)

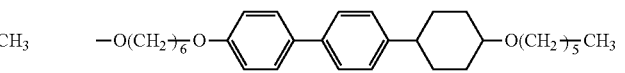
(1-4)

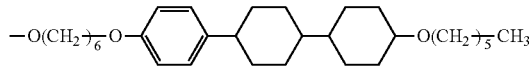
(1-5)

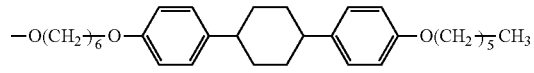
(1-6)

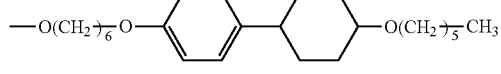
(1-7)

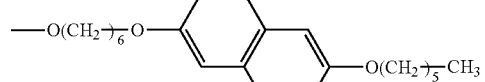
(1-8)

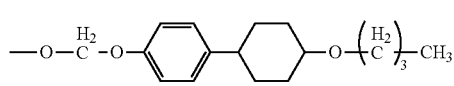
(1-9)

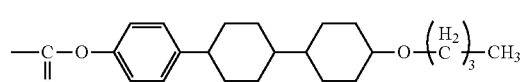
(1-10)

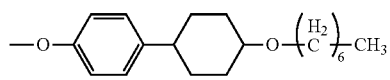
(1-11)

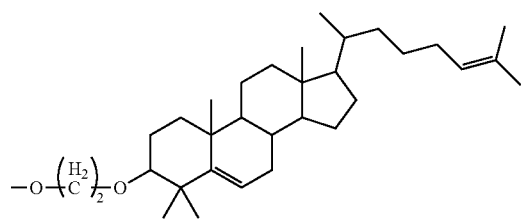
(1-12)

Further, the group shown in Formula (1) is not limited to the above-described group if it can move along the liquid crystal molecules 41.

Or, when expressed according to the $(1-2)^{th}$ configuration, the $(2-2)^{th}$ configuration (see Embodiment 2 that will be described below) or the $(4-2)^{th}$ configuration of the present disclosure, the polymer compound before crosslinkage (the compound before an alignment process) includes a compound having a group represented by Formula (2) as the first side chain. Since the compound has a portion along the liquid crystal molecules 41 and a portion defining a tilt angle, in addition to the crosslinkage portion, the portion of the first side chain along the liquid crystal molecules 41 can be fixed in a state in which the liquid crystal molecules 41 are along the portion. Also, thus, since it is easy to regulate the alignment of the liquid crystal molecules 41 in a predetermined direction, manufacture of a liquid crystal display element having an excellent display characteristic can be further facilitated.

$$-R_{11}'-R_{12}'-R_{13}'-R_{14}' \qquad (2)$$

where $R_{11}'$ is a linear or branched divalent organic group including an ether group or an ester group having 1 to 20 carbon atoms, preferably, 3 to 12 carbon atoms, and is bonded to the main chain of the polymer compound or the crosslinked compound (the compound before an alignment process or the compound after an alignment process). Or, $R_{11}'$ is at least one kind of bond group selected from the group consisting of ether, ester, acetal, ether ester, ketal, hemiacetal and hemiketal and is bonded to the main chain of the polymer compound or the crosslinked compound (the compound before an alignment process or the compound after an alignment process). For example, $R_{12}'$ is a divalent group including a structure of any one of chalcone, cinnamate, cinnamoyl, coumarin, maleimide, benzophenone, norbornene, oryzanol, chitosan, acryloyl, methacryloyl, vinyl, epoxy and oxetane, or an ethynylene group. $R_{13}'$ is a divalent organic group including a plurality of ring structures. $R_{14}'$ is a hydrogen atom, a halogen atom, an alkyl group, an alkoxy group, a monovalent group having a carbonate group, or a derivative thereof.

$R_{11}'$ in Formula (2) is a portion defining a tilt angle in the compound before an alignment process, and it is desirable for $R_{11}'$ to have flexibility in the compound before an alignment process. An example of $R_{11}'$ may include the group described for $R_1'$ in Formula (1). In the group shown in Formula (2), since $R_{12}'$ to $R_{14}'$ easily move using $R_{11}'$ as an axis, it becomes easy for $R_{13}'$ and $R_{14}'$ to be along the liquid crystal molecules 41. It is more desirable that the number of carbon atoms of $R_{11}'$ ranges from 6 to 10.

$R_{12}'$ in Formula (2) is a portion having a crosslinkable functional group or a polymerizable functional group. This crosslinkable functional group or polymerizable functional group may be a group forming a crosslinked structure by photoreaction or may be a group forming a crosslinked structure by thermal reaction, as described above. Specifically, an example of $R_{12}'$ may include a divalent group including a structure of any one of chalcone, cinnamate, cinnamoyl, coumarin, maleimide, benzophenone, norbornene, oryzanol, chitosan, acryloyl, methacryloyl, vinyl, epoxy and oxetane, or an ethynylene group.

$R_{13}'$ in Formula (2) is a portion that can be along a core portion of the liquid crystal molecule 41, and an example of $R_{13}'$ may include the group described for $R_2'$ in Formula (1).

$R_{14}'$ in Formula (2) is a portion along the end chain of the liquid crystal molecule 41, and an example of $R_{14}'$ may include the group described for $R_3'$ in Formula (1).

Specifically, an example of the group shown in Formula (2) may include a monovalent group represented by Formulae (2-1) to (2-11).

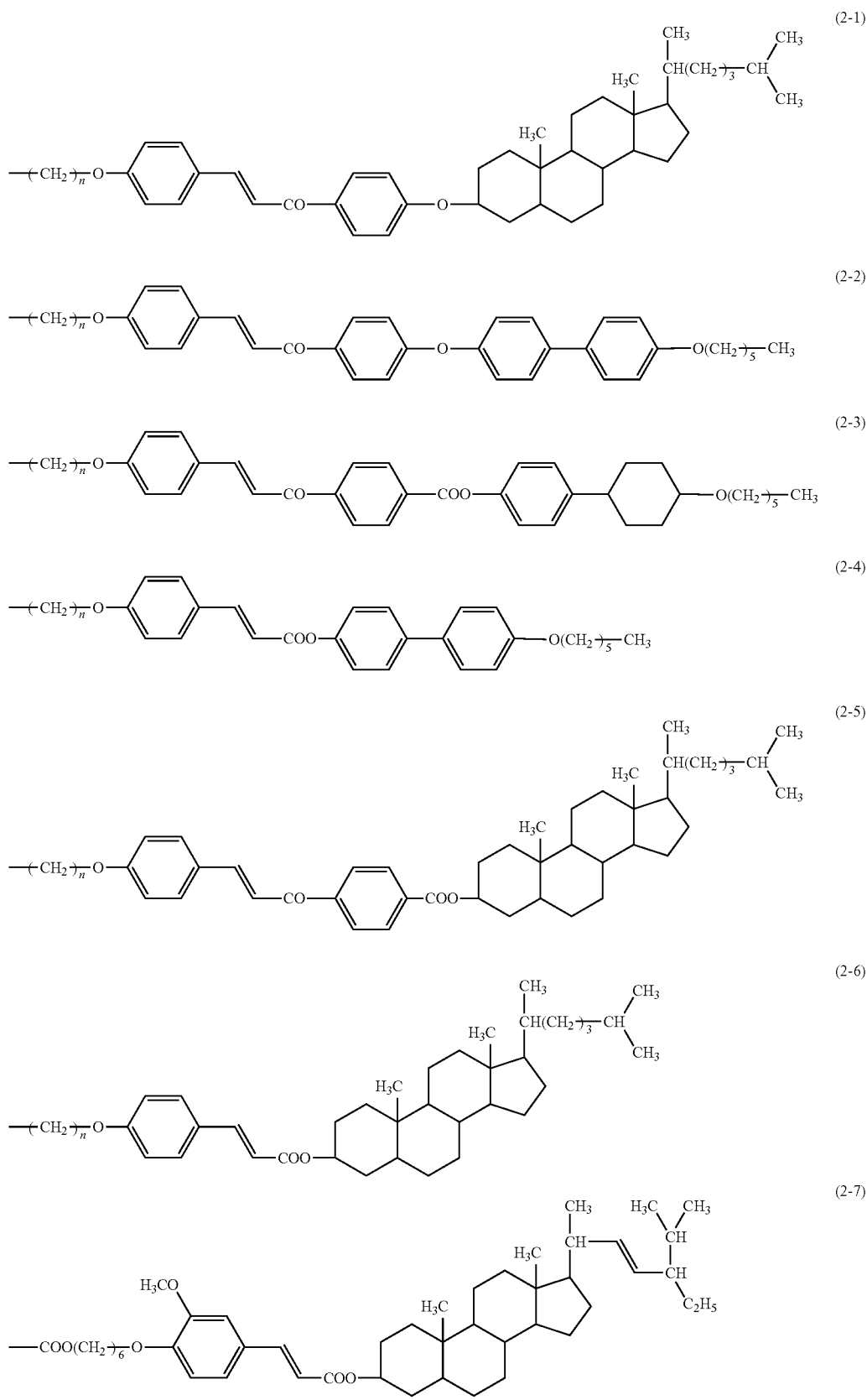
where n is an integer ranging from 3 to 20.

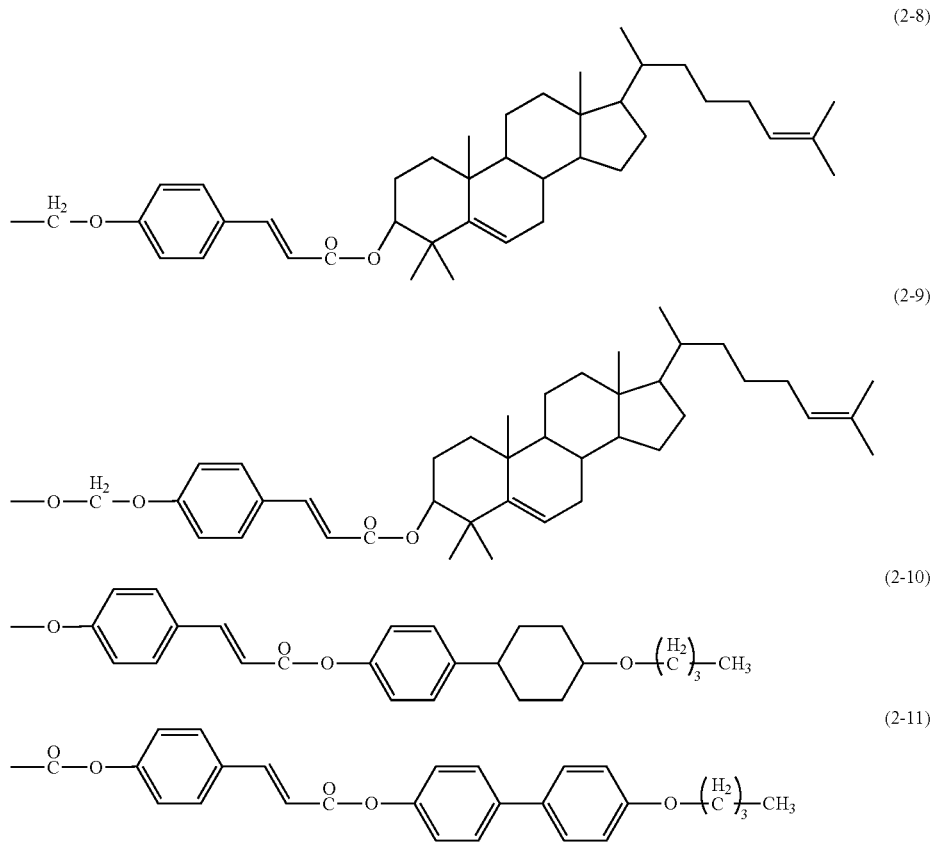

(2-8)

(2-9)

(2-10)

(2-11)

Further, the group shown in Formula (2) is not limited to the above-described group as long as the group has the four portions ($R_{11}'$ to $R_{14}'$) described above.

Further, when expressed according to the $(1-3)^{th}$ configuration of the present disclosure, the compound (the compound after an alignment process) obtained by crosslinking the polymer compound (the compound before an alignment process) includes a first side chain, a second side chain, and a main chain supporting the first side chain and the second side chain with respect to the substrate, the first side chain is bonded to the main chain and includes a crosslinking crosslinkage portion and end structure portions bonded to the crosslinkage portion, and the liquid crystal molecules are pretilted by being along the end structure portion or being sandwiched between the end structure portions. Further, when expressed according to a $(2-3)^{th}$ configuration of the present disclosure (see Embodiment 2 that will be described below), a compound (the compound after an alignment process) obtained by deforming the polymer compound (the compound before an alignment process) includes a first side chain, a second side chain, and a main chain supporting the first side chain and the second side chain with respect to the substrate, the first side chain is bonded to the main chain and includes a deformed deformation portion and end structure portions bonded to the deformation portion, and liquid crystal molecules are pretilted by being along the end structure portion or being sandwiched between the end structure portions. Further, when expressed according to a $(4-3)^{th}$ configuration of the present disclosure, a compound obtained by irradiating the polymer compound with an energy ray includes a first side chain, a second side chain, and a main chain supporting the first side chain and the second side chain with respect to the substrate, the first side chain is bonded to the main chain and includes a crosslinked or deformed crosslinkage and deformation portion, and end structure portions bonded to the crosslinkage and deformation portion, and liquid crystal molecules are pretilted by being along the end structure portion or being sandwiched between the end structure portions.

Figure 13:
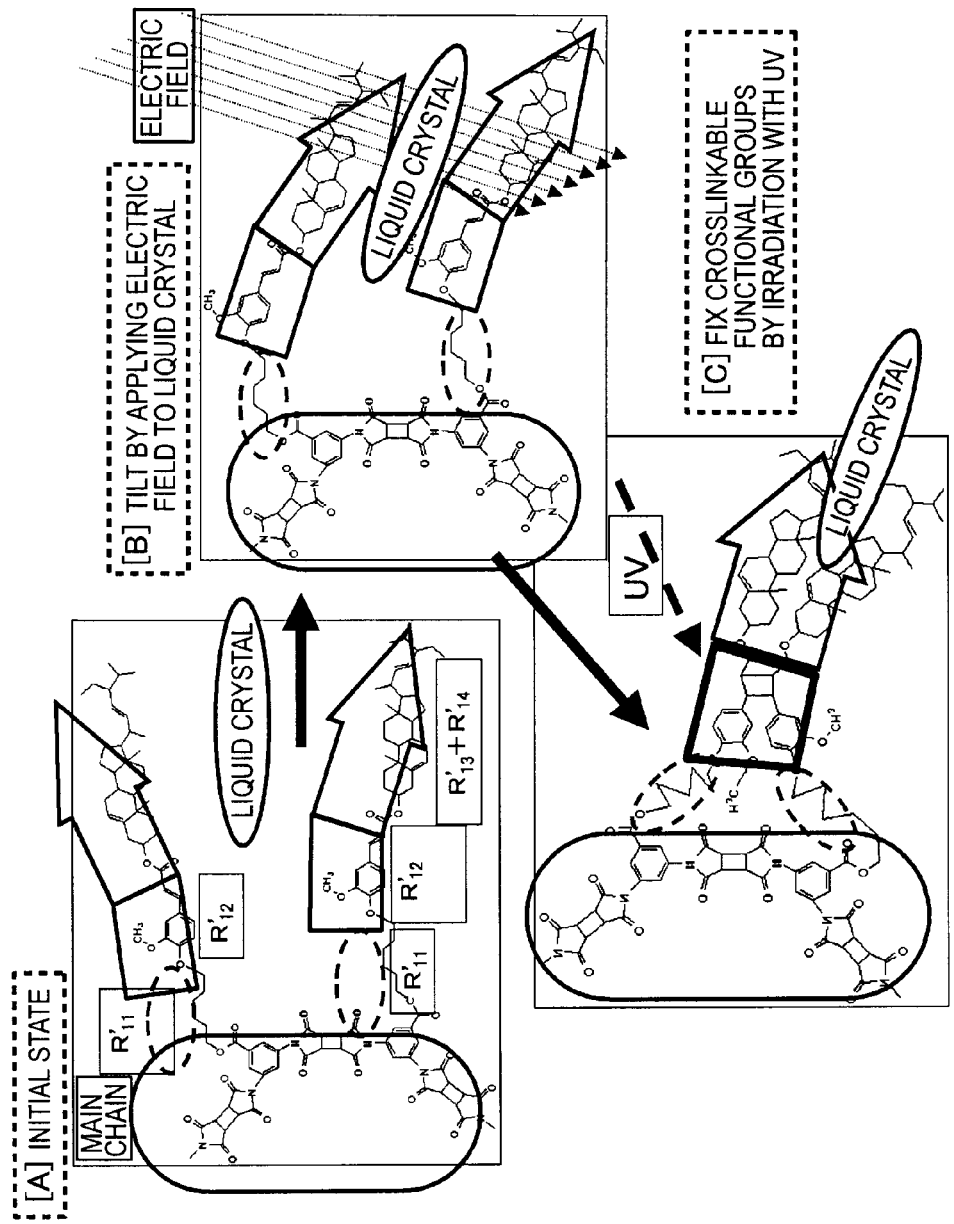
FIG. 13 is a conceptual diagram illustrating a relationship between a crosslinked polymer compound and liquid crystal molecules.

Here, in the $(1-3)^{th}$ configuration of the present disclosure, the crosslinkage portion in which the first side chain has been crosslinked corresponds to $R_{12}'$ in Formula (2) (however, after crosslinkage). Further, the end structure portions correspond to $R_{13}'$ and $R_{14}'$ in Formula (2). Here, in the compound after an alignment process, for example, the crosslinkage portions in two first side chains extending from the main chain are crosslinked to each other, some of the liquid crystal molecules are sandwiched between the end structure portion extending from one of the crosslinkage portions and the end structure portion extending from the other crosslinkage portion, and the end structure portions are fixed at a predetermined angle with respect to the substrates, thereby pretilting the liquid crystal molecules. Further, although such a state is illustrated in the conceptual diagram of FIG. 13, the second side chain is not shown in FIG. 13.

Or, when expressed according to the $(1-4)^{th}$ configuration of the present disclosure, a compound (a compound after an alignment process) obtained by crosslinking the polymer compound (the compound before an alignment process) includes a first side chain, a second side chain, and a main chain supporting the first side chain and the second side chain with respect to the substrate, the first side chain is bonded to the main chain and includes a crosslinking crosslinkage portion and end structure portions bonded to the crosslinkage portion and having a mesogenic group. Here, the first side chain may be in a form having a photodimerized photosensitive group. Further, the main chain and the crosslinkage portion may be bonded by a covalent bond and the crosslinkage portion and the end structure portions may be bonded by a covalent bond. Further, when expressed according to the (2-4)$^{th}$ configuration of the present disclosure (see Embodiment 2 that will be described below), a compound (a compound after alignment process) obtained by deforming the polymer compound (the compound before an alignment process) includes a first side chain, a second side chain, and a main chain supporting the first side chain and the second side chain with respect to the substrate, the first side chain is bonded to the main chain and includes a deformed deformation portion, and end structure portions bonded to the deformation portion and having a mesogenic group. Further, when expressed according to a (4-4)$^{th}$ configuration of the present disclosure, a compound (a compound after an alignment process) obtained by irradiating the polymer compound (the compound before an alignment process) with an energy ray includes a first side chain, a second side chain, and a main chain supporting the first side chain and the second side chain with respect to the substrate, the first side chain is bonded to the main chain and includes a crosslinked or deformed crosslinkage and deformation portion, and end structure portions bonded to the crosslinkage and deformation portion and having a mesogenic group.

Here, in the (1-4)$^{th}$ configuration of the present disclosure, an example of the photodimerized photosensitive group that is a crosslinkable functional group or a polymerizable functional group (a photosensitive functional group) may include a group including a structure of any one of a chalcone, cinnamate, cinnamoyl, coumarin, maleimide, benzophenone, norbornene, oryzanol, and chitosan. An example of the polymerizable functional group may include a group including a structure of any one of acryloyl, methacryloyl, vinyl, epoxy, and oxetane, as described above. Further, a rigid mesogenic group constituting the end structure portion may be a group exhibiting a liquid crystal property as a side chain or a group not exhibiting the liquid crystal property, and a concrete structure may include a steroid derivative, a cholesterol derivative, biphenyl, triphenyl, naphthalene and the like. Further, the end structure portion may include $R_{13}'$ and $R_{14}'$ in Formula (2).

Further, the alignment films 22 and 32 may include another vertical alignment agent, in addition to the compound after an alignment process described above. The other vertical alignment agent may include polyimide having a vertical alignment induction structure portion, polysiloxane having a vertical alignment induction structure portion, and the like.

The liquid crystal layer 40 includes liquid crystal molecules 41 having negative dielectric constant anisotropy. For example, the liquid crystal molecules 41 have a rotationally symmetrical shape using a long axis and a short axis perpendicular to each other as center axes, and have negative dielectric constant anisotropy.

The liquid crystal molecules 41 may be classified into liquid crystal molecules 41A held by the first alignment film 22 near an interface with the first alignment film 22, liquid crystal molecules 41B held by the second alignment film 32 near an interface with the second alignment film 32, and other liquid crystal molecules 41C. The liquid crystal molecule 41C are located in an intermediate region in a thickness direction of the liquid crystal layer 40, and are arranged so that long axis directions (directors) of the liquid crystal molecules 41C are substantially perpendicular to the first substrate 20 and the second substrate 30 in a state in which a driving voltage is off. Further, the liquid crystal molecules 41B are located near the second alignment film 32 and long axis directions (directors) of the liquid crystal molecules 41B are aligned at a second pretilt angle $\theta_2$ with respect to the second substrate 30 in a state in which the driving voltage is off. Further, the liquid crystal molecules 41A are located near the first alignment film 22 and the long axis directions (directors) of the liquid crystal molecules 41A are arranged obliquely at a first pretilt angle $\theta_1$ ($>\theta_2$) with respect to the first substrate 20 in a state in which the driving voltage is off.

Figure 4:
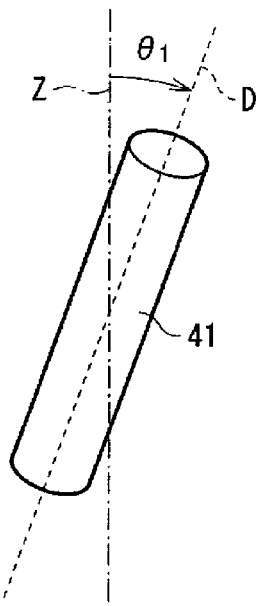
FIG. 4 is a schematic diagram for explaining pretilt of a liquid crystal molecule.

Here, if the driving voltage is turned on, the directors of the liquid crystal molecules 41A are obliquely aligned to be parallel to the first substrate 20 and the second substrate 30. This behavior is because the liquid crystal molecules 41A have a property in which a dielectric constant in the long axis direction is smaller than that in the short axis direction. Since the liquid crystal molecules 41B and 41C have the same property, the liquid crystal molecules 41B and 41C basically exhibit the same behavior as the liquid crystal molecules 41A according to a change in an on and off state of the driving voltage. However, in a state in which the driving voltage is off, the liquid crystal molecules 41A have the first pretilt angle $\theta_1$ due to the first alignment film 22, and the directors are in an attitude tilted from normal directions of the first substrate 20 and the second substrate 30. Meanwhile, the liquid crystal molecules 41B have the second pretilt angle $\theta_2$ due to the second alignment film 32, but their directors, for example, are parallel to the normal direction of the second substrate 30 or are in an attitude tilted from the normal directions of the first substrate 20 and the second substrate 30. Further, here, "held" indicates that the alignment films 22 and 32 and the liquid crystal molecules 41A and 41B are not fixed and the alignment of the liquid crystal molecules 41 is regulated. Further, as illustrated in FIG. 4, when a direction perpendicular to the surfaces of the first substrate 20 and the second substrate 30 (a normal direction) is Z, "the pretilt angle $\theta$ ($\theta_1$ and $\theta_2$)" refers to a tilt angle of the director D of the liquid crystal molecules 41 (41A and 41B) with respect to the Z direction in a state in which the driving voltage is off.

Figure 5:
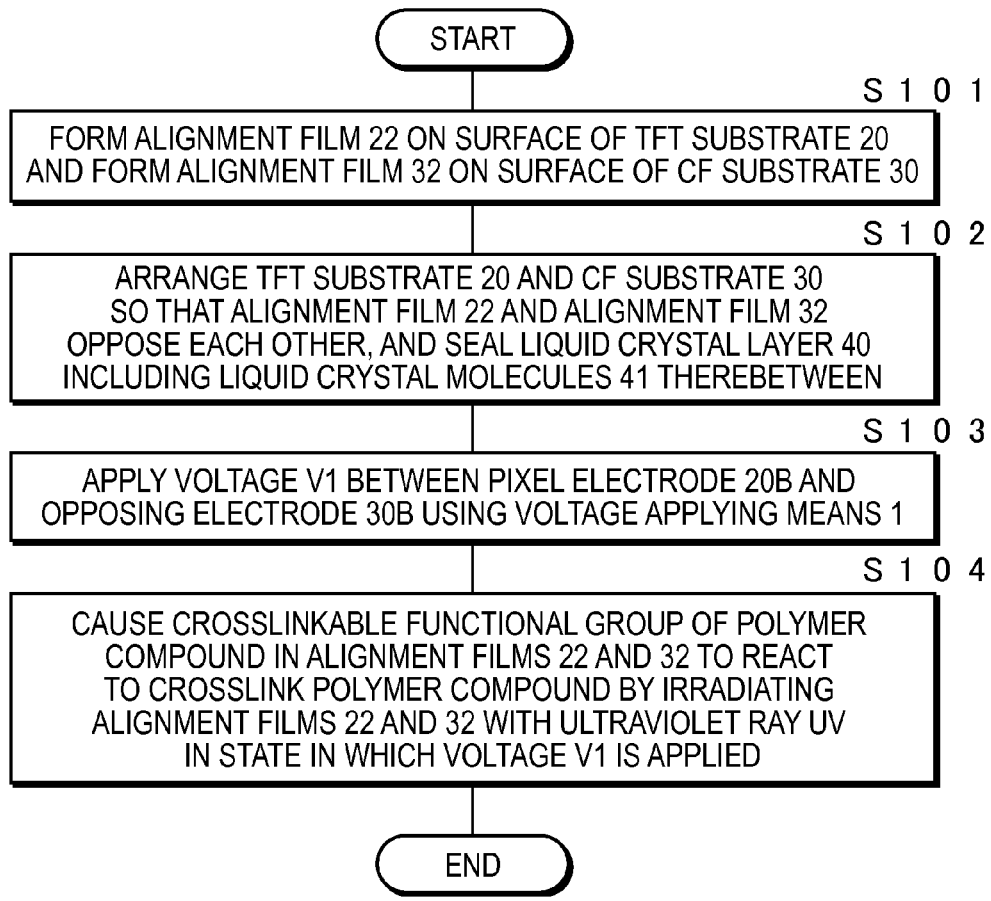
FIG. 5 is a flowchart illustrating a method of manufacturing a liquid crystal display device illustrated in FIG. 1.

Next, the method for manufacturing a liquid crystal display device (a liquid crystal display element) will be described with reference to a schematic diagram for explaining states in the alignment films 22 and 32 illustrated in FIG. 6 and schematic partial sectional views of a liquid crystal display device illustrated in FIGS. 7, 8 and 9 together with a flowchart illustrated in FIG. 5, and this manufacturing method includes a process of:

forming the first alignment film 22 including the polymer compound having the first side chain and the second side chain having a crosslinkable functional group or a polymerizable functional group on one (specifically, the substrate 20) of the pair of substrates 20 and 30, and forming the second alignment film 32 on the other (specifically, the substrate 30) of the pair of substrates 20 and 30, arranging the pair of substrates 20 and 30 so that the first alignment film 22 and the second alignment film 32 oppose each other and sealing the liquid crystal layer 40 including the liquid crystal molecules 41 having negative dielectric constant anisotropy between the first alignment film 22 and the second alignment film 32, and then crosslinking or polymerizing the first side chain in the polymer compound to pretilt the liquid crystal molecules 41 (the first aspect of the present disclosure). Or, the method includes a process of:

forming the first alignment film 22 including the polymer compound having the first side chain and the second side chain having a photosensitive functional group on one (specifically, the substrate 20) of the pair of substrates 20 and 30, and forming the second alignment film 32 on the other (specifically, the substrate 30) of the pair of substrates 20 and 30, arranging the pair of substrates 20 and 30 so that the first alignment film 22 and the second alignment film 32 oppose each other and sealing the liquid crystal layer 40 including the liquid crystal molecules 41 having negative dielectric constant anisotropy between the first alignment film 22 and the second alignment film 32, and then deforming the first side chain in the polymer compound to pretilt the liquid crystal molecules 41 (the second aspect of the present disclosure). Or, the method includes a process of:

forming the first alignment film 22 including the polymer compound having the first side chain and the second side chain having a crosslinkable functional group or a polymerizable functional group on one (specifically, the substrate 20) of the pair of substrates 20 and 30, and forming the second alignment film 32 on the other (specifically, the substrate 30) of the pair of substrates 20 and 30, arranging the pair of substrates 20 and 30 so that the first alignment film 22 and the second alignment film 32 oppose each other and sealing the liquid crystal layer 40 including the liquid crystal molecules 41 having negative dielectric constant anisotropy between the first alignment film 22 and the second alignment film 32, and then radiating an energy ray to the polymer compound to pretilt the liquid crystal molecules 41. Further, for simplicity, only one pixel is illustrated in FIGS. 7, 8 and 9 (the fourth aspect of the present disclosure).

Also, the second side chain has a structure inducing dielectric anisotropy, has a dipole moment in a direction perpendicular to its long axis and has a structure inducing spontaneous polarization, has a dielectrically negative component, or has Structural Formula (11) or (12).

First, the first alignment film 22 is formed on the surface of the first substrate (the TFT substrate) 20, and the second alignment film 32 is formed on the surface of the second substrate (the CF substrate) 30 (step S101).

Specifically, first, the pixel electrodes 20B having first predetermined slit portions 21 are provided, for example, in a matrix shape in the surface of the first substrate 20 to thereby prepare the TFT substrate 20. Further, the opposing electrode 30B is provided on the color filter of the second substrate 30 having a color filter formed therein to prepare the CF substrate 30.

Meanwhile, for example, for the compound before an alignment process or a polymer compound precursor as the compound before an alignment process, a solvent, and a vertical alignment agent, as necessary, are mixed to prepare a liquid alignment film material for the first alignment film and the second alignment film.

An example of the polymer compound precursor as the compound before an alignment process may include polyamic acid having a crosslinkable functional group or a polymerizable functional group when a polymer compound having a crosslinkable functional group or a polymerizable functional group as a side chain has a polyimide structure shown in Formula (3). For example, the polyamic acid as the polymer compound precursor is synthesized by causing a diamine compound and a tetracarboxylic acid dianhydride to react. At least one of the diamine compound and the tetracarboxylic acid dianhydride used herein has a crosslinkable functional group or a polymerizable functional group. An example of the diamine compound may include a compound having a crosslinkable functional group or a polymerizable functional group represented by Formulae (A-1) to (A-21), and the tetracarboxylic acid dianhydride may include a compound having a crosslinkable functional group or a polymerizable functional group represented by Formulae (a-1) to (a-10). Further, the compound represented by Formulae (A-9) to (A-21) is a compound constituting the crosslinkage portion and the end structure portion of the polymer compound crosslinked in the $(1-3)^{th}$ configuration of the present disclosure. Or, a compound constituting the crosslinkage portion and the end structure portion of the polymer compound crosslinked in the $(1-3)^{th}$ configuration of the present disclosure may include a compound represented by Formulae (F-1) to (F-22). Further, in the compound represented by Formulae (F-1) to (F-18), the liquid crystal molecules may be considered to be pretilted along the end structure portion of the compound represented by Formulae (F-1) to (F-3), Formulae (F-7) to (F-9) and Formulae (F-13) to (F-15) Meanwhile, the liquid crystal molecules may be considered to be sandwiched between the end structure portions of the compound represented by Formulae (F-4) to (F-6), Formulae (F-10) to (F-12) and Formulae (F-16) to (F-18) and pretilted. Further, the liquid crystal molecules are estimated to be pretilted along the end structure portion of the compound represented by Formulae (F-19) to (F-22) or the liquid crystal molecules are estimated to be sandwiched between the end structure portions of the compound represented by Formulae (F-19) to (F-22) and pretilted.

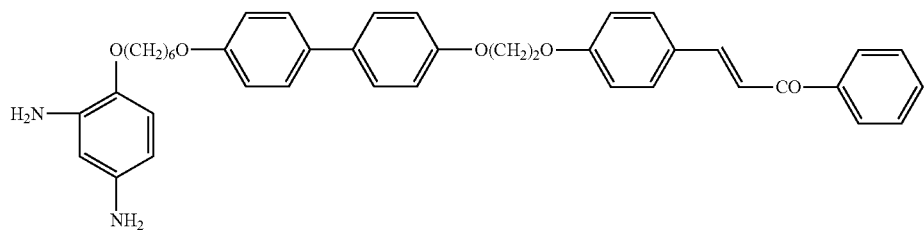

(A-1)

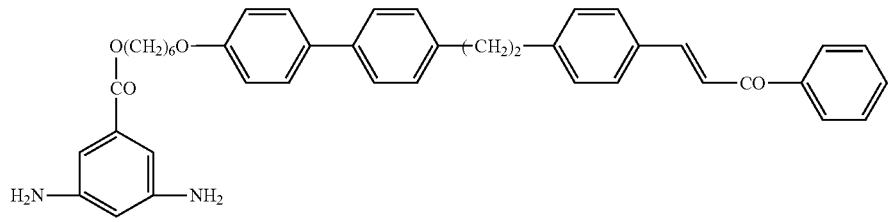

(A-2)

-continued
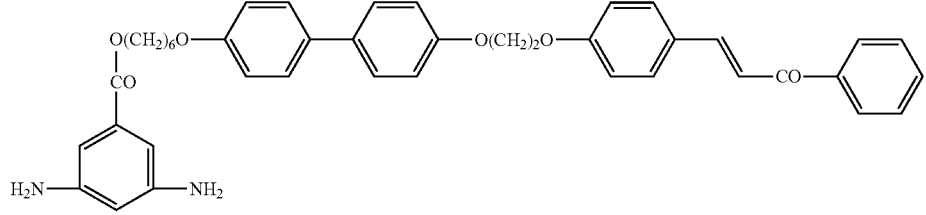
(A-3)
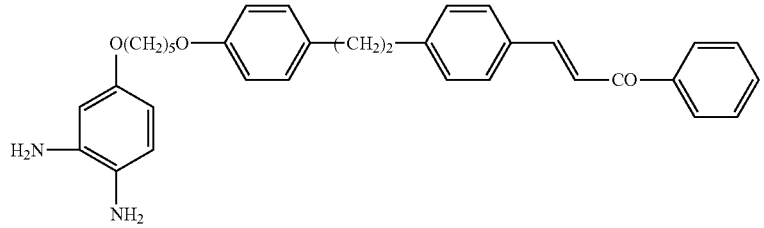
(A-4)
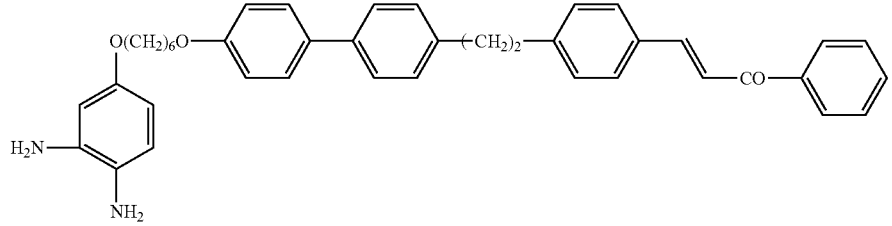
(A-5)
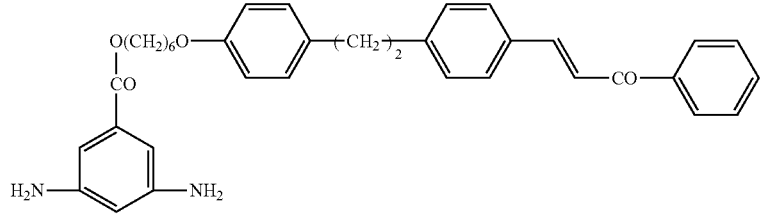
(A-6)
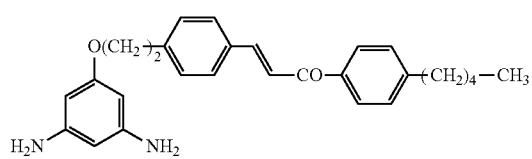
(A-7)
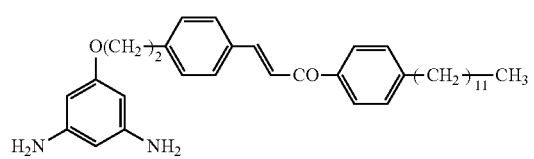
(A-8)
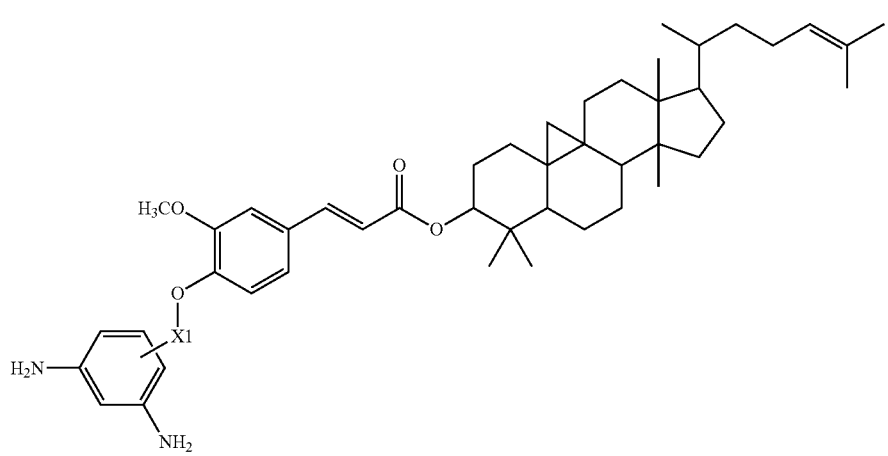
(A-9)

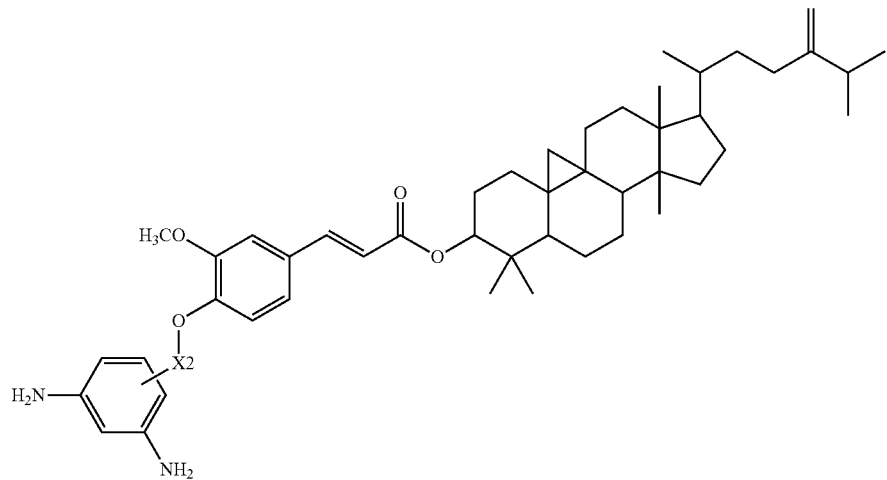
(A-10)
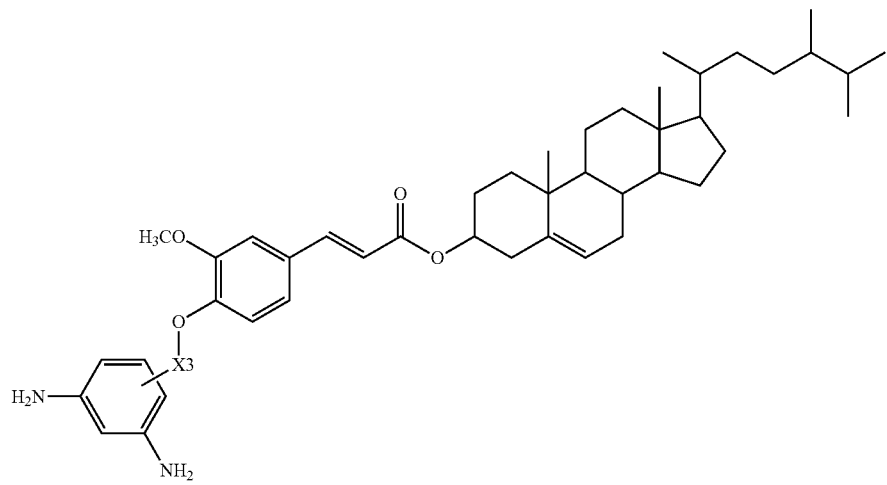
(A-11)
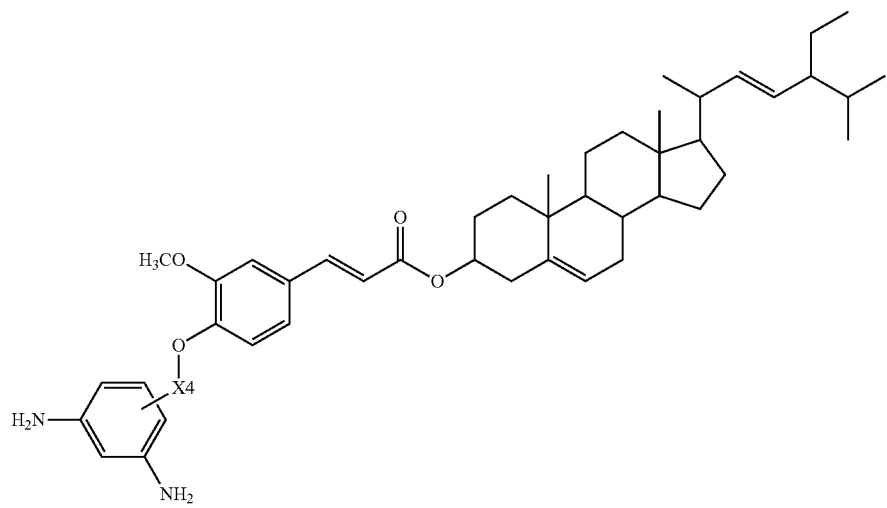
(A-12)
where $X_1$ to $X_4$ are single bonds or divalent organic groups.

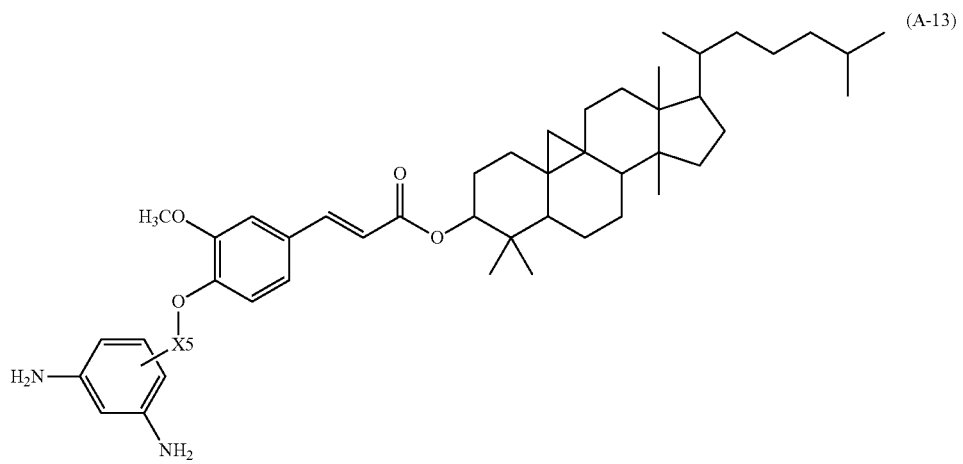
(A-13)
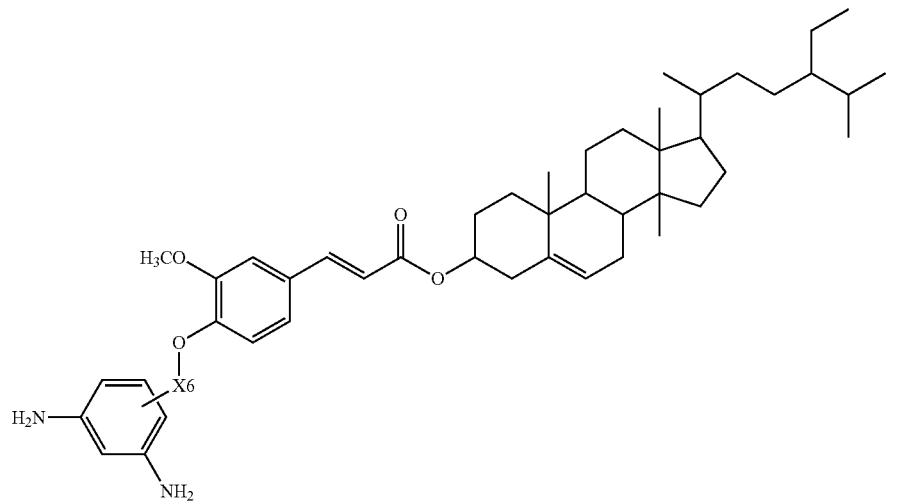
(A-14)
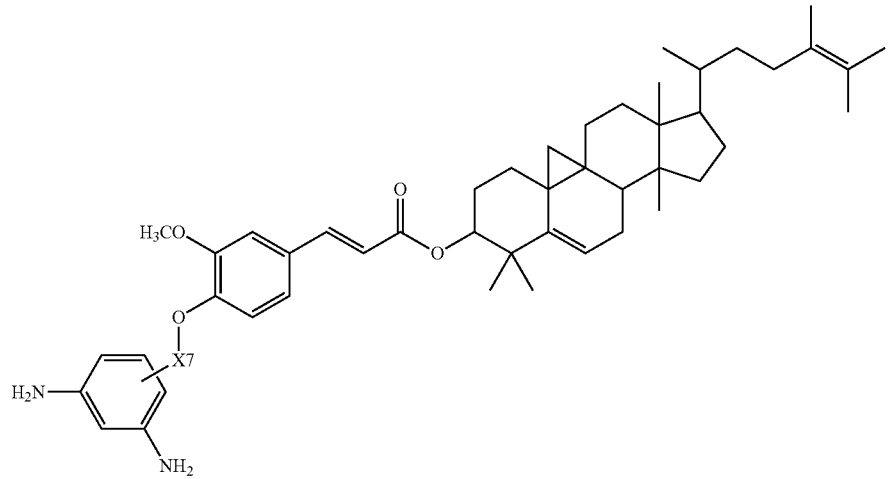
(A-15)
where $X_5$ to $X_7$ are single bonds or divalent organic groups.

(A-16)
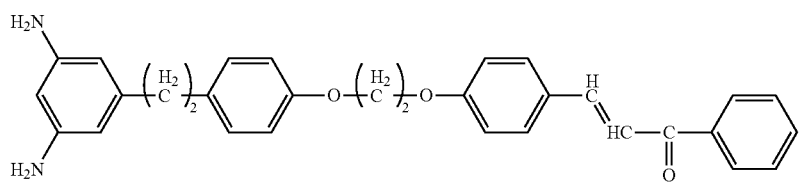
(A-17)
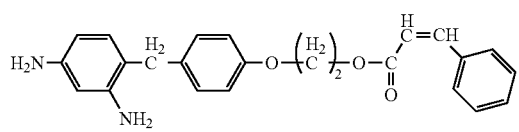
(A-18)
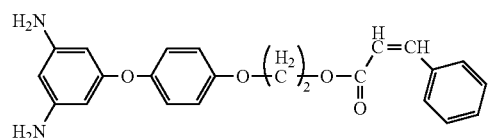
(A-19)
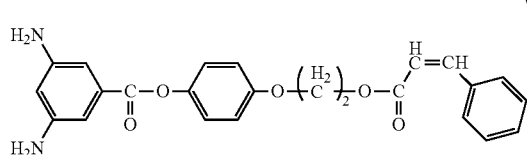
(A-20)
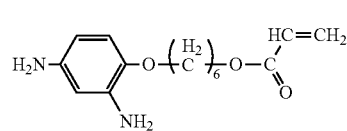
(A-21)
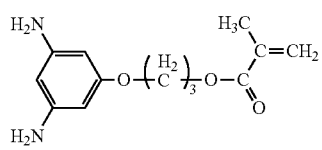
(a-1)
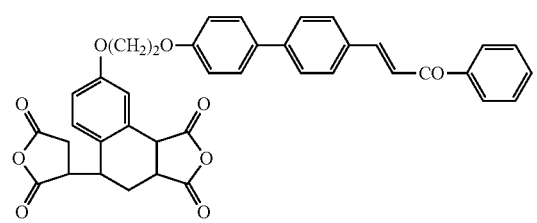
(a-2)
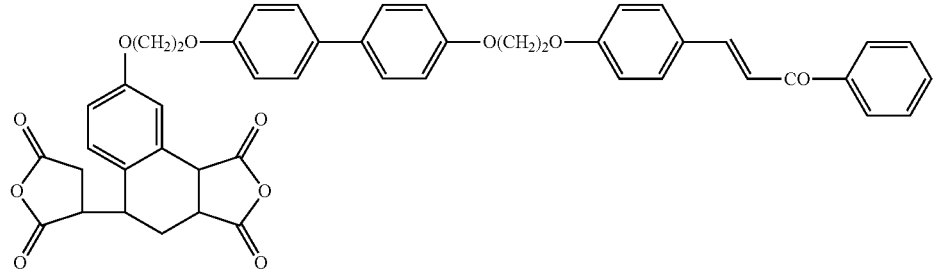
(a-3)
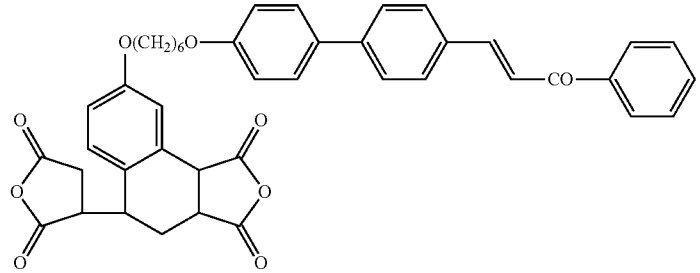
(a-4)
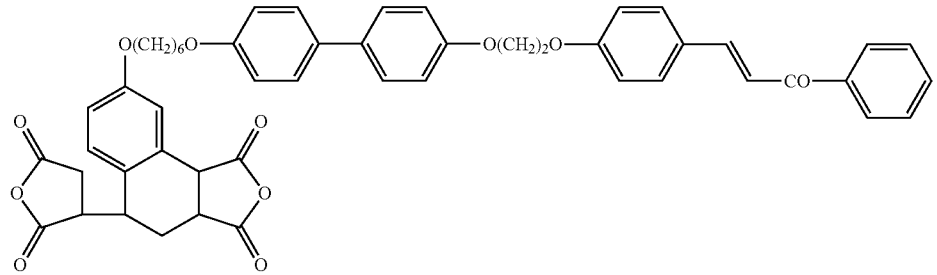

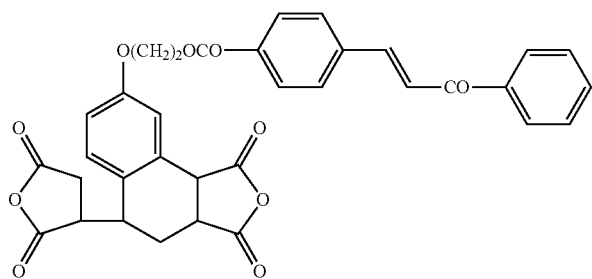
(a-5)
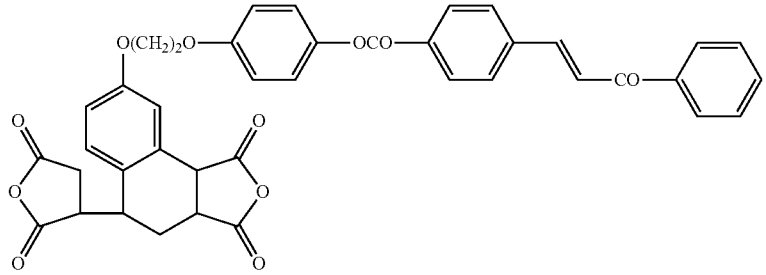
(a-6)
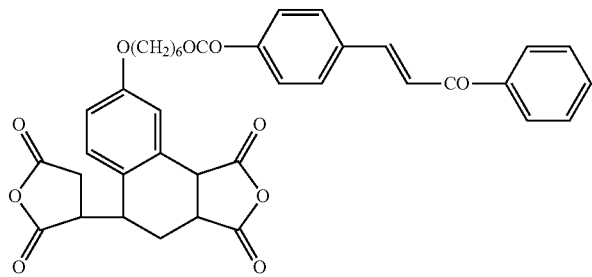
(a-7)
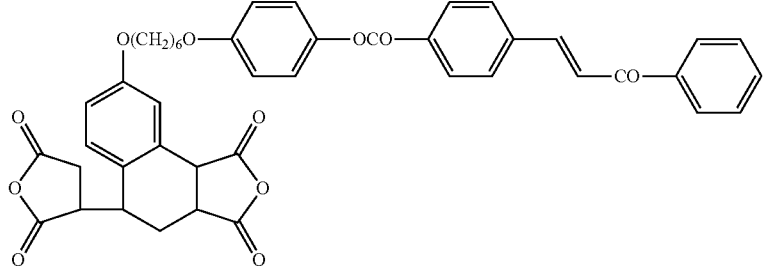
(a-8)
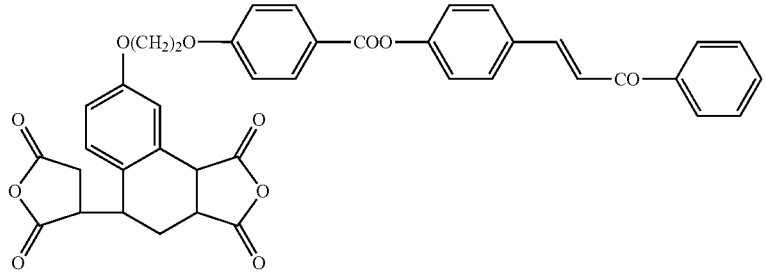
(a-9)

(a-10)
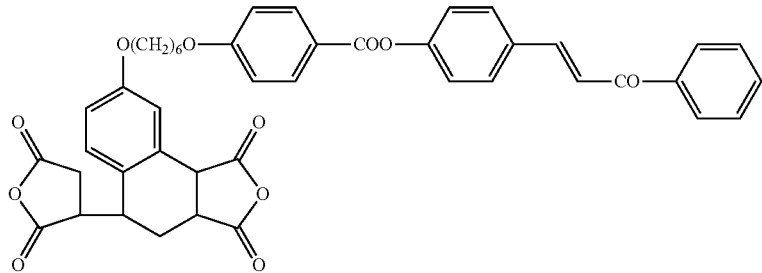
(a-11)
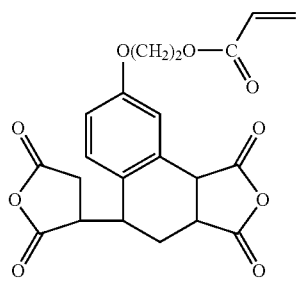
(a-12)
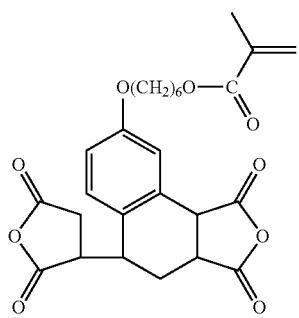
(F-1)
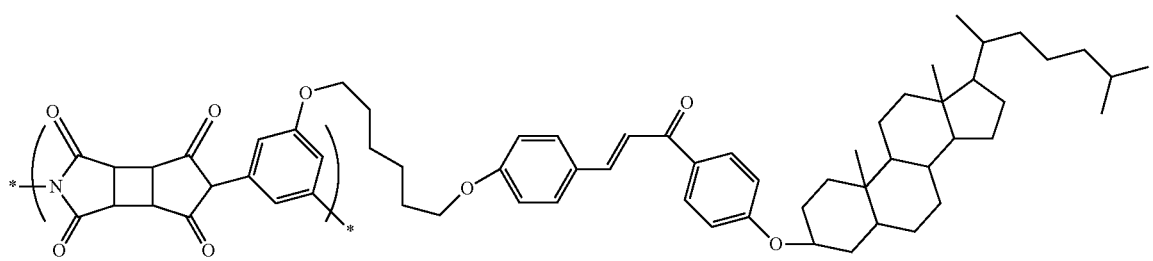
(F-2)
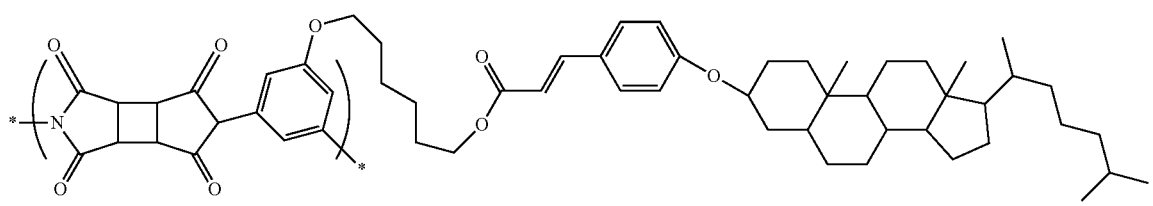
(F-3)
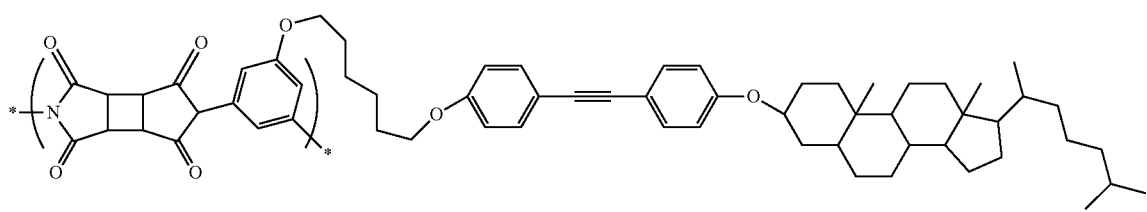
(F-4)
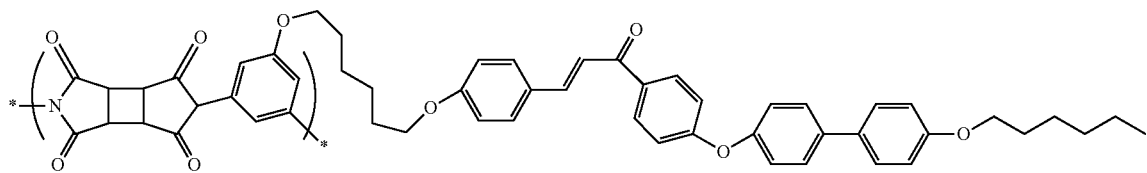

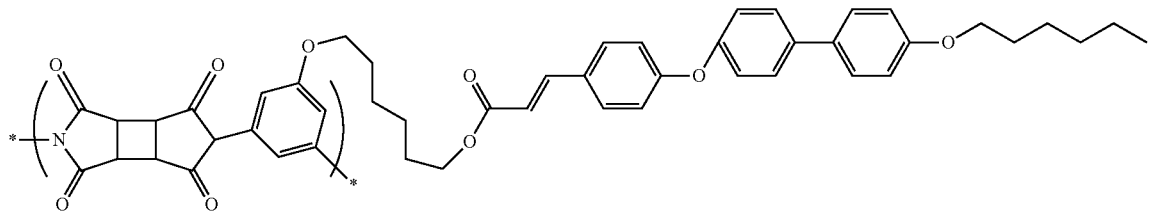
(F-5)
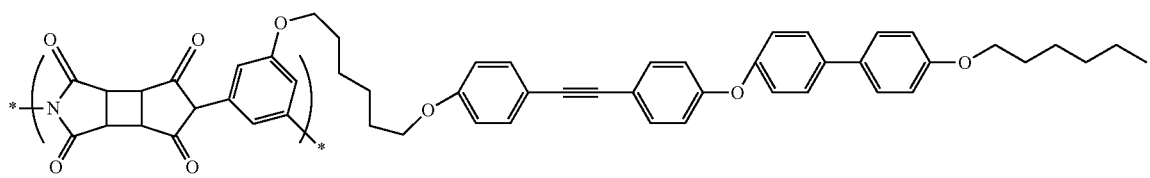
(F-6)
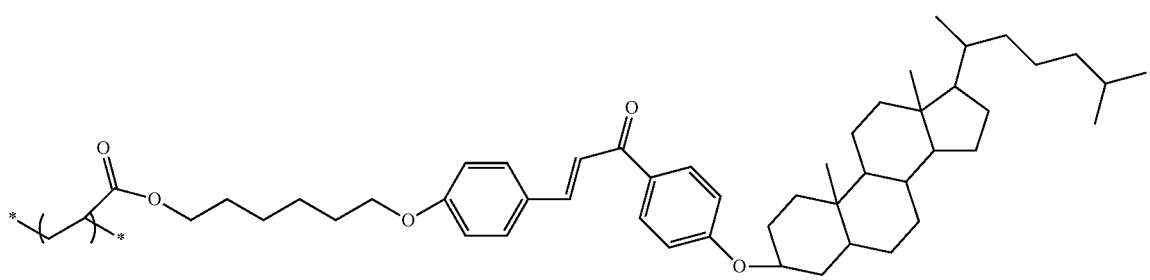
(F-7)
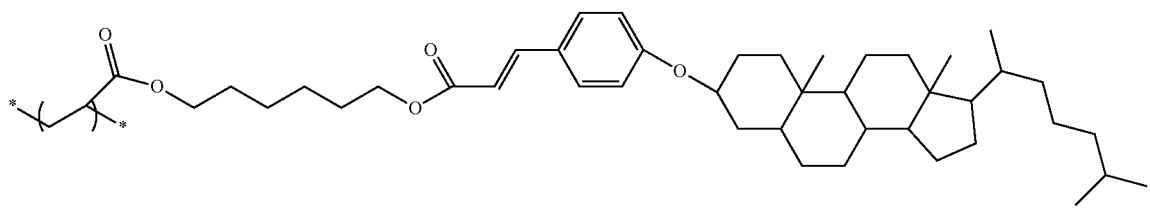
(F-8)
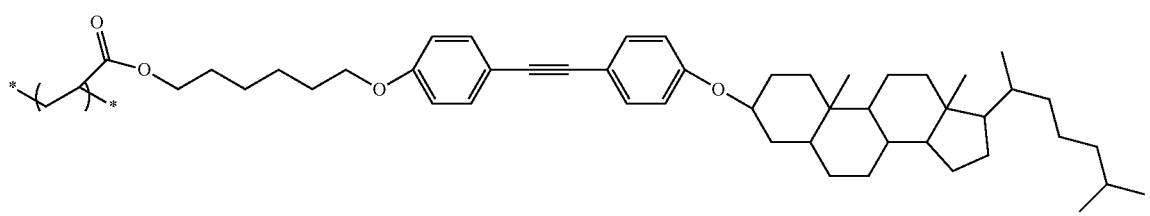
(F-9)
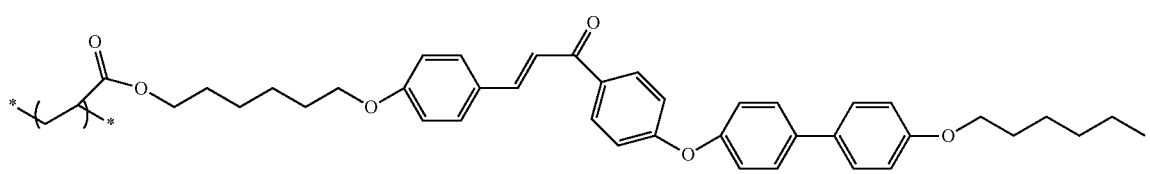
(F-10)
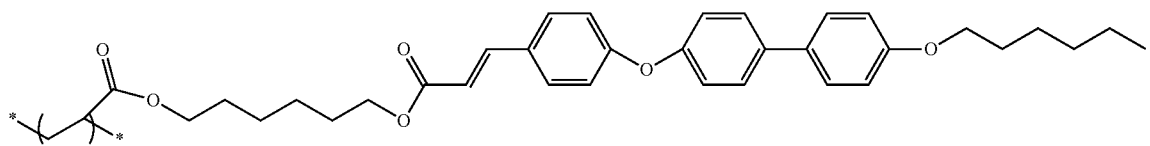
(F-11)

-continued
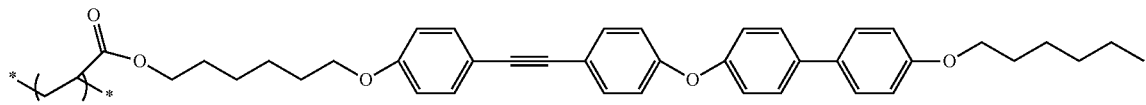
(F-12)
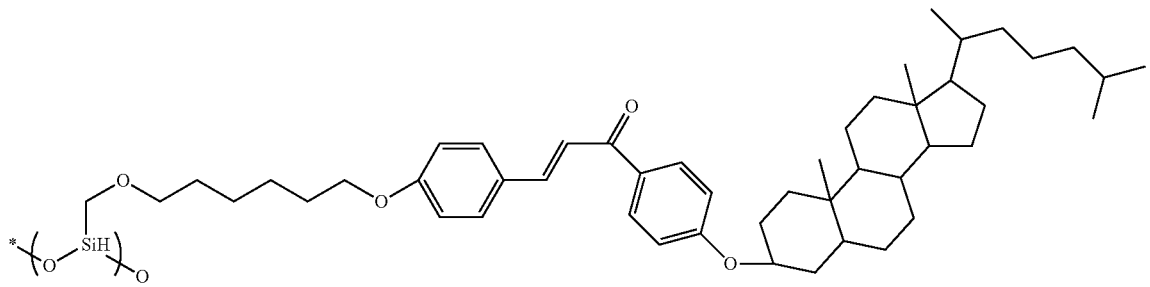
(F-13)
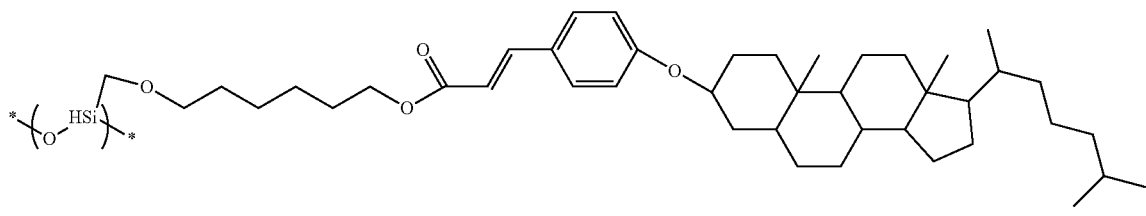
(F-14)
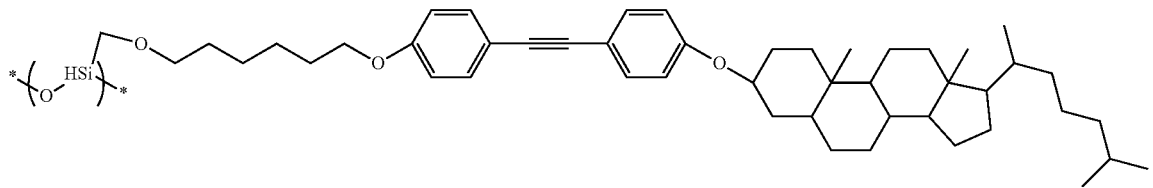
(F-15)
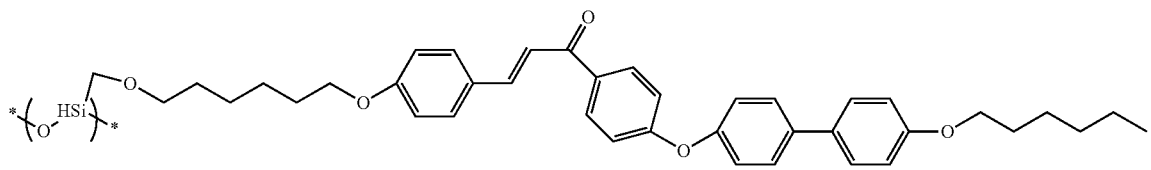
(F-16)
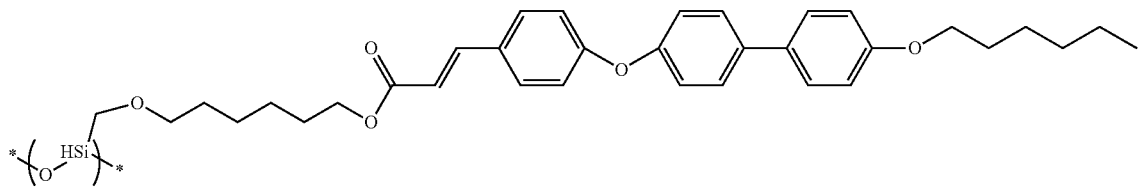
(F-17)
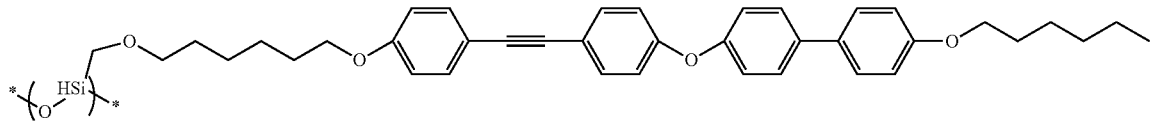
(F-18)

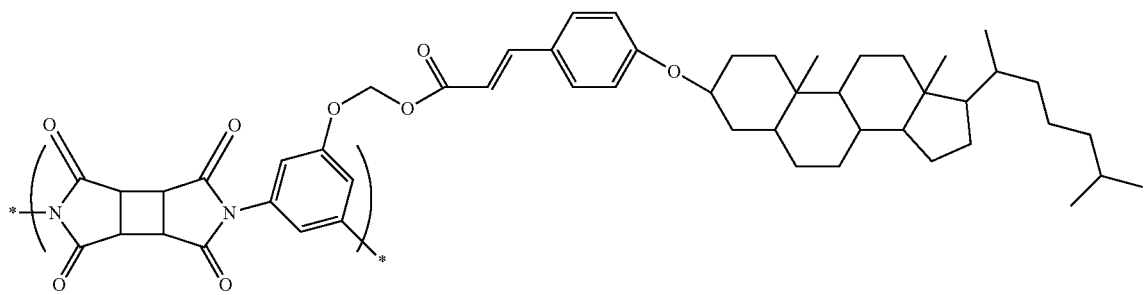

(F-19)

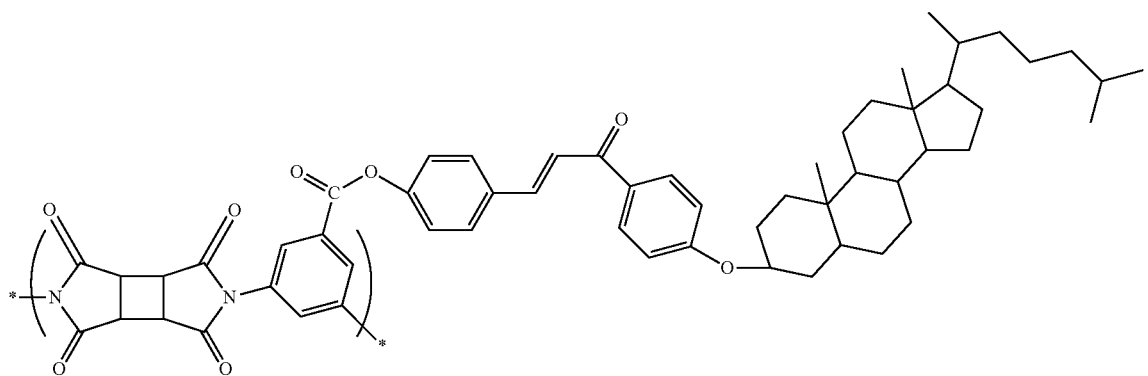

(F-20)

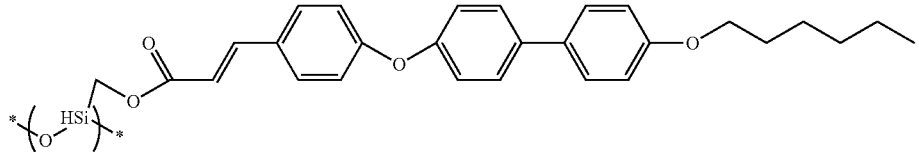

(F-21)

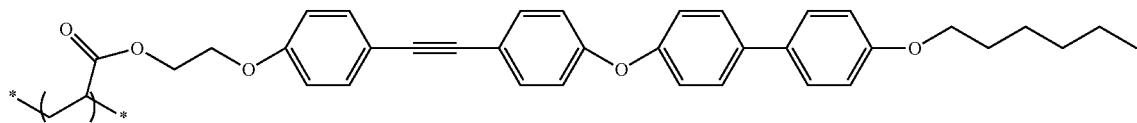

(F-22)

Further, if the polyamic acid as the polymer compound precursor is synthesized so that the compound before an alignment process includes the vertical alignment induction structure portion, a compound having a vertical alignment induction structure portion represented by Formulae (B-1) to (B-36) as a diamine compound or a compound having a vertical alignment induction structure portion represented by Formulae (b-1) to (b-3) as tetracarboxylic acid dianhydride may be used, in addition to the compound having a crosslinkable functional group or a polymerizable functional group.

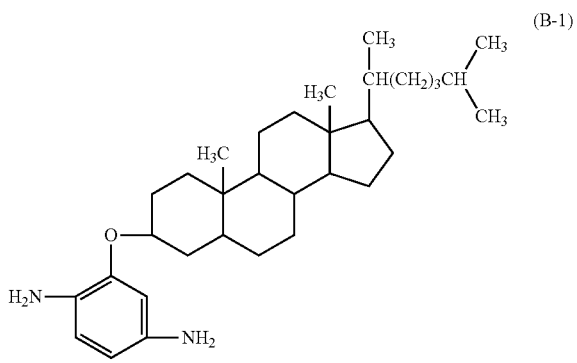

(B-1)

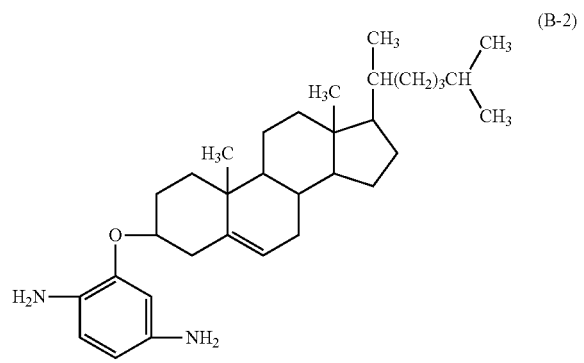

(B-2)

(B-3)
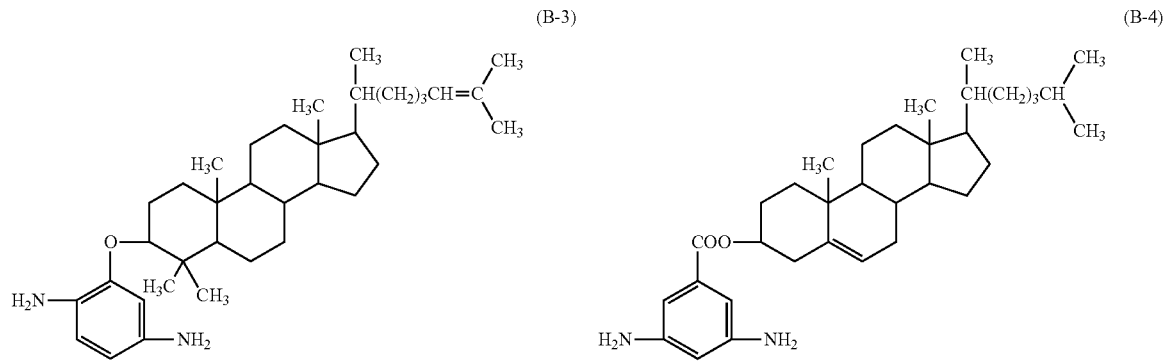
(B-4)
(B-5)
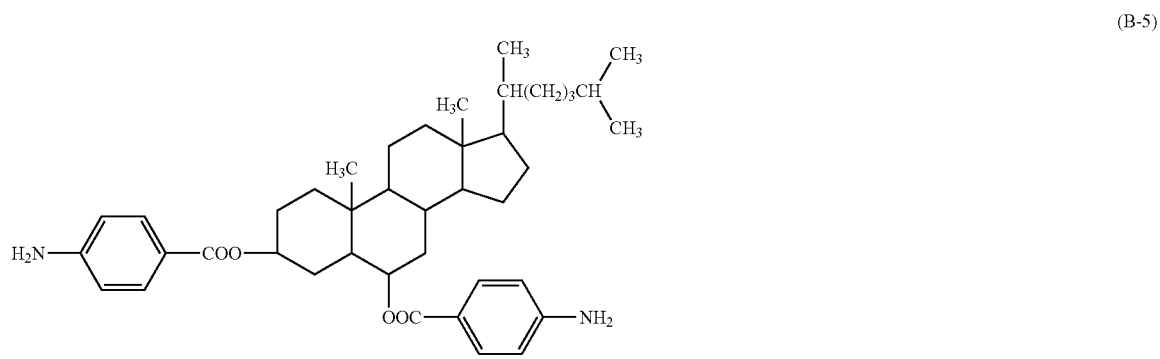
(B-6)
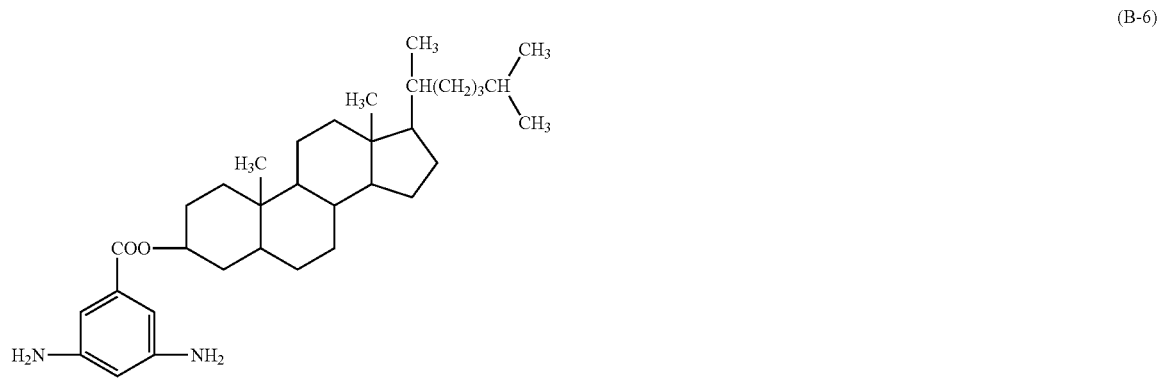
(B-7)
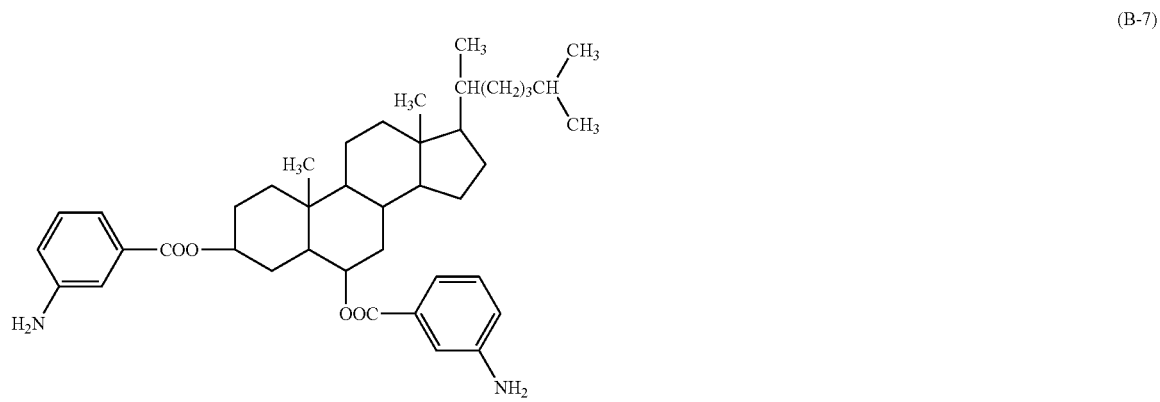

(B-8)
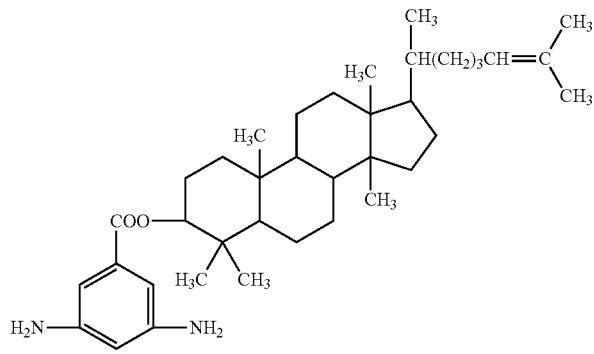
(B-9)
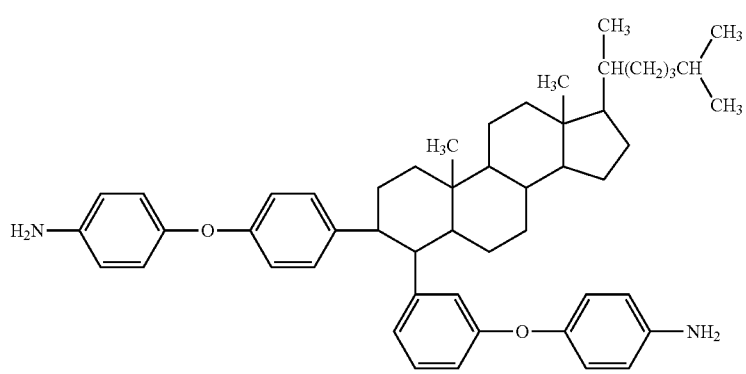
(B-10)
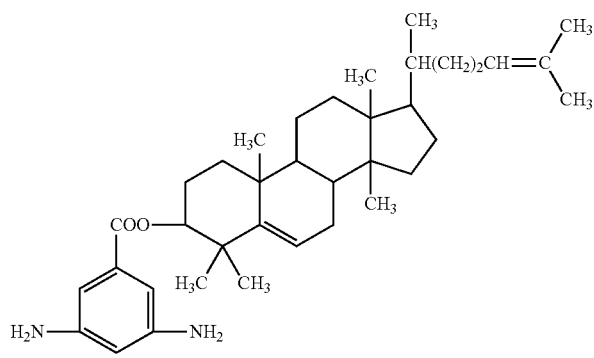
(B-11)
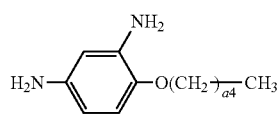
(B-12)
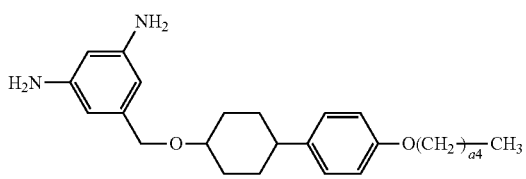
(B-13)
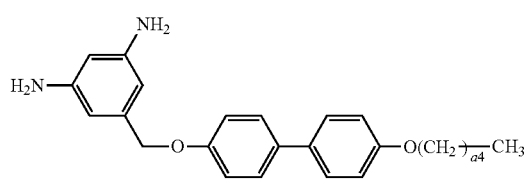
(B-14)
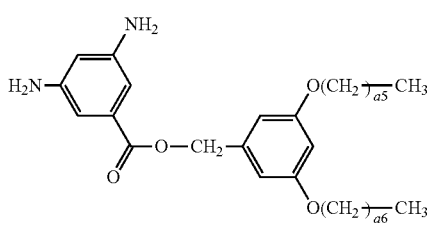
where a4 to a6 are integers ranging from 0 to 21.

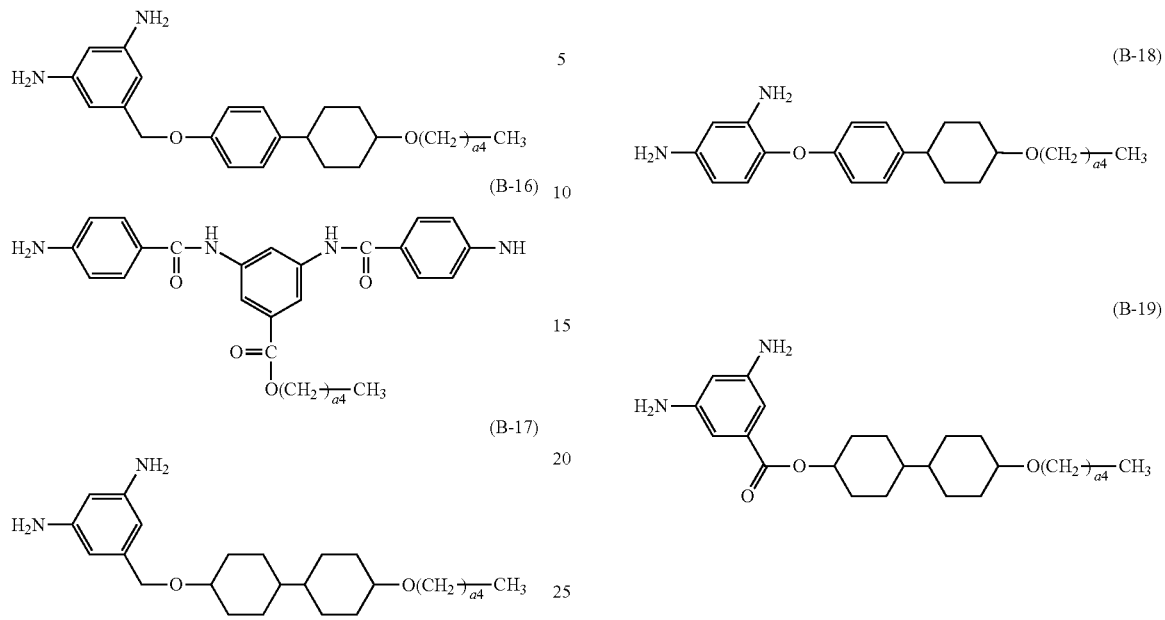
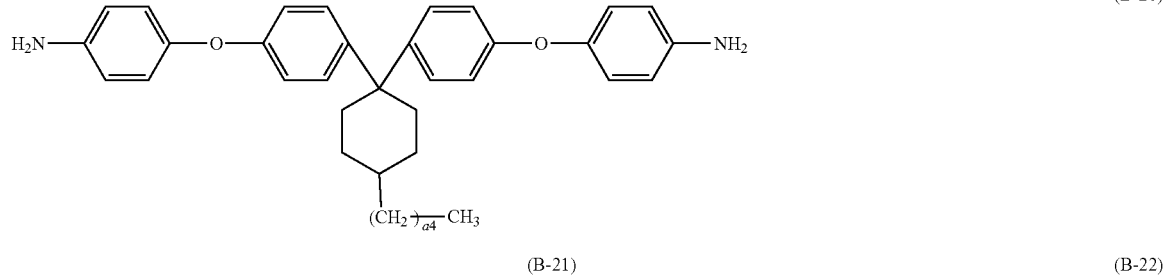
where a4 is an integer ranging from 0 to 21.
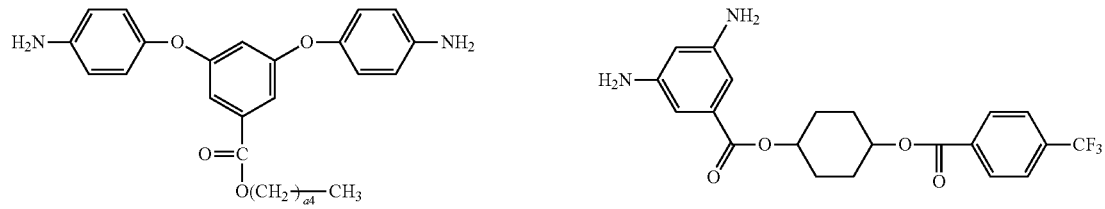
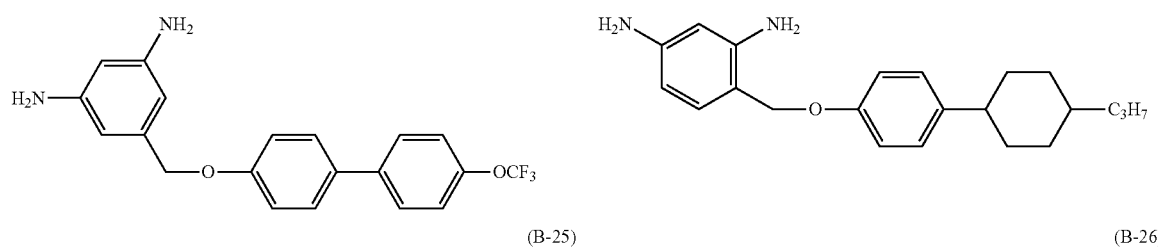
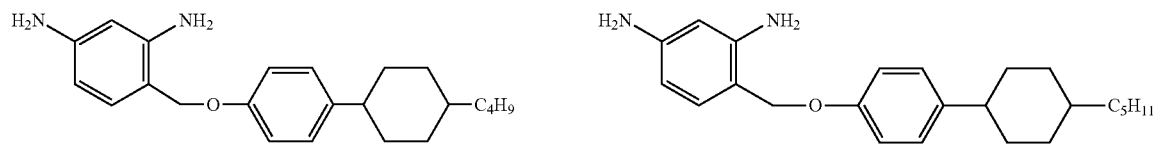

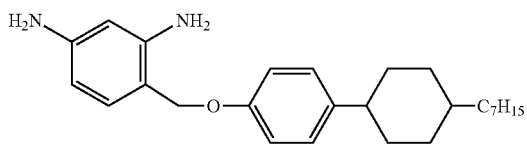 (B-27)
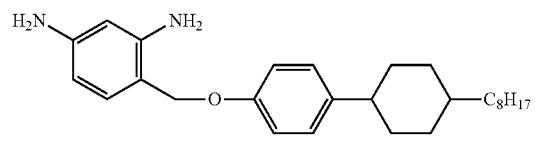 (B-28)
where a4 is an integer ranging from 0 to 21.
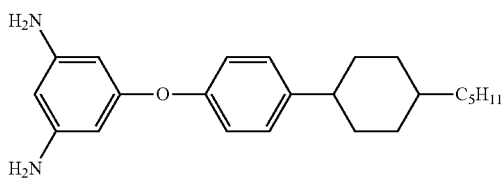 (B-29)
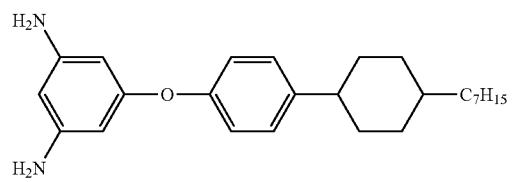 (B-30)
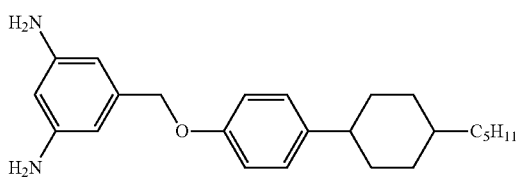 (B-31)
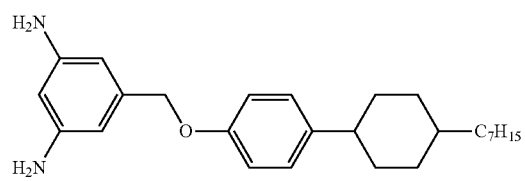 (B-32)
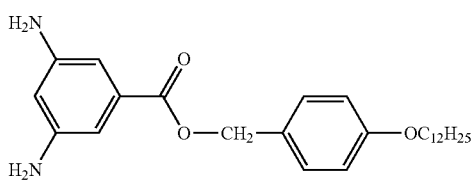 (B-33)
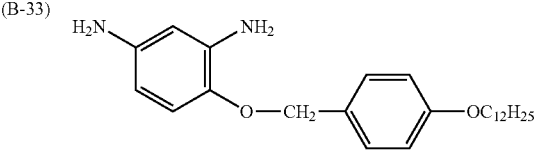 (B-34)
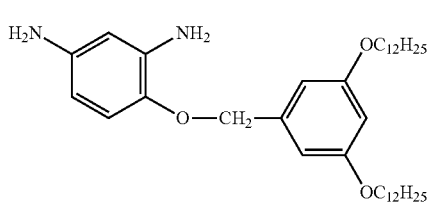 (B-35)
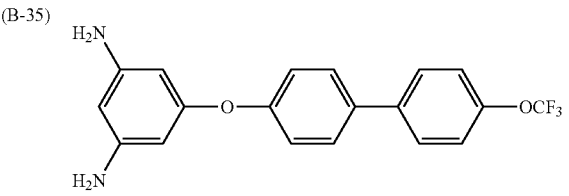 (B-36)
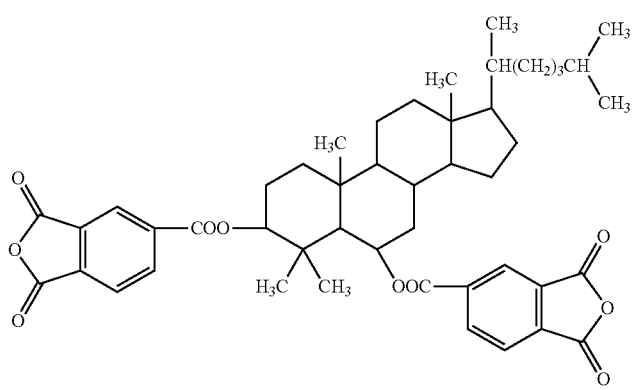 (b-1)

-continued

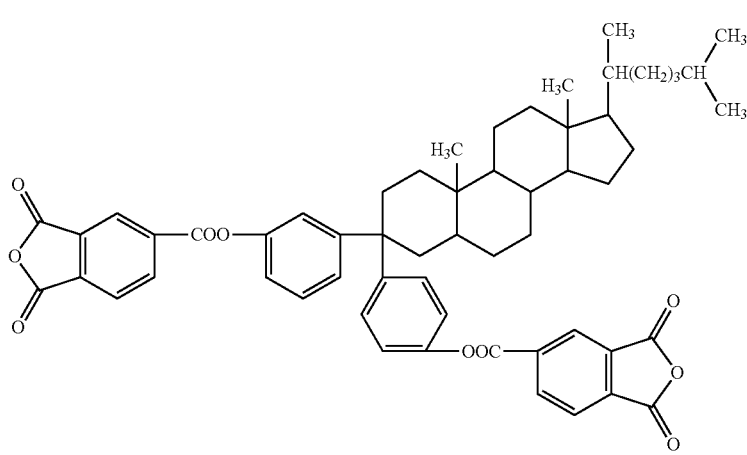

(b-2)

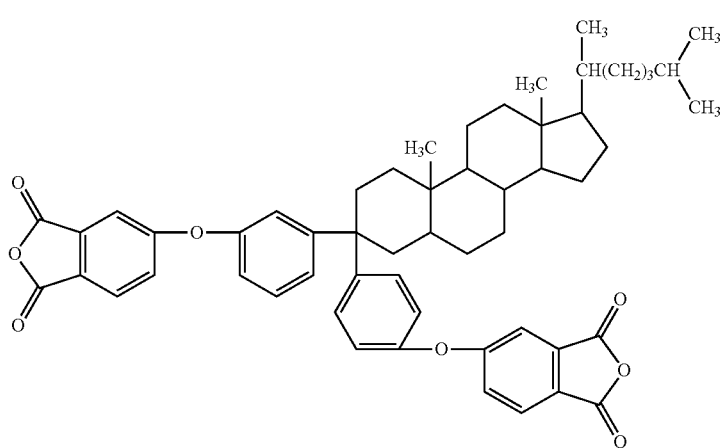

(b-3)

Further, if the polyamic acid as a polymer compound precursor is synthesized so that the compound before an alignment process has the group shown in Formula (1) together with a crosslinkable functional group or a polymerizable functional group, a compound having a group that can be along the liquid crystal molecules 41 represented by Formulae (C-1) to (C-24) may be used as a diamine compound, in addition to the above compound having a crosslinkable functional group or a polymerizable functional group.

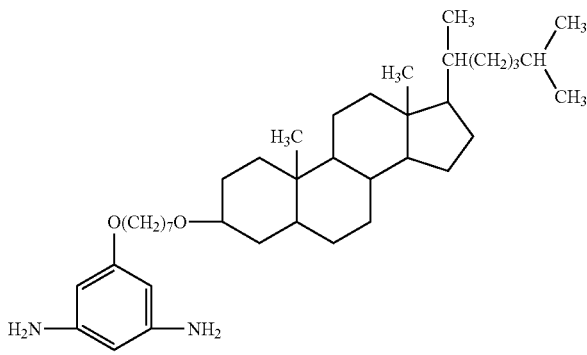

(C-1)

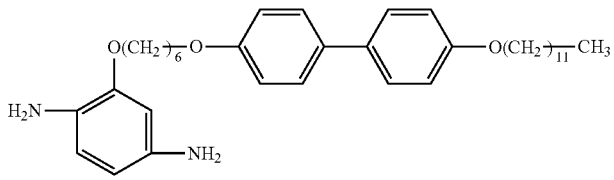

(C-2)

-continued
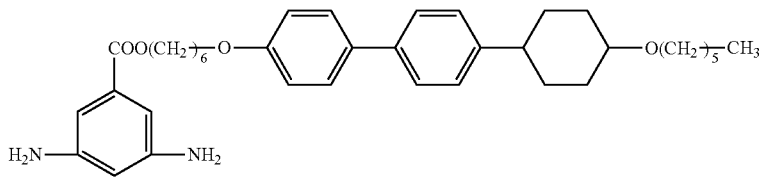
(C-3)
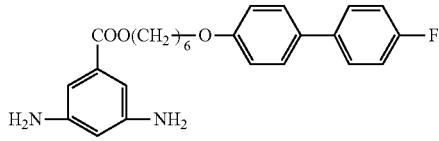
(C-4)
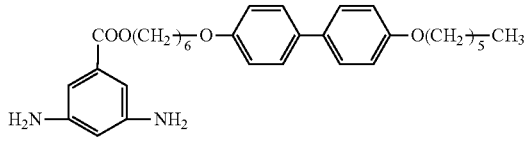
(C-5)
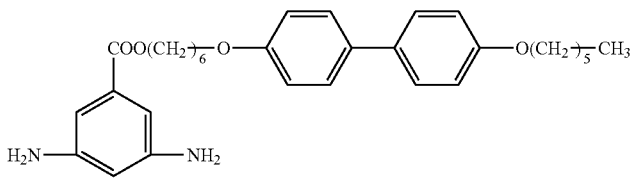
(C-6)
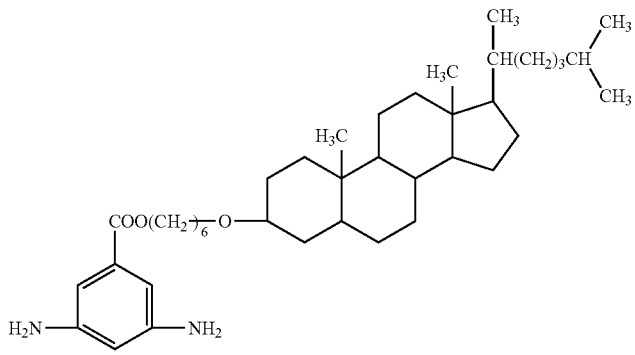
(C-7)
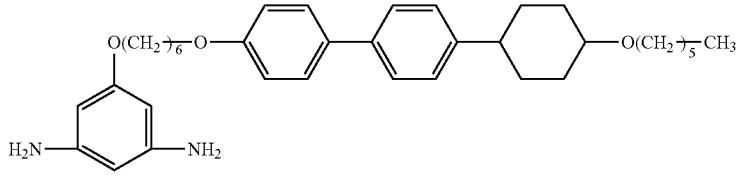
(C-8)
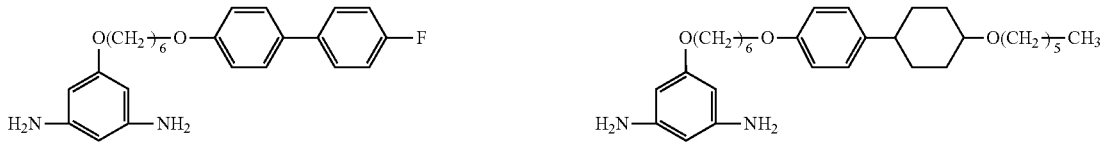
(C-9) (C-10)
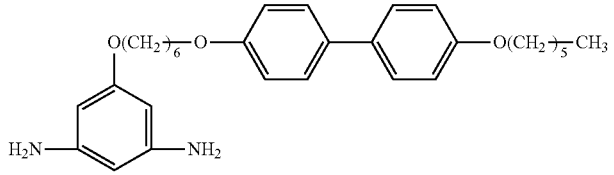
(C-11)

-continued
(C-12)
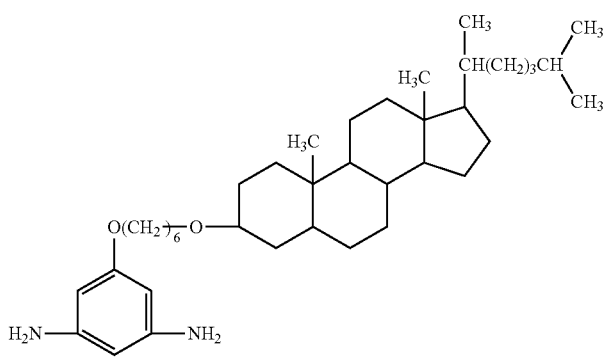
(C-13)
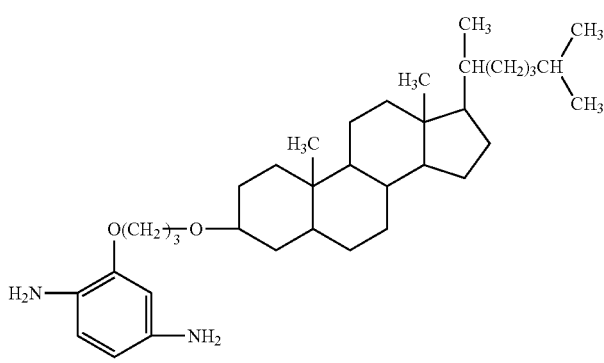
(C-14)
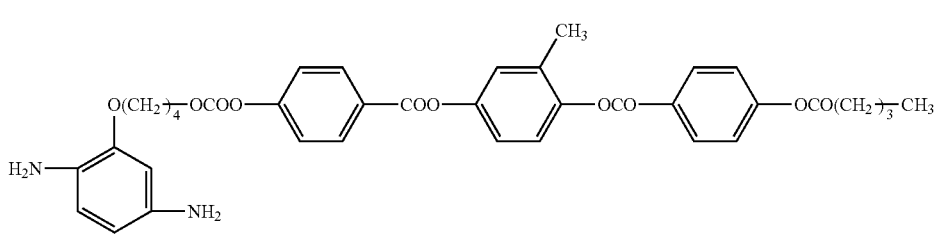
(C-15)
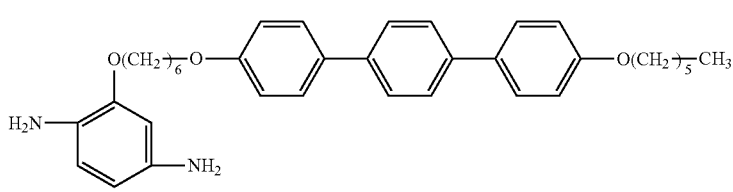
(C-16)
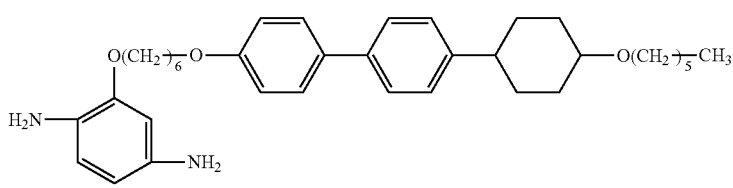
(C-17)
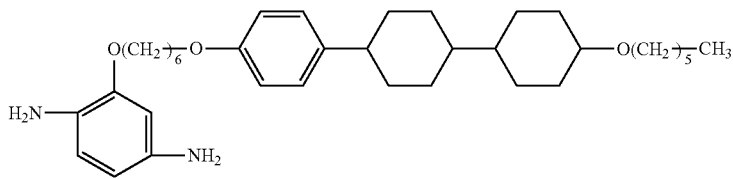

(C-18)

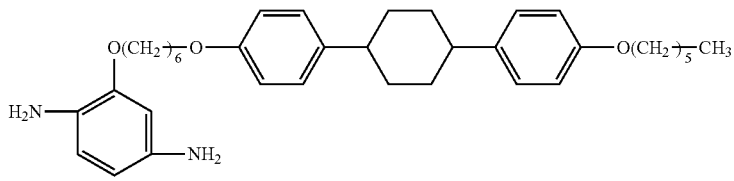

(C-19) (C-20)

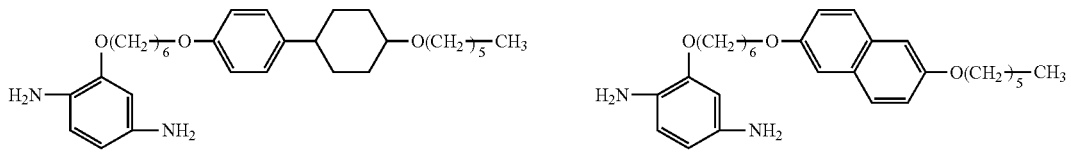

(C-21)

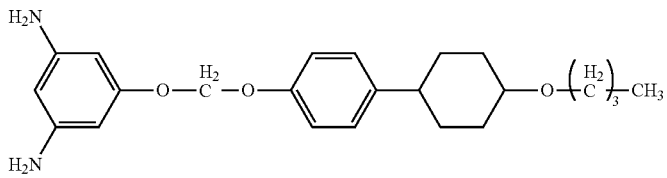

(C-22)

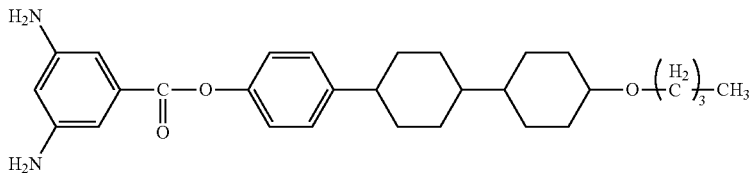

(C-23)

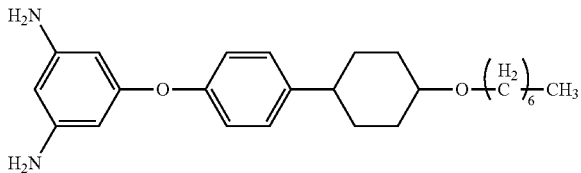

(C-24)

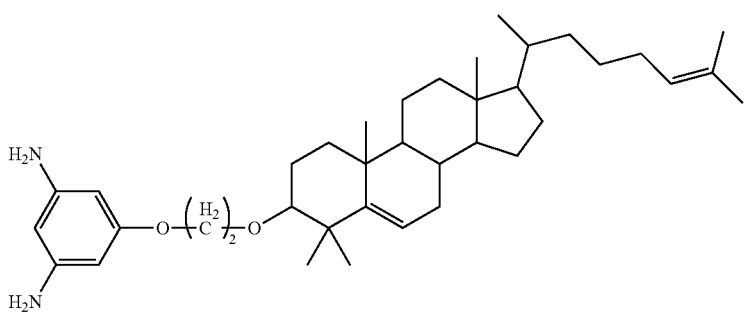

Further, if the polyamic acid as a polymer compound precursor is synthesized so that the compound before an alignment process has the group shown in Formula (2), the compound having a group that can be along liquid crystal molecules 41 represented by Formulae (D-1) to (D-11) may be used as the diamine compound, in addition to the compound having a crosslinkable functional group or a polymerizable functional group described above.

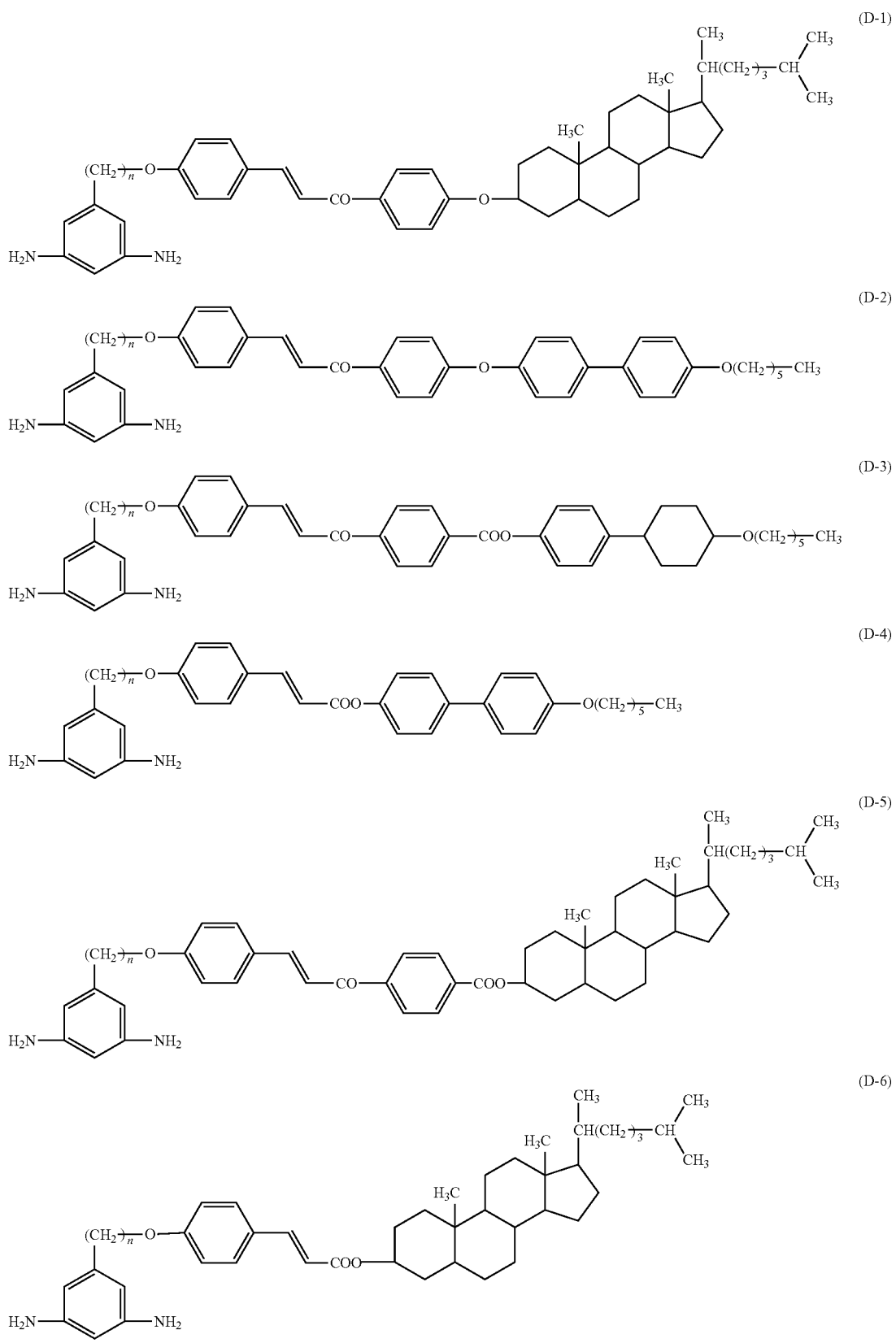

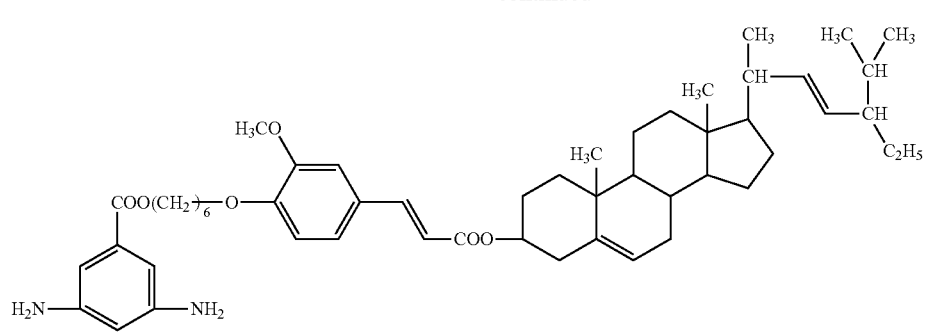
(D-7)

where n is an integer ranging from 3 to 20.

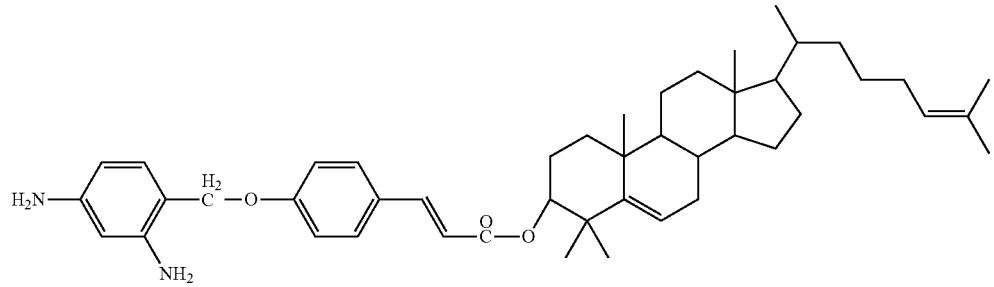
(D-8)

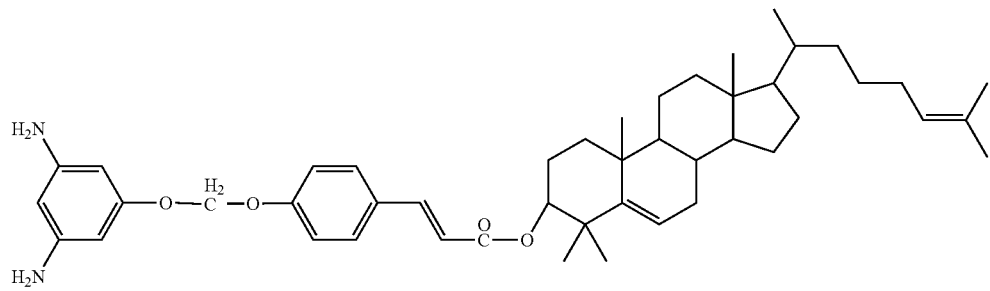
(D-9)

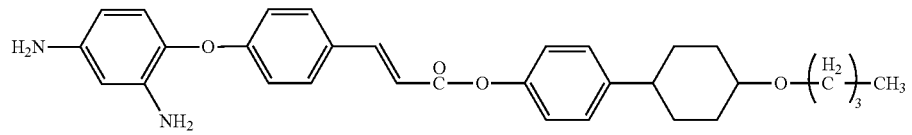
(D-10)

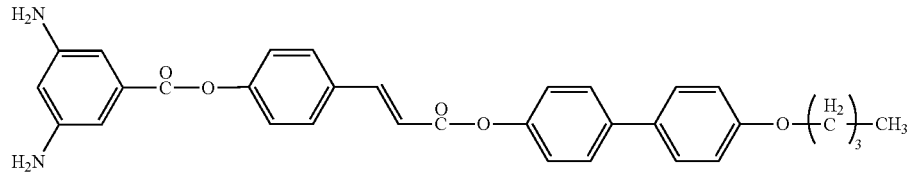
(D-11)

Further, if the polyamic acid as the polymer compound precursor is synthesized so that the compound before an alignment process includes two structures: a structure including a vertical alignment induction structure portion as R2 in Formula (3) and a structure including a crosslinkable functional group or a polymerizable functional group, for example, a diamine compound and tetracarboxylic acid dianhydride are selected as follows: That is, at least one of the compounds having a crosslinkable functional group or a polymerizable functional group shown in Formulae (A-1) to (A-21), at least one of the compounds having the vertical alignment induction structure portion shown in Formulae (B-1) to (B-36) and Formulae (b-1) and (b-3), and at least one of the tetracarboxylic acid dianhydride represented by Formulae (E-1) to (E-28) are used. Further, R1 and R2 in Formula (E-23) are the same or different alkyl groups, alkoxy groups or halogen atoms, and a type of the halogen atom is arbitrary.

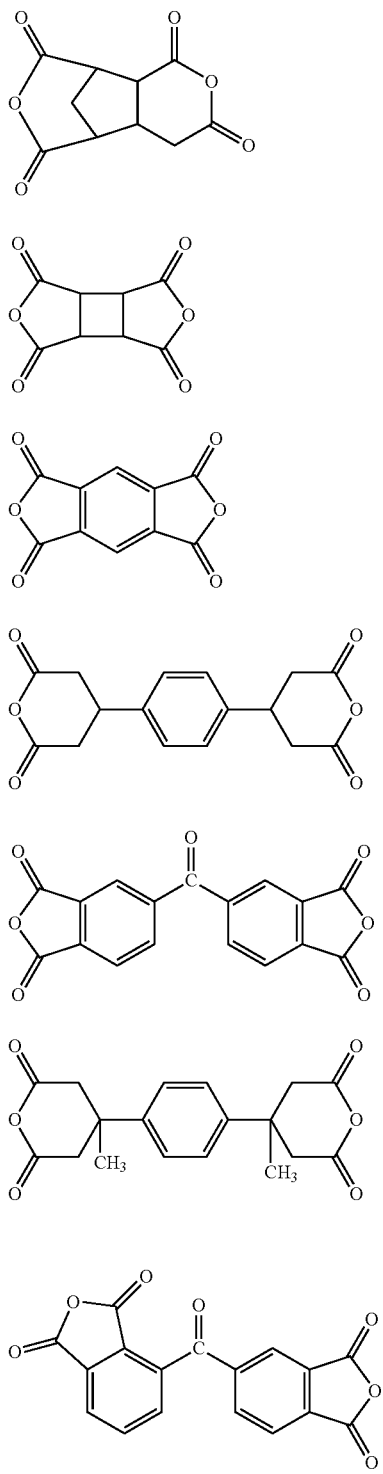

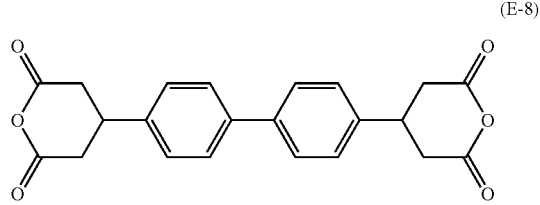

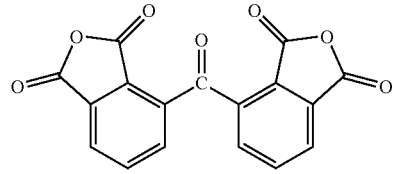

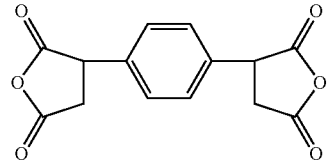

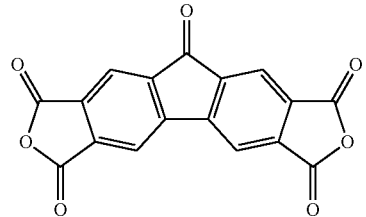

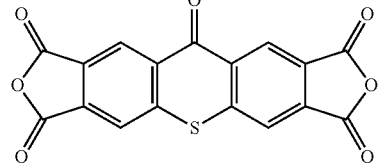

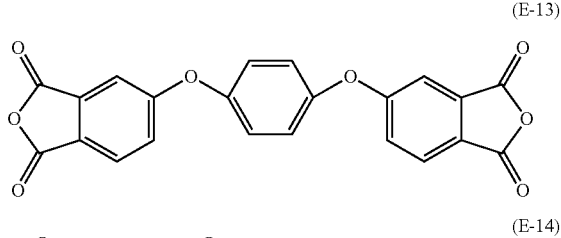

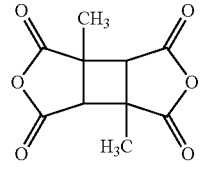

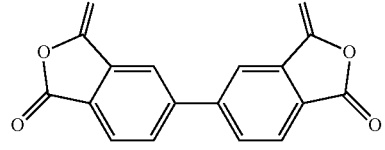

-continued

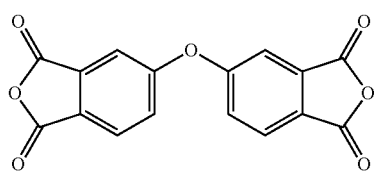 (E-16)

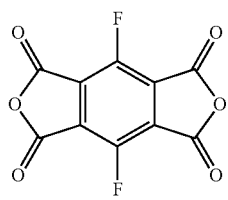 (E-17)

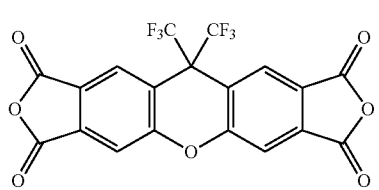 (E-18)

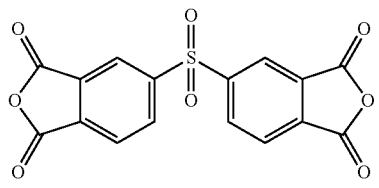 (E-19)

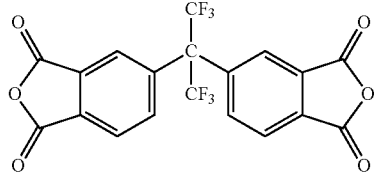 (E-20)

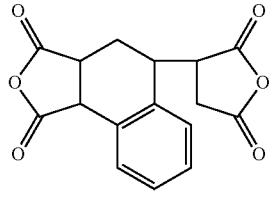 (E-21)

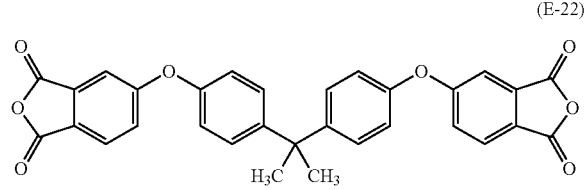 (E-22)

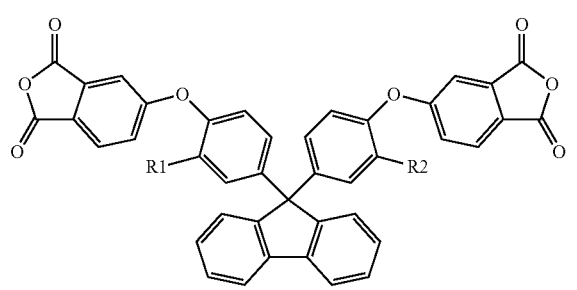 (E-23)

-continued

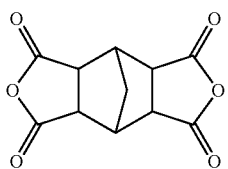 (E-24)

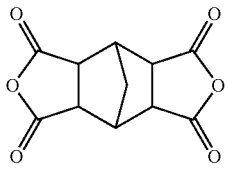 (E-25)

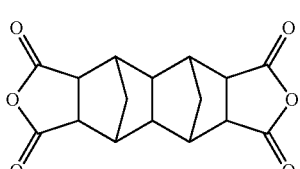 (E-26)

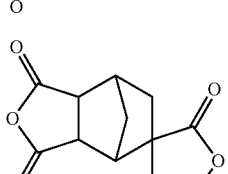 (E-27)

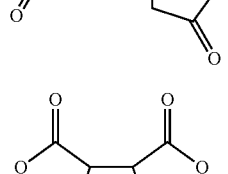 (E-28)

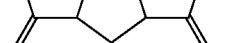

where R1 and R2 are alkyl groups, alkoxy groups or halogen atoms.

Further, when the polyamic acid as a polymer compound precursor is synthesized so that the compound before an alignment process includes two kinds of structures: a structure including the group shown in Formula (1) as R2 in Formula (3) and a structure including a crosslinkable functional group or a polymerizable functional group, for example, a diamine compound and tetracarboxylic acid dianhydride are selected as follows: That is, at least one of the compounds having a crosslinkable functional group or a polymerizable functional group shown in Formulae (A-1) to (A-21), at least one of the compounds shown in Formulae (C-1) to (C-24), and at least one of the tetracarboxylic acid dianhydride shown in Formulae (E-1) to (E-28) are used.

Further, when the polyamic acid as a polymer compound precursor is synthesized so that the compound before an alignment process includes two kinds of structures: a structure including a group shown in Formula (2) as R2 in Formula (3) and a structure including a crosslinkable functional group or a polymerizable functional group, for example, a diamine compound and tetracarboxylic acid dianhydride are selected as follows: That is, at least one of the compounds having a crosslinkable functional group or a polymerizable functional group shown in Formulae (A-1) to (A-21), at least one of the compounds shown in Formulae (D-1) to (D-11), and at least one of the tetracarboxylic acid dianhydride shown in Formulae (E-1) to (E-28) are used.

It is desirable for content of the compound before an alignment process or the polymer compound precursor as the compound before an alignment process in the alignment film material to range from 1% by weight to 30% by weight, and it is more desirable for the content to range from 3% by weight to 10% by weight. Further, for example, a photopolymerization initiator may be mixed in the alignment film material, if necessary.

Also, the prepared alignment film material is applied or printed on the TFT substrate 20 and the CF substrate 30 to cover the pixel electrodes 20B and the first slit portions 21, and the opposing electrode 30B, and then heating treatment is performed. A temperature for the heating treatment is preferably 80° C. or more, and more preferably, the temperature ranges from 150° C. to 200° C. Further, in the heating treatment, a heating temperature may be changed in a stepwise manner. Thus, a solvent contained in the applied or printed alignment film material is evaporated, and the alignment films 22 and 32 including the polymer compound (the compound before an alignment process) having a crosslinkable functional group or a polymerizable functional group as the side chain are formed. Then, treatment such as rubbing may be performed, if necessary.

Figure 6:
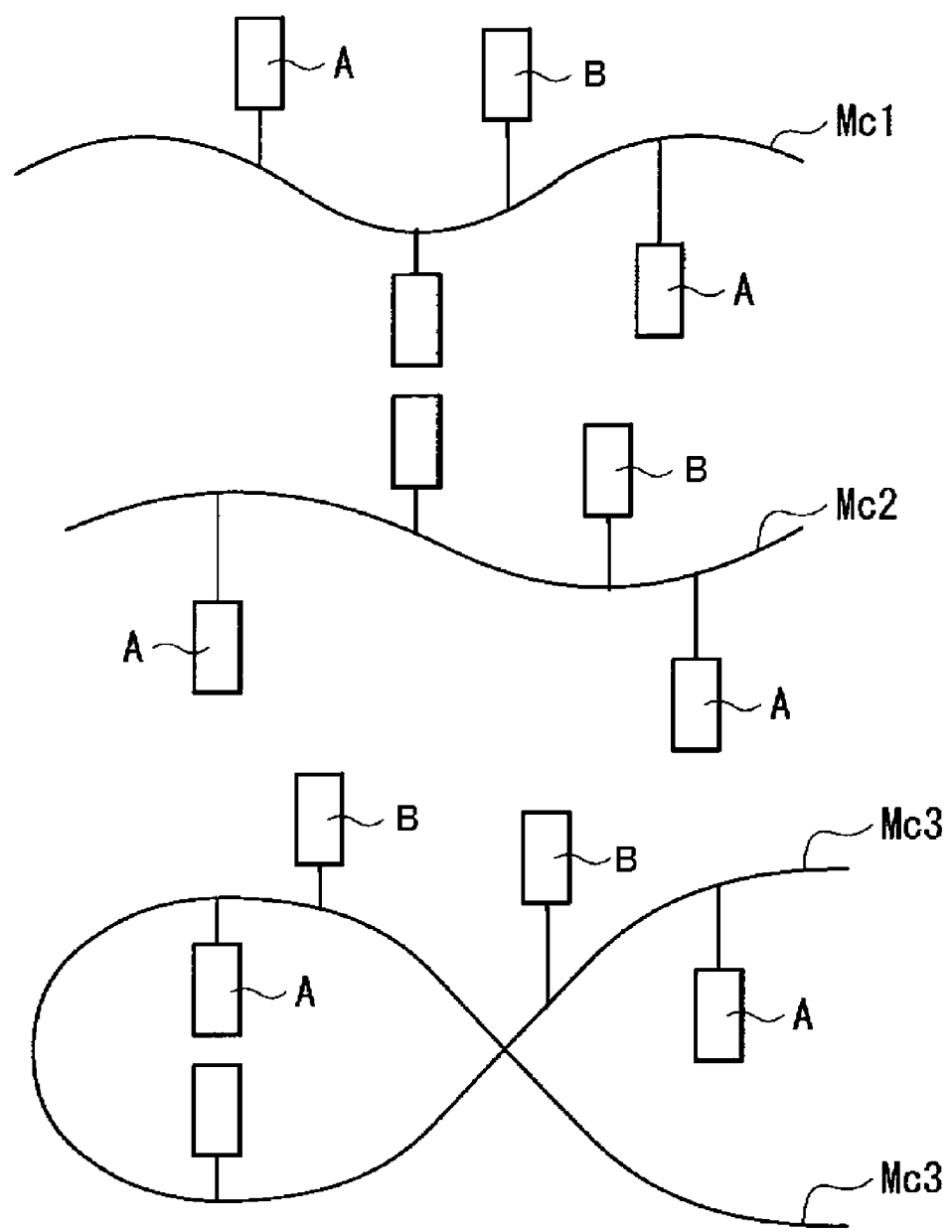
FIG. 6 is a schematic diagram illustrating a state of a polymer compound (a compound before an alignment process) in an alignment film in order to explain the method of manufacturing a liquid crystal display device illustrated in FIG. 1.
Figure 7:
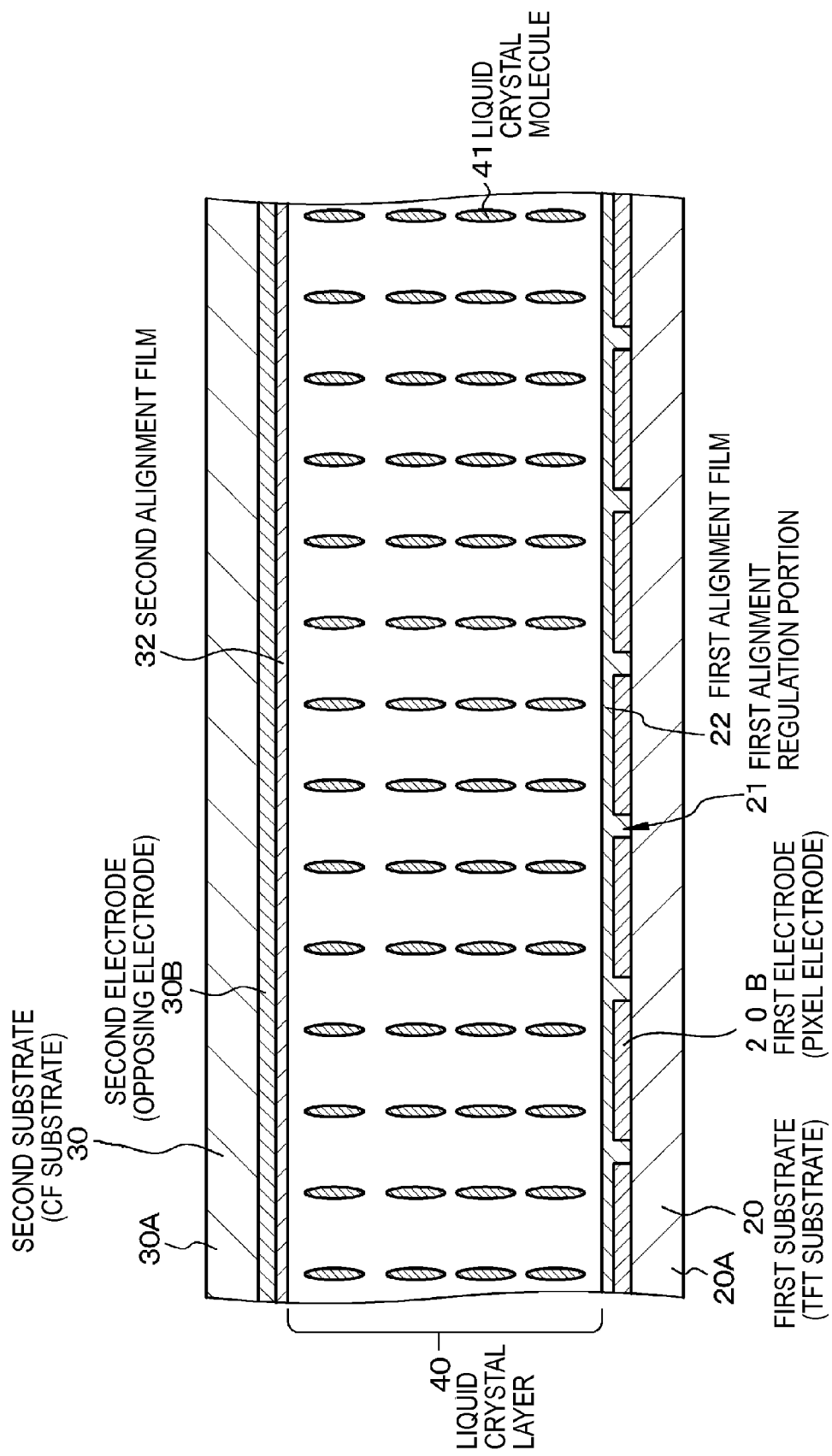
FIG. 7 is a schematic partial cross-sectional view of a substrate and the like for explaining a method of manufacturing the liquid crystal display device illustrated in FIG. 1.

Here, the compound before an alignment process in the alignment films 22 and 32 may be considered to be in a state illustrated in FIG. 6. That is, the compound before an alignment process includes main chains Mc (Mc1 to Mc3) and crosslinkable functional groups or polymerizable functional groups introduced as first side chains A to the main chains Mc, further includes second side chains B, and is present in a in which that the main chains Mc1 to Mc3 are not connected. Also, the first side chain A and the second side chain B in this state are directed to random directions due to thermal motion.

Next, the TFT substrate 20 and the CF substrate 30 are arranged so that the first alignment film 22 and the second alignment film 32 oppose each other, and the liquid crystal layer 40 including the liquid crystal molecules 41 is sealed between the first alignment film 22 and the second alignment film 32 (step S102). Specifically, a spacer protrusion for securing a cell gap, such as a plastic bead, is sprinkled on the surface of any one of the TFT substrate 20 and the CF substrate 30 having the alignment film 22 or 32 formed thereon, and for example, a sealing portion is printed using an epoxy-based adhesive or the like by a screen printing method. Then, as illustrated in FIG. 7, the TFT substrate 20 and the CF substrate 30 are bonded via the spacer protrusion and the sealing portion so that the alignment films 22 and 32 oppose each other, and the liquid crystal material including the liquid crystal molecules 41 is injected. Subsequently, the liquid crystal material is sealed between the TFT substrate 20 and the CF substrate 30 by curing the sealing portion, for example, through heating. FIG. 7 illustrates a cross-sectional configuration of the liquid crystal layer 40 sealed between the first alignment film 22 and the second alignment film 32.

Figure 8:
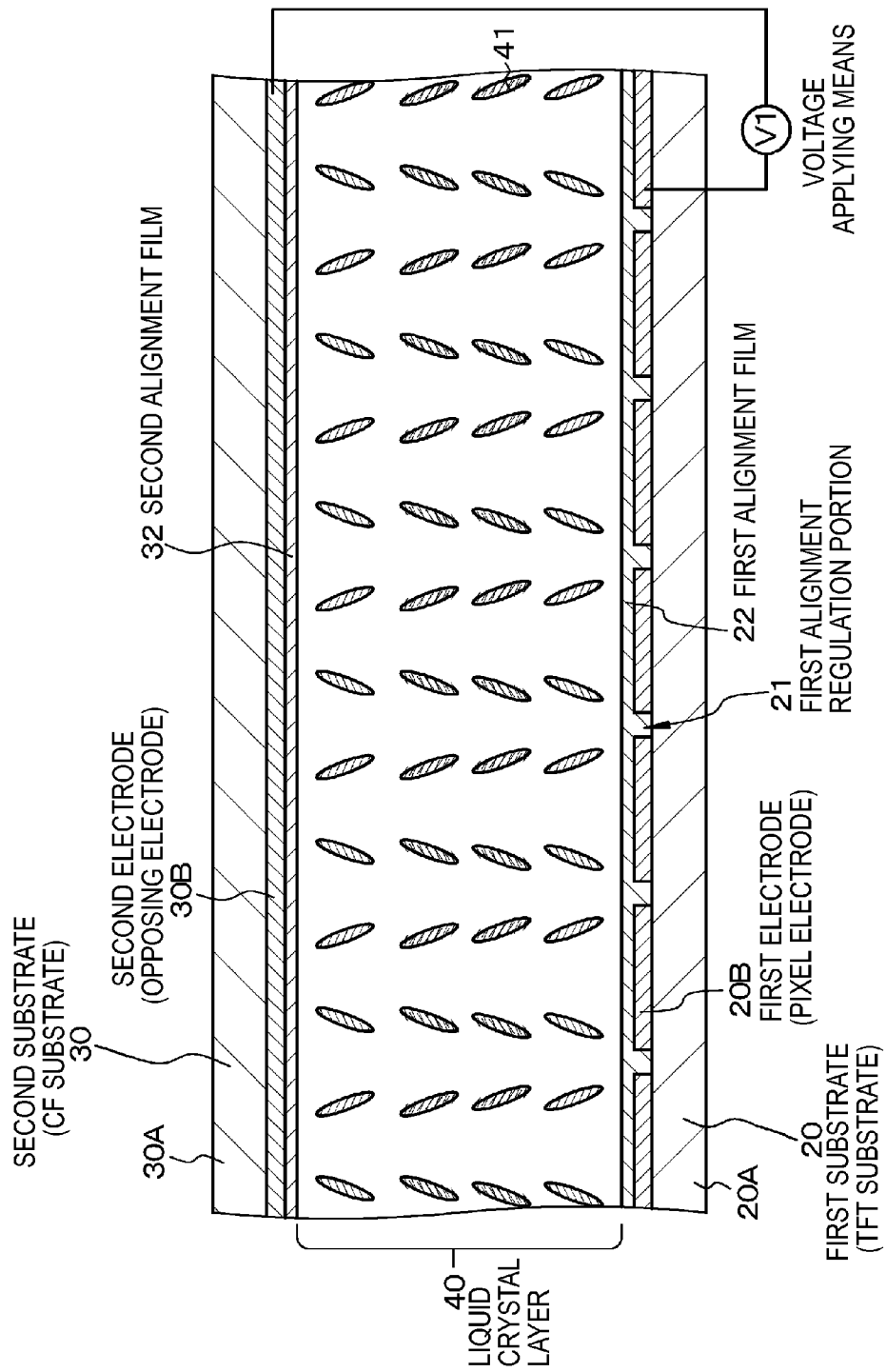
FIG. 8 is a schematic partial cross-sectional view of a substrate and the like for explaining a process subsequent to FIG. 7.

Next, as illustrated in FIG. 8, a voltage V1 is applied between the pixel electrode 20B and the opposing electrode 30B using a voltage applying means (step S103). For example, the voltage V1 is 30 to 3 volts. Accordingly, an electric field is generated in a direction forming a predetermined angle with respect to the surfaces of the first substrate 20 and the second substrate 30, and the liquid crystal molecules 41A are obliquely aligned in a predetermined direction from the vertical direction of the first substrate 20. Further, the liquid crystal molecules 41B are obliquely aligned in a predetermined direction from the vertical direction of the second substrate 30. That is, an azimuth angle (a deviation angle) of the liquid crystal molecules 41 at this time is defined by an intensity of the electric field and a molecule structure of an alignment film material, and a polar angle (a zenith angle) is defined by the intensity of the electric field and the molecule structure of the alignment film material. Also, a tilt angle of the liquid crystal molecules 41, and a first pretilt angle $\theta_1$ and a second pretilt angle $\theta_2$ of the liquid crystal molecules 41A held in the first alignment film 22 near an interface with the first alignment film 22 and the liquid crystal molecules 41B held in the second alignment film 32 near an interface with the second alignment film 32 in the process that will be described below are approximately equal. Also, values of the first pretilt angle $\theta_1$ and the second pretilt angle $\theta_2$ of the liquid crystal molecules 41A and 41B can be controlled by appropriately adjusting the value of the voltage V1. Moreover, since the second side chain has a structure inducing dielectric anisotropy, has a dipole moment in a direction perpendicular to its long axis and a structure inducing spontaneous polarization, has a dielectrically negative component, or has Structural Formula (11) or (12) described above, the second side chain is aligned in a direction dependent on the direction of the electric field (e.g. a direction generally perpendicular to the direction of the electric field) when the voltage V1 is applied to pretilt the molecular liquid crystals 41, thereby promoting the pretilt of the liquid crystal molecules by the second side chain. Therefore, it is possible to reduce the value of the voltage to the liquid crystal layer in order to pretilt the liquid crystal molecules constituting the liquid crystal layer in the process of manufacturing the liquid crystal display device.

Figure 9:
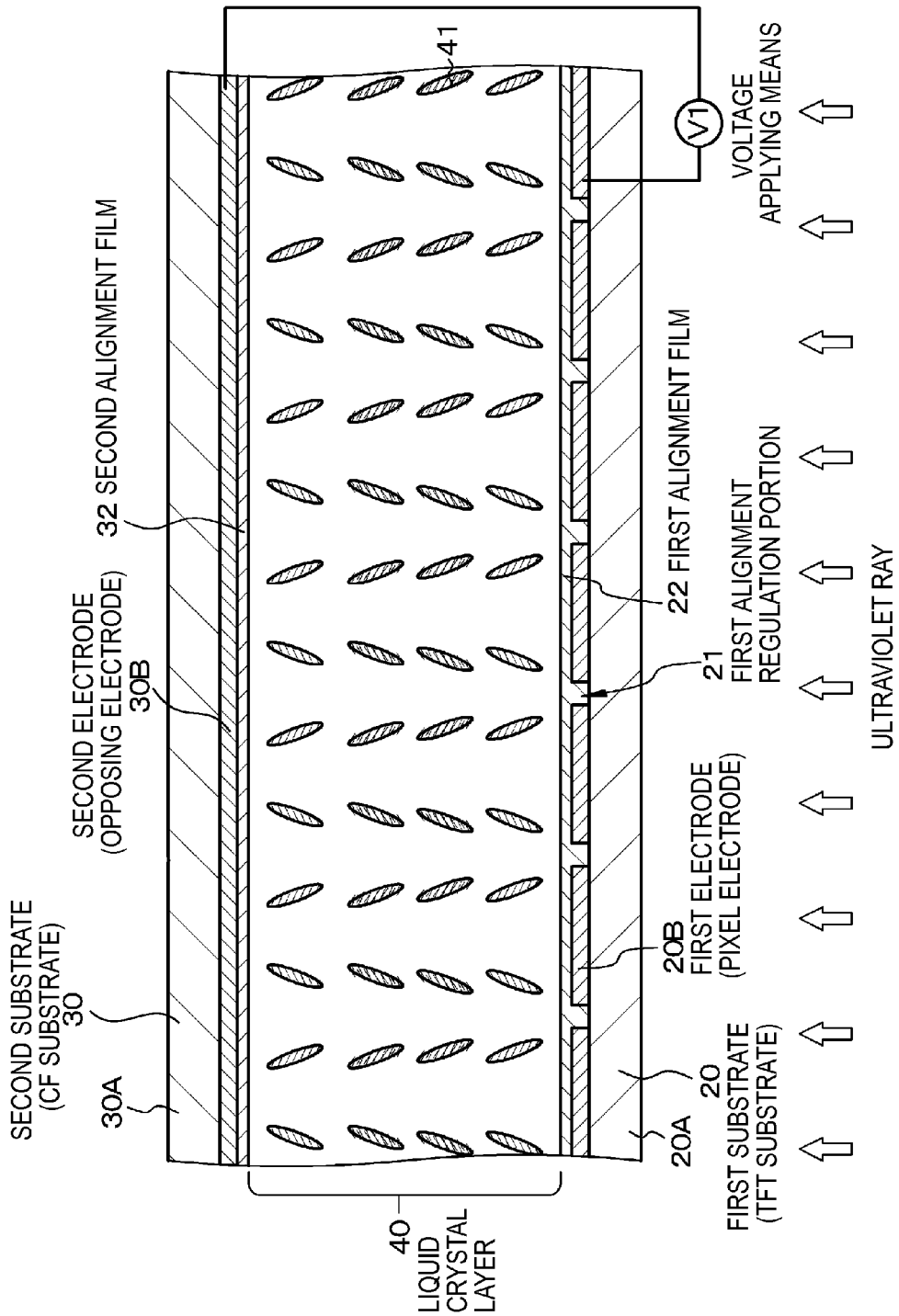
FIG. 9 is a schematic partial cross-sectional view of a substrate and the like for explaining a process subsequent to FIG. 8.

Further, as illustrated in FIG. 9, an energy ray (specifically, an ultraviolet ray UV) is applied, for example, to the alignment films 22 and 32 from the outside of the TFT substrate 20 in a state in which the voltage V1 is applied. In other words, the ultraviolet ray is applied while applying an electric field or a magnetic field to the liquid crystal layer so that the liquid crystal molecules 41A are arranged in a direction oblique to the surfaces of the pair of substrates 20 and 30. Accordingly, the crosslinkable functional group or the polymerizable functional group of the compound before an alignment process in the alignment films 22 and 32 react to crosslink the compound before an alignment process (step S104). Thus, a direction in which the liquid crystal molecules 41 are to respond is stored by the compound after an alignment process, and the liquid crystal molecules 41 near the alignment films 22 and 32 are pretilted. Also, as a result, the compound after an alignment process is formed in the alignment films 22 and 32, and in a non-driven state, the liquid crystal molecules 41A and 41B located near the interfaces with the first alignment films 22 and 32 in the liquid crystal layer 40 are given pretilt angles $\theta_1$ and $\theta_2$. It is desirable for the ultraviolet ray UV to be an ultraviolet ray including a number of light components having a wavelength of about 295 nm to about 365 nm. This is because use of an ultraviolet ray including a number of components in a range of wavelengths shorter than the above wavelengths may cause photodegradation and deterioration of the liquid crystal molecules 41. Further, while the ultraviolet ray UV is applied from the outside of the TFT substrate 20 herein, the ultraviolet ray UV may be applied from the outside of the CF substrate 30 or may be applied from the outside of both of the TFT substrate 20 and the CF substrate 30. In this case, it is desirable for the ultraviolet ray UV to be applied from the substrate having a higher transmittance. Further, when the ultraviolet ray UV is applied from the outside of the CF substrate 30, a crosslinkage reaction may be difficult due to absorption to the color filter according to the wavelength range of the ultraviolet ray UV. For this, it is desirable to apply the ultraviolet ray from the outside of the TFT substrate 20 (the substrate having the pixel electrode).

Figure 10:
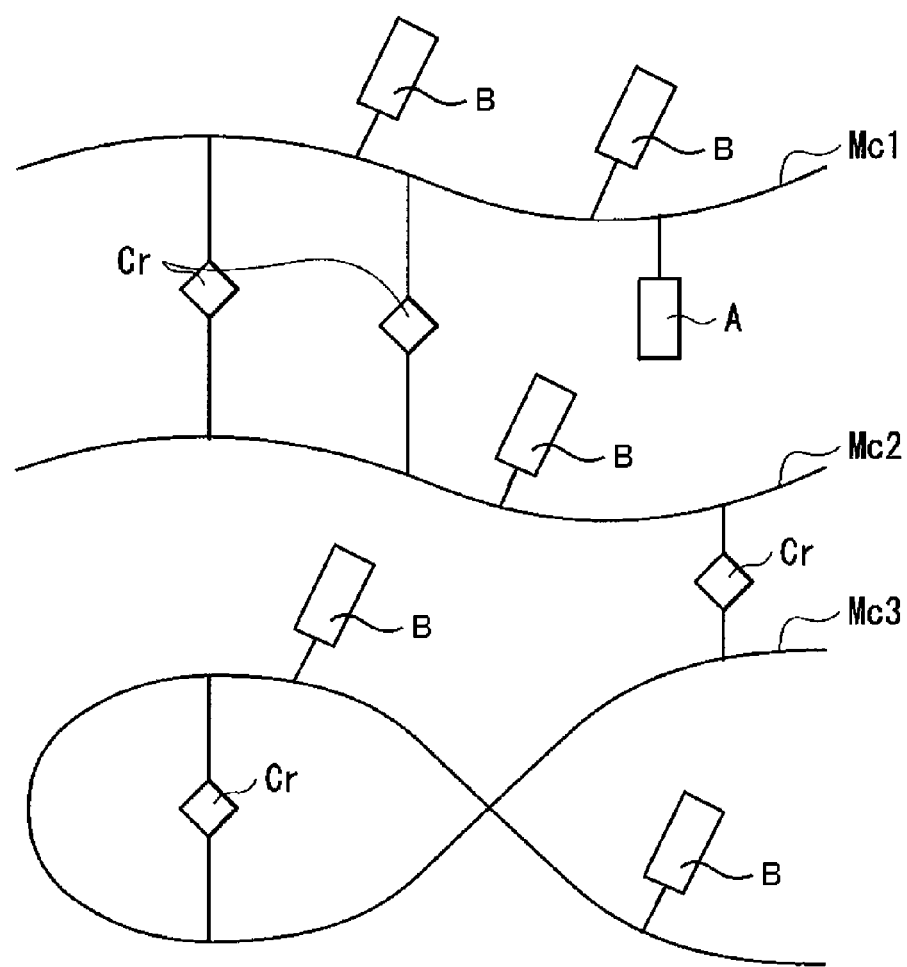
FIG. 10 is a schematic diagram illustrating a state of a polymer compound (a compound after an alignment process) in an alignment film.

Here, the compound after an alignment process in the alignment films 22 and 32 is in a state illustrated in FIG. 10. In other words, a direction of a first side chain A having a crosslinkable functional group or a polymerizable functional group introduced into a main chain Mc of the compound before an alignment process is changed according to an alignment direction of the liquid crystal molecules 41, the first side chains A whose physical distance is short react, and a connecting portion Cr is formed. The alignment films 22 and 32 may be considered to give the first pretilt angle $\theta_1$ and the second the pretilt angle $\theta_2$ to the liquid crystal molecules 41A and 41B by the produced compound after an alignment process. Further, the connecting portion Cr, may be formed between the compounds before an alignment process or may be formed within the compound before an alignment process. That is, as illustrated in FIG. 10, for example, the connecting portion Cr may be formed by reacting between the first side chain A having a main chain Mc1 and the first side chain A of the compound before an alignment process having a main chain Mc2. Further, for example, the connecting portion Cr may be formed as the first side chains A introduced into the same main chain Mc3 react to each other, like a polymer compound having a main chain Mc3. Further, in the case of the polymerizable functional group, a plurality of first side chains A are bonded. Moreover, the second side chain B is aligned in a direction dependent on the direction of the electric field for pretilting the liquid crystal molecules 41 (e.g., a direction generally perpendicular to the direction of the electric field). Accordingly, it is possible to promote the pretilt of the liquid crystal molecules by the second side chain B, and to reduce the value of the voltage that is applied to the liquid crystal layer in order to pretilt the liquid crystal molecules constituting the liquid crystal layer in the process of manufacturing the liquid crystal display device.

Through this process, it is possible to complete the liquid crystal display device (the liquid crystal display element) illustrated in FIG. 1.

In the operation of the liquid crystal display device (the liquid crystal display element), if the driving voltage is applied, an alignment state of the liquid crystal molecules 41 included in the liquid crystal layer 40 is changed according to a potential difference between the pixel electrode 20B and the opposing electrode 30B in the selected pixel 10. Specifically, in the liquid crystal layer 40, as the driving voltage is applied from the state before the application of the driving voltage illustrated in FIG. 1, the liquid crystal molecules 41A and 41B located near the alignment films 22 and 32 topple in their tilt direction, and their operations are propagated to the other liquid crystal molecules 41C. As a result, the liquid crystal molecules 41 respond to take an attitude in which liquid crystal molecules are almost horizontal (parallel) to the TFT substrate 20 and the CF substrate 30. Thus, an optical property of the liquid crystal layer 40 is changed into emitted light obtained as the light incident on the liquid crystal display element is modulated, a gradation representation is made based on this emitted light, and an image is displayed.

Here, in a liquid crystal display element in which the pretilt process is not performed at all and a liquid crystal display device including such a liquid crystal display element, even when an alignment regulation portion such as a slit portion for regulating the alignment of the liquid crystal molecules is provided in the substrate, the liquid crystal molecules aligned in the direction perpendicular to the substrate topple so that their directors are directed to any orientation in an in-surface direction of the substrate if the driving voltage is applied. In the liquid crystal molecules responding to the driving voltage, orientation of the director of each liquid crystal molecule shakes and the alignment is disturbed as a whole. Thus, there is a problem in that the response rate (the rising rate of the image display) becomes low and a response property is deteriorated, resulting in deterioration of the display characteristic. Further, if driving is performed using an initial driving voltage set higher than a driving voltage for a display state (overdrive), liquid crystal molecules that respond and liquid crystal molecules that hardly respond exist at the time of application of the initial driving voltage, and a great difference in a slope of the directors is generated in the meantime. Thereafter, if the driving voltage for a display state is applied, when operation of the liquid crystal molecules responding at the time of application of the initial driving voltage is hardly propagated to other liquid crystal molecules, a slope of the directors responding to the driving voltage for a display state is obtained and this slope is propagated to other liquid crystal molecules. As a result, all the pixels reach luminance of the display state at the time of the initial driving voltage. However, the luminance is then degraded, and the pixels reach the luminance of the display state again. In other words, the overdrive makes an apparent response rate higher than non-overdrive, but there is a problem in that it is difficult to obtain sufficient display quality. Further, this problem does not occur easily in a liquid crystal display element in an IPS mode or an FFS mode and may be considered as a problem specific to a liquid crystal display element in a VA mode.

On the other hand, in the liquid crystal display device (the liquid crystal display element) and the method of manufacturing the same in Embodiment 1, the first alignment film 22 and the second alignment film 32 described above give the first predetermined pretilt angle $\theta_1$ and the second predetermined pretilt angle $\theta_2$ to the liquid crystal molecules 41A and 41B. Accordingly, it is difficult for the problems associated with the case in which the pretilt process is not performed at all to occur, the response rate to the driving voltage (a rising rate of image display) is greatly improved, and the display quality at the time of the overdrive is improved. Moreover, since the first slit portion 21 as the alignment regulation portion for regulating the alignment of the liquid crystal molecules 41 is provided in the TFT substrate 20, a display characteristic such as a viewing angle characteristic is secured, thus improving a response characteristic in a state in which an excellent display characteristic is maintained. Further, since the liquid crystal molecules have the second pretilt angle $\theta_2$ by the second alignment film 32, it is possible to reduce a transmission amount of light at the time of black display and further improve contrast.

Further, in a method of manufacturing a liquid crystal display device (optical alignment film technology) in the related art, an alignment film is formed by applying linearly polarized light or light in a direction oblique to a substrate surface (hereinafter referred to as "oblique light") to a precursor film including a predetermined polymer material provided on the substrate surface, and a pretilt process is performed by the alignment film. For this, there is a problem in that a large-scale light irradiation apparatus, such as an apparatus that applies the linearly polarized light or an apparatus that applies the oblique light, is necessary when the alignment film is formed. Further, there is a problem in that a manufacturing process becomes complicated since the larger-scale apparatus is necessary to form a pixel having a multi-domain for realizing a wider viewing angle. In particular, when the alignment film is formed using the oblique light, if there is a structure such as a spacer or an unevenness on the substrate, a region that becomes a shadow of the structure or the like that the oblique light does not reach is generated, and desired alignment regulation for liquid crystal molecules in this region becomes difficult. In this case, for example, it is necessary to perform pixel design in consideration of diffraction of light to apply the oblique light using a photomask in order to provide a multi-domain within the pixel. That is, there is another problem in that it is difficult to form high-definition pixels when the alignment film is formed using the oblique light.

Furthermore, even in optical alignment film technology of the related art, when a crosslinkable polymer compound is used as a polymer material, a crosslinkable functional group or a polymerizable functional group included in the crosslinkable polymer compound in a precursor film is directed to a random orientation (direction) due to thermal motion, and accordingly, probability of a physical distance between the crosslinkable functional groups or the polymerizable functional groups being short becomes low. Moreover, when random light (non-polarized light) is applied, the crosslinkable functional groups or the polymerizable functional groups react as the physical distance therebetween becomes short, but in a crosslinkable functional group or a polymerizable functional group reacting due to radiation of the linearly polarized light, it is necessary for a polarization direction and a direction of a reacting portion to be aligned in a predetermined direction. Further, as an irradiation area of the oblique light is spread as compared to vertical light, an irradiation amount per unit area is reduced. That is, a ratio of the crosslinkable functional groups or the polymerizable functional groups reacting to the linearly polarized light or the oblique light becomes lower as compared to a case in which random light (non-polarized light) is emitted from a direction perpendicular to the substrate surface. Therefore, it is easy for a crosslinkage density (a crosslinkage degree) in the formed alignment film to become low.

On the other hand, in Embodiment 1, the alignment films 22 and 32 including the compound before an alignment process are formed and then the liquid crystal layer 40 is sealed between the first alignment film 22 and the second alignment film 32. Subsequently, as a voltage is applied to the liquid crystal layer 40, the liquid crystal molecules 41 take predetermined alignment, and the compound before an alignment process in the alignment films 22 and 23 is crosslinked or polymerized while a direction of the end structure portion of the side chain with respect to the substrate or electrode is defined by the liquid crystal molecules 41. Thus, it is possible to form the first alignment film 22 and the second alignment film 32 that give the first pretilt angle $\theta_1$ and the second pretilt angle $\theta_2$ to the liquid crystal molecules 41A and 41B. That is, according to the liquid crystal display device (the liquid crystal display element) and the method of manufacturing the same in Embodiment 1, it is possible to easily improve the response characteristic without using a large-scale apparatus. Moreover, since it is possible to give the pretilt angles $\theta_1$ and $\theta_2$ to the liquid crystal molecules 41 without depending on the irradiation direction of the ultraviolet ray when the compound before an alignment process is crosslinked or polymerized, high-definition pixels can be formed. Furthermore, since the compound after an alignment process is produced in a state in which an orientation of the end structure portion of the side chain in the compound before an alignment process is aligned, the crosslinkage degree of the compound after an alignment process may be considered to be higher than that of the alignment film according to the manufacturing method of the related art. Thus, since it is difficult for a crosslinked structure to be newly formed during driving even when driving is performed for a long time, the pretilt angles $\theta_1$ and $\theta_2$ of the liquid crystal molecules 41A and 41B are maintained in a state at the time of manufacture, thereby improving reliability. Moreover, since there is the second side chain, it is possible to promote the pretilt of the liquid crystal molecules by the second side chain as a result of the second side chain being aligned in a direction dependent on a direction of the electric field for pretilting the liquid crystal molecules 41 (e.g., a direction generally perpendicular to the direction of the electric field). Therefore, it is possible to reduce the value of the voltage that is applied to the liquid crystal layer in order to pretilt the liquid crystal molecules constituting the liquid crystal layer in the process of manufacturing the liquid crystal display device.

In this case, in Embodiment 1, since the liquid crystal layer 40 is sealed between the alignment films 22 and 32 and then the compound before an alignment process in the alignment films 22 and 32 is crosslinked or polymerized, the transmittance at the time of driving of the liquid crystal display device can be changed to increase continuously.

Figure 12:
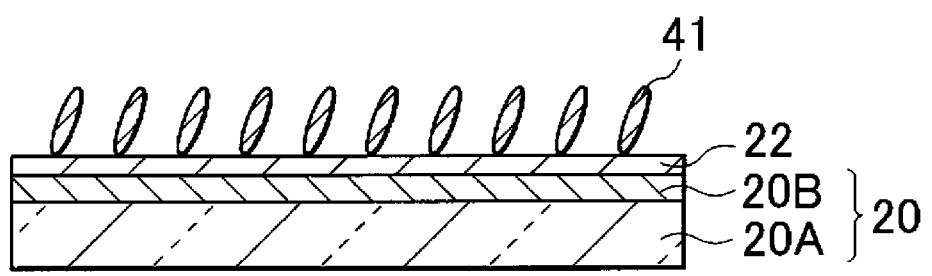
FIG. 12 is a schematic sectional view for explaining an order parameter.

In Embodiment 1 in which the liquid crystal layer 40 is sealed and then the pretilt process is performed using the crosslinkage reaction of the compound before an alignment process, the liquid crystal molecules 41 are pretilted according to the alignment direction of the liquid crystal molecules 41 at the time of driving, by the first slit portion 21 for regulating the alignment of the liquid crystal molecules 41 near the first alignment film 22. Thus, since the direction of the pretilt of the liquid crystal molecules 41 is easily aligned as illustrated in FIG. 12, an order parameter becomes greater (close to 1). Thus, since the liquid crystal molecules 41 exhibit a uniform behavior at the time of driving of the liquid crystal display element, the transmittance increases continuously.

In Embodiment 1, while the case in which the alignment films 22 and 32 including the compound before an alignment process having the main chain including the polyimide structure are used has been mainly described, the main chain of the compound before an alignment process is not limited to the main chain including the polyimide structure. For example, the main chain may include a polysiloxane structure, a polyacrylate structure, a polymethacrylate structure, a maleic imide polymer structure, a styrene polymer structure, a styrene/maleic imide polymer structure, and a polysaccharide structure, a polyvinyl alcohol structure or the like. Among them, the compound before an alignment process having the main chain including the polysiloxane structure is preferred. This is because the same effect as in the polymer compound including the polyimide structure described above can be obtained. An example of the compound before an alignment process having the main chain including the polysiloxane structure may include a polymer compound including a polysilane structure represented by Formula (9). R10 and R11 in Formula (9) is any monovalent group including carbon, but it is desirable for the first side chain to be included in any one of R10 and R11. This is because it is easy for sufficient alignment regulation capability to be obtained in the compound after an alignment process. An example of the crosslinkable functional group or the polymerizable functional group in this case may include the group shown in Formula (41) described above.

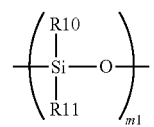

(9)

where R10 and R11 are monovalent organic groups, and m1 is an integer equal to or greater than 1.

Furthermore, in Embodiment 1, the viewing angle characteristic is improved by providing the first slit portion 21 for alignment division, but the present disclosure is not limited thereto. For example, a protrusion may be provided as the alignment regulation portion on the pixel electrode 20B, instead of the first slit portion 21. By providing the protrusion, it is possible to obtain the same effect as in the case in which the first slit portion 21 is provided.

Figure 2:
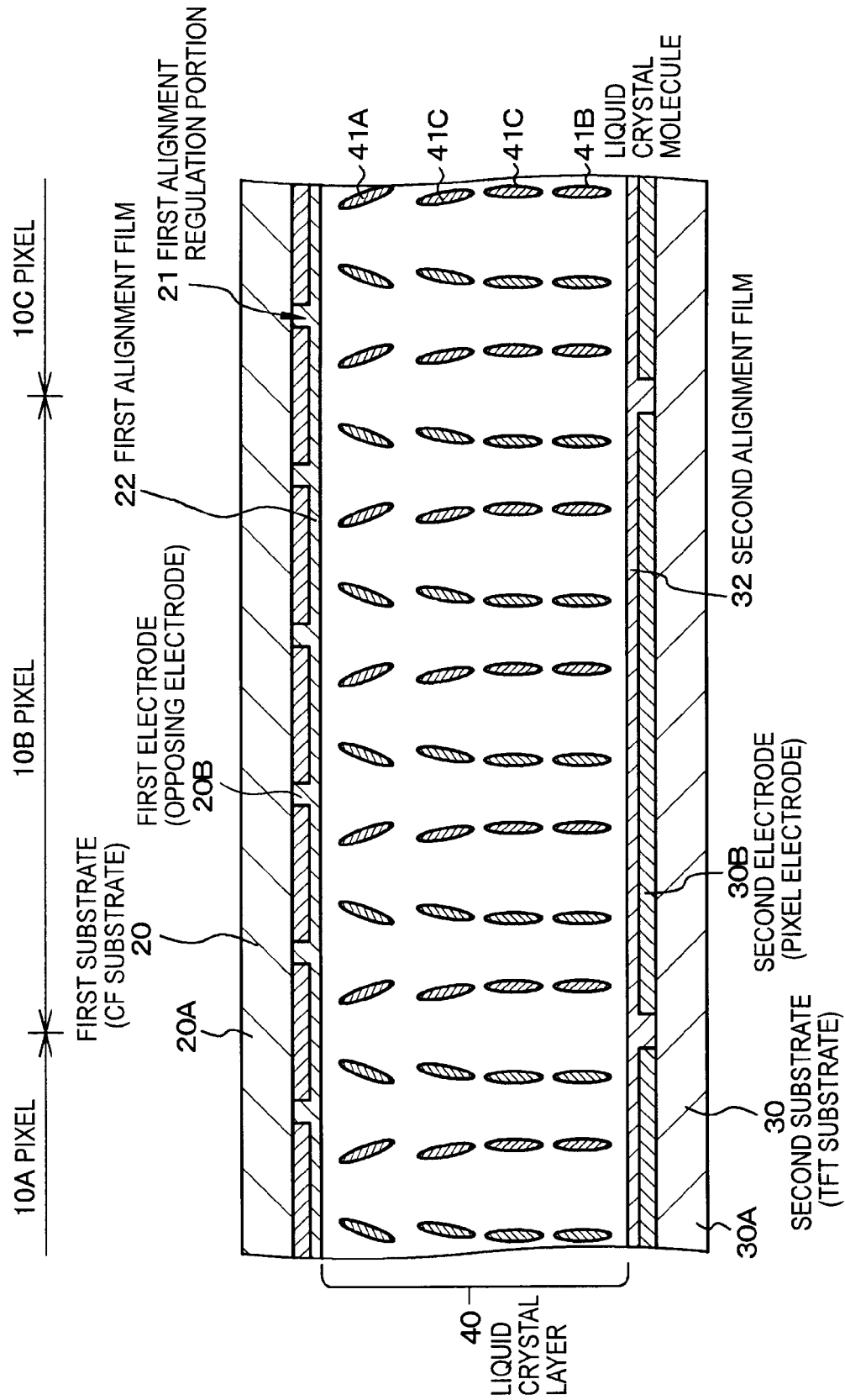
FIG. 2 is a schematic partial cross-sectional view of a variant of the liquid crystal display device according to an aspect of the present disclosure.

Further, in the example illustrated in FIG. 1, the first alignment film 22 covering the TFT substrate that is the first substrate 20 includes the compound after an alignment process to give the first pretilt angle $\theta_1$ to the liquid crystal molecules 41A located on the side of the first substrate (the TFT substrate) 20 in the liquid crystal layer 40, but the present disclosure is not limited thereto. That is, the first substrate 20 may be the CF substrate and the second substrate 30 may be the TFT substrate as illustrated in FIG. 2, and even in this case, the same effects as in the liquid crystal display device illustrated in FIG. 1 can be obtained. However, since a variety of transverse electric fields at the time of driving in the TFT substrate are generated, it is desirable to employ the variant of the liquid crystal display device of FIG. 2 in which the second substrate 30 is the TFT substrate. This makes it possible to effectively reduce alignment disturbance of the liquid crystal molecules 41 caused by the transverse electric fields.

Next, other embodiments will be described, but common components to the embodiments and Embodiment 1 are denoted by the same reference numerals and a description thereof will be omitted. Further, the same effects and operation as those in Embodiment 1 will be appropriately omitted. Further, the various technical matters described in Embodiment 1 are appropriately applied to the following embodiments.

Embodiment 2

Embodiment 2 relates to the liquid crystal display device according to the $(2-A)^{th}$ to $(2-D)^{th}$ aspects of the present disclosure and a method of manufacturing a liquid crystal display device according to second and fourth aspects of the present disclosure.

In Embodiment 1, the compound after an alignment process may be obtained by crosslinking or polymerizing the crosslinkable functional group or the polymerizable functional group in the compound before an alignment process, which has the crosslinkable functional group or the polymerizable functional group as the first side chain. On the other hand, in Embodiment 2, the compound after an alignment process may be obtained based on a compound before an alignment process having a photosensitive functional group with a deformation caused by radiation of an energy ray, as the first side chain.

Here, even in Embodiment 2, the alignment films 22 and 32 may include one kind or two or more kinds of polymer compounds (compounds after an alignment process) having a first side chain having a crosslinked structure and the second side chain illustrated in Structural Formula (11) or (12). Also, liquid crystal molecules are pretilted by the deformed compound. Here, the compound after an alignment process is produced by forming the alignment films 22 and 32 in a state in which one kind or two or more kinds of polymer compounds (compounds before an alignment process) having a main chain, a first side chain and a second side chain are included, providing the liquid crystal layer 40, and then deforming the polymer compound or by applying an energy ray to the polymer compound, more specifically, by deforming the photosensitive functional group included in the first side chain while applying an electric field or a magnetic field. Further, such a state is illustrated in a conceptual diagram of FIG. 14, but the second side chain is not illustrated in FIG. 14.

Figure 14:
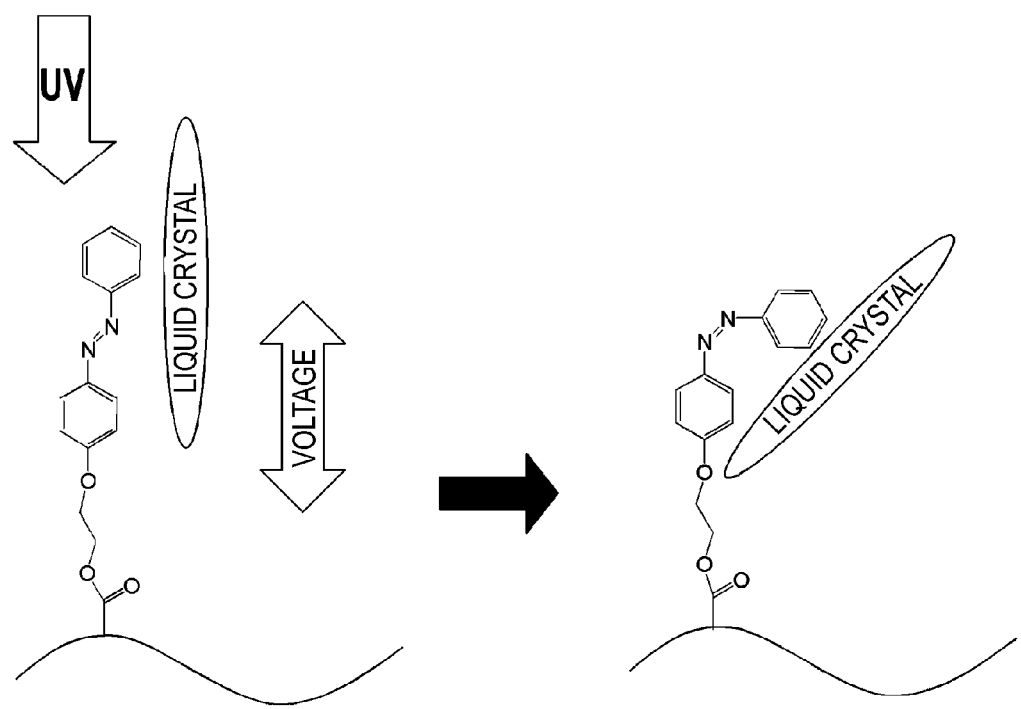
FIG. 14 is a conceptual diagram illustrating a relationship between a deformed polymer compound and liquid crystal molecules.

Further, in FIG. 14, a direction of an arrow indicated by "UV" and a direction of an arrow indicated by "voltage" do not indicate an irradiation direction of the ultraviolet ray and a direction of the applied electric field. Also, the compound after an alignment process includes a structure that arranges the liquid crystal molecules in a predetermined direction (specifically, an oblique direction) with respect to one (the TFT substrate 20 or the CF substrate 30) of a pair of substrates. Thus, the compound after an alignment process is included in the alignment films 22 and 32 by deforming the polymer compound or by applying the energy ray to the polymer compound, thereby pretilting the liquid crystal molecules 41 near the alignment films 22 and 32. Accordingly, a high response rate (a rising rate of image display) is obtained and the display characteristic is improved. Moreover, since there is the second side chain, it is possible to promote the pretilt of the liquid crystal molecules by the second side chain as a result of the second side being aligned in a direction dependent on a direction of the electric field (e.g., a direction generally perpendicular to the direction of the electric field) when a voltage is applied in order to pretilt the liquid crystal molecules 41. Thus, it is possible to reduce a value of the voltage that is applied to the liquid crystal layer in order to pretilt the liquid crystal molecules constituting the liquid crystal layer in the process of manufacturing the liquid crystal display device.

Examples of the photosensitive functional group may include an azobenzene-based compound having an azo group, a compound having imine and aldimine in a skeleton (referred to as "aldimine benzene" for convenience), and a compound having a styrene skeleton (referred to as "stilbene" for convenience). These compounds are deformed in response to an energy ray (e.g., ultraviolet ray), i.e., transition from a trance state to a cis state, thus pretilting the liquid crystal molecules.

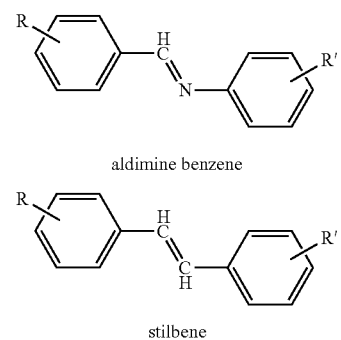

aldimine benzene stilbene

A specific example of "X" in the azobenzene-based compound represented by Formula (AZ-0) may include the following formulae (AZ-1) to (AZ-9).

(AZ-0)

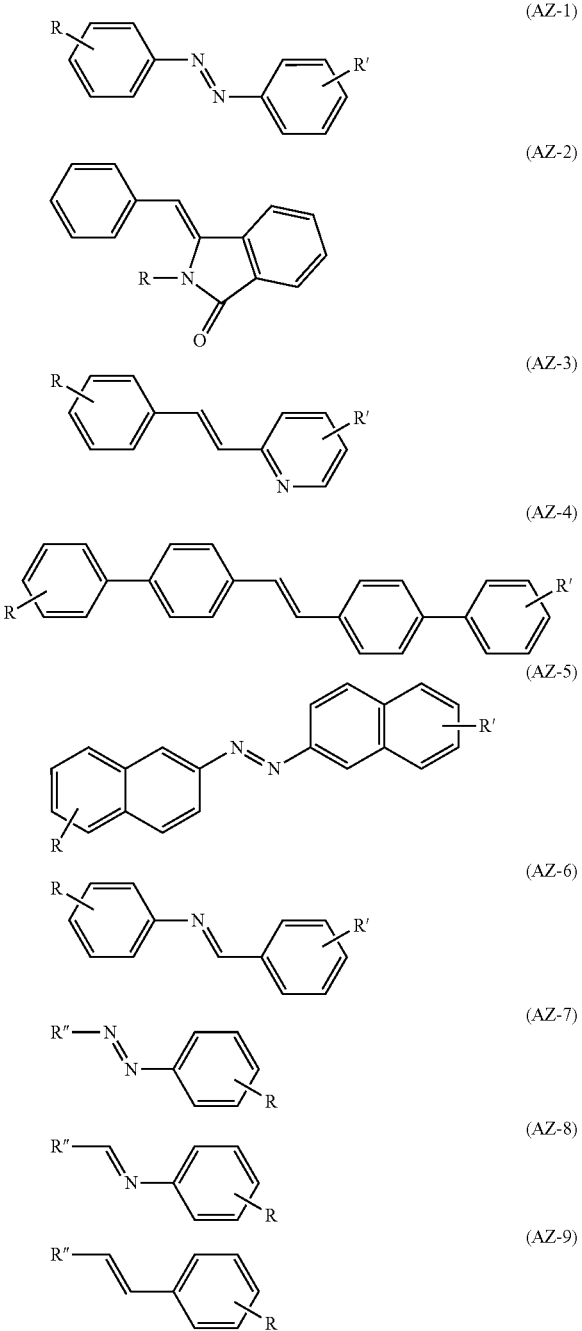

Here, any one of R and R" may be bonded to a benzene ring including diamine directly or via ether, ester, or the like, the other may be an end group, R, R', and R" may be a hydrogen atom, a halogen atom, an alkyl group, an alkoxy group, a monovalent group having a carbonate group, or a derivative thereof, and the end groups may include $R_2'$ of Formula (1) or $R_{13}'$ of Formula (2)' therebetween. By doing so, it is possible to more easily give the tilt. R" is bonded to a benzene ring including diamine directly or via ether, ester or the like.

Since the liquid crystal display device and the method of manufacturing the same in Embodiment 2 are, basically, substantially the same as the liquid crystal display device and the method of manufacturing the same described in Embodiment 1 except for the use of the compound before an alignment process having a photosensitive functional group with a deformation caused by radiation of an energy ray (specifically, a ultraviolet ray), a detailed description thereof will be omitted.

Embodiment 3

Embodiment 3 relates to the liquid crystal display device according to the $(3-A)^{th}$ to $(3-D)^{th}$ aspects of the present disclosure and the method of manufacturing a liquid crystal display device according to the third aspect of the present disclosure. In Embodiment 3, the compound after an alignment process is obtained by crosslinking or polymerizing a crosslinkable functional group or a polymerizable functional group in a compound before an alignment process, which has the crosslinkable functional group or the polymerizable functional group as a side chain.

Here, even in Embodiment 3, the side chain in the polymer compound constituting the alignment films 22 and 32 has the crosslinkable functional group or the polymerizable functional group, and further has Structural Formula (13), (14), (15) or (16). Also, the liquid crystal molecules are pretilted by the crosslinked or polymerized compound. Here, the compound after an alignment process is produced by forming the alignment films 22 and 32 in a state in which one kind or two or more kinds of polymer compounds (compounds before an alignment process) having a main chain and side chains are included, providing the liquid crystal layer 40, and then crosslinking or polymerizing the polymer compound, more specifically, by causing the crosslinkable functional group or the polymerizable functional group included in the side chain to react while applying an electric field or a magnetic field. Also, the compound after an alignment process includes a structure (specifically, the side chain) that arranges the liquid crystal molecules in a predetermined direction (specifically, an oblique direction) with respect to a pair of substrates (specifically, the TFT substrate 20 and the CF substrate 30). Thus, as the compound after an alignment process is included in the alignment films 22 and 32 by crosslinking or polymerizing the polymer compound (the compound before an alignment process), the liquid crystal molecules 41 near the alignment films 22 and 32 can be pretilted, thereby obtaining a high response rate (a rising rate of image display) and improving a display characteristic.

Further, the side chain has a crosslinkable functional group or a polymerizable functional group, and includes a structure inducing dielectric anisotropy, has a dipole moment in a direction perpendicular to a long axis of the side chain and includes a structure inducing spontaneous polarization, includes a dielectrically negative component, or has any one of Structural Formulae (13) to (16). Further, the dielectrically negative component is any one of a halogen atom (e.g., a fluorine atom or a chlorine atom), —CN, —OCF$_3$, —CF$_3$, —CHF$_2$, —CH$_2$F, —OCF$_2$CHF$_2$ or —OCF$_2$CHFCF$_3$. That is, $X_1$, $X_2$, $X_3$, and $X_4$ in the ring X correspond to the dielectrically negative components.

Specifically, —R$_{11}$—R$_{12}$—R$_{13}$ constituting the side chain may include the structures shown in Formulae (6-1) to (6-23) described above or may include the structures shown in Formulae (1-1) to (1-12) described above. More specifically, the side chain may include structures shown in the following formulae (H-1) to (H-4).

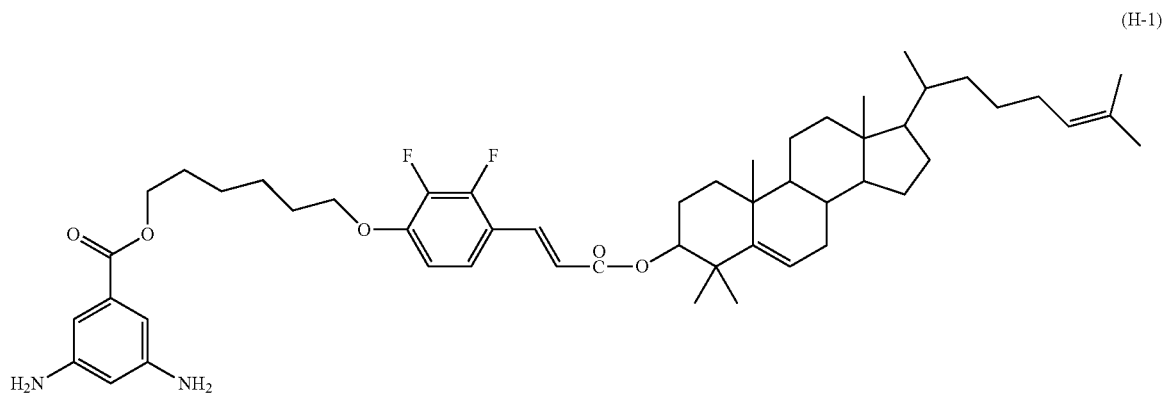

(H-1)

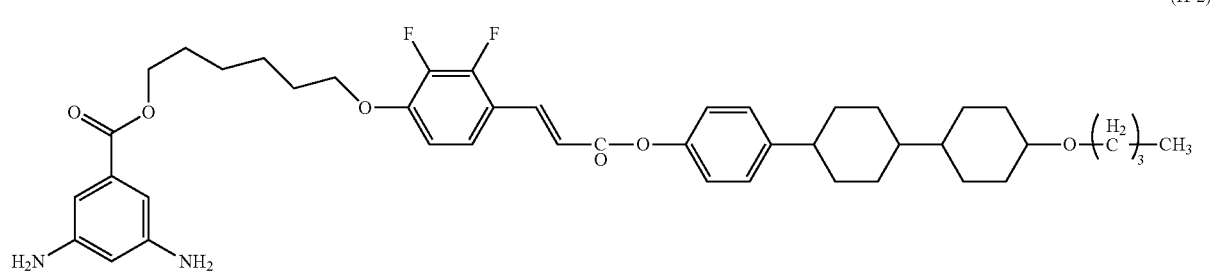

(H-2)

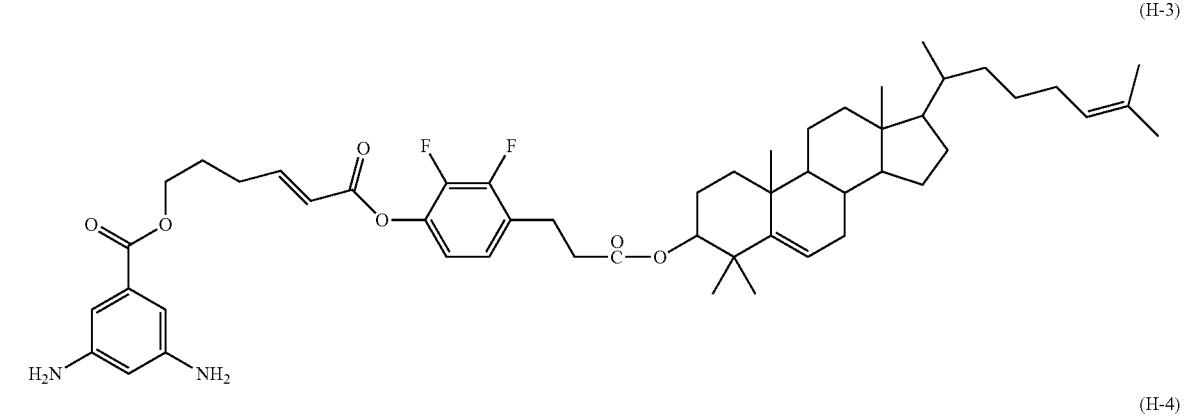

(H-3)

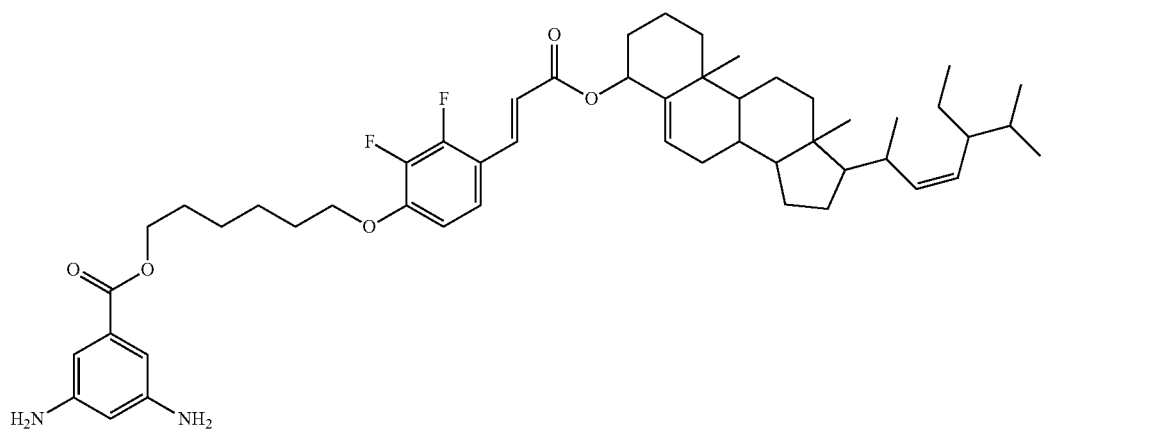

(H-4)

In the method of manufacturing a liquid crystal display device of Embodiment 3, the first alignment film 22 including a polymer compound having side chains is formed on one (specifically, the substrate 20) of a pair of substrates, and the second alignment film 32 is formed on the other (specifically, the substrate 30) of the pair of substrates, the pair of substrates 20 and 30 are arranged so that the first alignment film 22 and the second alignment film 32 oppose each other, and the liquid crystal layer 40 including liquid crystal molecules 41 having negative dielectric constant anisotropy is sealed between the first alignment film 22 and the second alignment film 32, and then, the side chain in the polymer compound is crosslinked or polymerized to pretilt the liquid crystal molecules 41.

Also, since the side chain has the characteristic as described above, it is possible to promote the pretilt of the liquid crystal molecules by the side chain as a result of the side chain being aligned in a direction dependent on a direction of the electric field (e.g., a direction generally perpendicular with the direction of the electric field) when an electric field for pretilt is applied to the liquid crystal molecules 41. As a result, it is possible to reduce a value of the voltage that is applied to the liquid crystal layer in order to pretilt the liquid crystal molecules constituting the liquid crystal layer in the process of manufacturing the liquid crystal display device.

Example 1

Example 1 relates to the liquid crystal display device (the liquid crystal display element) and the method of manufacturing the same according to the first aspect to Example 3 of the present disclosure, and the method of manufacturing the liquid crystal display device (the liquid crystal display element) according to the first to fourth aspects of the present disclosure. In Example 1, the liquid crystal display device (the liquid crystal display element) illustrated in FIG. 1 was prepared according to the following procedure.

First, the TFT substrate 20 and the CF substrate 30 were prepared. A substrate in which a pixel electrode 20B formed of ITO having a slit pattern (with a line width of 4 μm and a line spacing of 4 μm); the slit portion 21) was formed on one surface of a glass substrate 20A having a thickness of 0.7 mm was used as the TFT substrate 20. Further, a substrate in which an opposing electrode 30B formed of ITO was formed over an entire surface on a color filter of a glass substrate 30A having a thickness of 0.7 mm having the color filter formed therein was used as the CF substrate 30. An oblique electric field was applied between the TFT substrate 20 and the CF substrate 30 by the slit pattern formed in the pixel electrode 20B.

Meanwhile, an alignment film material for the first alignment film and the second alignment film was prepared.

In this case, for example, first, a compound having a crosslinkable functional group shown in Formula (A-8), a compound having a vertical alignment induction structure portion shown in Formula (C-1) or (C-2), various compounds having dielectric anisotropy shown in Table 1 (compounds constituting the second side chain), and tetracarboxylic acid dianhydride shown in Formula (E-2) as the diamine compound were dissolved in N-methyl-2-pyrrolidone (NMP) at a molar ratio of 12.5%, 2.5%, 35%, and 50%. Further, in the various compounds having dielectric anisotropy shown in Table 1 (compounds constituting the second side chain), m-phenylene diamine was bonded to "Z1."

Or, the compound having a crosslinkable functional group shown in Formula (A-8), the compound having a vertical alignment induction structure portion shown in Formula (C-1), the compound having dielectric anisotropy shown in Formula (H-1) (a compound constituting the side chain in the third aspect of the present disclosure), and tetracarboxylic acid dianhydride shown in Formula (E-2) as the diamine compound were dissolved in N-methyl-2-pyrrolidone (NMP) at a molar ratio of 7.5%, 2.5%, 40%, and 50%.

Subsequently, the respective solutions were caused to react for 6 hours at 60° C. and then a large excess of pure water was poured into the solution after the reaction to precipitate a reaction product. Then, a precipitated solid was separated, washed with pure water, and dried for 15 hours at 40° C. under reduced pressure. Accordingly, polyamic acid that is a polymer compound precursor as the compound before an alignment process was synthesized. Lastly, 3.0 grams of the obtained polyamic acid was dissolved in the NMP to obtain a solution having a solid concentration of 3% by weight, which was then filtered by a 0.2 μm filter. Thus, the alignment film material for forming the alignment films 22 and 32 (Examples 1-A to 1-M) was obtained.

The compound constituting the second side chain can be obtained by introducing a predetermined group to the ring X, R, $A_1$, $A_2$, or $Z_1$ in Structural Formula (11) or (12), but the introduction of such a group may be performed by a known general organic synthesis method. A typical synthesis example may include a method described in "Synthesis and Reaction of Organic Compound, New Experimental Chemistry Course 14," Maruzen Co., Ltd. (1978) or "Organic Synthesis I~VIII, Experimental Chemistry Courses 19 to 26, The Fourth Edition," Maruzen Co., Ltd. 1991).

Specifically, for example, arylboronic acid (21), and a compound (22) synthesized using a known method are caused to react under the presence of a catalyst such as a carbonate aqueous solution or tetrakis(triphenylphosphine) palladium to synthesize a compound (1A). Or, the compound (1A) may be synthesized by causing n-butyl lithium and then zinc chloride to react to a compound (23) synthesized using a known method and causing the compound (22) to react under the presence of a catalyst such as dichlorobis(triphenylphosphine) palladium. Further, "MSG" indicates mesogen.

Or, a compound (24) is reduced with a reducing agent such as sodium borohydride to obtain a compound (25). This compound (25) is halogenated with hydrobromic acid to obtain a compound (26). Also, the compound (26) is caused to react to a compound (27) to synthesize the compound (1B) under the presence of potassium carbonate, thereby obtaining a compound constituting the second side chain.

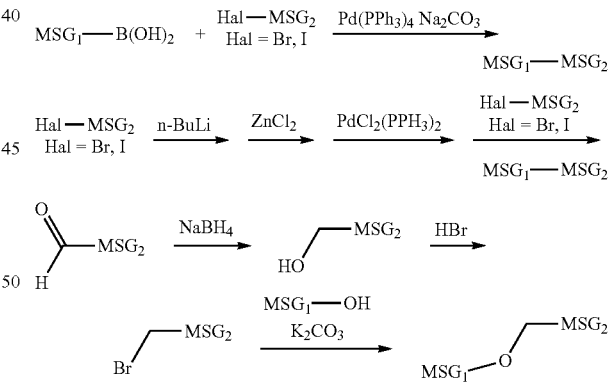

Subsequently, the prepared alignment film material (see Table 1) was applied to each of the TFT substrate 20 and the CF substrate 30 using a spin coater, and then the coated film was dried for 80 seconds by a hot plate at 80° C. Then, the TFT substrate 20 and the CF substrate 30 were heated for 1 hour in an oven at 200° C. under a nitrogen gas atmosphere. Accordingly, the first alignment film 22 having a thickness of 90 nm was formed on the pixel electrode 20B, and the CF substrate 30 in which a thickness of the second alignment film 32 was 90 nm was prepared on the opposing electrode 30B.

Next, an ultraviolet-curable resin containing silica particles having a particle diameter of 3.5 μm was applied to a peripheral edge of the pixel portion on the CF substrate 30 to form a sealing portion, and a liquid crystal material including MLC-7029 (manufactured by Merck & co., Inc.) that is negative liquid crystal having negative dielectric constant anisotropy was instilled into a portion surrounded by the sealing portion. Then, the TFT substrate 20 and the CF substrate 30 were bonded and the sealing portion was cured. Subsequently, it was heated for 1 hour in an oven at 120° C. to completely cure the sealing portion. Thus, various liquid crystal display devices including a liquid crystal cell in which the liquid crystal layer 40 was sealed were able to be completed.

Then, a rectangular wave AC electric field (60 Hz) having an rms voltage of 5 volts, 10 volts and 20 volts was applied to the liquid crystal cell prepared as described above, and in this state, a uniform 500 mJ ultraviolet ray (measured at a 365 nm wavelength) was applied to cause the compounds before an alignment process in the alignment films 22 and 32 to react. Accordingly, the alignment films 22 and 32 including the compound after an alignment process were formed in the TFT substrate 20 and the CF substrate 30. Thus, the liquid crystal display device (the liquid crystal display element) in which the liquid crystal molecules 41A and 41B on the side of the TFT substrate 20 and the CF substrate 30 had various pretilt angles was able to be completed (see FIG. 1). Finally, a pair of polarizing plates were bonded to the outside of the liquid crystal display device in such a manner that absorption axes were perpendicular to each other.

As Comparative Examples 1-A and 1-B, an alignment film material was prepared in the same manner as the alignment film material in the example except that used materials were different, as shown in Table 1. Specifically, a compound having a crosslinkable functional group shown in Formula (A-8), a compound having a vertical alignment induction structure portion shown in Formula (C-1) or (C-2), 1,4-phenylene diamine shown in Formula (J-1) as a modifier, and tetracarboxylic acid dianhydride shown in Formula (E-2) were dissolved in N-methyl-2-pyrrolidone (NMP) at a molar ratio of 12.5%, 2.5%, 35%, and 50% and prepared to prepare the liquid crystal display device as described above.

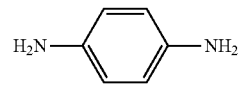

(J-1)

For a liquid crystal display device (a liquid crystal display element) using these alignment film materials, a response time (a rising time of image display) and a pretilt angle θ were measured. A result is shown in Table 2.

When the response time was measured, a driving voltage (7.5 volts) was applied between the pixel electrode 20B and the opposing electrode 30B, and a time (a rising time of the image display) until luminance reached 90% from 10% with gradation according to the driving voltage was measured using LCD5200 (Manufactured by Otsuka Electronics Co., Ltd.) as a measuring apparatus. Also, if the rising time was 10 milliseconds or less, the response time was excellent and "response O" is indicated in Table 1. On the other hand, if the rising time exceeded 10 milliseconds, the response time was bad and "response x" is indicated in Table 1.

Further, when the pretilt angle θ of the liquid crystal molecules 41 was examined, measurement was performed using a crystal rotation method using a He—Ne laser light according to a known method (a method described in T. J. Scheffer, et al., J. Appl. Phys., vol. 19, pp. 2013, 1980). Further, the pretilt angle θ was a tilt angle of the director D of the liquid crystal molecules 41 (41A and 41B) with respect to a Z direction in a state in which the driving voltage was off when a direction perpendicular to surfaces of the glass substrates 20A and 30A (a normal direction) was Z, as described above and illustrated in FIG. 4.

TABLE 1

| | Crosslinking material (diamine compound) | | Compound for vertical alignment | | Tetracarboxylic acid dianhydride | | Main chain spacer | | Compound constituting second side chain (or side chain) | |
|---|---|---|---|---|---|---|---|---|---|---|
| | Material | Molar ratio | Material | Molar ratio | Material | Molar ratio | Material | Molar ratio | Material | Molar ratio |
| Example | | | | | | | | | | |
| 1-A | A-8 | 12.5 | C-1 | 2.5 | E-2 | 50 | | | G-1 | 35 |
| 1-B | A-8 | 12.5 | C-2 | 2.5 | E-2 | 50 | | | G-22 | 35 |
| 1-C | A-8 | 12.5 | C-1 | 2.5 | E-2 | 50 | | | G-10 | 35 |
| 1-D | A-8 | 12.5 | C-1 | 2.5 | E-2 | 50 | | | G-18 | 35 |
| 1-E | A-8 | 12.5 | C-1 | 2.5 | E-2 | 50 | | | G-32 | 35 |
| 1-F | A-8 | 12.5 | C-1 | 2.5 | E-2 | 50 | | | G-35 | 35 |
| 1-G | A-8 | 12.5 | C-1 | 2.5 | E-2 | 50 | | | G-41 | 35 |
| 1-H | A-8 | 12.5 | C-1 | 2.5 | E-2 | 50 | | | G-49 | 35 |
| 1-I | A-8 | 12.5 | C-1 | 2.5 | E-2 | 50 | | | G-57 | 35 |
| 1-J | A-8 | 12.5 | C-1 | 2.5 | E-2 | 50 | | | G-65 | 35 |
| 1-K | A-8 | 12.5 | C-1 | 2.5 | E-2 | 50 | | | G-73 | 35 |
| 1-L | A-8 | 12.5 | C-1 | 2.5 | E-2 | 50 | | | G-85 | 35 |
| 1-M | A-8 | 7.5 | C-1 | 2.5 | E-2 | 50 | | | H-1 | 40 |
| Comparative Example | | | | | | | | | | |
| 1-A | A-8 | 12.5 | C-1 | 2.5 | E-2 | 50 | J-1 | 35 | | |
| 1-B | A-8 | 12.5 | C-2 | 2.5 | E-2 | 50 | J-1 | 35 | | |

TABLE 2

| | Example | | | | | | | |
|---|---|---|---|---|---|---|---|---|
| | 1-A | | 1-B | | 1-C | | 1-D | |
| Applied voltage (V) | θ | response | θ | response | θ | response | θ | response |
| 5 | 2.2 | ○ | 1.6 | ○ | 1.8 | ○ | 1.8 | ○ |
| 10 | 3.5 | ○ | 3.0 | ○ | 2.4 | ○ | 2.4 | ○ |
| 20 | 5.5 | ○ | 4.8 | ○ | 3.0 | ○ | 3.6 | ○ |

| | Example | | | | | | | |
|---|---|---|---|---|---|---|---|---|
| | 1-E | | 1-F | | 1-G | | 1-H | |
| Applied voltage (V) | θ | response | θ | response | θ | response | θ | response |
| 5 | 2.2 | ○ | 2.0 | ○ | 2.0 | ○ | 2.0 | ○ |
| 10 | 2.7 | ○ | 3.2 | ○ | 2.8 | ○ | 2.4 | ○ |
| 20 | 4.5 | ○ | 4.2 | ○ | 3.8 | ○ | 3.6 | ○ |

| | Example | | | | | | | |
|---|---|---|---|---|---|---|---|---|
| | 1-I | | 1-J | | 1-K | | 1-L | |
| Applied voltage (V) | θ | response | θ | response | θ | response | θ | response |
| 5 | 2.0 | ○ | 2.0 | ○ | 1.7 | ○ | 2.2 | ○ |
| 10 | 2.4 | ○ | 2.3 | ○ | 2.8 | ○ | 3.2 | ○ |
| 20 | 3.5 | ○ | 3.8 | ○ | 3.1 | ○ | 3.9 | ○ |

| | Example 1-M | |
|---|---|---|
| Applied voltage (V) | θ | response |
| 5 | 1.5 | ○ |
| 10 | 3.0 | ○ |
| 20 | 4.5 | ○ |

| | Comparative Example | | | |
|---|---|---|---|---|
| | 1-A | | 1-B | |
| Applied voltage (V) | θ | response | θ | response |
| 5 | 0.4 | x | 0.7 | x |
| 10 | 0.7 | x | 0.9 | x |
| 20 | 1.5 | ○ | 2.0 | ○ |

When Examples 1-A to 1-M and Comparative Examples 1-A and 1-B were compared, in Comparative Examples 1-A and 1-B, a response time was bad when the applied voltage at the time of the pretilt process was 5 volts and 10 volts and excellent at 20 volts, while in Examples 1-A to 1-M, the response time was excellent even when the applied voltage at the time of the pretilt process was 5 volts. Further, when the applied voltage was the same, in Examples 1-A to 1-M, a greater pretilt angle θ was able to be obtained as compared with Comparative Examples 1-A and 1-B. In other words, it was possible to realize the pretilt at a relatively lower voltage and to perform the pretilt with a more inexpensive power supply in which a high voltage is unnecessary. Also, it was found that it is possible to manufacture a liquid crystal display device capable of easily improving a response characteristic without using a large-scale manufacture apparatus.

While the present disclosure has been described above using the preferred embodiments and examples, the present disclosure is not limited to such embodiments and the like and various modifications are possible. For example, while the liquid crystal display device (the liquid crystal display element) in the VA mode has been described in the embodiments and examples, the present disclosure is not necessarily limited thereto, and may be applied to other display modes, such as an ECB mode (a mode of positive liquid crystal in horizontal alignment; with no twist), an IPS (In Plane Switching) mode, an FFS (Fringe Field Switching) mode, or an OCB (Optically Compensated Bend) mode. The same effects can also be obtained in this case. However, in the present disclosure, it is possible to exhibit an effect of particularly high response characteristic improvement in the VA mode as compared with the IPS mode or the FFS mode, unlike a case in which the pretilt process is not performed.

Further, while only the transmission type liquid crystal display device (liquid crystal display element) has been described in the embodiments and examples, the liquid crystal display device in the present disclosure is not necessarily limited to the transmission type and, for example, may be of a reflective type. When the liquid crystal display device (the liquid crystal display element) is of a reflection type, a pixel electrode is formed of an electrode material having light reflectivity, such as aluminum.

In the liquid crystal display device described above, the alignment regulation portion is provided only in the first substrate, but a first alignment regulation portion (a first slit portion) may be provided in the first substrate and a second alignment regulation portion (a second slit portion) may be provided in the second substrate. An example of such a liquid crystal display device may include a liquid crystal display device described below. That is, a liquid crystal display device may have a configuration in which a plurality of pixels are arranged, each pixel includes:
a first substrate and a second substrate,
a first electrode formed on an opposing surface of the first substrate opposing the second substrate,
a first alignment regulation portion provided in the first electrode,
a first alignment film that covers the first electrode, the first alignment regulation portion, and the opposing surface of the first substrate,
a second electrode formed on an opposing surface of the second substrate opposing the first substrate,
a second alignment regulation portion provided in the second electrode,
a second alignment film that covers the second electrode, the second alignment regulation portion, and the opposing surface of the second substrate, and
a liquid crystal layer provided between the first alignment film and the second alignment film and including liquid crystal molecules,
in each pixel, long axes of a group of liquid crystal molecules in a liquid crystal layer are located in substantially the same virtual plane, in a central region of an overlap region in which a projection image of a region surrounded by an edge portion of the first electrode and the first alignment regulation portion and a projection image of a region surrounded by an edge portion of the second electrode and the second alignment regulation portion overlap, and the liquid crystal molecules can be pretilted by the first alignment film. Here, when a central region of the overlap region is viewed from a normal direction of the second substrate, long axes of a group of liquid crystal molecules occupying the central region of the overlap region along the normal direction of the second substrate (specifically, a group of liquid crystal molecules occupying a small columnar region from the first substrate to the second substrate) are located in substantially the same virtual vertical plane.

It should be understood by those skilled in the art that various modifications, combinations, sub-combinations and alterations may occur depending on design requirements and other factors insofar as they are within the scope of the appended claims or the equivalents thereof.

Additionally, the present application may also be configured as below.

[1] <<Liquid Crystal Display Device (1-A)$^{th}$ Aspect>>
A liquid crystal display device including
  a liquid crystal display element including
  a first alignment film and a second alignment film provided on opposing surfaces of a pair of substrates, and
  a liquid crystal layer arranged between the first alignment film and the second alignment film and including crystal molecules having negative dielectric constant anisotropy,
wherein at least the first alignment film includes a compound in which a polymer compound having a first side chain and a second side chain is crosslinked or polymerized,
wherein the first side chain has a crosslinkable functional group or a polymerizable functional group,
wherein the second side chain has a structure inducing dielectric anisotropy, and
wherein the liquid crystal molecules are pretilted by the first alignment film.

[2] <<Liquid Crystal Display Device (1-B)$^{th}$ Aspect>>
A liquid crystal display device including
  a liquid crystal display element including
  a first alignment film and a second alignment film provided on opposing surfaces of a pair of substrates, and
  a liquid crystal layer arranged between the first alignment film and the second alignment film and including crystal molecules having negative dielectric constant anisotropy,
wherein at least the first alignment film includes a compound in which a polymer compound having a first side chain and a second side chain is crosslinked or polymerized,
wherein the first side chain has a crosslinkable functional group or a polymerizable functional group,
wherein the second side chain has a dipole moment in a direction perpendicular to a long axis of the second side chain, and has a structure inducing spontaneous polarization, and
wherein the liquid crystal molecules are pretilted by the first alignment film.

[3] <<Liquid Crystal Display Device (1-C)$^{th}$ Aspect>>
A liquid crystal display device including
  a liquid crystal display element including
  a first alignment film and a second alignment film provided on opposing surfaces of a pair of substrates, and
  a liquid crystal layer arranged between the first alignment film and the second alignment film and including crystal molecules having negative dielectric constant anisotropy,
wherein at least the first alignment film includes a compound in which a polymer compound having a first side chain and a second side chain is crosslinked or polymerized,
wherein the first side chain has a crosslinkable functional group or a polymerizable functional group,
wherein the second side chain has a dielectrically negative component, and
wherein the liquid crystal molecules are pretilted by the first alignment film.

[4] The liquid crystal display device according to [3], wherein the dielectrically negative component is one of a halogen atom, —CN, —OCF$_3$, —CF$_3$, —CHF$_2$, —CH$_2$F, —OCF$_2$CHF$_2$ and —OCF$_2$CHFCF$_3$.

[5] <<Liquid Crystal Display Device (1-D)$^{th}$ Aspect>>
A liquid crystal display device including
  a liquid crystal display element including
  a first alignment film and a second alignment film provided on opposing surfaces of a pair of substrates, and
  a liquid crystal layer arranged between the first alignment film and the second alignment film and including crystal molecules having negative dielectric constant anisotropy,
wherein at least the first alignment film includes a compound in which a polymer compound having a first side chain and a second side chain is crosslinked or polymerized,
wherein the first side chain has a crosslinkable functional group or a polymerizable functional group,
wherein the second side chain has the following Structural Formula (11) or (12), and
wherein the liquid crystal molecules are pretilted by the first alignment film:

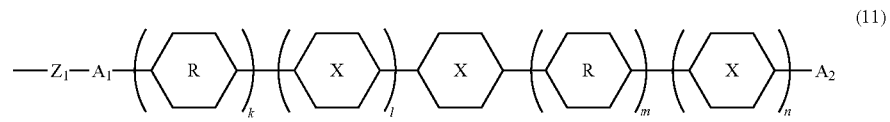

(11)

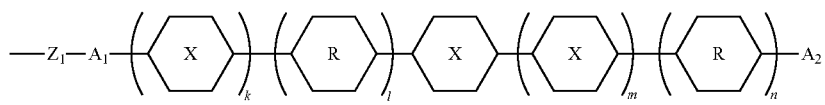

(12)

where a ring R is represented by one of the following formulae:

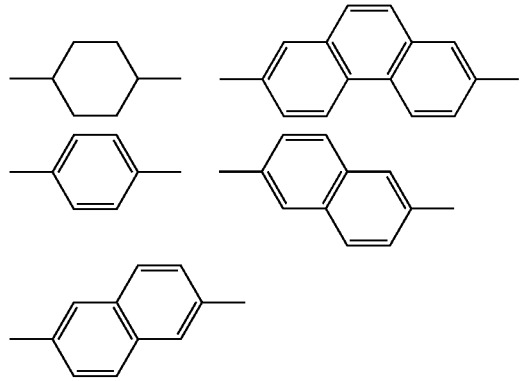

a ring X is represented by one of the following formulae:

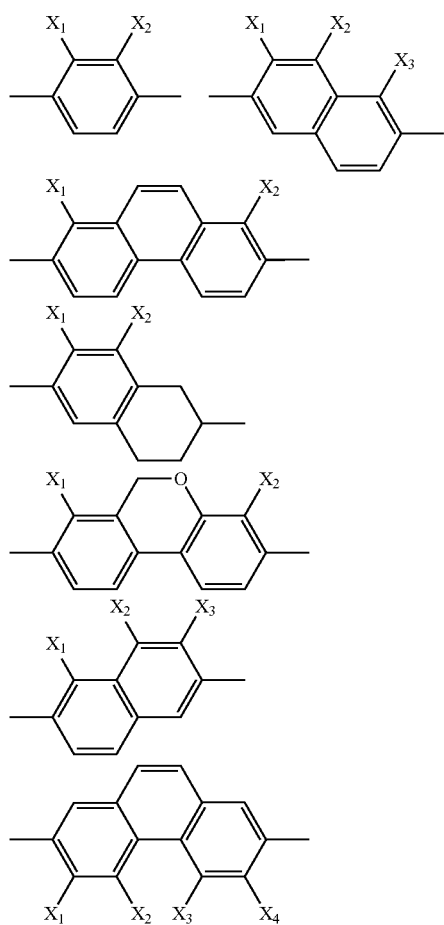

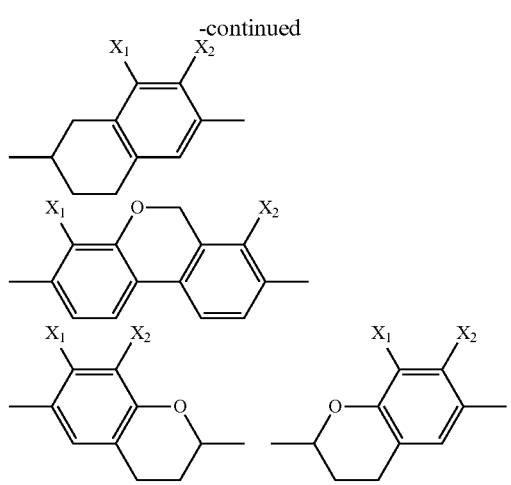

$Z_1$ represents one of a single bond, —O—, —CH$_2$O—, —OCH$_2$—, —COO— and —COO—, each of $A_1$ and $A_2$ independently represents a hydrogen atom or an unsubstituted alkyl group having 0 to 15 carbon atoms, and in the alkyl group, any non-adjacent —(CH$_2$)— may be substituted by —O—, —S— or —CO—, and any —(CH$_2$)— may be substituted by —CH=CH— or —C≡C—, $X_1$ represents one of a halogen atom, —CN, —OCF$_3$, —CF$_3$, —CHF$_2$, —CH$_2$F, —OCF$_2$CHF$_2$ or —OCF$_2$CHFCF$_3$, each of $X_2$, $X_3$ and $X_4$ independently represents a hydrogen atom, a halogen atom, —CN, —OCF$_3$, —CF$_3$, —CHF$_2$, —CH$_2$F, —OCF$_2$CHF$_2$ or —OCF$_2$CHFCF$_3$, and each of k, l, m, and n independently represents 0 or 1.

[6] <<Liquid Crystal Display Device (2-A)$^{th}$ Aspect>>

A liquid crystal display device including
  a liquid crystal display element including
  a first alignment film and a second alignment film provided on opposing surfaces of a pair of substrates, and
  a liquid crystal layer arranged between the first alignment film and the second alignment film and including crystal molecules having negative dielectric constant anisotropy,
  wherein at least the first alignment film includes a compound in which a polymer compound having a first side chain and a second side chain is deformed,
  wherein the first side chain has a photosensitive functional group,
  wherein the second side chain has a structure inducing dielectric anisotropy, and
  the liquid crystal molecules are pretilted by the first alignment film.

[7] <<Liquid Crystal Display Device (2-B)$^{th}$ Aspect>>

A liquid crystal display device including
  a liquid crystal display element including
  a first alignment film and a second alignment film provided on opposing surfaces of a pair of substrates, and a liquid crystal layer arranged between the first alignment film and the second alignment film and including crystal molecules having negative dielectric constant anisotropy, wherein at least the first alignment film includes a compound in which a polymer compound having a first side chain and a second side chain is deformed, wherein the first side chain has a photosensitive functional group, wherein the second side chain has a dipole moment in a direction perpendicular to a long axis of the second side chain, and has a structure inducing spontaneous polarization, and wherein the liquid crystal molecules are pretilted by the first alignment film.

[8] <<Liquid Crystal Display Device (2-C)$^{th}$ Aspect>>
A liquid crystal display device including
  a liquid crystal display element including
  a first alignment film and a second alignment film provided on opposing surfaces of a pair of substrates, and
  a liquid crystal layer arranged between the first alignment film and the second alignment film and including crystal molecules having negative dielectric constant anisotropy,
  wherein at least the first alignment film includes a compound in which a polymer compound having a first side chain and a second side chain is deformed,
  wherein the first side chain has a photosensitive functional group,
  wherein the second side chain has a dielectrically negative component, and
  wherein the liquid crystal molecules are pretilted by the first alignment film.

[9] The liquid crystal display device according to [8], wherein the dielectrically negative component is one of a halogen atom, —CN, —OCF$_3$, —CF$_3$, —CHF$_2$, —CH$_2$F, —OCF$_2$CHF$_2$ and —OCF$_2$CHFCF$_3$.

[10] <<Liquid Crystal Display Device (2-D)$^{th}$ Aspect>>
A liquid crystal display device including
  a liquid crystal display element including
  a first alignment film and a second alignment film provided on opposing surfaces of a pair of substrates, and
  a liquid crystal layer arranged between the first alignment film and the second alignment film and including crystal molecules having negative dielectric constant anisotropy,
  wherein at least the first alignment film includes a compound in which a polymer compound having a first side chain and a second side chain is deformed,
  wherein the first side chain has a photosensitive functional group,
  wherein the second side chain has the following Structural Formula (11) or (12), and
  wherein the liquid crystal molecules are pretilted by the first alignment film:

$$—Z_1—A_1—\left(\underset{k}{R}\right)\left(\underset{l}{X}\right)\left(X\right)\left(\underset{m}{R}\right)\left(\underset{n}{X}\right)—A_2 \quad (11)$$

$$—Z_1—A_1—\left(\underset{k}{X}\right)\left(\underset{l}{R}\right)\left(X\right)\left(\underset{m}{X}\right)\left(\underset{n}{R}\right)—A_2 \quad (12)$$

where a ring R is represented by one of the following formulae:

a ring X is represented by one of the following formulae:

-continued

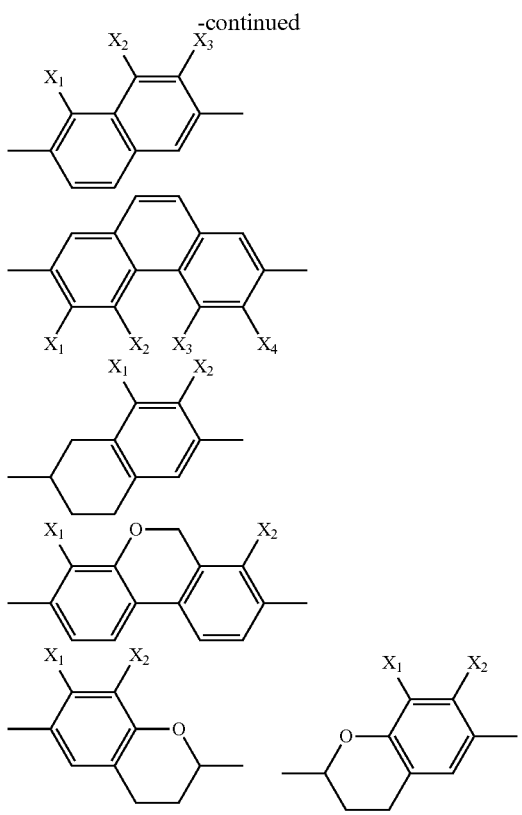

$Z_1$ represents one of a single bond, —O—, —CH$_2$O—, —OCH$_2$—, —COO— and —COO—, each of $A_1$ and $A_2$ independently represents a hydrogen atom or an unsubstituted alkyl group having 0 to 15 carbon atoms, and in the alkyl group, any non-adjacent —(CH$_2$)— may be substituted by —O—, —S— or —CO—, and any —(CH$_2$)— may be substituted by —CH═CH— or —C≡C—, $X_1$ represents one of a halogen atom, —CN, —OCF$_3$, —CF$_3$, —CHF$_2$, —CH$_2$F, —OCF$_2$CHF$_2$ or —OCF$_2$CHFCF$_3$, each of $X_2$, $X_3$ and $X_4$ independently represents a hydrogen atom, a halogen atom, —CN, —OCF$_3$, —CF$_3$, —CHF$_2$, —CH$_2$F, —OCF$_2$CHF$_2$ or —OCF$_2$CHFCF$_3$, and each of k, l, m, and n independently represents 0 or 1.

[11] <<Liquid Crystal Display Device (3-A)$^{th}$ Aspect>>
A liquid crystal display device including
a liquid crystal display element including
a first alignment film and a second alignment film provided on opposing surfaces of a pair of substrates, and
a liquid crystal layer arranged between the first alignment film and the second alignment film and including crystal molecules having negative dielectric constant anisotropy,
wherein at least the first alignment film includes a compound in which a polymer compound having a side chain is crosslinked or polymerized,
wherein the side chain has a crosslinkable functional group or a polymerizable functional group, and has a structure inducing dielectric anisotropy, and
wherein the liquid crystal molecules are pretilted by the first alignment film.

[12] <<Liquid Crystal Display Device (3-B)$^{th}$ Aspect>>
A liquid crystal display device including
a liquid crystal display element including
a first alignment film and a second alignment film provided on opposing surfaces of a pair of substrates, and
a liquid crystal layer arranged between the first alignment film and the second alignment film and including crystal molecules having negative dielectric constant anisotropy,
wherein at least the first alignment film includes a compound in which a polymer compound having a side chain is crosslinked or polymerized,
wherein the side chain has a crosslinkable functional group or a polymerizable functional group, has a dipole moment in a direction perpendicular to a long axis of the side chain, and has a structure inducing spontaneous polarization, and
wherein the liquid crystal molecules are pretilted by the first alignment film.

[13] <<Liquid Crystal Display Device (3-C)$^{th}$ Aspect>>
A liquid crystal display device including
a liquid crystal display element including
a first alignment film and a second alignment film provided on opposing surfaces of a pair of substrates, and
a liquid crystal layer arranged between the first alignment film and the second alignment film and including crystal molecules having negative dielectric constant anisotropy,
wherein at least the first alignment film includes a compound in which a polymer compound having a side chain is crosslinked or polymerized,
wherein the side chain has a crosslinkable functional group or a polymerizable functional group, and has a dielectrically negative component, and
wherein the liquid crystal molecules are pretilted by the first alignment film.

[14] The liquid crystal display device according to [13], wherein the dielectrically negative component is one of a halogen atom, —CN, —OCF$_3$, —CF$_3$, —CHF$_2$, —CH$_2$F, —OCF$_2$CHF$_2$ and —OCF$_2$CHFCF$_3$.

[15] <<Liquid Crystal Display Device (3-D)$^{th}$ Aspect>>
A liquid crystal display device including
a liquid crystal display element including
a first alignment film and a second alignment film provided on opposing surfaces of a pair of substrates, and
a liquid crystal layer arranged between the first alignment film and the second alignment film and including crystal molecules having negative dielectric constant anisotropy,
wherein at least the first alignment film includes a compound in which a polymer compound having a side chain is crosslinked or polymerized,
wherein the side chain has a crosslinkable functional group or a polymerizable functional group, and has the following Structural Formula (13), (14), (15) or (16), and
wherein the liquid crystal molecules are pretilted by the first alignment film:

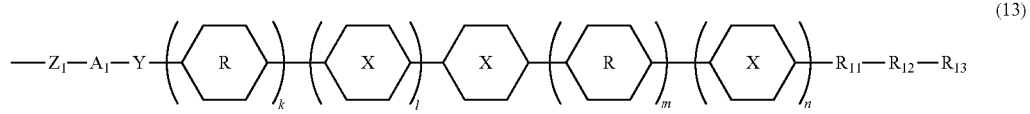

(13)

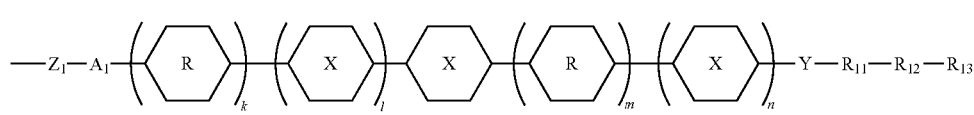

(14)

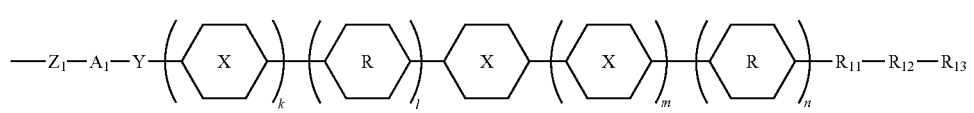

(15)

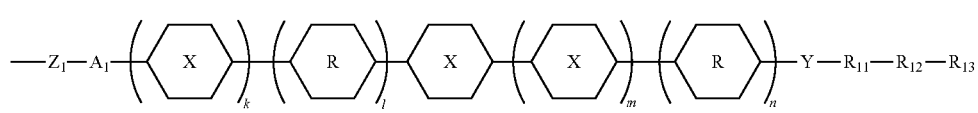

(16)

where a ring R is represented by one of the following formulae:

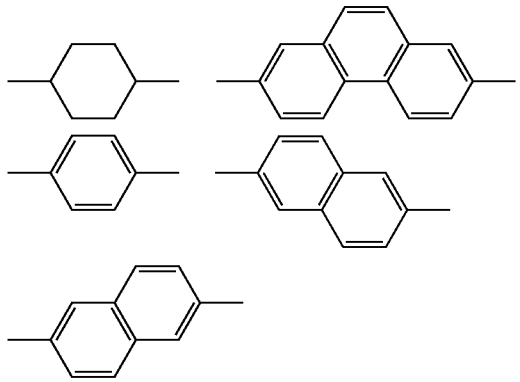

a ring X is represented by one of the following formulae:

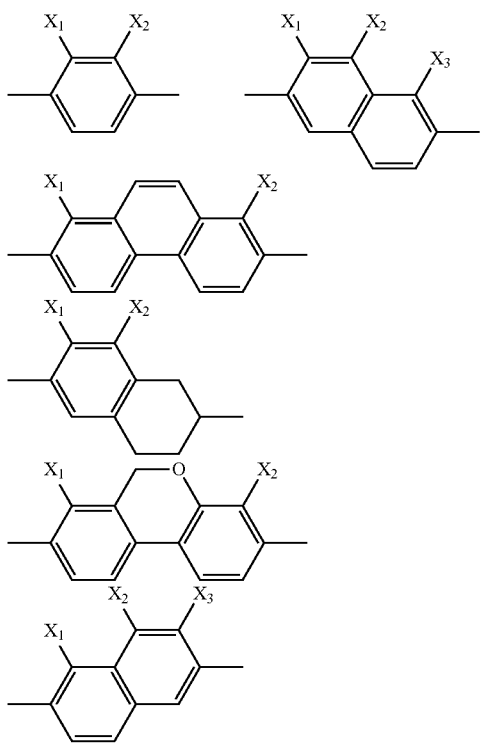

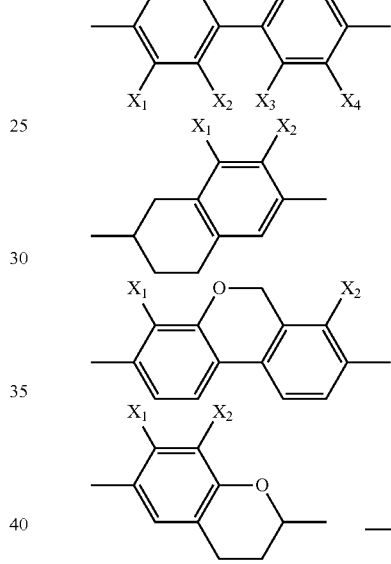

$Z_1$ represents one of a single bond, —O—, —CH$_2$O—, —OCH$_2$—, —COO— and —COO—, each of $A_1$ and $A_2$ independently represents a hydrogen atom or an unsubstituted alkyl group having 0 to 15 carbon atoms, and in the alkyl group, any non-adjacent —(CH$_2$)— may be substituted by —O—, —S— or —CO—, and any —(CH$_2$)— may be substituted by —CH=CH— or —C≡C—, $X_1$ represents one of a halogen atom, —CN, —OCF$_3$, —CF$_3$, —CHF$_2$, —CH$_2$F, —OCF$_2$CHF$_2$ or —OCF$_2$CHFCF$_3$, each of $X_2$, $X_3$ and $X_4$ independently represents a hydrogen atom, a halogen atom, —CN, —OCF$_3$, —CF$_3$, —CHF$_2$, —CH$_2$F, —OCF$_2$CHF$_2$ or —OCF$_2$CHFCF$_3$, each of k, l, m, and n independently represents 0 or 1, Y represents a crosslinkable functional group or a polymerizable functional group, $R_{11}$ represents a linear or branched divalent organic group including an ether group or an ester group having one or more carbon atoms, or at least one kind of bond group selected from the group consisting of ether, ester, ether ester, acetal, ketal, hemiacetal and hemiketal, $R_{12}$ represents a divalent organic group including a plurality of ring structures, and $R_{13}$ represents a hydrogen atom, a halogen atom, an alkyl group, an alkoxy group, a monovalent group having a carbonate group, or a derivative thereof

[16] <<Method of Manufacturing Liquid Crystal Display Device 1st Aspect>>

A method of manufacturing a liquid crystal display device including:

forming, on one of a pair of substrates, a first alignment film including a polymer compound having a first side chain having a crosslinkable functional group or a polymerizable functional group and a second side chain, and forming a second alignment film on the other of the pair of substrates, arranging the pair of substrates so that the first alignment film and the second alignment film oppose each other, and sealing a liquid crystal layer including liquid crystal molecules having negative dielectric constant anisotropy between the first alignment film and the second alignment film, and then crosslinking or polymerizing the first side chain in the polymer compound to pretilt the liquid crystal molecules, wherein the second side chain has a structure inducing dielectric anisotropy, wherein the second side chain has a dipole moment in a direction perpendicular to a long axis of the second side chain and has a structure inducing spontaneous polarization, wherein the second side chain has a dielectrically negative component, or wherein the second side chain has the following Structural Formula (11) or (12):

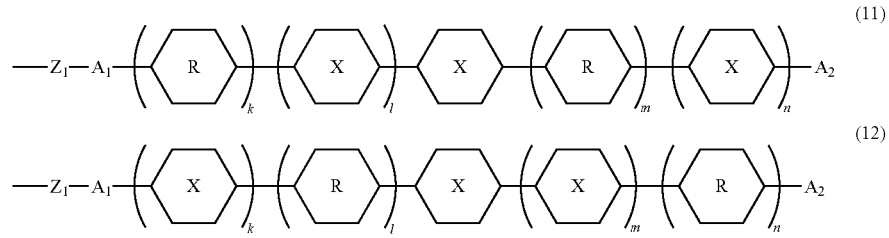

where a ring R is represented by one of the following formulae:

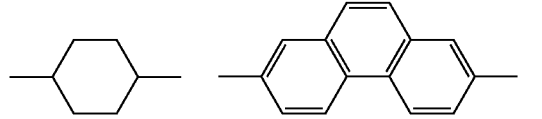

a ring X is represented by one of the following formulae:

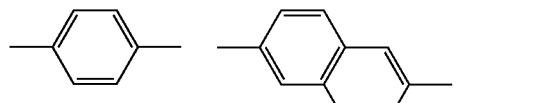

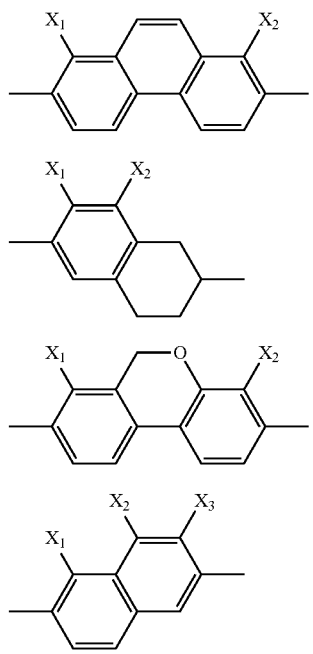

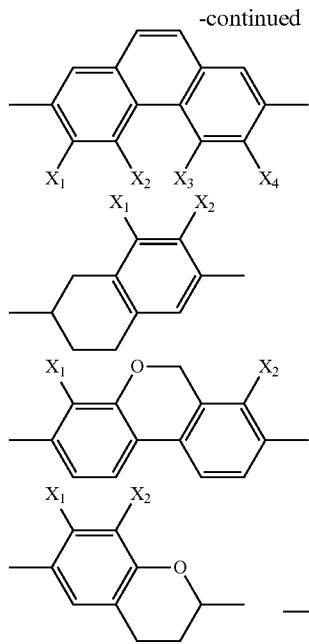

$Z_1$ represents one of a single bond, —O—, —$CH_2$O—, —O$CH_2$—, —COO— and —COO—, each of $A_1$ and $A_2$ independently represents a hydrogen atom or an unsubstituted alkyl group having 0 to 15 carbon atoms, and in the alkyl group, any non-adjacent —($CH_2$)— may be substituted by —O—, —S— or —CO—, and any —($CH_2$)— may be substituted by —CH=CH— or C≡C—, $X_1$ represents one of a halogen atom, —CN, —$OCF_3$, —$CF_3$, —$CHF_2$, —$CH_2F$, —$OCF_2CHF_2$ or —$OCF_2CHFCF_3$, each of $X_2$, $X_3$ and $X_4$ independently represents a hydrogen atom, a halogen atom, —CN, —$OCF_3$, —$CF_3$, —$CHF_2$, —$CH_2F$, —$OCF_2CHF_2$ or —$OCF_2CHFCF_3$, and each of k, l, m, and n independently represents 0 or 1.

[17] The method of manufacturing a liquid crystal display device according to [16], the method including applying an energy ray to crosslink or polymerize the first side chain of the polymer compound while aligning the liquid crystal molecules by applying a predetermined electric field to the liquid crystal layer.

[18] <<Method of Manufacturing Liquid Crystal Display Device $2^{nd}$ Aspect>>

A method of manufacturing a liquid crystal display device including:

forming, on one of a pair of substrates, a first alignment film including a polymer compound having a first side chain having a photosensitive functional group and a second side chain, and forming a second alignment film on the other of the pair of substrates, arranging the pair of substrates so that the first alignment film and the second alignment film oppose each other, and sealing a liquid crystal layer including liquid crystal molecules having negative dielectric constant anisotropy between the first alignment film and the second alignment film, and then deforming the first side chain in the polymer compound to pretilt the liquid crystal molecules, wherein the second side chain has a structure inducing dielectric anisotropy, wherein the second side chain has a dipole moment in a direction perpendicular to a long axis of the second side chain and has a structure inducing spontaneous polarization, wherein the second side chain has a dielectrically negative component, or wherein the second side chain has the following Structural Formula (11) or (12):

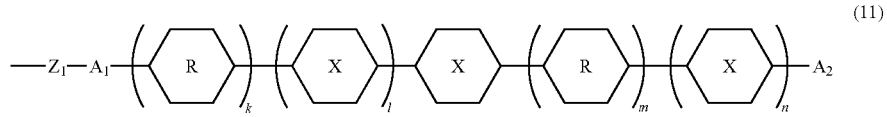

(11)

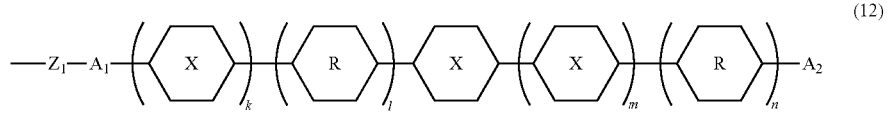

(12)

where a ring R is represented by one of the following formulae:

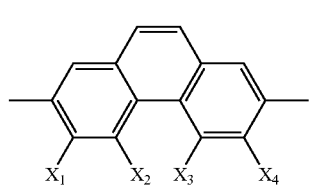

a ring X is represented by one of the following formulae:

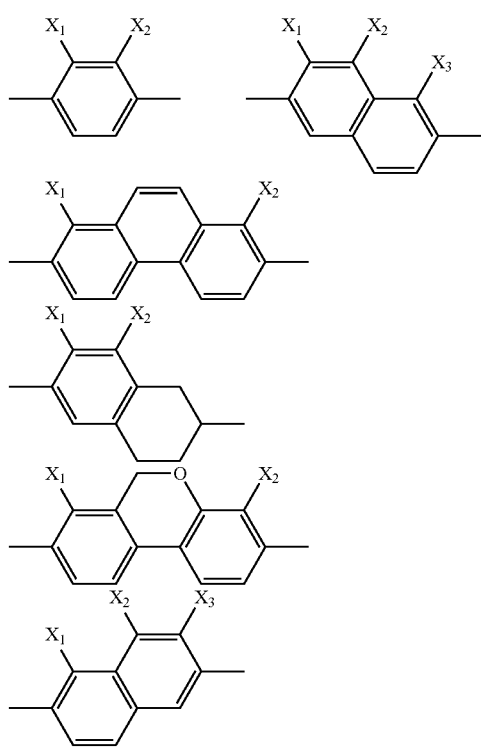

-continued

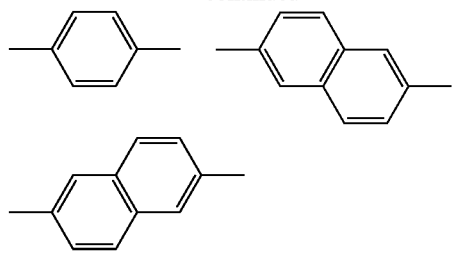

-continued

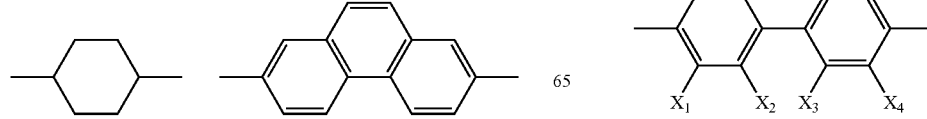

-continued

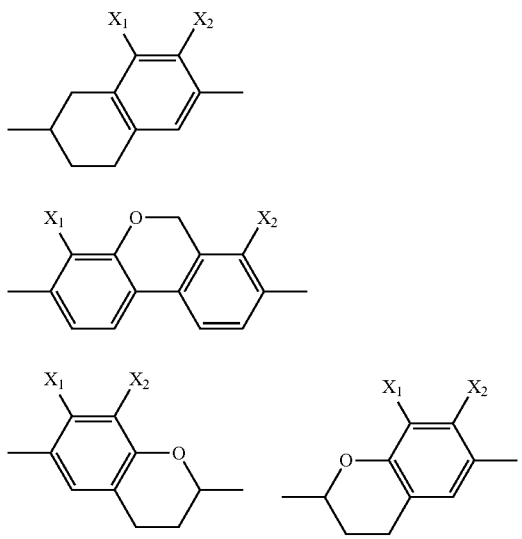

$Z_1$ represents one of a single bond, —O—, —CH$_2$O—, —OCH$_2$—, —COO— and —COO—, each of $A_1$ and $A_2$ independently represents a hydrogen atom or an unsubstituted alkyl group having 0 to 15 carbon atoms, and in the alkyl group, any non-adjacent —(CH$_2$)— may be substituted by —O—, —S— or —CO—, and any —(CH$_2$)— may be substituted by —CH═CH— or —C≡C—, $X_1$ represents one of a halogen atom, —CN, —OCF$_3$, —CF$_3$, —CHF$_2$, —CH$_2$F, —OCF$_2$CHF$_2$ or —OCF$_2$CHFCF$_3$, each of $X_2$, $X_3$ and $X_4$ independently represents a hydrogen atom, a halogen atom, —CN, —OCF$_3$, —CF$_3$, —CHF$_2$, —CH$_2$F, —OCF$_2$CHF$_2$ or —OCF$_2$CHFCF$_3$, and each of k, l, m, and n independently represents 0 or 1.

[19] The method of manufacturing a liquid crystal display device according to [18], the method including applying an energy ray to deform the first side chain of the polymer compound while aligning the liquid crystal molecules by applying a predetermined electric field to the liquid crystal layer.

[20] <<Method of Manufacturing Liquid Crystal Display Device 3$^{rd}$ Aspect>>

A method of manufacturing a liquid crystal display device including:

forming, on one of a pair of substrates, a first alignment film including a polymer compound having a side chain and forming a second alignment film on the other of the pair of substrates, arranging the pair of substrates so that the first alignment film and the second alignment film oppose each other, and sealing a liquid crystal layer including liquid crystal molecules having negative dielectric constant anisotropy between the first alignment film and the second alignment film, and then crosslinking or polymerizing the side chain in the polymer compound to pretilt the liquid crystal molecules, wherein the side chain has a crosslinkable functional group or a polymerizable functional group, and a structure inducing dielectric anisotropy, a dipole moment in a direction perpendicular to a long axis of the side chain and has a structure inducing spontaneous polarization, a dielectrically negative component, or the following Structural Formula (13), (14), (15) or (16):

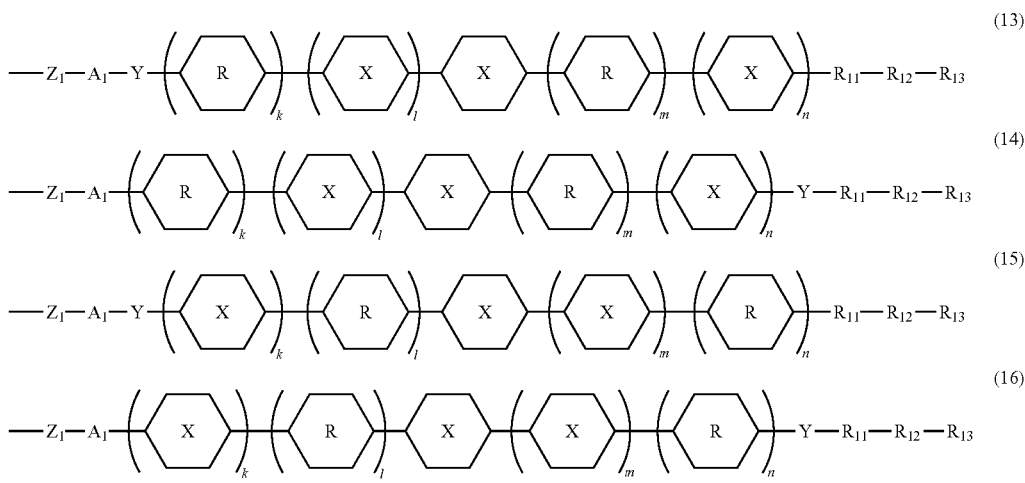

where a ring R is represented by one of the following formulae:

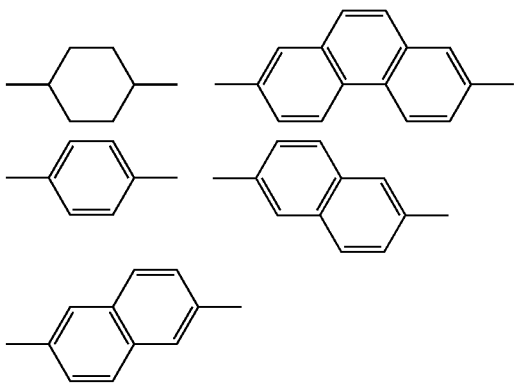

a ring X is represented by one of the following formulae:

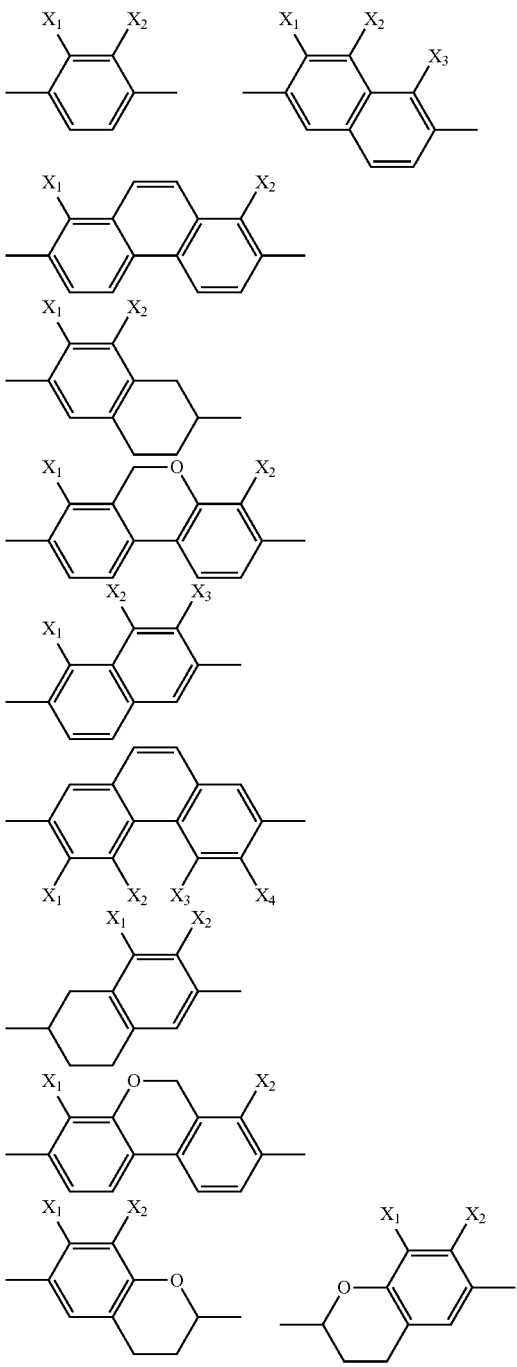

$Z_1$ represents one of a single bond, —O—, —CH$_2$O—, —OCH$_2$—, —COO— and —COO—, each of $A_1$ and $A_2$ independently represents a hydrogen atom or an unsubstituted alkyl group having 0 to 15 carbon atoms, and in the alkyl group, any non-adjacent —(CH$_2$)— may be substituted by —O—, —S— or —CO—, and any —(CH$_2$)— may be substituted by —CH=CH— or C≡C—, $X_1$ represents one of a halogen atom, —CN, —OCF$_3$, —CF$_3$, —CHF$_2$, —CH$_2$F, —OCF$_2$CHF$_2$ or —OCF$_2$CHFCF$_3$, each of $X_2$, $X_3$ and $X_4$ independently represents a hydrogen atom, a halogen atom, —CN, —OCF$_3$, —CF$_3$, —CHF$_2$, —CH$_2$F, —OCF$_2$CHF$_2$ or —OCF$_2$CHFCF$_3$, each of k, l, m, and n independently represents 0 or 1, Y represents a crosslinkable functional group or a polymerizable functional group, $R_{11}$ represents a linear or branched divalent organic group including an ether group or an ester group having one or more carbon atoms, or at least one kind of bond group selected from the group consisting of ether, ester, ether ester, acetal, ketal, hemiacetal and hemiketal, $R_{12}$ represents a divalent organic group including a plurality of ring structures, and $R_{13}$ represents a hydrogen atom, a halogen atom, an alkyl group, an alkoxy group, a monovalent group having a carbonate group, or a derivative thereof

[21] <<Method of Manufacturing Liquid Crystal Display Device 4$^{th}$ Aspect>>

A method of manufacturing a liquid crystal display device including:

forming, on one of a pair of substrates, a first alignment film including a polymer compound having a first side chain having a crosslinkable functional group or a photosensitive functional group and a second side chain, and forming a second alignment film on the other of the pair of substrates, arranging the pair of substrates so that the first alignment film and the second alignment film oppose each other, and sealing a liquid crystal layer including liquid crystal molecules having negative dielectric constant anisotropy between the first alignment film and the second alignment film, and then radiating the polymer compound with an energy ray to pretilt the liquid crystal molecules, wherein the second side chain has a structure inducing dielectric anisotropy, wherein the second side chain has a dipole moment in a direction perpendicular to a long axis of the second side chain and has a structure inducing spontaneous polarization, wherein the second side chain has a dielectrically negative component, or wherein the second side chain has the following Structural Formula (11) or (12):

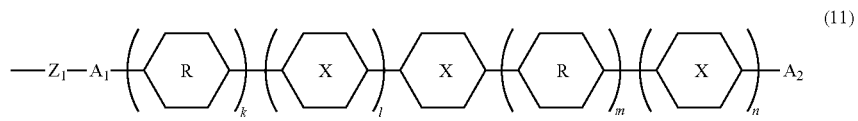

(11)

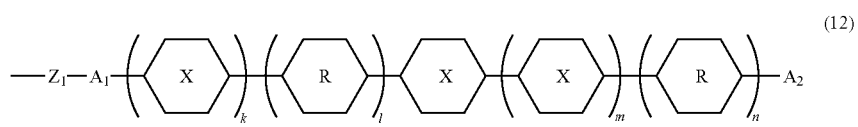

(12)

where a ring R is represented by one of the following formulae:

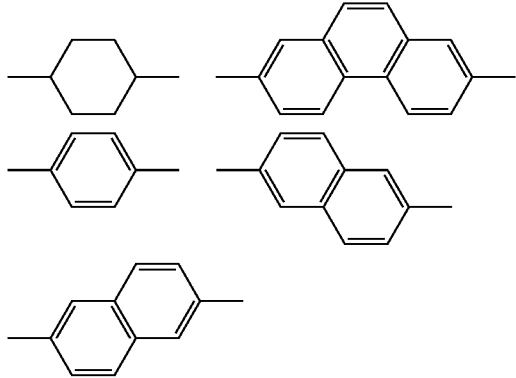

a ring X is represented by one of the following formulae:

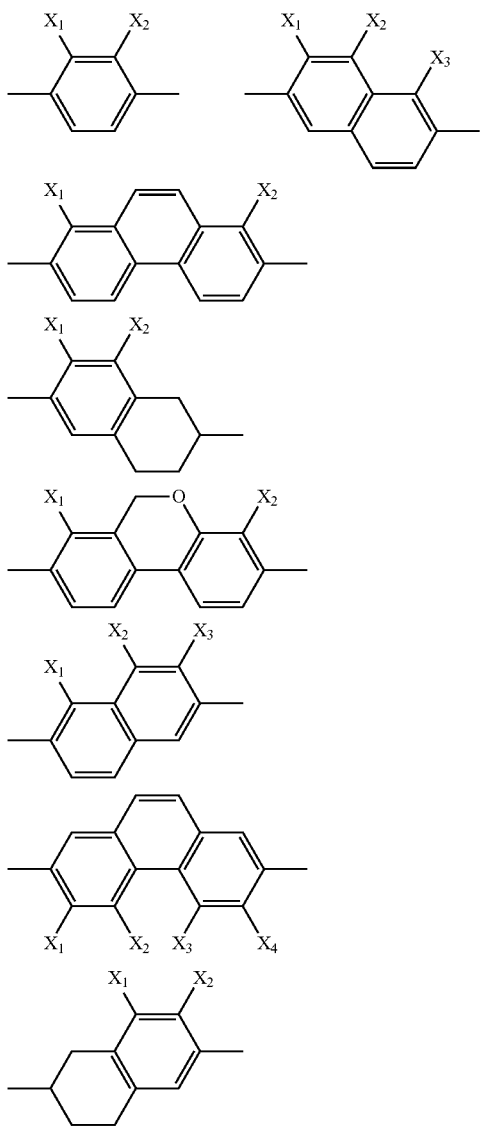

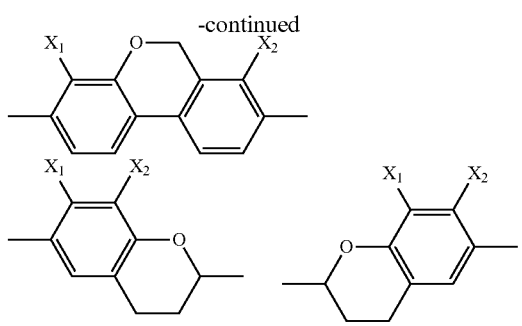

$Z_1$ represents one of a single bond, —O—, —CH$_2$O—, —OCH$_2$—, —COO— and —COO—, each of $A_1$ and $A_2$ independently represents a hydrogen atom or an unsubstituted alkyl group having 0 to 15 carbon atoms, and in the alkyl group, any non-adjacent —(CH$_2$)— may be substituted by —O—, —S— or —CO—, and any —(CH$_2$)— may be substituted by —CH=CH— or —C≡C—, $X_1$ represents one of a halogen atom, —CN, —OCF$_3$, —CF$_3$, —CHF$_2$, —CH$_2$F, —OCF$_2$CHF$_2$ or —OCF$_2$CHFCF$_3$, each of $X_2$, $X_3$ and $X_4$ independently represents a hydrogen atom, a halogen atom, —CN, —OCF$_3$, —CF$_3$, —CHF$_2$, —CH$_2$F, —OCF$_2$CHF$_2$ or —OCF$_2$CHFCF$_3$, and each of k, l, m, and n independently represents 0 or 1.

[22] The method of manufacturing a liquid crystal display device according to [21], the method including applying an ultraviolet ray as an energy ray to the polymer compound while aligning the liquid crystal molecules by applying a predetermined electric field to the liquid crystal layer.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display device comprising
    a liquid crystal display element including
        a first alignment film and a second alignment film provided on opposing surfaces of a pair of substrates, and
        a liquid crystal layer arranged between the first alignment film and the second alignment film and including crystal molecules having negative dielectric constant anisotropy,
    wherein at least the first alignment film includes a compound in which a polymer compound having a first side chain and a second side chain is crosslinked or polymerized,
    wherein the first side chain has a crosslinkable functional group or a polymerizable functional group,
    wherein the second side chain has the following Structural Formula (11) or (12), and
    wherein the liquid crystal molecules are pretilted by the first alignment film:

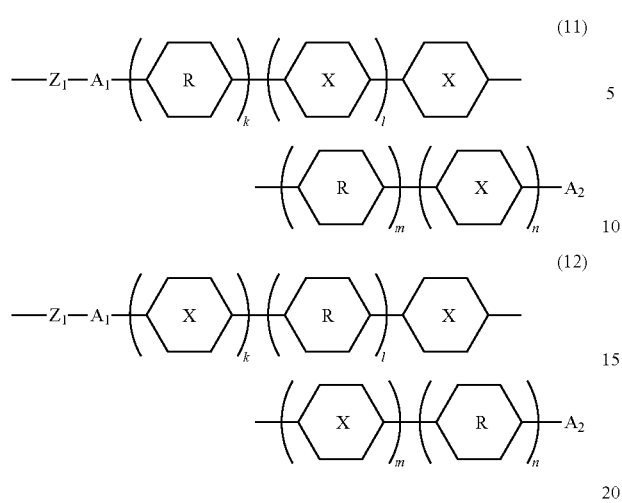

where a ring R is represented by one of the following formulae:

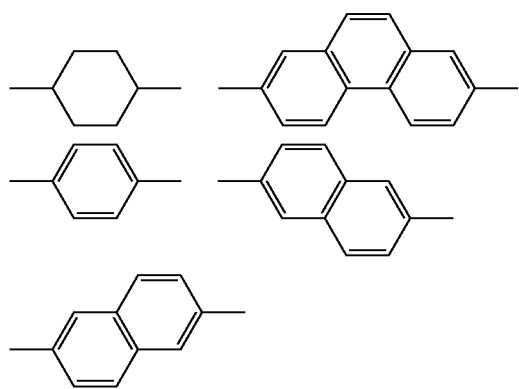

a ring X is represented by one of the following formulae:

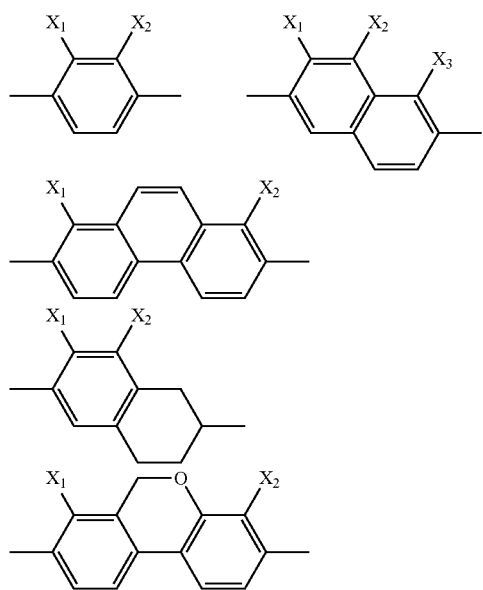

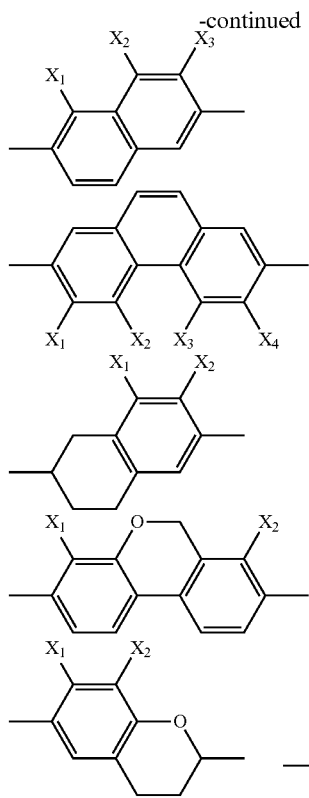

$Z_1$ represents one of a single bond, —O—, —CH$_2$O—, —OCH$_2$—, —COO— and —OCO—, each of $A_1$ and $A_2$ independently represents a hydrogen atom or an unsubstituted alkyl group having 0 to 15 carbon atoms, and in the alkyl group, any non-adjacent —(CH$_2$)— may be substituted by —O—, —S— or —CO—, and any —(CH$_2$)— may be substituted by —CH=CH— or —C≡C—, $X_1$ represents one of a halogen atom, —CN, —OCF$_3$, —CF$_3$, —CHF$_2$, —CH$_2$F, —OCF$_2$CHF$_2$ or —OCF$_2$CHFCF$_3$, each of $X_2$, $X_3$ and $X_4$ independently represents a hydrogen atom, a halogen atom, —CN, —OCF$_3$, —CF$_3$, —CHF$_2$, —CH$_2$F, —OCF$_2$CHF$_2$ or —OCF$_2$CHFCF$_3$, and each of k, l, m, and n independently represents 0 or 1.

2. A liquid crystal display device comprising a liquid crystal display element including a first alignment film and a second alignment film provided on opposing surfaces of a pair of substrates, and a liquid crystal layer arranged between the first alignment film and the second alignment film and including crystal molecules having negative dielectric constant anisotropy, wherein at least the first alignment film includes a compound in which a polymer compound having a first side chain and a second side chain is deformed, wherein the first side chain has a photosensitive functional group, wherein the second side chain has the following Structural Formula (11) or (12), and wherein the liquid crystal molecules are pretilted by the first alignment film:

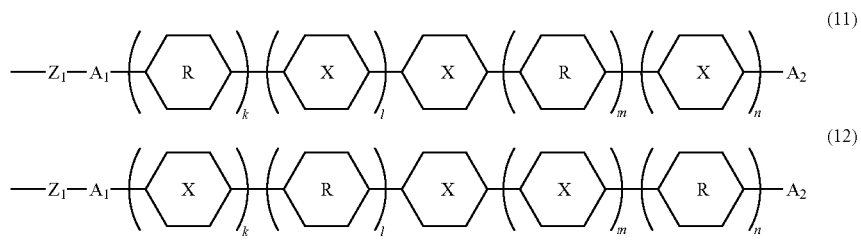

where a ring R is represented by one of the following formulae:

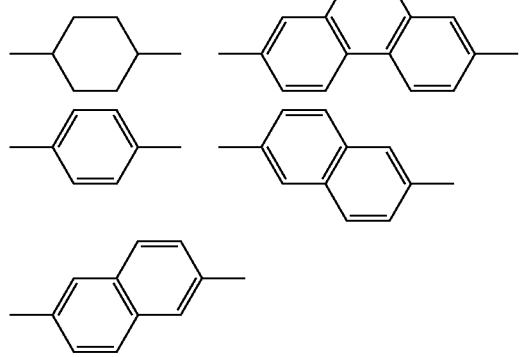

a ring X is represented by one of the following formulae:

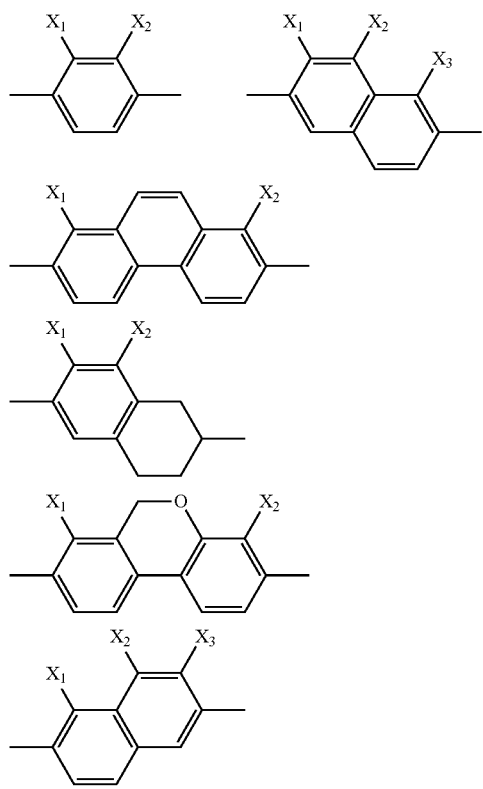

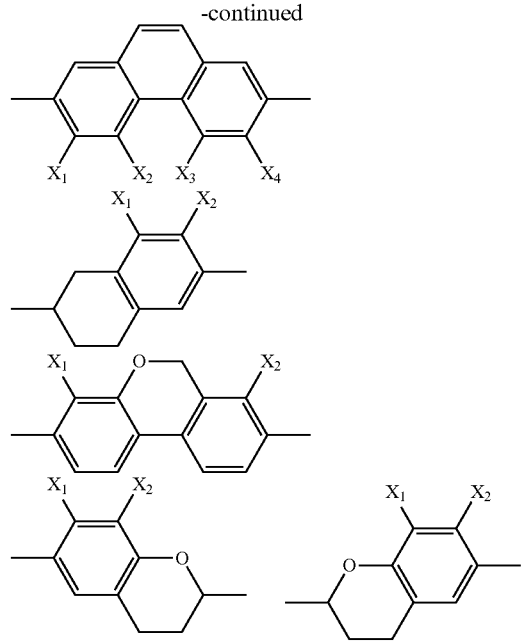

$Z_1$ represents one of a single bond, —O—, —CH$_2$O—, —OCH$_2$—, —COO— and —OCO—, each of $A_1$ and $A_2$ independently represents a hydrogen atom or an unsubstituted alkyl group having 0 to 15 carbon atoms, and in the alkyl group, any non-adjacent —(CH$_2$)— may be substituted by —O—, —S— or —CO—, and any —(CH$_2$)— may be substituted by —CH═CH— or —C≡C—, $X_1$ represents one of a halogen atom, —CN, —OCF$_3$, —CF$_3$, —CHF$_2$, —CH$_2$F, —OCF$_2$CHF$_2$ or —OCF$_2$CHFCF$_3$, each of $X_2$, $X_3$ and $X_4$ independently represents a hydrogen atom, a halogen atom, —CN, —OCP$_3$, —CF$_3$, —CHF$_2$, —CH$_2$F, —OCF$_2$CHF$_2$ or —OCF$_2$CHFCF$_3$, and each of k, l, m, and n independently represents 0 or 1.

3. A liquid crystal display device comprising
a liquid crystal display element including
a first alignment film and a second alignment film provided on opposing surfaces of a pair of substrates, and
a liquid crystal layer arranged between the first alignment film and the second alignment film and including crystal molecules having negative dielectric constant anisotropy,
wherein at least the first alignment film includes a compound in which a polymer compound having a side chain is crosslinked or polymerized,
wherein the side chain has a crosslinkable functional group or a polymerizable functional group, and has the following Structural Formula (13), (14), (15) or (16), and
wherein the liquid crystal molecules are pretilted by the first alignment film:

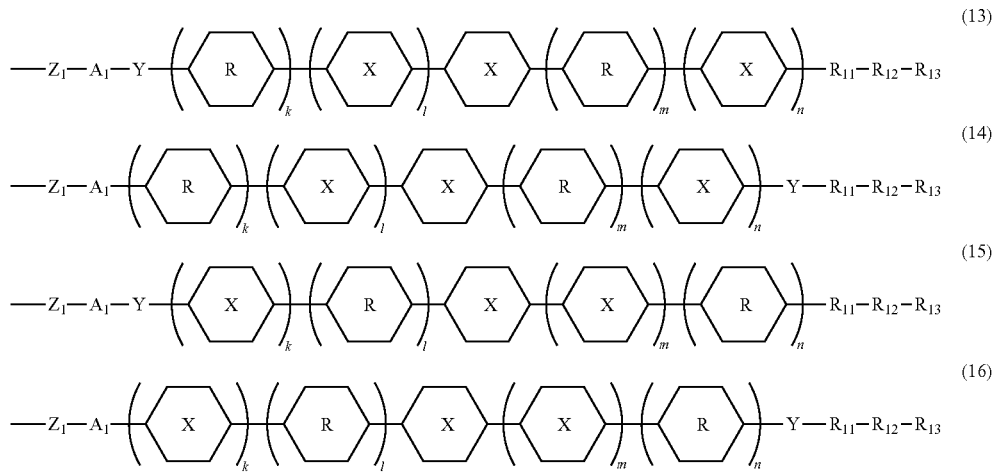

where a ring R is represented by one of the following formulae:

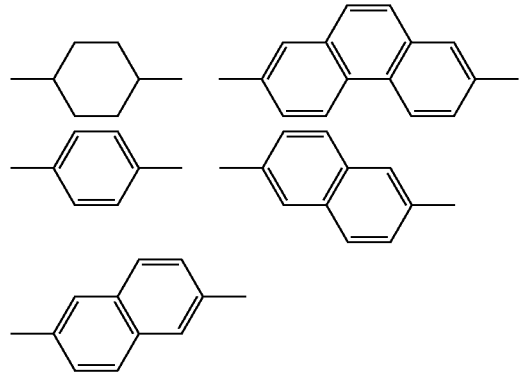

a ring X is represented by one of the following formulae:

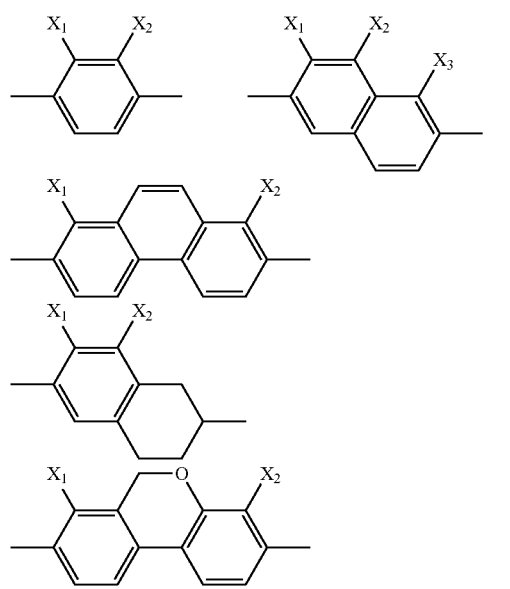

$Z_1$ represents one of a single bond, —O—, —CH$_2$O—, —OCH$_2$—, —COO— and —OCO—, each of $A_1$ and $A_2$ independently represents a hydrogen atom or an unsubstituted alkyl group having 0 to 15 carbon atoms, and in the alkyl group, any non-adjacent —(CH$_2$)— may be substituted by —O—, —S— or —CO—, and any —(CH$_2$)— may be substituted by —CH=CH— or —C≡C—, $X_1$ represents one of a halogen atom, —CN, —OCF$_3$, —CF$_3$, —CHF$_2$, —CH$_2$F, —OCF$_2$CHF$_2$ or —OCF$_2$CHFCF$_3$, each of $X_2$, $X_3$ and $X_4$ independently represents a hydrogen atom, a halogen atom, —CN, —OCP$_3$, —CF$_3$, —CHF$_2$, —CH$_2$F, —OCF$_2$CHF$_2$ or —OCF$_2$CHFCF$_3$, each of k, l, m, and n independently represents 0 or 1, Y represents a crosslinkable functional group or a polymerizable functional group, $R_{11}$ represents a linear or branched divalent organic group including an ether group or an ester group having one or more carbon atoms, or at least one kind of bond group selected from the group consisting of ether, ester, ether ester, acetal, ketal, hemiacetal and hemiketal, $R_{12}$ represents a divalent organic group including a plurality of ring structures, and $R_{13}$ represents a hydrogen atom, a halogen atom, an alkyl group, an alkoxy group, a monovalent group having a carbonate group, or a derivative thereof.

4. A method of manufacturing a liquid crystal display device comprising:

forming, on one of a pair of substrates, a first alignment film including a polymer compound having a first side chain having a crosslinkable functional group or a polymerizable functional group and a second side chain, and forming a second alignment film on the other of the pair of substrates, arranging the pair of substrates so that the first alignment film and the second alignment film oppose each other, and sealing a liquid crystal layer including liquid crystal molecules having negative dielectric constant anisotropy between the first alignment film and the second alignment film, and then crosslinking or polymerizing the first side chain in the polymer compound to pretilt the liquid crystal molecules, wherein the second side chain has a structure inducing dielectric anisotropy, wherein the second side chain has a dipole moment in a direction perpendicular to a long axis of the second side chain and has a structure inducing spontaneous polarization, wherein the second side chain has a dielectrically negative component, or wherein the second side chain has the following Structural Formula (11) or (12):

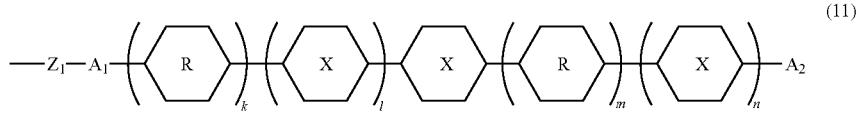

(11)

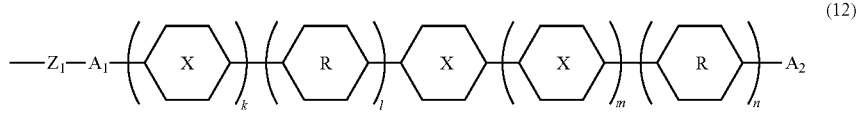

(12)

where a ring R is represented by one of the following formulae:

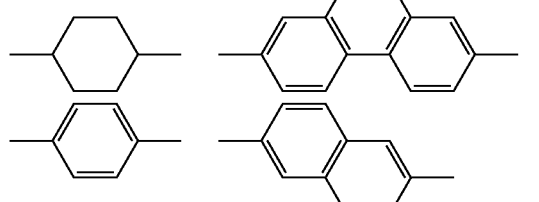

a ring X is represented by one of the following formulae:

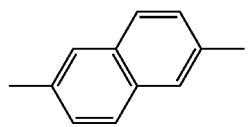

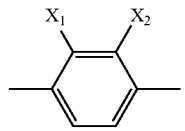

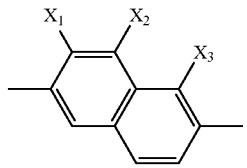

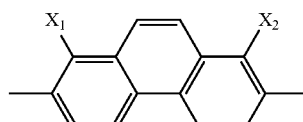

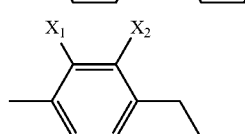

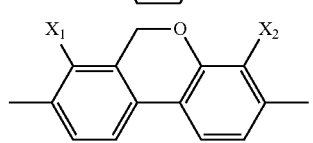

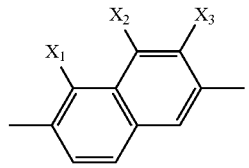

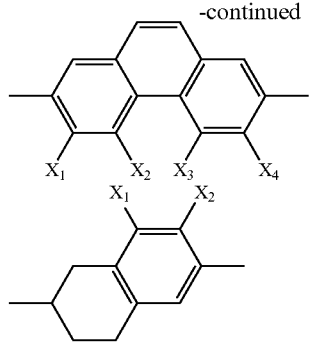

-continued

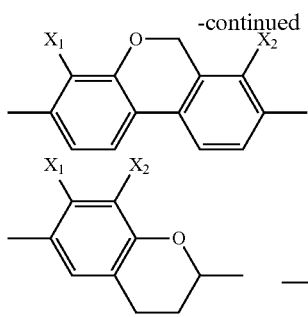

$Z_1$ represents one of a single bond, —O—, —CH$_2$O—, —OCH$_2$—, —COO— and —OCO—, each of $A_1$ and $A_2$ independently represents a hydrogen atom or an unsubstituted alkyl group having 0 to 15 carbon atoms, and in the alkyl group, any non-adjacent —(CH$_2$)— may be substituted by —O—, —S— or —CO—, and any —(CH$_2$)— may be substituted by —CH=CH— or —C≡C—, $X_1$ represents one of a halogen atom, —CN, —OCF$_3$, —CF$_3$, —CHF$_2$, —CH$_2$F, —OCF$_2$CHF$_2$ or —OCP$_2$CHFCF$_3$, each of $X_2$, $X_3$ and $X_4$ independently represents a hydrogen atom, a halogen atom, —CN, —OCP$_3$, —CF$_3$, —CHF$_2$, —CH$_2$F, —OCF$_2$CHF$_2$ or —OCF$_2$CHFCF$_3$, and each of k, l, m, and n independently represents 0 or 1.

5. A method of manufacturing a liquid crystal display device comprising:

forming, on one of a pair of substrates, a first alignment film including a polymer compound having a first side chain having a photosensitive functional group and a second side chain, and forming a second alignment film on the other of the pair of substrates, arranging the pair of substrates so that the first alignment film and the second alignment film oppose each other, and sealing a liquid crystal layer including liquid crystal molecules having negative dielectric constant anisotropy between the first alignment film and the second alignment film, and then deforming the first side chain in the polymer compound to pretilt the liquid crystal molecules, wherein the second side chain has a structure inducing dielectric anisotropy, wherein the second side chain has a dipole moment in a direction perpendicular to a long axis of the second side chain and has a structure inducing spontaneous polarization, wherein the second side chain has a dielectrically negative component, or wherein the second side chain has the following Structural Formula (11) or (12):

where a ring R is represented by one of the following formulae:

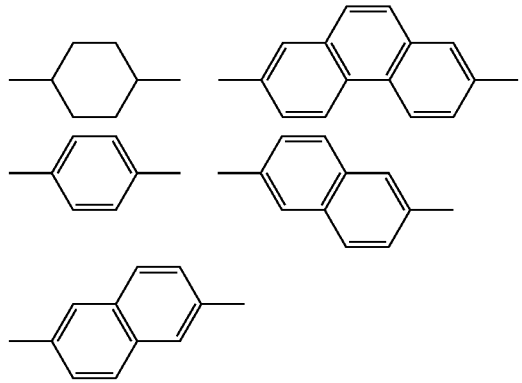

a ring X is represented by one of the following formulae:

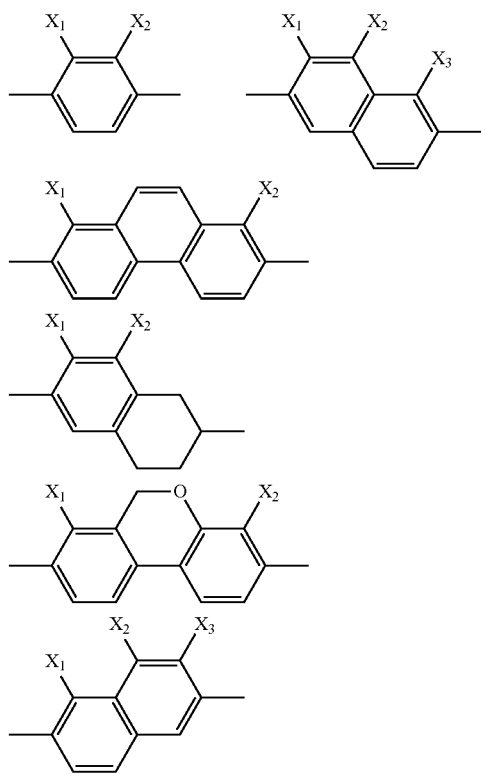

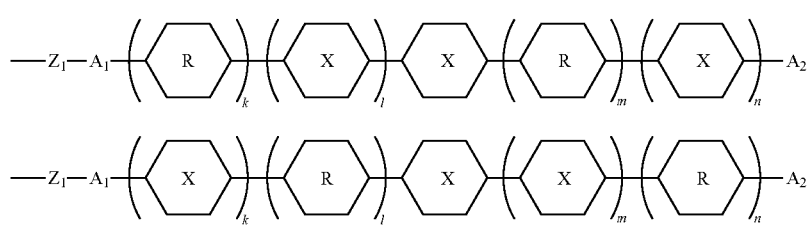

-continued

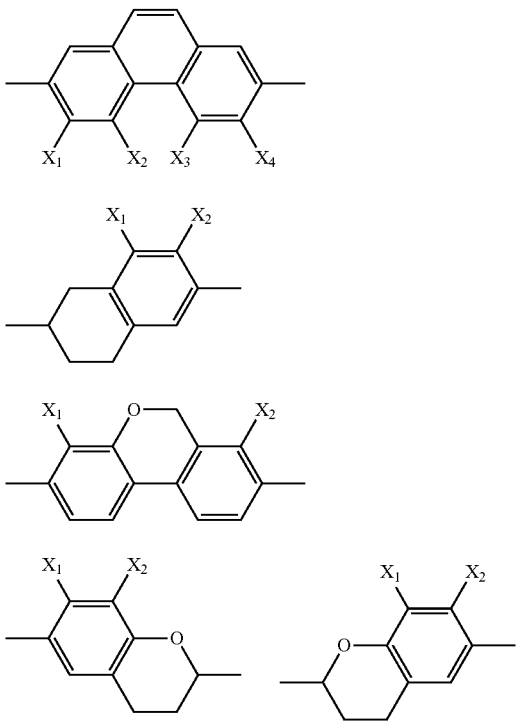

$Z_1$ represents one of a single bond, —O—, —CH$_2$O—, —OCH$_2$—, —COO— and —OCO—, each of A$_1$ and A$_2$ independently represents a hydrogen atom or an unsubstituted alkyl group having 0 to 15 carbon atoms, and in the alkyl group, any non-adjacent —(CH$_2$)— may be substituted by —O—, —S— or —CO—, and any —(CH$_2$)— may be substituted by —CH═CH— or —C≡C—, X$_1$ represents one of a halogen atom, —CN, —OCF$_3$, —CF$_3$, —CHF$_2$, —CH$_2$F, —OCF$_2$CHF$_2$ or —OCF$_2$CHFCF$_3$, each of X$_2$, X$_3$ and X$_4$ independently represents a hydrogen atom, a halogen atom, —CN, —OCP$_3$, —CF$_3$, —CHF$_2$, —CH$_2$F, —OCF$_2$CHF$_2$ or —OCF$_2$CHFCF$_3$, and each of k, l, m, and n independently represents 0 or 1.

6. A method of manufacturing a liquid crystal display device comprising:

forming, on one of a pair of substrates, a first alignment film including a polymer compound having a side chain and forming a second alignment film on the other of the pair of substrates, arranging the pair of substrates so that the first alignment film and the second alignment film oppose each other, and sealing a liquid crystal layer including liquid crystal molecules having negative dielectric constant anisotropy between the first alignment film and the second alignment film, and then crosslinking or polymerizing the side chain in the polymer compound to pretilt the liquid crystal molecules, wherein the side chain has a crosslinkable functional group or a polymerizable functional group, and a structure inducing dielectric anisotropy, a dipole moment in a direction perpendicular to a long axis of the side chain and has a structure inducing spontaneous polarization, a dielectrically negative component, or the following Structural Formula (13), (14), (15) or (16):

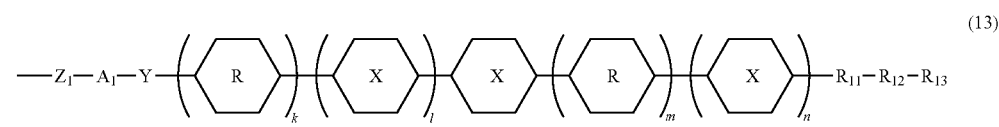
(13)

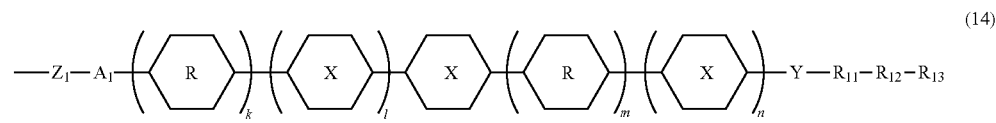
(14)

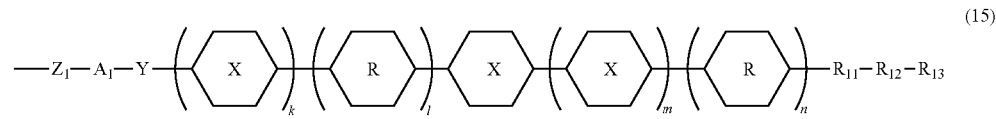
(15)

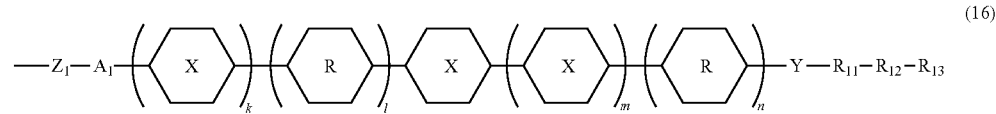
(16)

where a ring R is represented by one of the following formulae:

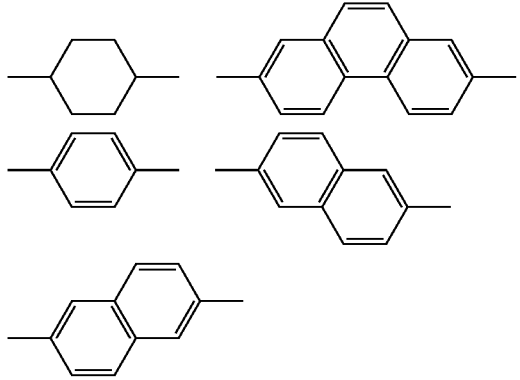

a ring X is represented by one of the following formulae:

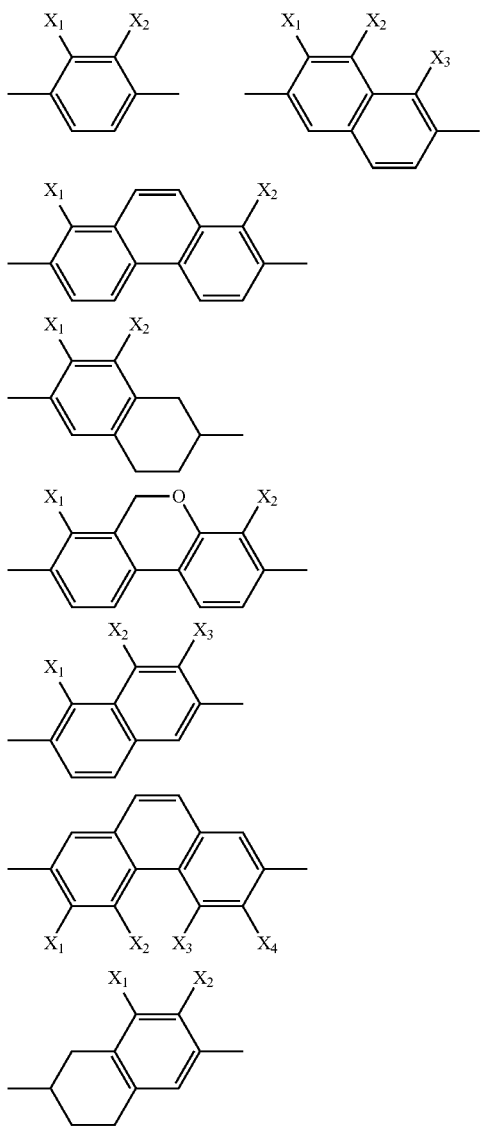

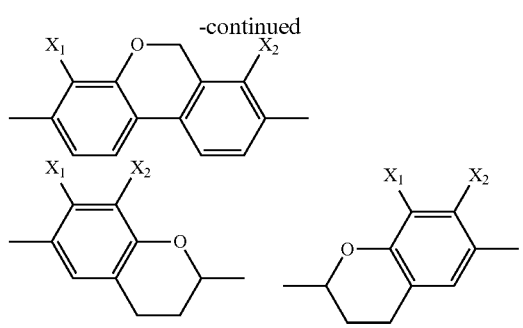

$Z_1$ represents one of a single bond, —O—, —CH$_2$O—, —OCH$_2$—, —COO— and —OCO—, each of $A_1$ and $A_2$ independently represents a hydrogen atom or an unsubstituted alkyl group having 0 to 15 carbon atoms, and in the alkyl group, any non-adjacent —(CH$_2$)— may be substituted by —O—, —S— or —CO—, and any —(CH$_2$)— may be substituted by —CH=CH— or —C≡C—, $X_1$ represents one of a halogen atom, —CN, —OCF$_3$, —CF$_3$, —CHF$_2$, —CH$_2$F, —OCF$_2$CHF$_2$ or —OCF$_2$CHFCF$_3$, each of $X_2$, $X_3$ and $X_4$ independently represents a hydrogen atom, a halogen atom, —CN, —OCF$_3$, —CF$_3$, —CHF$_2$, —CH$_2$F, —OCF$_2$CHF$_2$ or —OCF$_2$CHFCF$_3$, each of k, l, m, and n independently represents 0 or 1, Y represents a crosslinkable functional group or a polymerizable functional group, $R_{11}$ represents a linear or branched divalent organic group including an ether group or an ester group having one or more carbon atoms, or at least one kind of bond group selected from the group consisting of ether, ester, ether ester, acetal, ketal, hemiacetal and hemiketal, $R_{12}$ represents a divalent organic group including a plurality of ring structures, and $R_{13}$ represents a hydrogen atom, a halogen atom, an alkyl group, an alkoxy group, a monovalent group having a carbonate group, or a derivative thereof.

7. A method of manufacturing a liquid crystal display device comprising:
forming, on one of a pair of substrates, a first alignment film including a polymer compound having a first side chain having a crosslinkable functional group or a photosensitive functional group and a second side chain, and forming a second alignment film on the other of the pair of substrates,
arranging the pair of substrates so that the first alignment film and the second alignment film oppose each other, and sealing a liquid crystal layer including liquid crystal molecules having negative dielectric constant anisotropy between the first alignment film and the second alignment film, and then
radiating the polymer compound with an energy ray to pretilt the liquid crystal molecules,
wherein the second side chain has a structure inducing dielectric anisotropy,
wherein the second side chain has a dipole moment in a direction perpendicular to a long axis of the second side chain and has a structure inducing spontaneous polarization,
wherein the second side chain has a dielectrically negative component, or
wherein the second side chain has the following Structural Formula (11) or (12):

$$—Z_1—A_1—\left(\left(\underset{k}{R}\right)\left(\underset{l}{X}\right)\left(\underset{m}{X}\right)\left(\underset{m}{R}\right)\left(\underset{n}{X}\right)\right)—A_2 \quad (11)$$

$$—Z_1—A_1—\left(\left(\underset{k}{X}\right)\left(\underset{l}{R}\right)\left(\underset{l}{X}\right)\left(\underset{m}{X}\right)\left(\underset{n}{R}\right)\right)—A_2 \quad (12)$$

where a ring R is represented by one of the following formulae:

a ring X is represented by one of the following formulae:

$Z_1$ represents one of a single bond, —O—, —CH$_2$O—, —OCH$_2$—, —COO— and —OCO—, each of $A_1$ and $A_2$ independently represents a hydrogen atom or an unsubstituted alkyl group having 0 to 15 carbon atoms, and in the alkyl group, any non-adjacent —(CH$_2$)— may be substituted by —O—, —S— or —CO—, and any —(CH$_2$)— may be substituted by —CH=CH— or —C≡C—, $X_1$ represents one of a halogen atom, —CN, —OCF$_3$, —CF$_3$, —CHF$_2$, —CH$_2$F, —OCF$_2$CHF$_2$ or —OCP$_2$CHFCF$_3$, each of $X_2$, $X_3$ and $X_4$ independently represents a hydrogen atom, a halogen atom, —CN, —OCP$_3$, —CF$_3$, —CHF$_2$, —CH$_2$F, —OCF$_2$CHF$_2$ or —OCF$_2$CHFCF$_3$, and each of k, l, m, and n independently represents 0 or 1.

* * * * *